United States Patent
Nakahara et al.

(10) Patent No.: US 6,167,610 B1
(45) Date of Patent: *Jan. 2, 2001

(54) METHOD OF MAKING A ROTARY MOTOR

(75) Inventors: Yuji Nakahara; Ken-ichi Azuma; Masaru Matsumoto; Youichi Fujita, all of Hyogo; Satoru Akutsu, Fukushima; Akira Hashimoto, Kanagawa; Yasunori Takai, Hyogo; Tadashi Hasegawa; Hiroshi Miyazaki, both of Fukushima; Junji Kawada, Kanagawa, all of (JP)

(73) Assignee: Mitsubishi Denki Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/582,595

(22) Filed: Jan. 3, 1996

Related U.S. Application Data

(62) Division of application No. 08/333,142, filed on Nov. 1, 1994, now Pat. No. 5,859,486.

(30) Foreign Application Priority Data

| Nov. 8, 1993 | (JP) | 5-278562 |
| Apr. 28, 1994 | (JP) | 6-92041 |
| Aug. 5, 1994 | (JP) | 6-184802 |

(51) Int. Cl.$^7$ .................................................. H02K 15/09

(52) U.S. Cl. .......................... 29/596; 29/606; 29/609; 310/42; 310/259

(58) Field of Search ....................... 29/596, 598, 609, 29/606; 310/42, 43, 259

(56) References Cited

U.S. PATENT DOCUMENTS

| 1,779,950 | 10/1930 | Reichel | 310/254 |
| 2,253,191 | 8/1941 | Morrill . | |
| 2,554,226 | 5/1951 | Taylor | 310/254 |
| 3,320,451 | 5/1967 | Wiley | 310/216 |
| 3,464,106 | 9/1969 | Barrett . | |
| 3,606,674 | 9/1971 | Givan . | |
| 3,710,158 | 1/1973 | Bachle et al. | 310/156 |
| 3,829,720 | 8/1974 | Swanke et al. | 310/43 |
| 3,909,643 | 9/1975 | Kishima . | |
| 4,102,040 | * 7/1978 | Rich | 29/598 |
| 4,206,621 | 6/1980 | Kawasaki et al. | 72/130 |
| 4,350,914 | 9/1982 | Searle | 310/194 |
| 4,359,763 | 11/1982 | Hoffman . | |

(List continued on next page.)

FOREIGN PATENT DOCUMENTS

| 1914317 | 9/1970 | (DE) . | |
| 32 23 897 A1 | 12/1983 | (DE) | H02K/29/02 |

(List continued on next page.)

OTHER PUBLICATIONS

Austrian Search Report, issued for application No. 9601848–6.

\* cited by examiner

*Primary Examiner*—Carl E. Hall
(74) *Attorney, Agent, or Firm*—Wolf, Greenfield & Sacks, P.C.

(57) ABSTRACT

Magnetic materials which are divided into a plurality of blocks or divided corresponding to respective magnetic pole teeth are connected by means of thin portions. The respective magnetic pole teeth are wound continuously with wire without cutting the wire at the positions in which the thin portions are connected. When a stator is assembled, a plurality of blocks or magnetic pole teeth are disposed on a substrate by separating or bending the thin portions.

12 Claims, 107 Drawing Sheets

U.S. PATENT DOCUMENTS

| | | |
|---|---|---|
| 4,363,987 | 12/1982 | Vorotyntseva et al. . |
| 4,365,180 * | 12/1982 | Licata et al. .................. 29/598 X |
| 4,384,226 | 5/1983 | Sato et al. .................. 310/89 |
| 4,402,129 * | 9/1983 | Kreuzer et al. .................. 29/596 |
| 4,519,010 | 5/1985 | Elsaesser et al. .................. 360/97 |
| 4,547,714 | 10/1985 | Müller .................. 318/254 |
| 4,593,223 | 6/1986 | Lehoczky .................. 310/258 |
| 4,754,178 | 6/1988 | Kavanaugh .................. 310/49 R |
| 4,758,752 | 7/1988 | Leenhouts .................. 310/49 R |
| 4,868,439 | 9/1989 | King .................. 310/217 |
| 4,882,832 | 11/1989 | Lewis .................. 29/596 |
| 5,047,745 | 9/1991 | Marriott et al. .................. 310/217 |
| 5,057,733 | 10/1991 | Sonoda et al. .................. 310/269 |
| 5,086,245 | 2/1992 | Sieja et al. .................. 310/216 |
| 5,113,104 | 5/1992 | Blaettner et al. .................. 310/90 |
| 5,124,863 | 6/1992 | Koizumi et al. . |
| 5,173,889 | 12/1992 | Nagahisa et al. .................. 369/37 |
| 5,304,878 | 4/1994 | Oda et al. .................. 310/67 R |
| 5,319,270 | 6/1994 | Tanaka et al. .................. 310/67 R |
| 5,457,873 | 10/1995 | Cattaneo .................. 29/606 |
| 5,477,096 | 12/1995 | Sakashita et al. .................. 310/216 |
| 5,489,811 | 2/1996 | Kern et al. .................. 310/216 |
| 5,592,731 * | 1/1997 | Huang et al. .................. 29/596 |

FOREIGN PATENT DOCUMENTS

| | | |
|---|---|---|
| 3408394 | 9/1985 | (DE) . |
| 3 629 423 A1 | 3/1988 | (DE) .................. H02K/29/00 |
| 3629423 | 3/1988 | (DE) . |
| 3639004 | 5/1988 | (DE) . |
| 4 117 801 A1 | 12/1991 | (DE) .................. H02K/21/14 |
| 0097756 | 1/1984 | (EP) . |
| 0160147 | 11/1985 | (EP) . |
| 0 445 367 A1 | 9/1991 | (EP) .................. H02K/1/16 |
| 2201575 | 4/1974 | (FR) . |
| 2219508 | 9/1974 | (FR) . |
| 1129932 | 3/1967 | (GB) . |
| 2245108 | 12/1991 | (GB) . |
| 55-48392 | 9/1953 | (JP) . |
| 56-80638 | 11/1954 | (JP) . |
| 50-122608 | 9/1975 | (JP) . |
| 50-132401 | 10/1975 | (JP) . |
| 52-34301 * | 3/1977 | (JP) .................. 29/596 |
| 56-112838 | 9/1981 | (JP) . |
| 56-117568 | 9/1981 | (JP) . |
| 57-068644 | 4/1982 | (JP) . |
| 58-130751 | 8/1983 | (JP) . |
| 59-206188 | 11/1984 | (JP) . |
| 60-46745 | 3/1985 | (JP) . |
| 61-124241 | 6/1986 | (JP) . |
| 62-107833 | 5/1987 | (JP) . |
| 62-185462 | 11/1987 | (JP) . |
| 63-21455 | 2/1988 | (JP) . |
| 63-87146 | 4/1988 | (JP) . |
| 63-131567 | 8/1988 | (JP) . |
| 01252141 * | 6/1989 | (JP) . |
| 01252141 | 10/1989 | (JP) . |
| 01264548 | 10/1989 | (JP) . |
| 1-252141 | 10/1989 | (JP) . |
| 1-159557 | 11/1989 | (JP) . |
| 2-52127 | 2/1990 | (JP) . |
| 2-123933 | 5/1990 | (JP) . |
| 2-179247 | 7/1990 | (JP) . |
| 2-211035 | 8/1990 | (JP) . |
| 2-29800 | 8/1990 | (JP) .................. H02K/5/04 |
| 4-42760 | 2/1992 | (JP) . |
| 4-134291 | 4/1992 | (JP) . |
| 4-147776 | 5/1992 | (JP) . |
| 4-178149 | 6/1992 | (JP) . |
| 4-178157 | 6/1992 | (JP) . |
| 4-80276 | 6/1992 | (JP) . |
| 04298013 | 10/1992 | (JP) . |
| 05003648 | 1/1993 | (JP) . |
| 5-9171 | 2/1993 | (JP) . |
| 05095643 | 4/1993 | (JP) . |
| 05283833 | 10/1993 | (JP) . |
| 5-292708 | 11/1993 | (JP) . |
| 5-86151 | 11/1993 | (JP) .................. G11B/19/20 |

ND OF THE INVENTION

1. Field of the Invention

The present invention relates to the construction of a thin structure motor for driving a medium used in a magnetic disk drive unit or an optical disk drive unit, the production method thereof, and the laminated core and the production method thereof.

2. Description of the Prior Art

FIG. 139 shows the stator of the spindle motor for the disk drive unit disclosed in Japanese Patent Publication No. 5-39020. The same Figure shows a stator core 20 formed integratedly by punching the magnetic material and stator coils 2 which are wound around respective teeth of the stator core 20 so that they are contained in respective slats. The spindle motor using this stator core 20 is called inner rotor type. Inside the stator, a rotor and rotor magnets are disposed so as to face the stator. The structure of the inner rotor makes it possible to form a thin structure motor and therefore is suitable for a magnetic disk drive unit and optical disk drive unit which are required to be of compact and thin structure.

FIGS. 140, 141 show a stator of the spindle motor for the disk drive unit disclosed in Japanese Patent Laid-Open No. 2-133055 and the magnetic pole tooth of the stator core, respectively. FIG. 140 shows the stator core formed integratedly by punching magnetic material and FIG. 141 shows a magnetic tooth 15 of the stator core, which is wound with stator coil 2. The spindle motor using this stator core is called outer rotor type. Outside the stator, a ring like rotor and rotor magnets are disposed so as to face the stator. A rotor shaft is located in the center of the stator and the rotor shaft is connected to the ring like rotor magnet through a thin circular plate. The spindle motor having such structure also makes it possible to obtain small diameter and thin structure, and therefore is often used as the spindle motor for driving a magnetic disk drive unit or an optical disk drive unit.

FIGS. 142A, 142B, 143A, 143B show part of the stator cores of other spindle motors for the disk drive unit disclosed in Japanese Patent Laid-Open No. 2-133055. The spindle motor using this stator core is also of outer rotor type. A difference thereof from the aforementioned outer rotor structure is that part of the respective magnetic teeth can be separated. In the stator core shown in FIGS. 142A, 142B, slot heads 15-2 are inserted into the magnetic teeth wound with the coil 2. In the stator core shown in FIGS. 143A, 143B, respective magnetic teeth 15-3 wound with the coils 2 are inserted into the stator body 15-1.

FIG. 146 shows the structure of a motor for the magnetic disk drive unit and optical disk drive unit disclosed in Japanese Utility Model Laid-Open No. 5-86151. This motor is of inner rotor type. As shown in the same Figure, three magnetic teeth constitute a stator core 20 as a single block. Each tooth 15 is wound with the coil 2. The feature of this motor is that the stator core 20 is not disposed in the space in which the head of the disk drive unit moves. On the circumference of the rotor magnet 4, in which the stator core 20 is not disposed, shield yokes 4a are disposed so as to cover the rotor magnet.

FIG. 147 is a partial sectional view showing the stator core and the coil of the spindle motor of conventional floppy disk drive unit disclosed in Japanese Patent Laid-Open No. 5-176484. FIG. 148 is a front view of the spindle motor. This motor is of inner rotor type. In the respective Figures, reference numeral 122 designates a stator core formed by punching magnetic material integratedly and numeral 130 designates stator coil wound around the magnetic pole tooth 122a of the stator core 122. The stator core 122 is formed by laminated core in which a plurality of magnetic materials are stacked. Resin layer is formed on the surface of the stator core 122 to insulate between the stator core 122 and the stator coil 130. Reference numeral 112 designates a magnet, numeral 114 designates a shaft and numeral 116 designates a yoke.

FIG. 149 shows the stator core of a conventional thin structure motor disclosed in Japanese Patent Laid-Open No. 5-38109. As shown in the same Figure, insulating film 150 is formed on the circumference of the magnetic pole tooth of the stator core 151. That is, the insulating sheet of thermoplastic resin is heated and pressed from both sides to form insulating film 150 on the circumference of the magnetic pole tooth in order to achieve insulation treatment.

The stator shown in FIG. 139 has an integrated ring shaped stator core and therefore, it is difficult to wind the magnetic pole teeth facing inward of the stator with stator coil. In coiling, a nozzle through which wire is run is rotated around the magnetic pole teeth. However, because the inside of the stator core is small, the structure of the winding apparatus is complicated. Additionally, the coiling speed cannot be increased more than 1,000 rpm thereby suppressing the productivity of coiling low. It is impossible to increase the number of slots because the number of slots is restricted by the difficulty of coiling, thereby obstructing the increase of torque and resulting in torque ripple. Although winding wire of the coil neatly contributes to compacting and enhancement of the characteristic and reliability of the coil, it is impossible to wind wire neatly because the space between the stator core and the winding apparatus is very small.

FIG. 140 shows an integrated structure stator. Because the shape of the magnetic pole teeth of the stator core is complicated, it is impossible to wind wire effectively. For the reason, productivity is so low that cost increases and further a special winding apparatus is required.

Although the stator shown in FIGS. 142A, 142B was proposed to solve the aforementioned problem, it is impossible to achieve effective winding of wire if the number of slots is increased to improve the characteristic of the motor. Further, magnetic resistance increases at portions in which divided stator portions are combined by engagement and air gap is unequalized, so that the characteristic of the motor deteriorates. Although winding procedure is facilitated to the stator shown in FIG. 143, two coil terminals are required for every magnetic pole tooth, thereby the step for connecting coil terminals electrically after coiling is required. Thus, production cost is increased and the reliability of connection is decreased.

By dividing the stator core into blocks in the motor shown in FIG. 146, the difficulty of coiling which is a problem of the inner rotor type is relaxed. However, the step for connecting the coils wound around the respective magnetic pole teeth in respective blocks after coiling is required, thereby increasing production cost and thus decreasing the reliability. Further, because the stator core is divided to blocks, it is difficult to fix the stator core with a certain gap with respect to the rotor magnet. Still further, because the stator core comprises divided blocks, the stator core is not easy to handle or assemble.

In the stators shown in FIGS. 147 and 148, the stator core 122 is of integrated ring structure. Therefore, it is difficult to wind the respective magnetic pole teeth 122a having small gap from an magnetic pole tooth nearby, with the stator coil 130 in the direction in which the stator coil is wound inward of the stator. Namely, when a nozzle through which wire is run is rotated around the magnetic pole tooth 122a for coiling, the structure of the winding apparatus is complicated because the inside of the stator core is small. Additionally, it is impossible to increase the winding speed over 1,000 rpm, thereby suppressing productivity low.

It is impossible to increase the number of slots because the number of slots is restricted by the difficulty of coiling, thereby obstructing the increase of torque and resulting in torque ripple. Although winding wire of the coil neatly contributes to compacting and enhancement of the characteristic and reliability of the coil, in this conventional example, it is impossible to wind wire neatly because the space between the stator core 122 and the winding apparatus is very small.

Resin is integratedly molded to insulate between the stator coil 130 and the stator core 122. In this case, because the process of integrated molding of resin is required, production cost is increased. Further, because resin layer is formed on the stator core 122, additional length of the stator coil 130 is required. Thus, the amount of the magnet wire used for the stator coil 130 increases and therefore, it is impossible to form a thin structure motor.

In the stator shown in FIG. 149, insulating film 150 is formed by heating and pressing the insulating sheet of thermoplastic resin from both sides of the stator core 151 in order to insulate between the coil and the stator core 151. As a result, the insulating sheet and the process for heating and pressing thereof are required, thereby increasing production cost.

SUMMARY OF THE INVENTION

In views of the aforementioned problems, an object of the present invention is to provide a rotary motor in which it is possible to wind the stator of the rotary motor with wire easily and in which it is possible to perform terminating and connecting treatments of the coils easily. Another object of the present invention is to provide a rotary motor in which the stator core can be assembled at high precision easily to ensure high productivity and reliability at low cost.

Still another object of the present invention is to provide a rotary motor which facilitates winding wire of the coil and which can be assembled easily having high reliability. A further object of the present invention is to provide a rotary motor in which the stator can be handled separately from other members, the stator can be installed on a complicated structure base and which can be built in a recording/reproducing apparatus easily.

A still further object of the present invention is to provide a laminated core which can be formed easily and in which the coil can be arranged and formed on the magnetic pole teeth easily. A yet still further object of the present invention is to provide laminated core which can be fixed securely to the structure through screws at position near the thin portions and which can form a magnetic path for connecting respective stator components. A yet still further object of the present invention is to provide laminated core which is capable of preventing deformation and damage of the thin portions before the laminated core is obtained by bending the thin portions. A yet still further object of the present invention is to provide laminated core in which the thin portions can be bent easily even if a large number of magnetic members are to be stacked. A yet still further object of the present invention is to provide laminated core in which magnetic members can be positioned and held accurately to form the coils on the magnetic teeth.

A yet still further object of the present invention is to provide laminated core which is capable of securing stabilized integrated structure so that the laminated core can be installed rigidly and securely. A yet still further object of the present invention is to provide laminated core which can be wound with wire directly or through thin film. A yet still further object of the present invention is to provide laminated core which is capable of preventing magnet wire from being damaged by the corners at both ends of the magnetic materials. A yet still further object of the present invention is to provide laminated core which can be wound with wire by only simple insulating treatment. A yet still further object of the present invention is to provide laminated core in which the terminal wire of the coil to be wound around the magnetic pole teeth can be treated easily. A yet still further object of the present invention is to provide laminated core which facilitates to construct a transformer.

A yet still further object of the present invention is to provide the method for forming the laminated core, in which the laminated core of the stator can be assembled easily and quickly. A yet still further object of the present invention is to provide a method for forming the laminated core, in which the laminated core can be formed in simpler process.

The rotary motor according to the first aspect comprises a stator portion having coils which are disposed on respective magnetic pole teeth of the stator core formed by stacked magnetic materials and a rotor portion which is disposed along the inner circumference of the stator portion. The stator portion is constituted of blocks including the same number of magnetic pole teeth as the number of the phases of the rotary motor. The stator portion is fixed on molded resin product or substrate so as to face the rotor portion, in the state in which a plurality of the blocks are connected through the thin portions or a plurality of the blocks are separated by cutting the thin portions.

In this rotary motor, it is easy to form the coils for each block because the same number of magnetic pole teeth as that of the phases are contained in a single block.

That is, it is possible to locate a wire winding machine at a position facing a plurality of connected blocks and further, the space necessary for the wire winding machine is not restricted by the shape of the stator. Still further, because, after the formation of the coil is completed, the stator portion is mounted and fixed onto the molded resin product or substrate with the state in which the thin portions are connected or the thin portions are cut off, the assembly of the stator is facilitated and performed with higher accuracy.

The rotary motor according to the second aspect of the present invention includes magnetic pole teeth which are parallel to each other in each block.

Because the magnetic pole teeth of each block are parallel to each other, when coils are formed on respective magnetic pole teeth, the nozzle of the wire winding machine is located parallel to all the magnetic pole teeth. Thus, the construction of the wire winding machine can be simplified. Additionally, by providing the wire winding machine with the same number of the nozzles as the number of the magnetic pole teeth in a single block, it is possible to wind wires on a plurality of coils at the same time. Further, because the motion of the nozzle can be simplified when wire is wounded, it is also possible to improve the speed of wire winding and reduce the possibility of winding fault occurrence. According to these effects, it is possible to improve the productivity of winding the stator with wire.

The rotary motor according to the third aspect of the present invention includes a coil which is disposed on the yoke portion of the block.

Because this rotary motor is provided with a coil at the yoke portion of the block also, as compared with the stator in which coils are disposed on only the magnetic pole teeth, it is possible to relatively increase the amount of the coil in a limited space. Thus, the torque of the rotary motor can be increased. As compared with conventional rotary motor having the same output, the structure of the rotary motor can be thinned because the coils can be arranged with improved balance.

The rotary motor according to the fourth aspect of the present invention includes a block or a plurality of the blocks which have the same potential level as the power supply terminal of the coil or the neutral point terminal, and uses the stator as the connecting terminal.

Because a block or a plurality of the blocks have the same potential as the power supply terminal or the neutral point terminal of the coil, no additional connecting terminal is needed to automatically process the terminal of the coil when the teeth are wound with wires. Additionally, a plurality of the blocks can be used as the connecting terminals at the same time. That is, when the teeth are wounded with wires, the terminals of the coils are directly tied and soldered to the blocks which need to be electrically connected, so that processing of the terminals of the power supply terminal or the neutral point terminal is facilitated.

In the rotary motor according to the fifth aspect of the present invention, two protrusions having a step are provided so as to be perpendicular to the substrate at a piece facing the substrate, of the core members of the blocks, the stator being inserted into holes made on the substrate for the positioning and fixing thereof.

In this rotary motor, it is possible to connect the block directly with the substrate, so that a plurality of the blocks can be arranged and assembled highly accurately. That is, the deflection between the rotor and the stator can be minimized, so that a rotary motor which is hardly deflected due to occurrence of cogging torque can be obtained.

The production method for the rotary motor according to the sixth aspect of the present invention comprises the process for punching the magnetic material by press so that a plurality of blocks are connected in series in a direction perpendicular to the direction of magnetic flux flow of the center magnetic pole teeth of each block, the process for stacking a plurality of the magnetic materials and the process for forming the stator by continuously winding a plurality of the magnetic pole teeth of the stacked magnetic materials without cutting the crossover wire.

The production method for the rotary motor according to the seventh aspect of the present invention comprises the process for mounting the stator on a molded resin product or a substrate in the state in which the thin portions of a plurality of the blocks are bent or the thin portions of a plurality of the blocks are separated.

According to this method, the formation of coils when wire is wound is facilitated thereby making it possible to simplify the construction of the wire winding machine and increase the speed of wire winding. Further, it is possible to minimize the connecting point for treatment of the terminal because wire is continuously wound without cutting the crossover wire. Still further, it is possible to mount the blocks easily at high accuracy. Thus, the productivity and the reliability can be improved and a high power motor can be obtained at low cost.

The production method for the rotary motor according to the eighth aspect of the present invention comprises the step for forming the magnetic material having a plurality of blocks by punching by means of press and for forming the insulation for the magnetic pole teeth by integrated resin molding, the fixing portions of the block and pins for holes provided on both ends or a single side of the blocks, and the step in which the thin portions of a plurality of blocks are cut and bent with respect to the pins formed by the integrated resin molding in order to assemble the stator coiled with wire onto the substrate.

According to this method, the formation of coils when wire is wound is facilitated thereby making it possible to simplify the construction of the wire winding machine and increase the speed of wire winding. Further, it is possible to minimize the connecting point for treatment of the terminal because wire is continuously wound without cutting the crossover wire. Still further, it is possible to mount the blocks easily at the forming accuracy of integrated resin molding. Thus, the productivity and the reliability can be improved and a high power motor can be obtained at low cost.

The rotary motor according to the ninth aspect of the present invention comprises the stator portion in which the coils are disposed on respective magnetic pole teeth of the stator core formed by stacking the magnetic materials and the rotor disposed on the inner circumference of the stator portion, one or a plurality of added sections being provided using iron substrates in the portions in which part of the magnetic pole tooth of the stator is cut off.

If the stator is provided with a cut-out section in which the carriage of a read/write head reciprocates in a inner rotor type medium rotation driving motor such as a magnetic disk, the cut-out section of the stator reduces unbalanced load on the rotor shaft. Thus, it is possible to increase the service life of the rotor bearing. Because the cut-out section of the stator exists, attraction between the rotor magnet and the stator becomes ununiform. However, the added section of the iron substrate compensates for the imbalance of the attraction. That is, the added section substitutes the cut-out portion of the stator.

The rotary motor according to the tenth aspect of the present invention comprises the stator portion in which the stator core is divided to sections corresponding to the magnetic pole teeth and in which the coils are formed on the respective magnetic pole teeth, and the rotor, the stator portion being fixed so as to face the rotor portion in the state in which the crossover wires of the coils of the magnetic pole teeth are connected with each other.

In producing this rotary motor, the productivity of wire winding is extremely high because the stator is divided. Further, because the crossover wires of the coils are continuously wound, the terminals of the coils can be processed with minimized number of steps, and connected easily, and the reliability is high.

According to the rotary motor according to the eleventh aspect of the present invention, the rotor facing surface of the magnetic pole teeth mounted on a molded resin product or a substrate is cut by laser beam or the like or shaved.

The rotary motor according to the present aspect is capable of maintaining a gap between the rotor facing surface of each magnetic pole tooth and the rotor. This rotary motor reduces the unevenness of the rotation and improves the characteristic by setting the air gap at a small value.

In the rotary motor according to the twelfth aspect of the present invention, the yoke portions of the magnetic pole teeth fixed on the molded resin product or substrate are fused thermally by laser beam and fixed so that the yoke portions are fit to each other.

The rotary motor according to the present aspect enables the stator to be mounted and fixed easily at high precision. Additionally, the rotary motor according to the present aspect enables reduction of the unevenness of the rotation and the improvement of the characteristic of the motor by setting the design value of the air gap at a small value.

In the rotary motor according to the thirteenth aspect of the present invention, the neutral point is connected directly to the magnetic materials of the magnetic pole teeth so that the potential of the neutral point is on the same level as that of the magnetic material.

The rotary motor according to the present aspect does not necessitate additional connecting terminal for connecting to the neutral-point. Additionally, it is possible to process the terminal of the neutral point at the same time when the coils are formed.

In the rotary motor according to the fourteenth aspect of the present invention, the rotor facing surface is formed so as to have a plurality of steps along the length of the motor shaft or have oblique surface with respect to the length of the motor shaft. As a method for reducing the cogging torque of the motor, there is a method for producing magnetic formation on the rotor magnet in the form of a spiral. However in this case, a special apparatus is required to realize the method and further the accuracy of magnetic formation was low.

In the rotary motor according to the fifteenth aspect of the present invention, magnetic material wire is wound around or in the vicinity of the rotor facing surface of the stator by several turns.

According to the aforementioned construction, part of magnetic flux which effectively acts on the rotor magnet from the magnetic pole teeth leaks to the magnetic pole teeth nearby, so that cogging torque occurs inactively, thereby reducing the unevenness of the rotation.

The production method for the rotary motor according to the sixteenth aspect of the present invention comprises the process for punching magnetic material in the state in which a plurality of magnetic pole teeth are connected in series along the direction of magnetic flux flow, the process for continuously winding neighboring magnetic pole teeth with wire and the process in which the magnetic pole teeth are cut off by laser beam and mounted on molded resin product or substrate.

According to this method, the formation of the coils by winding wire is facilitated, and the frequency of connection in processing the terminals is minimized and the connecting processing can be automated. Additionally, this method enables assembling of the stators easily at high precision, thereby improving the productivity and the reliability of the motor.

The production method for the rotary motor according to the seventeenth aspect of the present invention comprises the process for producing a core in which a plurality of core portions are arranged in series, the process for winding the respective core portions of the core with wire and the process for forming the core wound with wire by bending the portions of the core.

In the rotary motor according to the eighteenth aspect of the present invention, the stator core is a core which is linearly extensible and provided with a storage container for storing and fixing the core.

In producing the rotary motor according to the present aspect, it is easy to wind the core with wire easily, thus the rotary motor can be assembled easily.

The rotary motor according to the nineteenth aspect of the present invention comprises windows for inspecting the inside of the storage container.

Because workers can produce this rotary motor checking the inside through this windows, it is possible to mount the internal components at high accuracy.

In the rotary motor according to the twentieth aspect of the present invention, respective typing portions which are the coil terminating portions of the storage container are disposed in parallel to each other with the same pitch as that of the magnetic pole teeth.

In producing the rotary motor according to the present aspect, the tying portions can be wound with wire by means of the wire winding machine for winding the coils.

The production method for the rotary motor according to the twenty first aspect of the present invention comprises the process for winding the coil winding portion with wire from the outer edge and the process for inserting and fixing the connected magnetic pole teeth from the outer circumference after the coils are made.

Because the tip portions of the magnetic pole teeth which are an obstacle for making the coils on the core are not provided in producing this rotary motor, the procedure for winding with wire is easy.

According to the production method for the rotary motor according the twenty second aspect of the present invention, the magnetic pole teeth having the same width from the tip to the root are used in the aforementioned method.

Because the stator core according to the present aspect can be inserted into the storage container easily, the assembly work of the rotary motor is simplified.

In the rotary motor according to the twenty third aspect of the present invention, the stator core is linearly extensible and provided with a circular holding ring for holding the core.

Because the core can be fixed to this holding ring easily in producing this rotary motor, it is easy to handle the parts.

In the rotary motor according to the twenty fourth aspect of the present invention, the stator core is linearly extensible and comprises the storage container for storing and fixing the core and the magnetic balancer provided in the portion in which the stator core is not provided, the relationship between the gap gb between the magnetic balancer and the rotor, and the gap gt between the tip of the magnetic pole teeth of the stator core and the rotor being gb>gt.

In this rotary motor, it is possible to reduce the deflection of the rotation resulting from the influence of the portion in which the stator is not provided.

In the rotary motor according to the twenty fifth aspect of the present invention, the magnetic balancer is fixed in the storage container.

Because the magnetic balancer can be used as part of the stator in producing this rotary rotor, it is easy to fit the parts easily and handle the parts easily.

In the rotary motor according to the twenty sixth aspect of the present invention, the stator core is linearly extensible and comprises the storage container for storing and fixing the core, a plurality of magnetic pole teeth are disposed in parallel to each other in the stator core and the diameter of the coil increases as the length thereof increases.

This rotary motor enables to eliminate the imbalance of the magnetic field generated on respective magnetic pole teeth.

In the rotary motor according to the twenty seventh aspect of the present invention, the stator core is linearly extensible and comprises the storage container for storing and fixing the core, the magnetic pole teeth of the stator core are disposed in parallel to each other and the wire winding position differs depending on the length thereof.

This rotary motor enables to eliminate the imbalance of the magnetic field generated in respective magnetic pole teeth.

The production method for the rotary motor according to the twenty eighth aspect of the present invention comprises the process for producing a linear core and the process in which the magnetic pole teeth disposed almost in parallel to each other on the linear core are wounded with wire.

This method makes it possible to simplify the construction of the wire winding machine and improve the productivity of wire winding.

In the rotary motor according to the twenty ninth aspect of the present invention, the stator core is linearly extensible, and comprises the storage container for storing and fixing the core and the rotor which is concentric with the stator core, the stator core being provided with a portion in which no block is provided, the rotor being placed eccentrically toward said portion.

Because the unbalanced magnetic attraction in this rotary motor is reduced, the torque loss is reduced.

In the rotary motor according to the thirtieth aspect of the present invention, the stator core is linearly extensible, and comprises the storage container for storing and fixing the core and the rotor which is concentric with the stator core, the stator core being provided with a portion in which no block is provided, the block gap located on the opposite side of the portion in which no block is provided being set so as to be larger than other block gap.

Because the unbalanced magnetic attraction in this rotary motor is reduced, the torque loss is reduced.

In the rotary motor according to the thirty first aspect of the present invention, the stator core is linearly extensible, and comprises the storage container for storing and fixing the core and the rotor which is concentric with the stator core, the shortest magnetic pole tooth of the stator core block being provided with the trimmed caulking portions for laminating and fixing the stator core.

Because the difference of magnetic resistance between the respective magnetic pole teeth of this rotary motor is reduced, the torque ripple is reduced.

In the laminated core according to the thirty second aspect of the present invention, the stacked magnetic materials comprises a plurality of core portions and the thin portions which connect these core portions and can be bent after the materials are stacked.

It is easier to form the laminated core, and arrange and form the coil on the magnetic pole teeth of the laminated core as compared with conventional laminated core. Additionally, as compared with the laminated core in which the coil portion is divided, the number of the parts for the laminated core can be decreased and the necessity of handling small parts can be eliminated. Further, because the laminated core can be disposed freely, the sheet materials of the magnetic materials can be used effectively as compared with the integrated core, so that the amount of the materials to be thrown away when punching can be reduced. Because the core portions are connected by means of the thin portions, when a plurality of the coils are wound with wires, it is possible to continuously wind the terminal wire of the coil without cutting the wire between the core portions. Thus, it is possible to eliminate the procedure required for connecting work between the coils.

The laminated core according to the thirty third aspect of the present invention has protrusions which are formed on both sides of the thin portion by bending the thin portions so that the protrusions abut each other, the protrusions forming a fastening member insertion portion for forming magnetic path and fixing the core when thin portions are bent so as to be attached to each other.

According to this construction, a plurality of the core portions of the laminated core can be fixed to a construction body in the vicinity of the thin portions by means of screws or the like. Further, the magnetic path connecting the respective stator components can be formed easily.

The laminated core according to the thirty fourth aspect of the present invention is provided with reinforcing portions which reinforce the thin portions in the shape of bridge and can be arbitrarily removed.

This construction makes it possible to prevent the thin portions of the laminated core from being deformed and damaged when the core is punched by press. Further, this construction prevents the thin portions from being deformed by annealing the laminated core or treatment for coiling. Still further, the reinforcing portions can be removed easily when the thin portions are bent.

The laminated core according to the thirty fifth aspect of the present invention is constructed by stacking the magnetic materials in which the thin portions are formed and the magnetic materials in which no thin portions are formed.

According to this construction, the thin portions can be bent easily when a large number of the magnetic materials are stacked.

A laminated core according to the thirty sixth aspect of the present invention comprises positioning portions which are provided on both ends of the magnetic material constituted of the core portion and thin portions.

According to this construction, the laminated core can be positioned accurately when the coils are formed on the magnetic pole teeth.

In the laminated core according to the thirty seventh aspect of the present invention, the protrusions on both ends of the thin portions which are fit to each other or placed near each other when the thin portions are bent are fused and fixed through both end faces or a single end face.

According to this construction, the stator components (block) of the laminated core can be connected to each other firmly.

A laminated core according to the thirty eighth aspect of the present invention in which a plurality of the stacked magnetic materials are integratedly bound by spot welding at a single position or a plurality of the positions.

According to this construction, the stacked magnetic materials are integratedly bound at arbitrary positions with a large strength. Particularly, a plurality of the stacked magnetic materials can be stacked and fixed easily without fixing by caulking or fixing with adhesive. Additionally, because there is no obstacle against the magnetic flux passing path as compared with the case in which the trimmed caulking portions formed by pressing are used. Still further, because the strength by spot welding is larger than that obtained by caulking or adhesive, it is possible to select spot welding positions freely.

In the laminated core according to the thirty ninth aspect of the present invention, a plurality of the stacked magnetic materials are integratedly bound by spot welding the protrusions on both ends of the thin portions.

According to this construction, a plurality of the stacked magnetic materials can be integratedly fixed. Further, this construction makes it possible to supply current through an appropriate contacting area between the electrode and the protrusions, thereby enhancing the strength of binding a plurality of the magnetic materials.

In the laminated core according to the fortieth aspect of the present invention, dent/protruding portions are provided at a position or a plurality of positions on the front and back surfaces of the respective stacked magnetic materials and the respective magnetic materials are engaged through the dent/protruding portions and integratedly bound by spot welding.

According to this construction, a plurality of the stacked magnetic materials can be fixed accurately and firmly. Further, the stacked magnetic materials can be fixed easily without fixing by caulking or fixing with adhesive. Still further, because there is no obstacle against the magnetic flux passing path as compared with the case in which the trimmed caulking portions by pressing are used, a core having excellent magnetic characteristics can be obtained. Still further, because the strength of projection welding is larger than that by caulking or adhesive, it is possible to select the position of the dent/protruding portion freely.

In the laminated core according to the forty first aspect of the present invention, part or all of the corners of the pressed cross section of a plurality of the stacked magnetic materials have the shape of smooth roundness.

According to this construction, it is possible to wind directly the laminated core with wire or the laminated core covered with thin coating film with wire without insulation treatments on the laminated core such as integrated molding of resin, formation of resin bobbin or fusing of insulating sheet.

In the laminated core according to the forty second aspect of the present invention, the roundness of the shape of both ends of each stacked magnetic material is larger than that of the other corners.

According to this construction, it is possible to form the shape of roundness as large as half of the thickness of the magnetic material sheet at the outermost pieces of the stacked magnetic materials, so that the wire is not damaged even if the thickness of the magnetic material is thin.

In the laminated core according to the forty third aspect of the present invention, insulating thin plates are attached to the magnetic materials on both sides of a plurality of the stacked magnetic materials.

According to this construction, insulation treatments on the laminated core such as integrated molding of resin, formation of resin bobbin and fusing of insulating sheet are not required before the coils are formed. Thus, winding the core with wire is facilitated.

In the laminated core according to the forty fourth aspect of the present invention, a wiring sheet having a wiring pattern through the insulating material is sandwiched between two pieces of a plurality of the stacked magnetic materials.

According to this construction, the terminal wire of the coil which is wound around the magnetic pole teeth of the stacked core can be processed easily.

In the laminated core according to the forty fifth aspect of the present invention, a magnetic material substrate having a wiring pattern through the insulating material is attached to one side of a plurality of the stacked magnetic materials.

According to this construction, the terminal wire of the coil which is wound around the magnetic pole teeth of the stacked core can be processed easily.

In the laminated core according to the forty sixth aspect of the present invention, the magnetic material is bent so that the burr portions on the edges of the magnetic material formed due to punching are on the overlapping side and then the drooping sides are positioned on the outside. A plurality of the pieces of such magnetic materials are stacked.

According to this construction, insulation treatments on the laminated core such as integrated molding of resin, formation of resin bobbin and fusing of insulating sheet are not required before the coils are formed. Thus, it is possible to wind the core directly with wire. Or it is possible to wind the core with wire by coating the core with thin coating film.

The laminated core according to the forty seventh aspect of the present invention comprises the core portion which is substantially U-shaped magnetic material to be stacked and the thin portion which is connected to the core portion and which can be bent so as to close the U-shaped opening.

According to this construction, by closing the U-shaped opening after the coil is mounted, a transformer is completed. Thus, it is possible to manufacture a transformer, a stator or the like through simplified processes.

The production method for the coil according to the forty eighth aspect of the present invention comprises the process for forming the magnetic material having a plurality of the core portions and the thin portions for connecting the core portions by punching by means of press, the process for forming the coils after a plurality of the magnetic materials are stacked and the process for bending the thin portions.

According to this method, it is possible to form the coils through simple procedure such as bending or the like after the core is wound with wire, thereby realizing effective production of the transformer and the stator.

The production method for the laminated core according to the forty ninth aspect of the present invention comprises the process for bonding insulating thin plate and conductive thin plates on the surface of the magnetic material substrate, the process for forming wiring pattern by etching the conductive material and the process for bonding the magnetic material substrate having wiring pattern on a single side of the stacked magnetic materials.

According to this method, it is possible to obtain the laminated core in which the terminal wire of the coil can be treated easily.

The production method for the laminated core according to the fiftieth aspect of the present invention comprises the process for forming the magnetic material having a plurality of the magnetic pole teeth located on both sides which are opposite to each other by punching by means of press, the process for bending the magnetic material so that the magnetic pole teeth which are located on opposite side overlap each other and further so that the burr portions formed by punching overlap each other at a single position or a plurality of the positions, and the process for stacking the bent magnetic materials to form the laminated core.

Accordingly, it is possible to easily form the laminated core which can be wound directly with the coil through simple process including bending of the magnetic material and stacking of the layers.

BRIEF DESCRIPTION OF THE DRAWINGS

FIG. 120 is a front view showing the state in which the laminated core shown in FIG. 119 is being bent.

FIG. 121 is a front view showing the rotary motor having the laminated core according to the forty second embodiment of the present invention.

FIG. 122 is a front view showing another rotary motor having the laminated core according to the forty second embodiment of the present invention.

FIG. 123 is a front view showing still another rotary motor having the laminated core according to the forty second embodiment of the present invention.

FIG. 124 is a front view showing the process in which the laminated core according to the forty second embodiment of the present invention is being wound with wire.

FIG. 125 is a side sectional view showing a further rotary motor having the laminated core according to the forty second embodiment of the present invention.

FIG. 126 is a front view showing the laminated core according to the forty third embodiment of the present invention.

FIG. 127 is a front view showing the state in which the laminated core shown in FIG. 126 is wound with wire to form the coil.

FIG. 128 is an explanatory view showing the state in which the laminated core shown in FIG. 127 is being wound with wire.

FIG. 129 is a front view showing the state in which the laminated core shown in FIG. 127 is being bent.

FIG. 130 is a front view showing the state in which bending of the laminated core shown in FIG. 127 has been finished.

FIG. 131 is a front view showing the rotary motor having the stator shown in FIG. 130.

Figure 129:
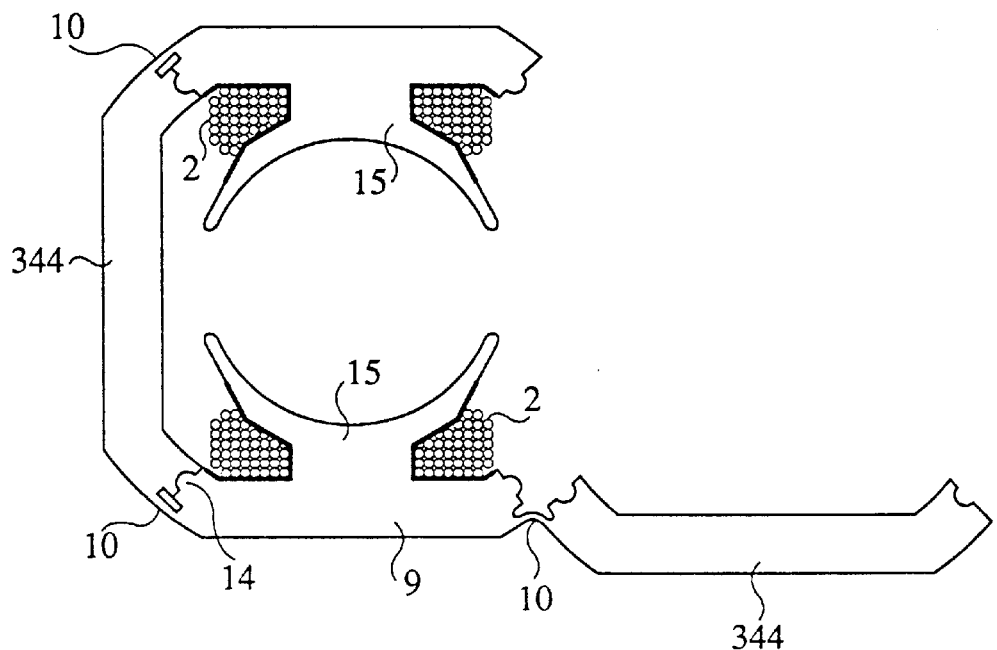
Figure 132:
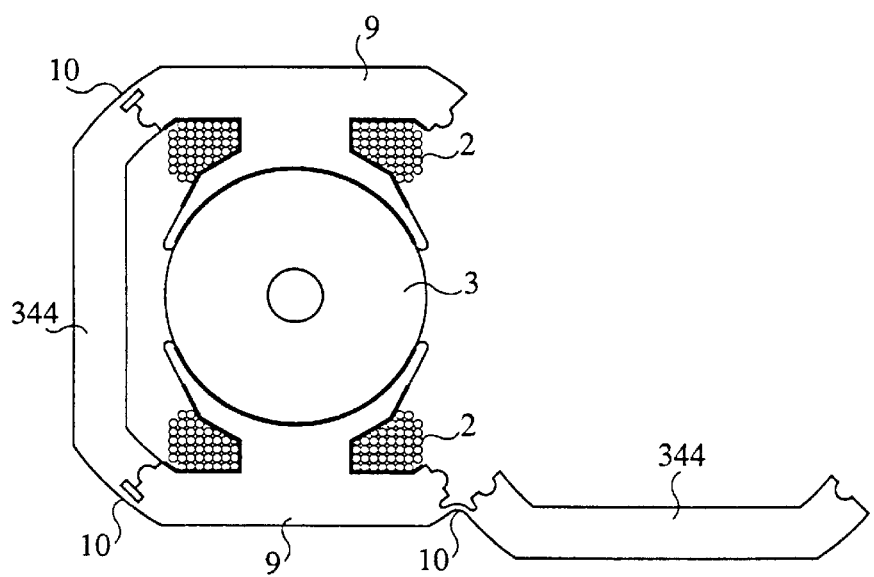

FIG. 132 is a front view showing the state in which the laminated core is being bent after the rotor shown in FIG. 129 is mounted.

Figure 133:
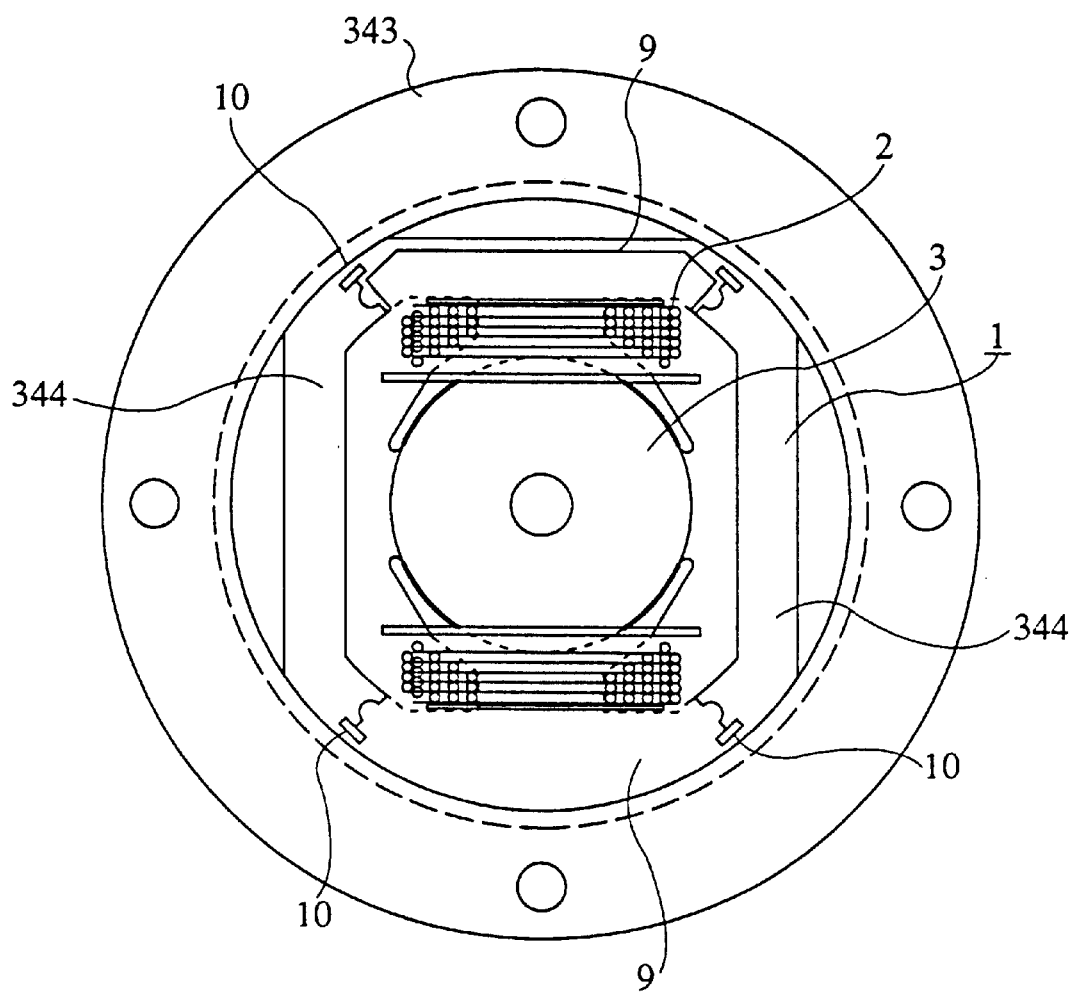

FIG. 133 is a front view showing the rotary motor having the stator shown in FIG. 132.

Figure 134:
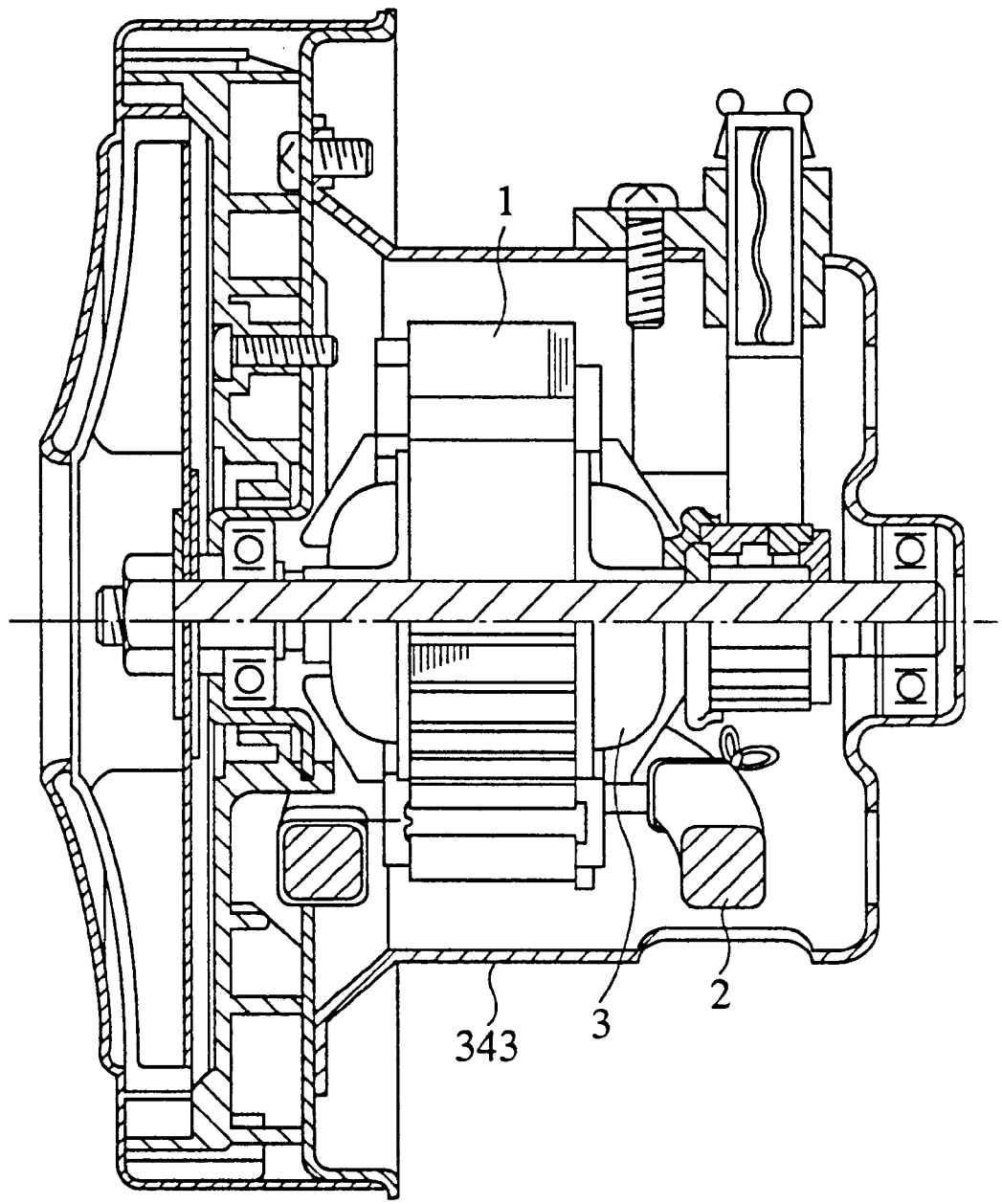

FIG. 134 is a side sectional view showing another rotary motor having the laminated core according to the forty third embodiment of the present invention.

Figure 135:
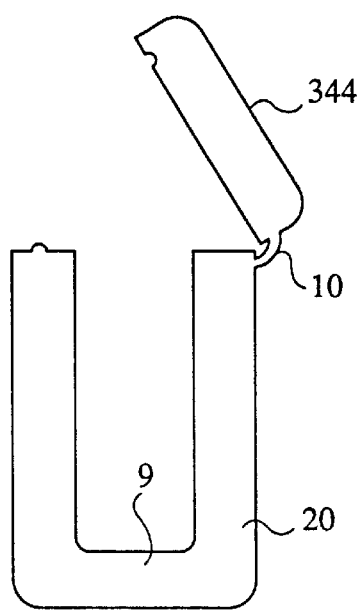

FIG. 135 is a front view showing the laminated core according to the forty fourth embodiment of the present invention.

Figure 136:
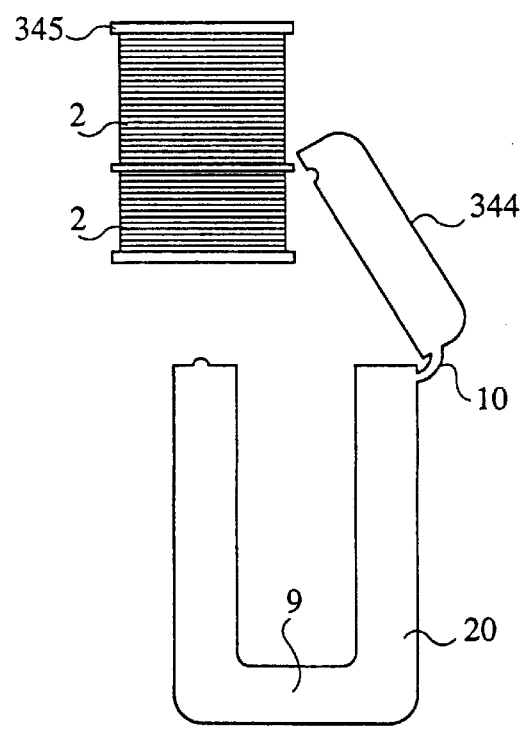

FIG. 136 is a front view showing the state in which the coil is mounted to the laminated core shown in FIG. 135.

Figure 137:
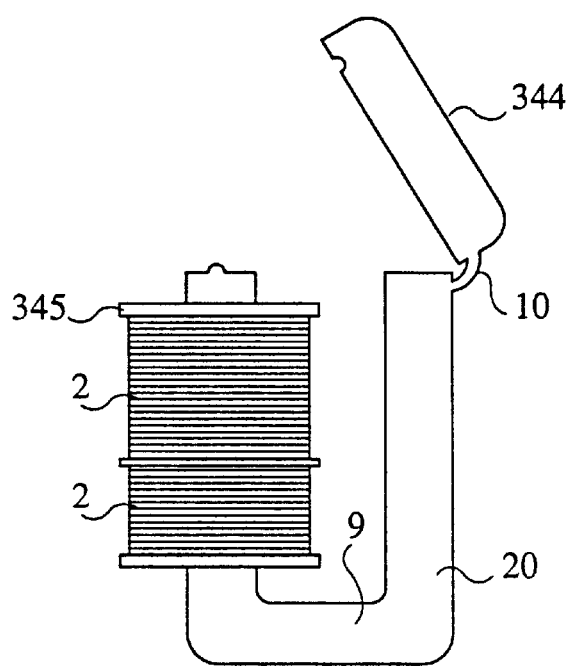

FIG. 137 is a front view showing the state in which the bobbin having the coil is being mounted onto the laminated core shown in FIG. 136.

Figure 138:
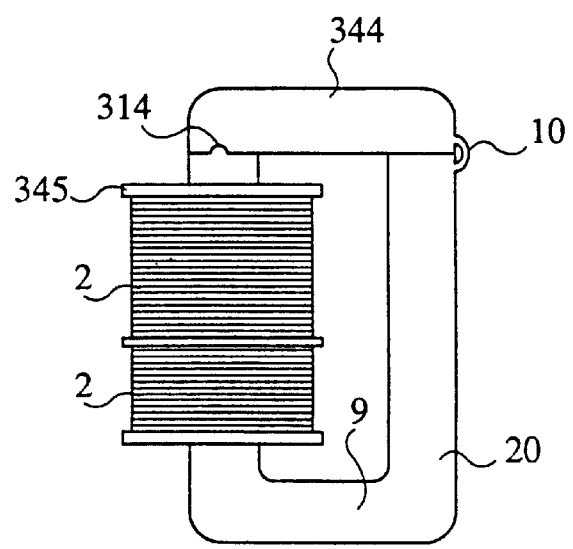

FIG. 138 is a front view showing the transformer according to the forty fourth embodiment of the present invention.

Figure 139:
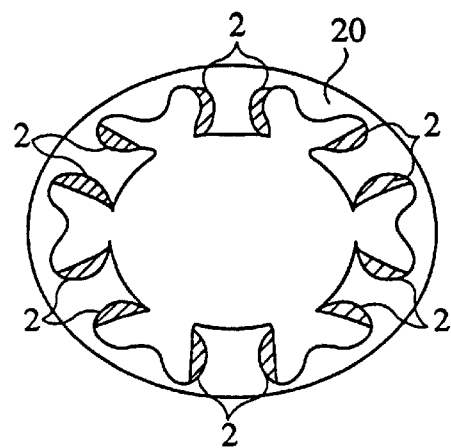

FIG. 139 is a front view of conventional stator.

Figure 140:
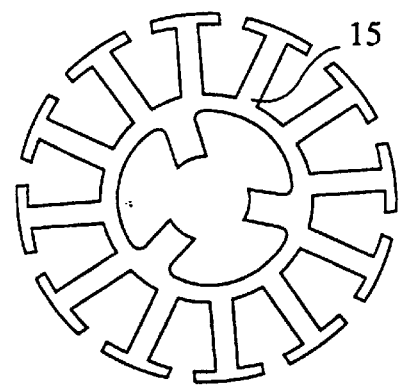

FIG. 140 is a front view of conventional stator core.

Figure 141:
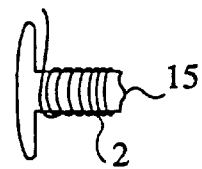

FIG. 141 is a partial enlarged view of the stator shown in FIG. 140.

Figure 142A:
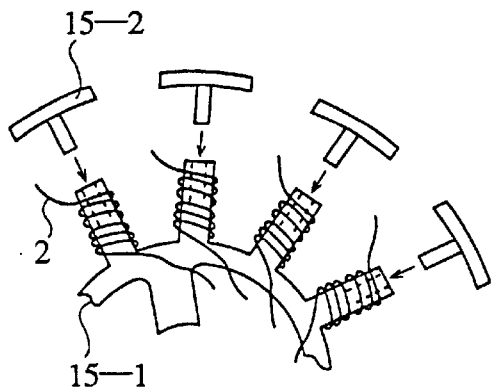
Figure 142B:
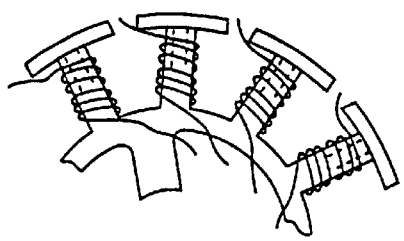

FIGS. 142A, 142B are partial front views of another conventional stator.

Figure 143A:
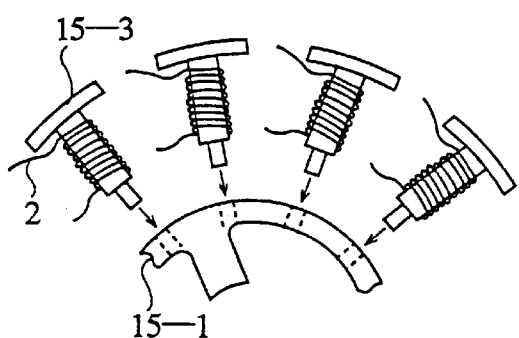
Figure 143B:
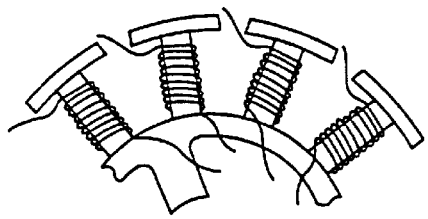

FIGS. 143A, 143B are partial front view of another conventional stator.

Figure 144A:
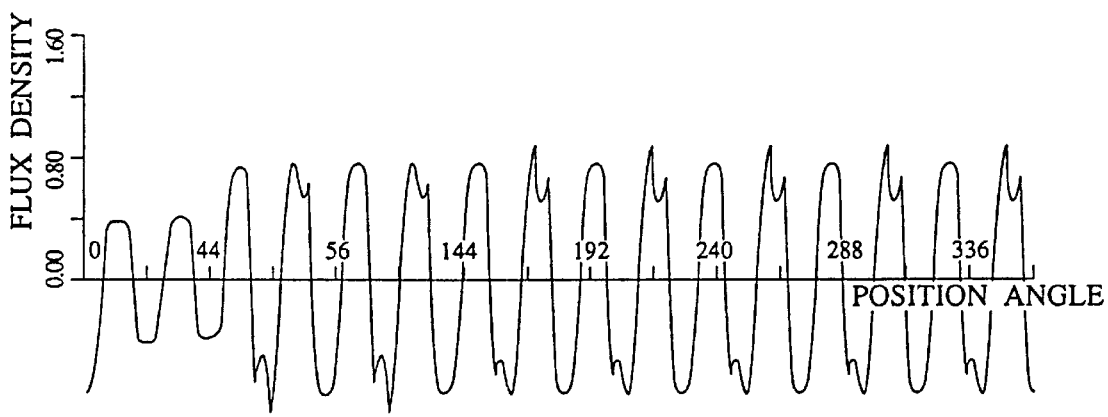
Figure 144B:
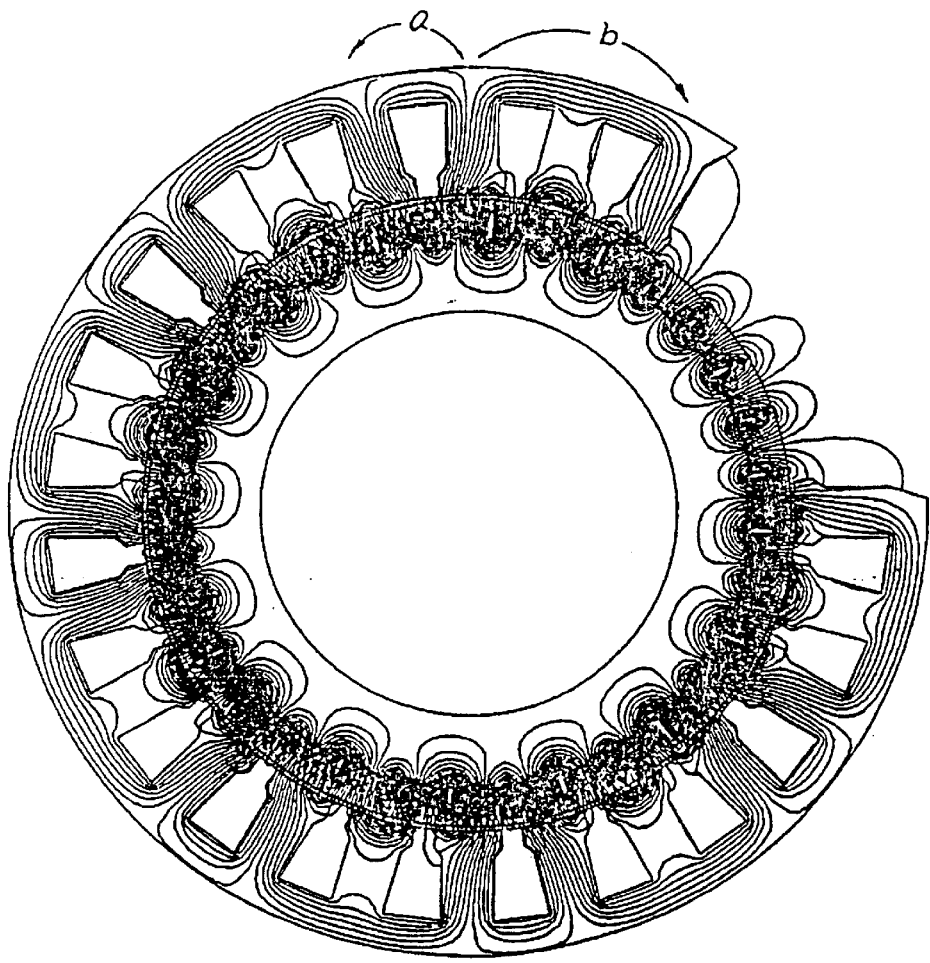

FIGS. 144A, 144B are diagrams showing the result of the analysis of magnetic field of conventional stator.

Figure 145A:
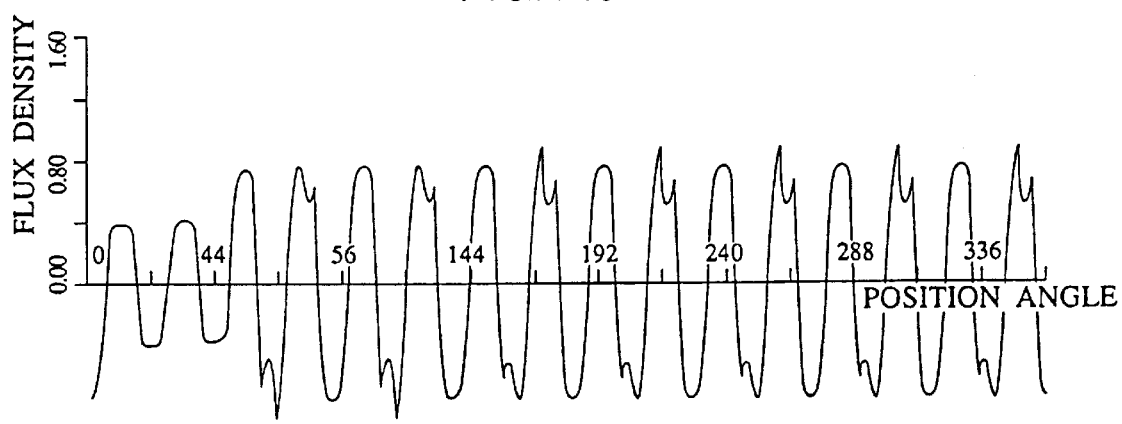
Figure 145B:
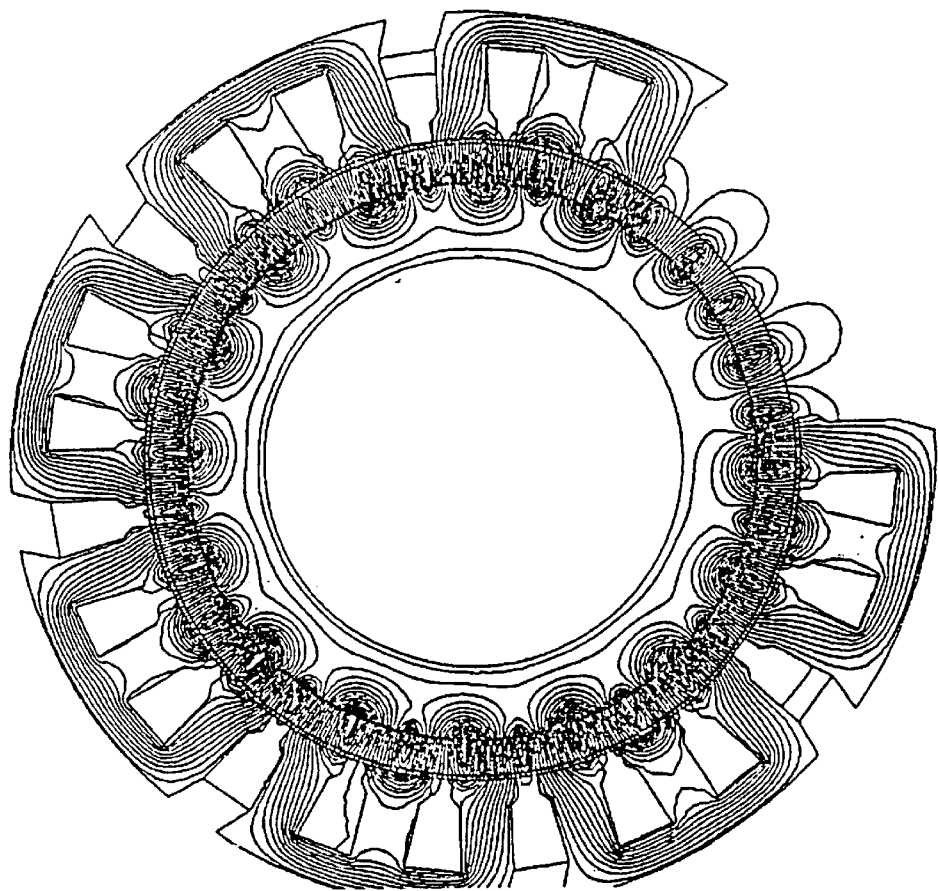

FIGS. 145A, 145B are diagrams showing the result of the analysis of magnetic field of the stator according to the present invention.

Figure 146:
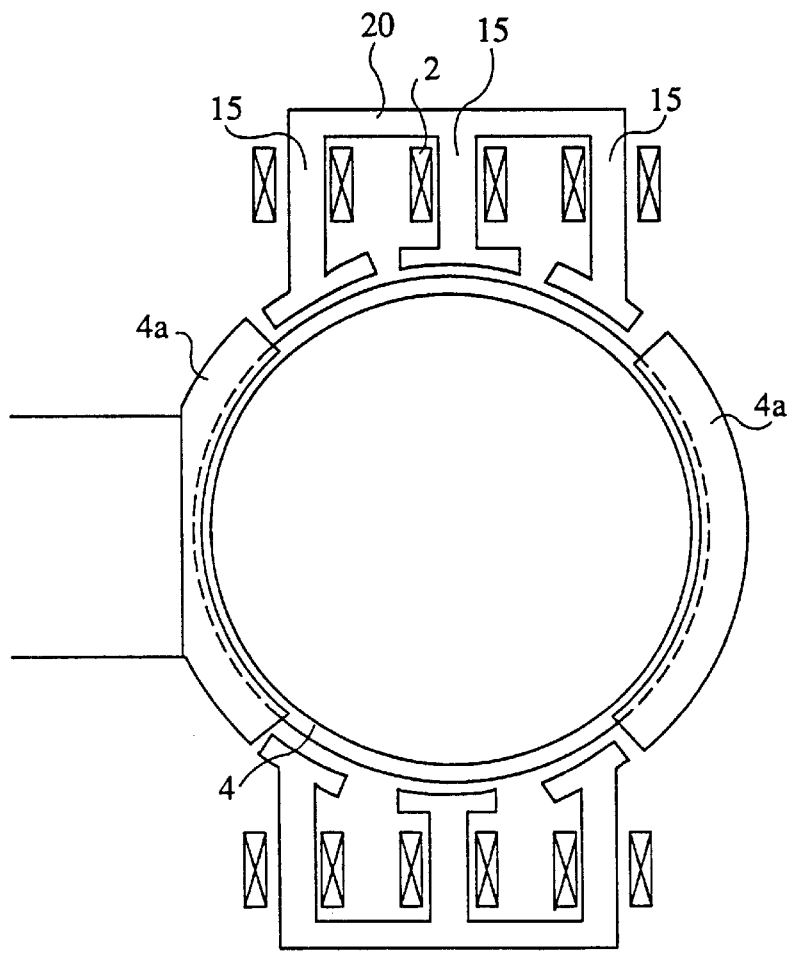

FIG. 146 is a plan view of conventional rotary motor.

Figure 147:
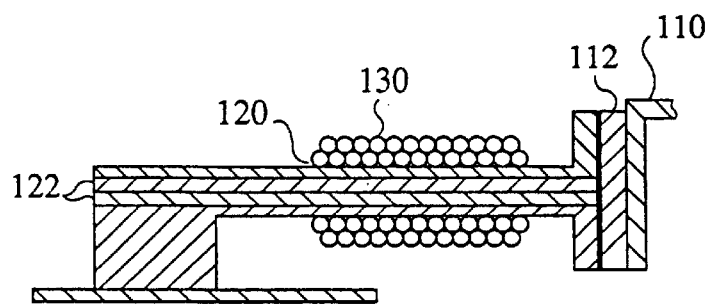

FIG. 147 is a partial sectional view showing a conventional stator core and a conventional coil in the rotary motor shown in FIG. 146.

Figure 148:
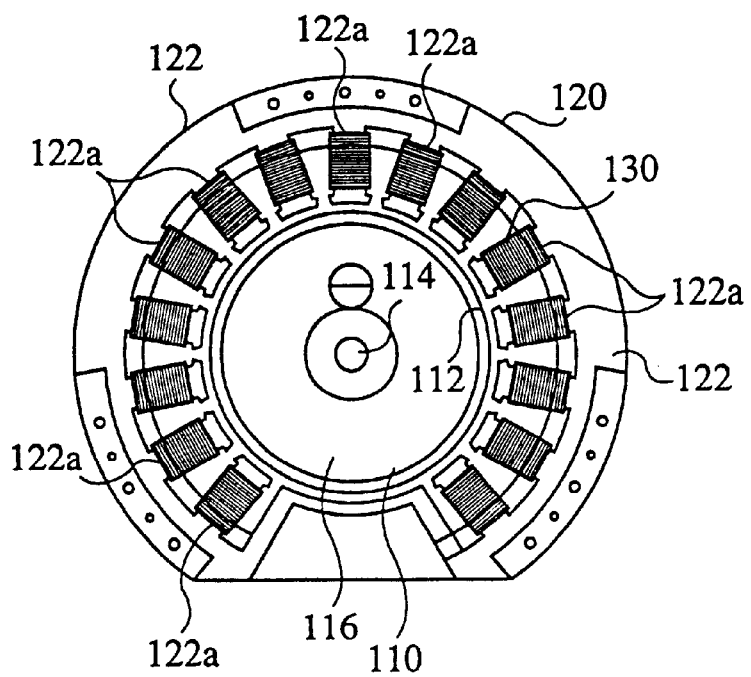

FIG. 148 is a front view of conventional inner rotor type thin structure rotary motor.

Figure 149:
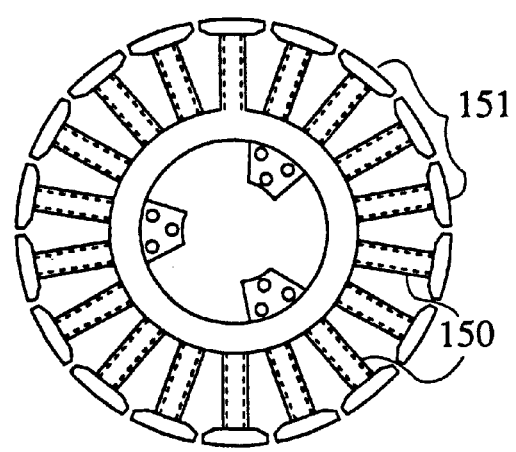

FIG. 149 is a front view of the conventional laminated core having insulating film.

DESCRIPTION OF THE PREFERRED EMBODIMENTS

Embodiments of the present invention will be described with reference to the accompanying drawings.

Embodiment 1

Figure 1:
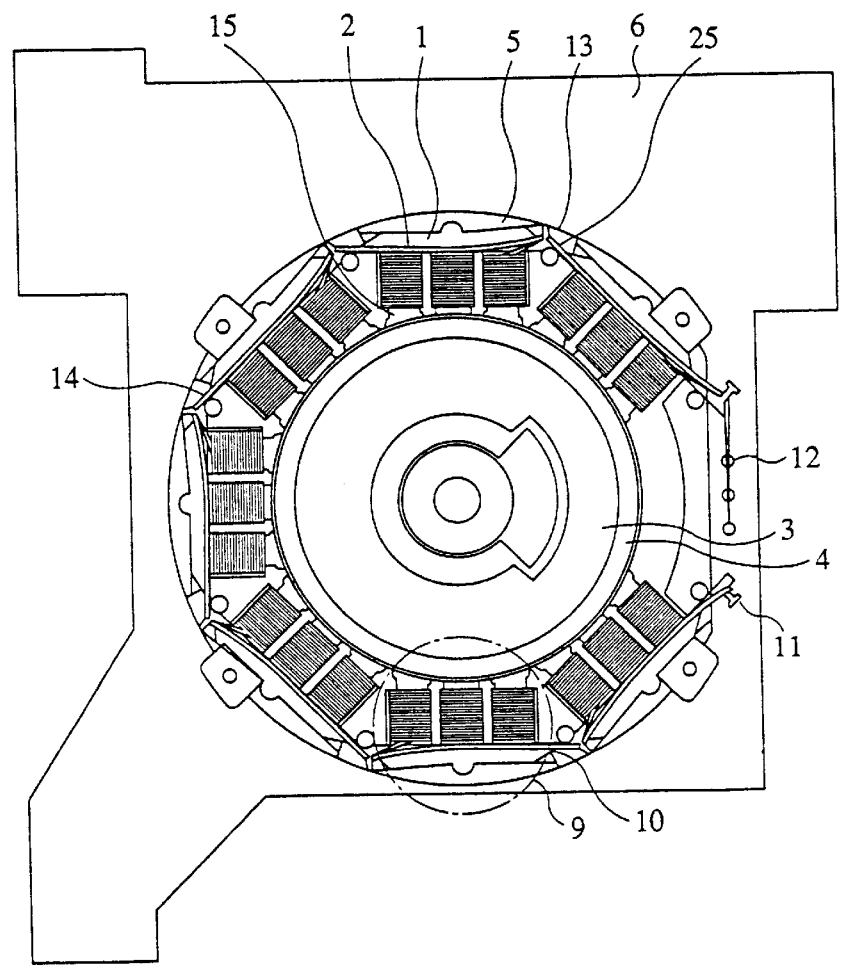
FIG. 1 is a front view of the rotary motor according to the first and fifth embodiments of the present invention.
Figure 6:
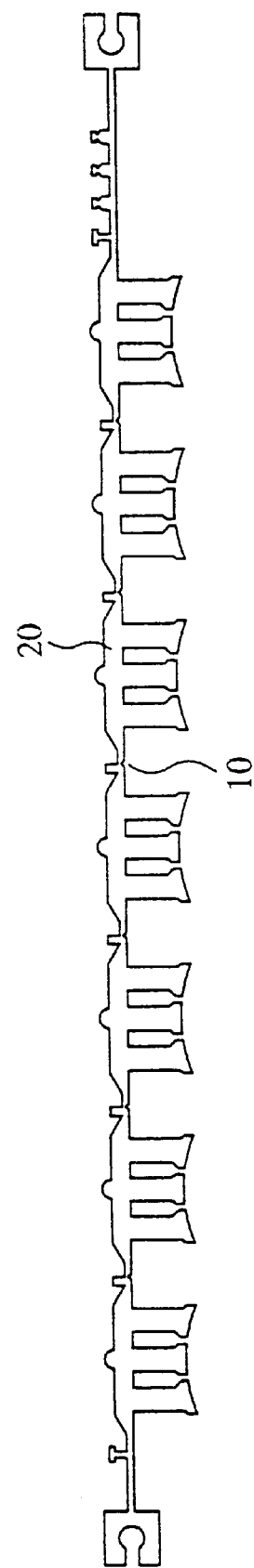
FIG. 6 is a front view of the stator core according to the first and fifth embodiments of the present invention.
Figure 7:
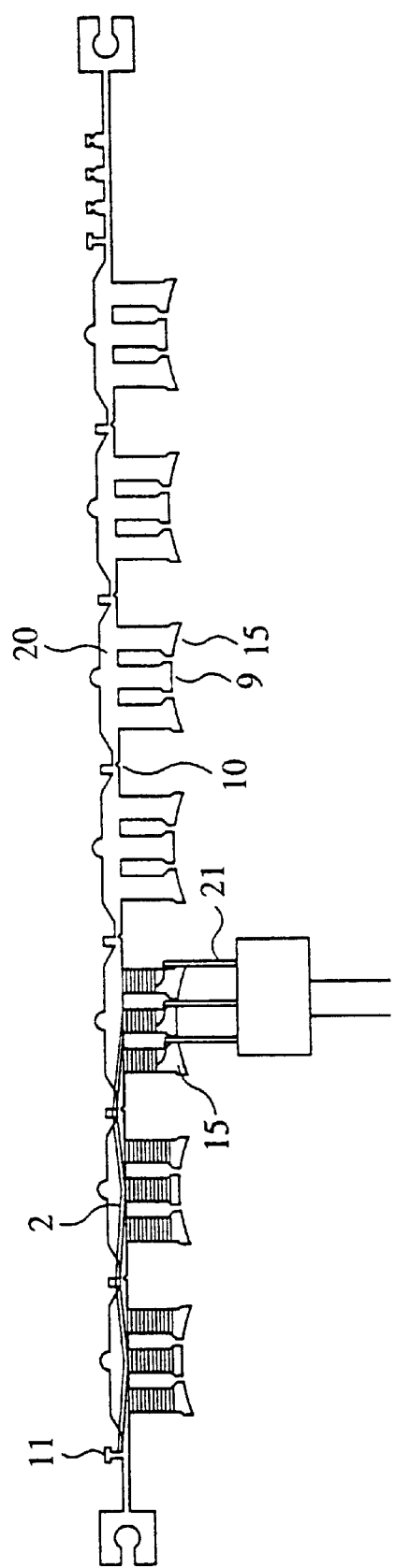
FIG. 7 is a front view of the stator core being wound with wire according to the first, second and fifth embodiments of the present invention.

A rotary motor according to the first embodiment of the present invention will be-described with reference to FIGS. 1, 2, 6 and 7. FIG. 6 shows a connecting stator core 20 which is formed by punching magnetic material by means of press. In the connecting stator core 20, the same number of magnetic teeth as the number of the phase of the motor are composed as a single block. A plurality of blocks of the connecting stator cores 20 are connected by means of thin portions 10. In producing the stator, some pieces of the connecting stator cores 20 are stacked and then subjected to insulation processing by coating or the like. Next, stacked connecting stator cores 20 i.e. a laminated core is wound with wires. That is, both ends of the stacked connecting stator cores 20 are held with tension applied thereto as shown in FIG. 7 and nozzles 21 of a winding machine which spouts conductive wire are turned around the magnetic teeth 15 in order to form coils. Although the magnetic pole teeth 15 of a conventional motor are arranged radially around the motor shaft, in this case, the magnetic pole teeth 15 are arranged so as to be parallel to each other in a single block as shown in FIGS. 1, 7. A plurality of the blocks 9 are connected to each other by means of thin portions 10. In winding process, a winding machine is placed at a position facing the connecting stator core 20 and one or a plurality of wire winding nozzles 21 are turned around the magnetic pole teeth. The wire winding nozzle 21 can be fed forward and backward with respect to the magnetic pole teeth 15 upon being turned around the magnetic pole teeth thereby facilitating winding wires neatly.

Then, the thin portions 10 are bent by means of a cylindrical jig placed on the side facing a rotor to form the wound connecting stator cores 20 in a desired shape of the stator.

Figure 2:
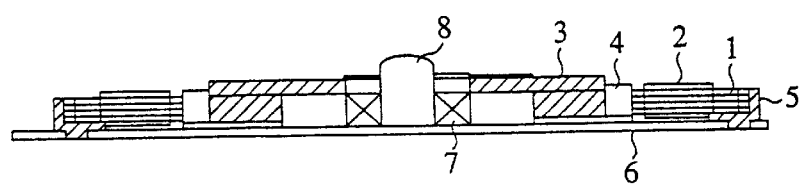
FIG. 2 is a sideways cross sectional view of the rotary rotor according to the first and fifth embodiments of the present invention.

The formed stator 1 is disposed and fixed to a molded resin housing 5 as shown in FIGS. 1, 2 by crushing stator fixing pins by ultrasonic fusing or the like. The molded resin housing 5 is fixed to a substrate 6. In the substrate 6, a rotor 3 is supported through a bearing.

FIGS. 144A and 144B show the result of magnetic field analysis of a conventional stator core. FIG. 144A shows the flux density at respective locations of the stator core. FIGS. 145A and 145B shows the result of magnetic field analysis of the stator core according to the present invention. FIG. 145A shows the flux density at respective locations of the stator core. As evident from FIGS. 144A and 145A, there is no difference of the distribution of flux density between the conventional stator core and the stator core of the present invention. Namely, in the stator core according to the present invention, magnetic flux in the pass "a" in FIG. 144B is eliminated by block division, however, it is possible to prevent a drop of the characteristic of the motor by assuring the magnetic flux of the yoke portion sufficiently.

Embodiment 2

Figure 3:
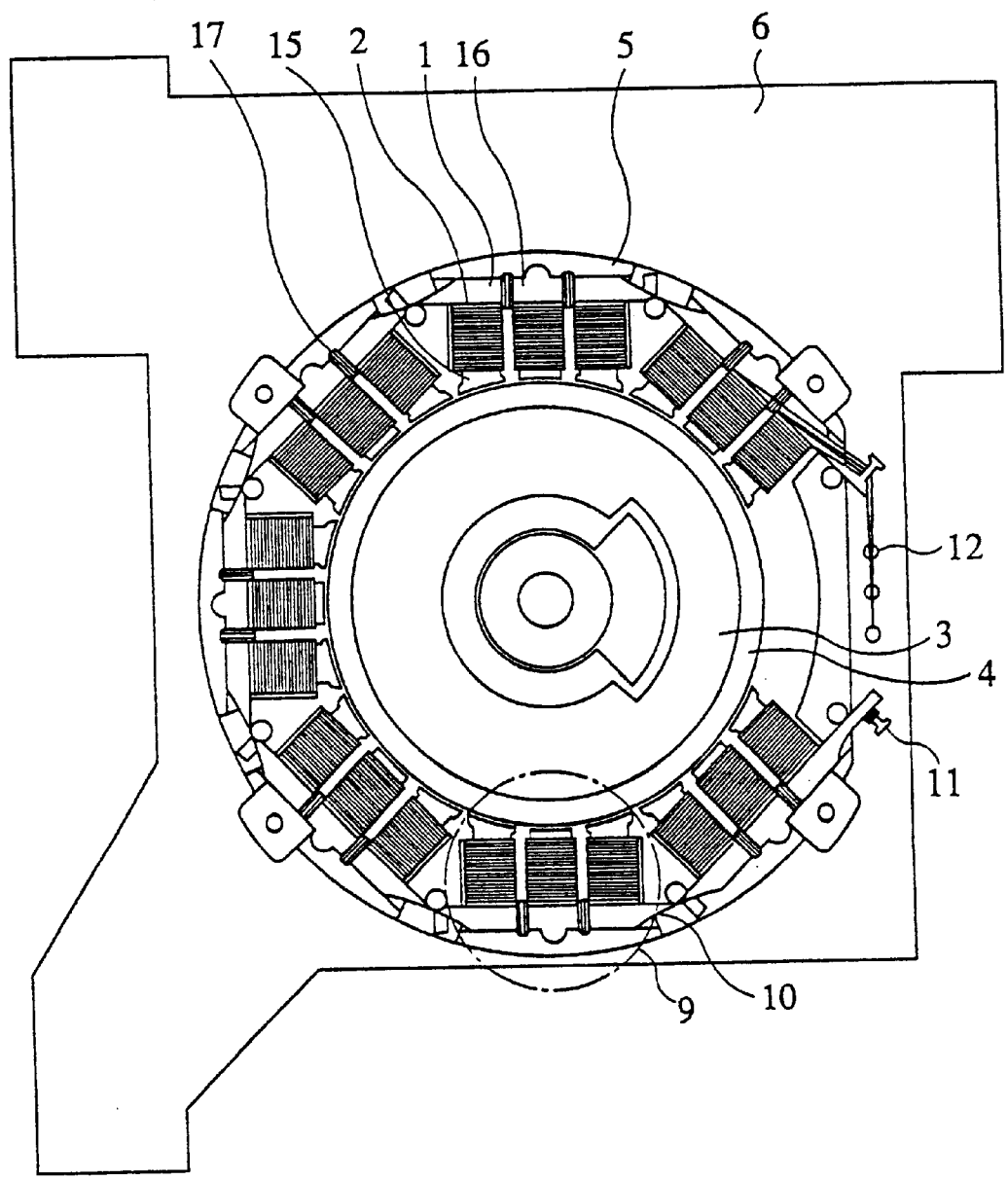
FIG. 3 is a front view of the rotary motor according to the second embodiment of the present invention.

Then, the rotary motor according to the second embodiment will be explained with reference to FIGS. 3, 7. In the rotary motor of the present invention, the coil 2 is formed around the magnetic pole teeth 15 and yoke coils 17 are formed on the yoke portion 16. Thus, magnetic flux generated in the coils 2 of the magnetic pole teeth 15 flows to the yoke portion 16 as well as to the rotor 3. The yoke coil 17 is supplied with electricity to enhance the magnetic flux flowing through the yoke portion 17.

When the yoke coil 17 is wound with wire, the stacked connecting stator core 20 is turned around its longitudinal length and the wire winding nozzle 21 is used. In this case, a single wire winding nozzle 21 should be used because the yoke coil 17 is wound with wire.

Embodiment 3

Figure 4:
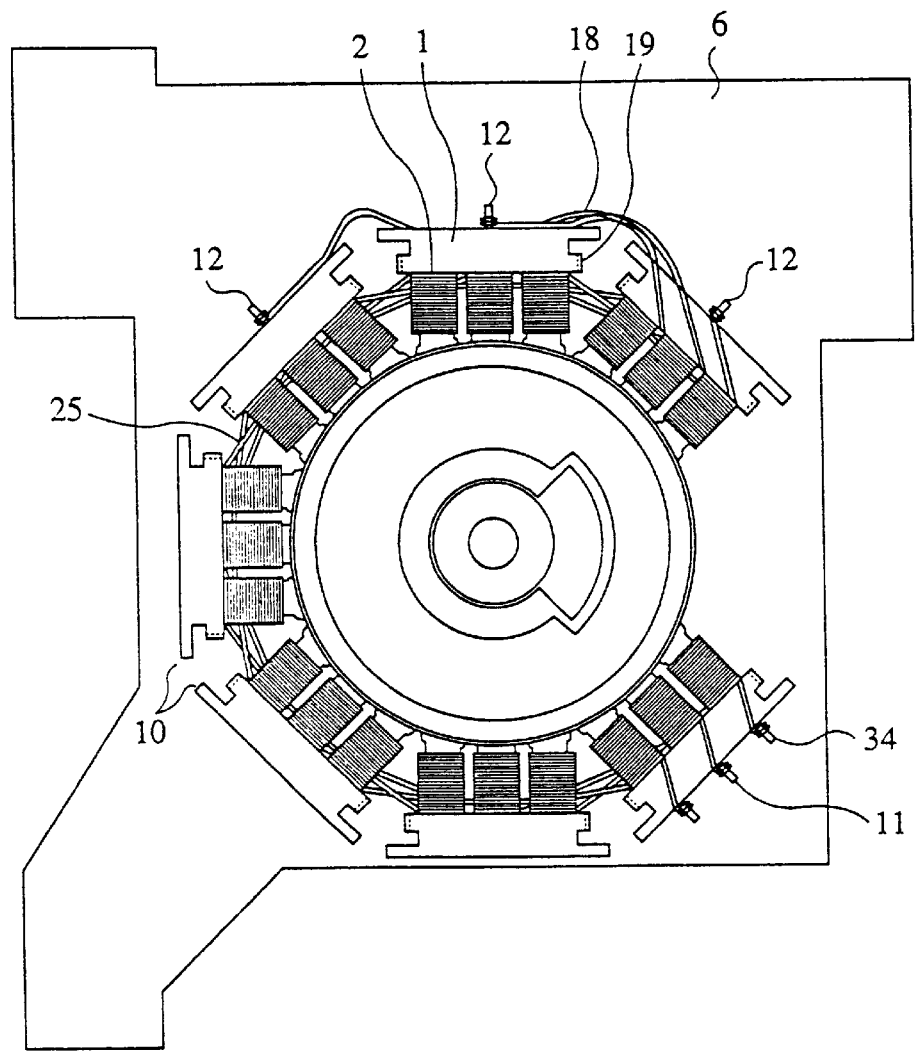
FIG. 4 is a front view of the rotary motor according to the third and fourth embodiments of the present invention.

Then, the rotary motor according to the third embodiment will be described with reference to FIG. 4. As in the first embodiment, the stacked connecting stator core 20 is wound with wire. However, in this case, the beginning end and the terminating end of the coil are tied on part of the block. After winding of wire terminates, the tied portion is soldered to electrically connect the coil end to the stator core material of each block. As for the tying protrusion 34 on which wire is tied, in the case of three phase, three protrusions for common terminal portion 11 are provided and three protrusions for coil terminal portion 12 are provided. The three tying protrusions 34 for the common terminal portion 11 are provided on the same block 9.

When the stator is assembled, the thin portion 10 of the stator is cut without cutting the crossover wire 25 and the stator is installed to the substrate. Neutral point connection is achieved by placing three tying protrusions 34 at the same potential level within a single block. The coil terminal portion 12 is connected to the coil power supply section of the substrate through each block.

Embodiment 4

Figure 5:
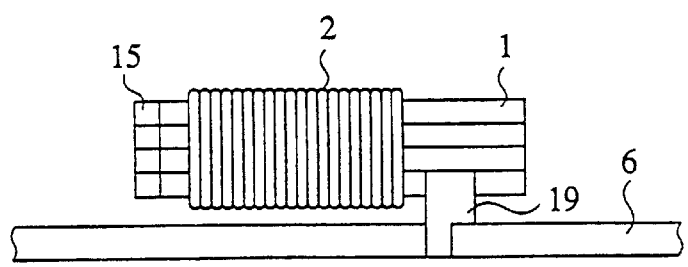
FIG. 5 is a partial side view of the stator according to the fourth embodiment of the present invention.

Next, the rotary motor according to the fourth embodiment of the present invention will be described with reference to FIGS. 4 and 5. In each stacked connecting stator core 20, each respective block 9 near the substrate is provided with two stepped protrusions 19 which are perpendicular to the substrate 6. Insulation procedure and winding procedure are performed in the same manner as in the first embodiment. When the stator is assembled to the substrate 6, the thin portion 10 is cut, the stepped protrusions 19 are inserted into holes provided on the substrate 6 to position the stator, and then the stepped protrusions 19 are fixed with adhesive.

Embodiment 5

Then, the production method for the rotary motor will be described with reference to FIGS. 1, 2, 6 and 7. First, respective connecting stator cores 20 are formed by punching magnetic material by means of press. The connecting stator core 20 is formed so that the respective blocks 9 are connected linearly in a direction perpendicular to the direction of magnetic flux flow in the central teeth. After insulation processing is performed by coating or the like, coils are formed on respective magnetic pole teeth 15 so that the coils are continuous without cutting the crossover wire 25. Then, a bending jig is placed on the side facing the rotor of the connecting stator core 20 and the thin portions 10 are bent. The connecting stator cores 20 are disposed and fixed to the molded resin housing 5. Fixing of the connecting stator cores 20 to the molded resin housing 5 is performed by crushing the stator fixing pin provided on the molded resin housing 5 by ultrasonic fusing or the like. The coil terminal portions 12 are temporarily tied to part of the connecting stator core 20 and wires are placed up to the land position of a wiring pattern on the substrate and then connected to the land.

Embodiment 6

Figure 8:
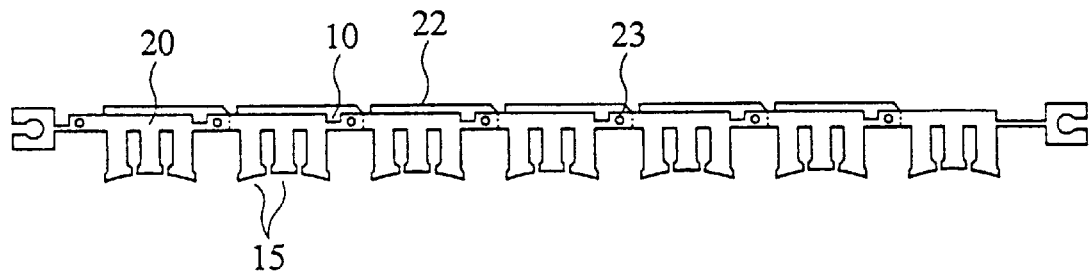
FIG. 8 is a front view of the stator core molded integratedly with resin, according to the sixth embodiment of the present invention.
Figure 9:
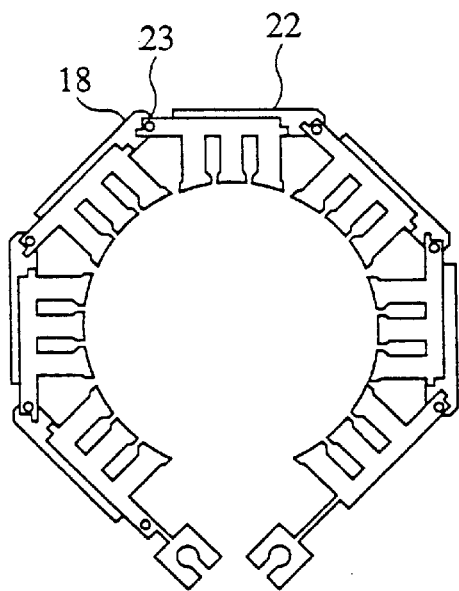
FIG. 9 is a front view of the stator core molded integratedly with resin, according to the sixth embodiment of the present invention.

The production method of other rotary motor will be described with reference to FIGS. 8, 9. First, respective connecting stator cores are formed in the same manner as described above. Then, the connecting stator cores 20 are stacked, and subjected to insulation treatment and integrated resin molding by integrally molded resin 22 in order to fix the block. Resin pins 23 are formed on the block fixing portion. Then, coils are formed on respective magnetic pole teeth 15 so that they are continuous without cutting the crossover wire 25. Then, the thin portion 10 of the connecting stator core 20 is cut and nearby blocks are turned relative to the resin pins 23 by means of a jig placed on the side facing the rotor in order to form a stator. The integrally molded resin 22 is fixed to the substrate 6 by means of adhesive or the like.

Embodiment 7

Figure 10:
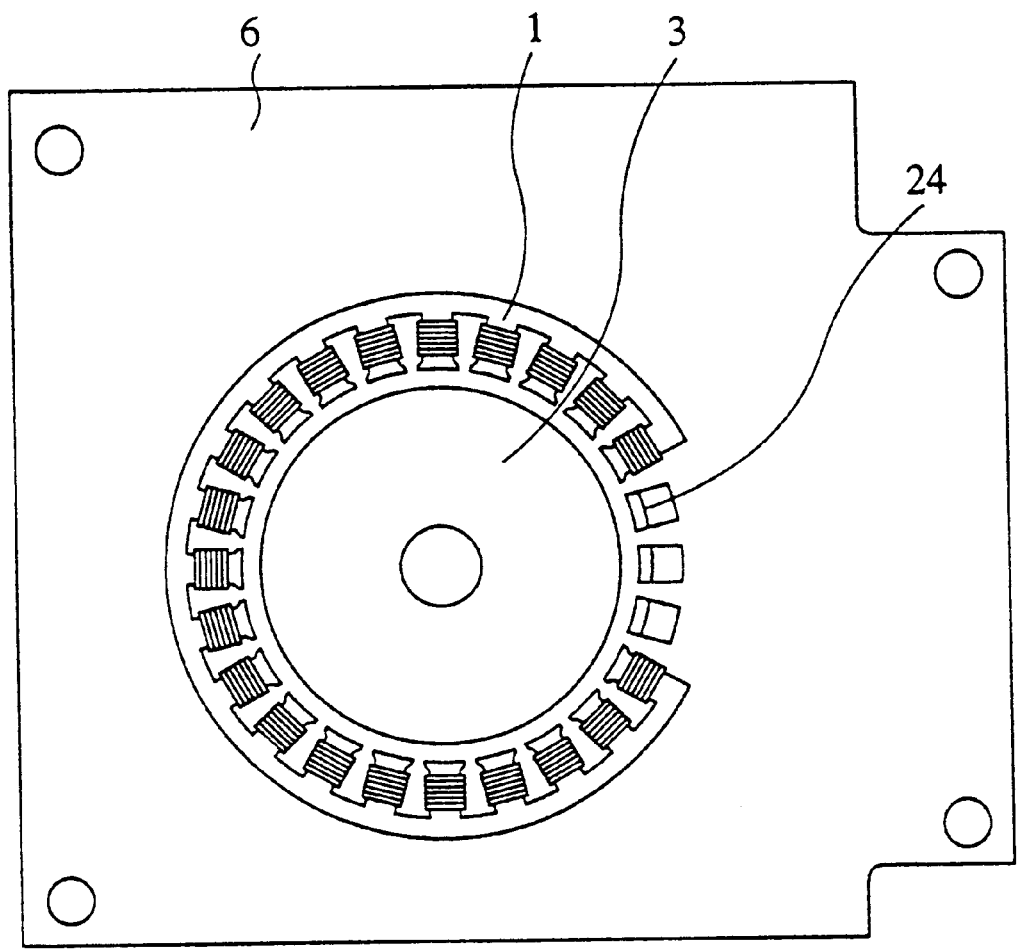
FIG. 10 is a front view of the stator and the substrate according to the seventh embodiment of the present invention.
Figure 11:
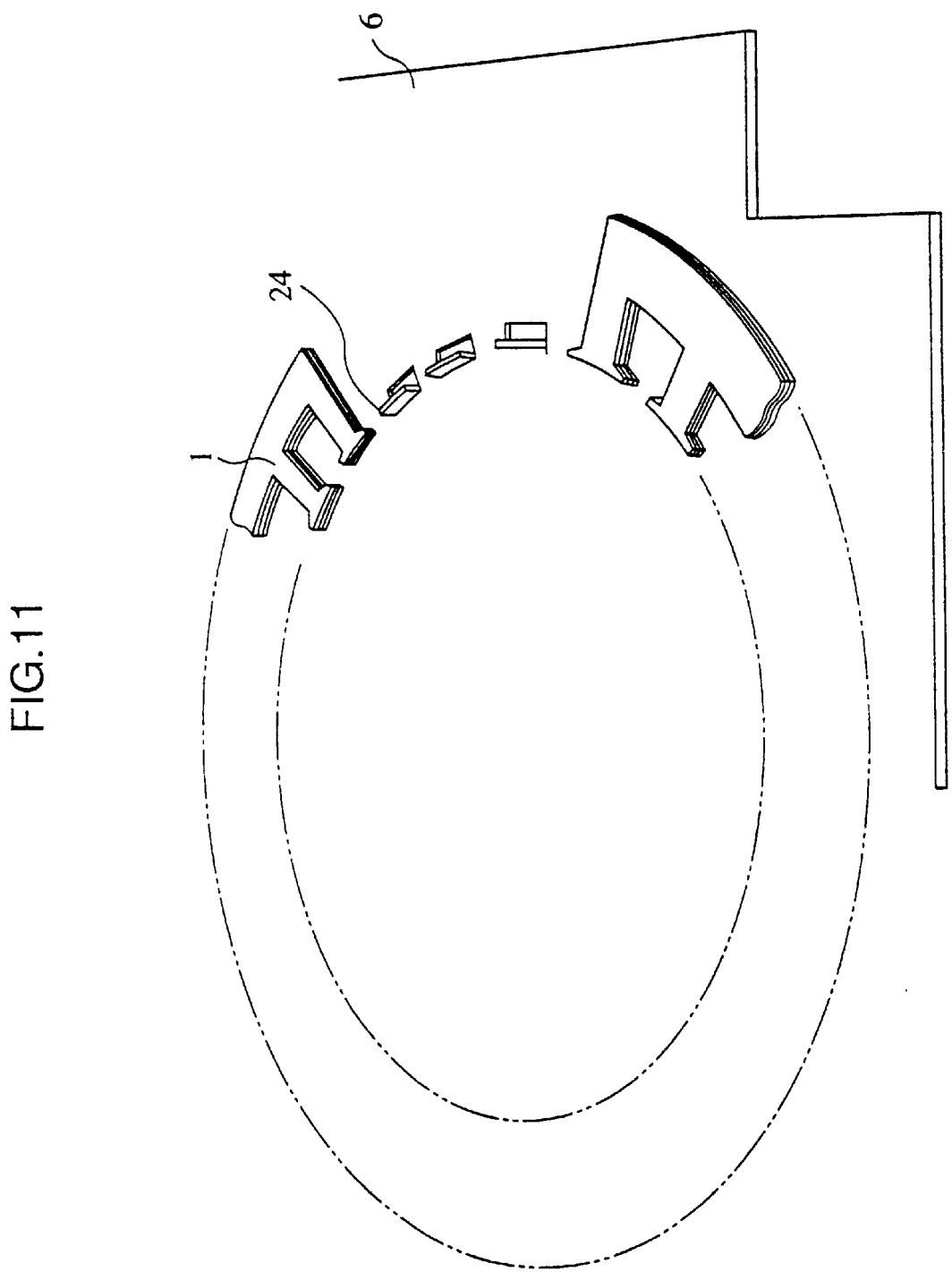
FIG. 11 is a partial perspective view of the stator and the substrate according to the seventh embodiment of the present invention.

The rotary motor according to the seventh embodiment of the present invention will be described with reference to FIGS. 10, 11. If the stator is provided with a cut-out section in which the carriage of a read/write head reciprocates in an inner rotor type medium rotation driving motor such as a magnetic disk, an unbalanced load occurs.

Then, rising sections 24 are provided with the iron substrate 6 in the portion in which part of the stator is cut off. In order to compensate for the imbalance of magnetic attraction due to the cut-off of the stator, a plurality of rising sections 24 having a large width are disposed with an appropriate gap with respect to the rotor.

Embodiment 8

Figure 12:
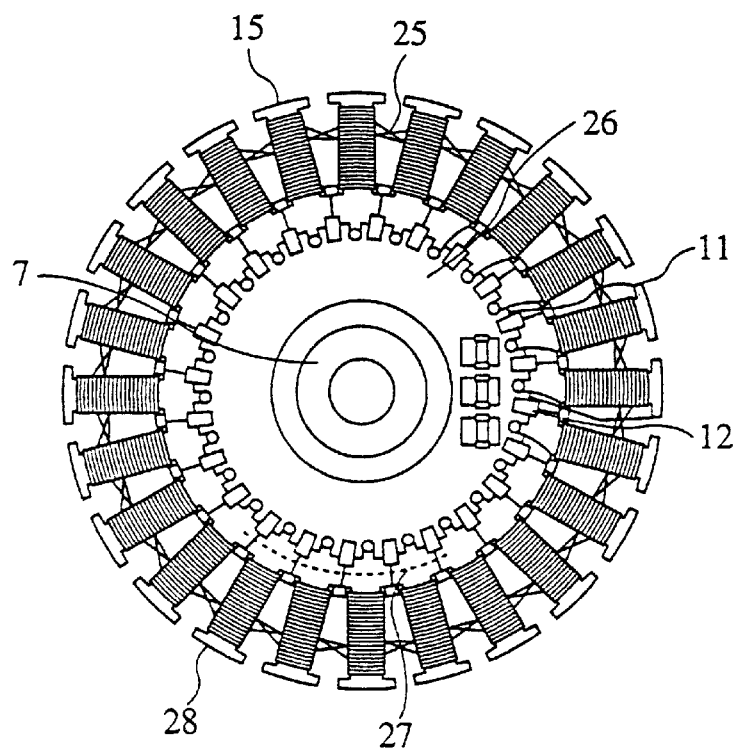
FIG. 12 is a front view of the stator according to the eighth and ninth embodiments of the present invention.
Figure 13:
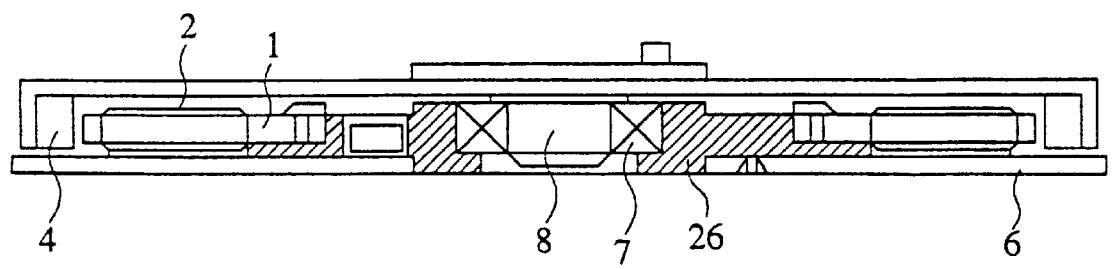
FIG. 13 is a sideways sectional view of the stator according to the eighth embodiment of the present invention.
Figure 21:
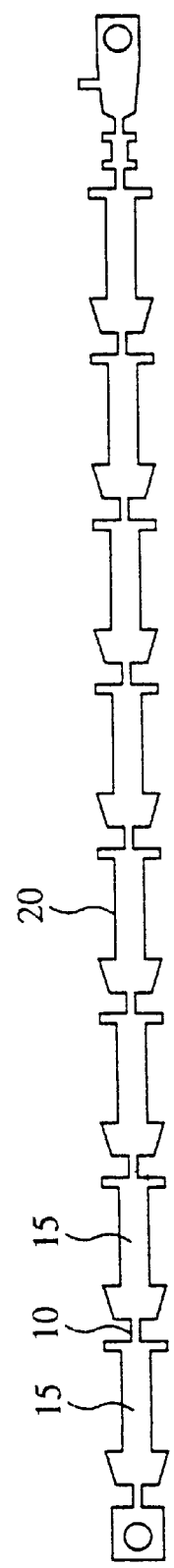
FIG. 21 is a front view of the stator core according to the eighth embodiment of the present invention.

Next, the rotary motor according to the eighth embodiment of the present invention will be described with reference to FIGS. 12, 13 and 21–25. FIGS. 12, 13 show an outer rotor type in which the stator core is divided for every magnetic pole tooth. As shown in FIG. 21, the connecting stator cores 20 are produced by punching the material in the form of a plurality of magnetic pole teeth 15 which are connected in the direction of magnetic flux of the magnetic pole teeth 15. That is, the connecting stator core 20 is a string composed of magnetic pole teeth having the same phase, which are connected to each other with the thin portions 10.

Figure 22:
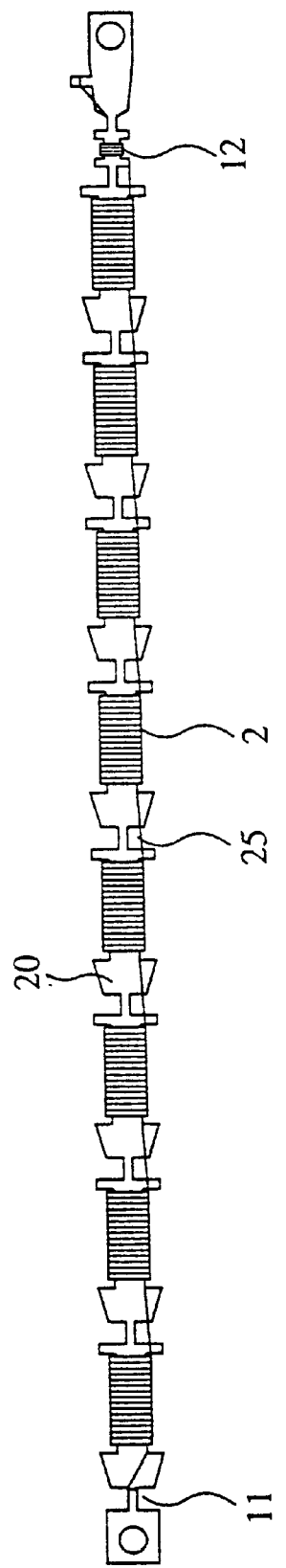
FIG. 22 is a front view of the stator core wound with wire, according to the eighth and ninth embodiments of the present invention.
Figure 23:
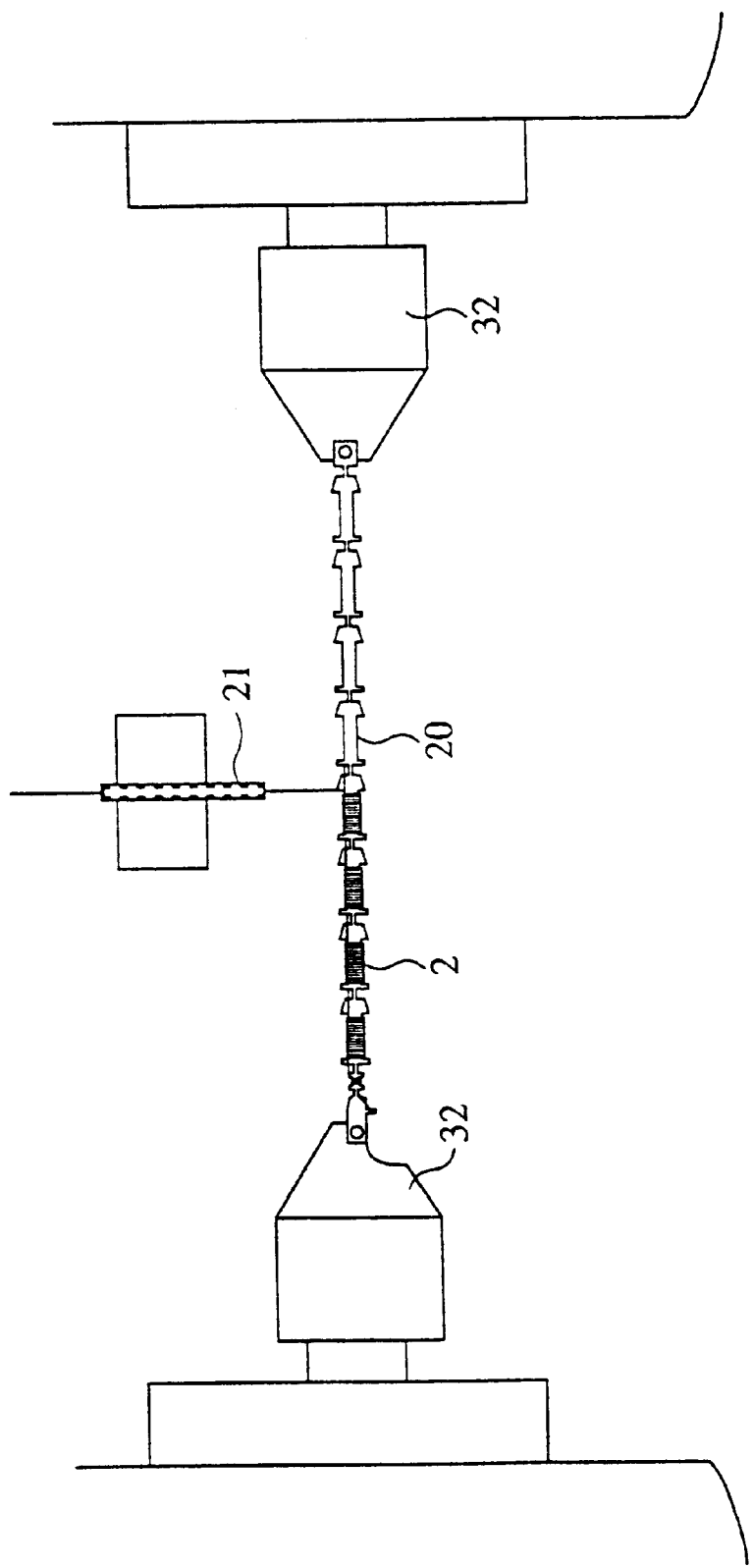
FIG. 23 is an explanatory view for explaining the procedure of wire winding on the stator core according to the eighth embodiment of the present invention.

A plurality of stacked pieces of the connecting stator cores 20 are subjected to insulation treatment such as coating. Then, as shown in FIG. 23, both ends of the stacked connecting stator cores 20 are pulled by means of the stator holding apparatus 32 and the connecting stator cores 20 are rotated with respect to the length thereof to wind the connecting stator cores 20 with wires. FIG. 22 shows the connecting stator cores 20 after wound with wires. The crossover wire 25 between the coils of the magnetic pole teeth is wound so as to be continuous without cutting the crossover wire as shown in FIG. 22.

Figure 24:
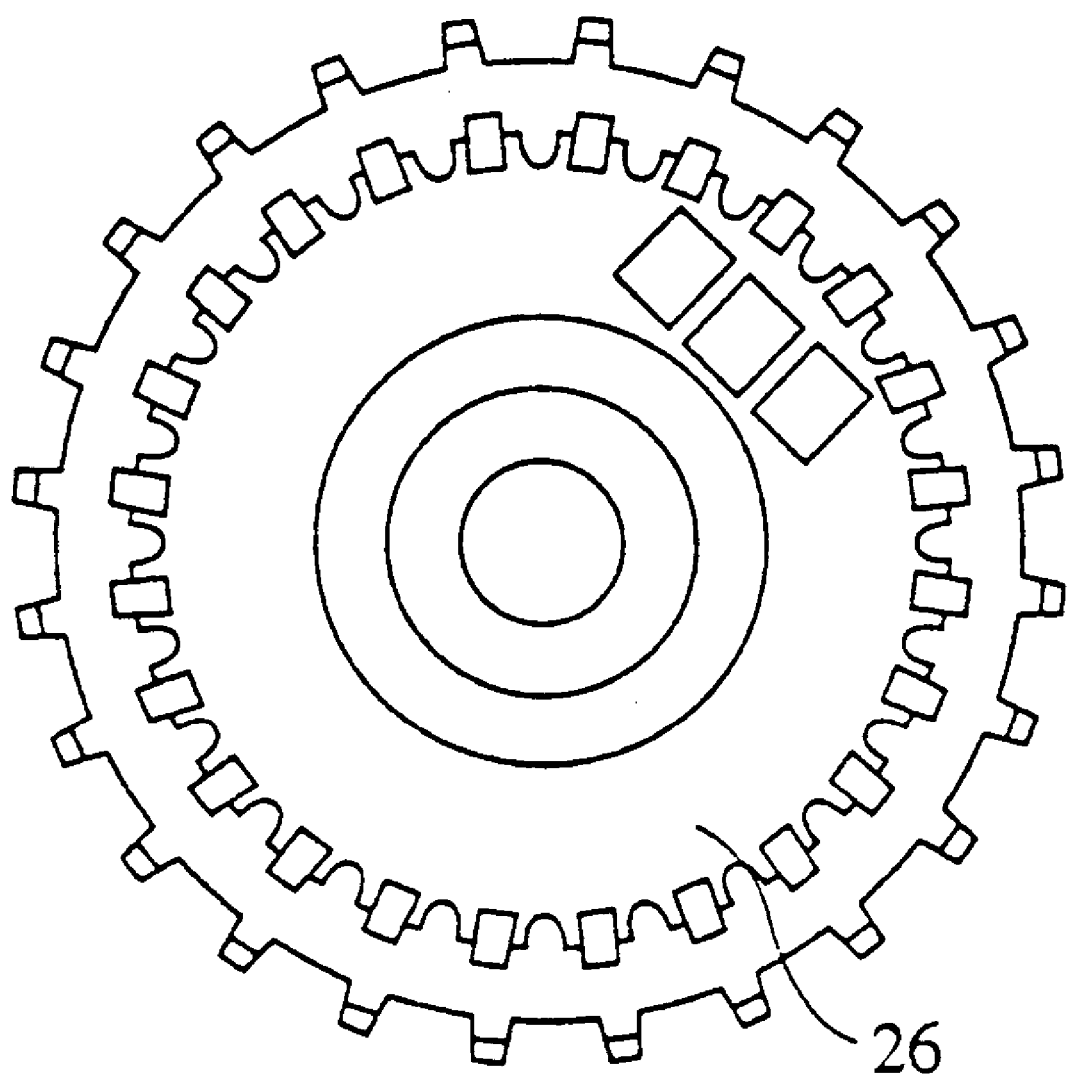
FIG. 24 is a front view of the molded resin product according to the eighth embodiment of the present invention.
Figure 25:
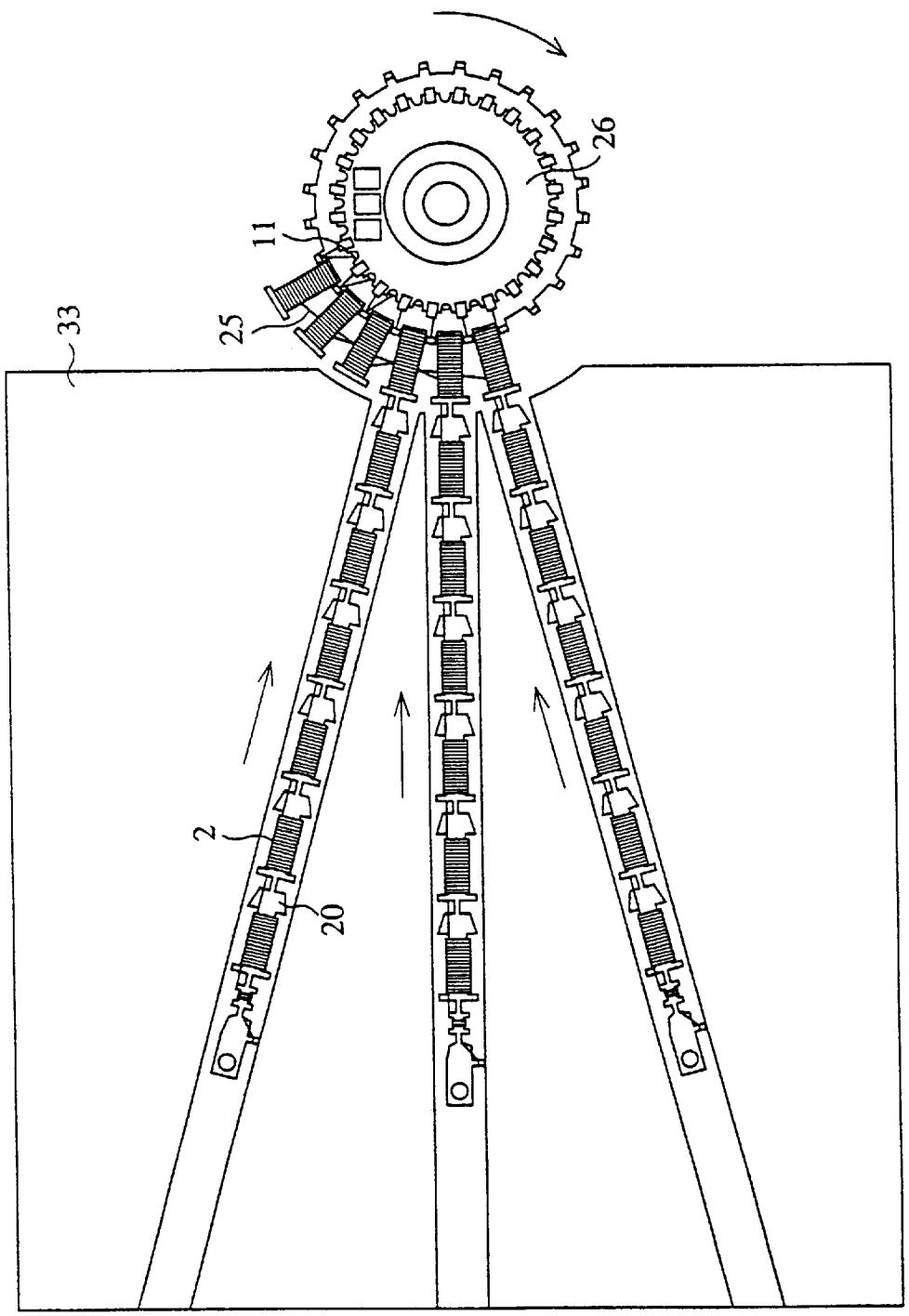
FIG. 25 is an explanatory view for explaining the procedure of forming the stator core according to the eighth embodiment of the present invention.

Then, the stator is assembled. As shown in FIG. 25, a resin molded product 26 shown in FIG. 24 is set on a rotary jig. The magnetic pole teeth 15 are assembled to the resin molded product 26 by cutting the thin portions 10 of the connecting stator cores 20 of different phases which are wound with wires by means of laser or the like. Upon winding the connecting stator core with wire, the connecting stator cores 20 are wound with wire loosely to assure tolerance of winding in order to keep the crossover wire 25 continuous between the magnetic pole teeth.

It is permissible to rotate an assembled stator with respect to the center of the stator and cut or shave the surface thereof facing the rotor by means of laser beam or the like. In this case, the surface of the magnetic pole tooth, facing the rotor in the punched connecting stator core 20 is provided with a processing allowance.

Further, it is permissible to fit the yoke portions 16 of the magnetic pole teeth 15 and fasten the yoke portion 16 by fusing thermally by means of laser beam or the like after the stator is assembled. FIG. 12 shows the fusion-fixed portion 27.

Embodiment 9

It is permissible to compose the rotary motor as follows. As shown in FIGS. 22, 12, the beginning end and the terminating end of the coil are tied to both ends of the connecting stator core 20. One end thereof is the common terminal portion 11 and the other end is the coil terminal portion 12. Although the coil terminal portion 12 is separated from the magnetic pole tooth when the stator is assembled and connected onto the Land of the wiring pattern, the common terminal portion 11 is directly connected to the stator core by soldering or the like. Because respective magnetic pole teeth which are divided when the stator is assembled are fit to each other or bonded with each other, the stator has the same potential as the neutral point potential.

Embodiment 10

Figure 14:
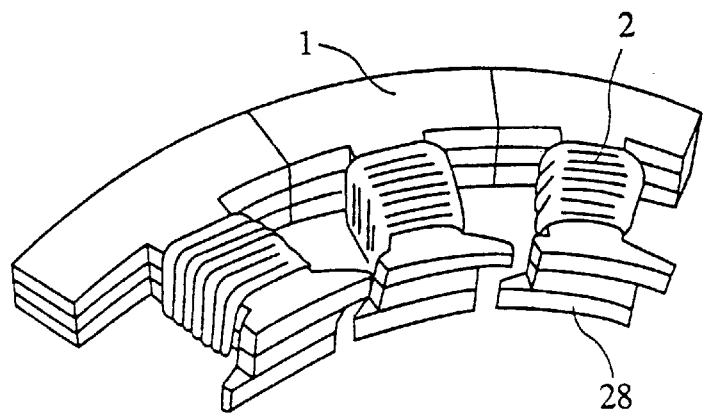
FIG. 14 is a perspective view of the stator according to the tenth embodiment of the present invention.
Figure 15:
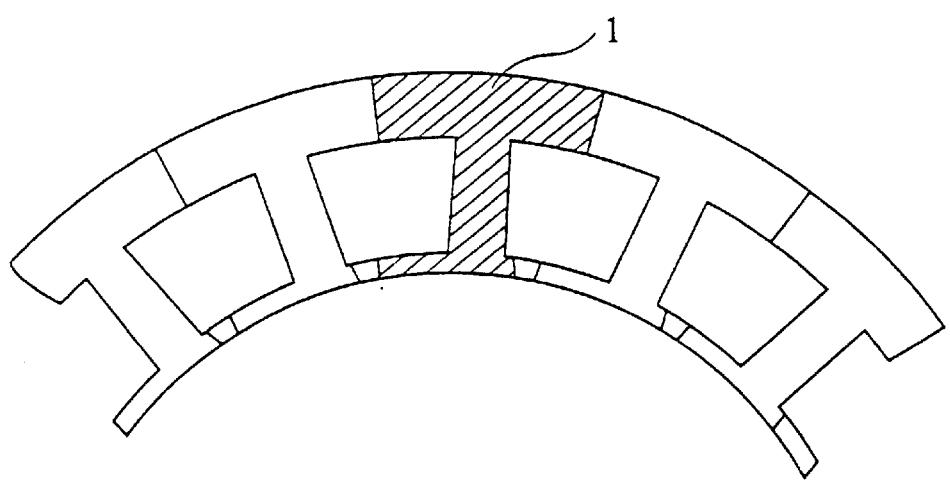
FIG. 15 is a front view of the stator core according to the tenth embodiment of the present invention.
Figure 16:
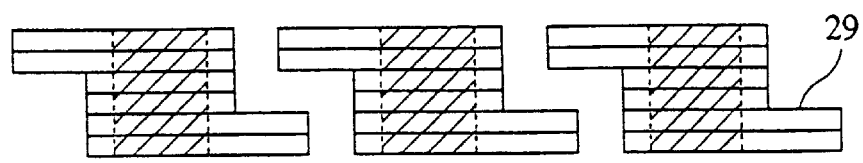
FIG. 16 is a partial side view of the stator core viewed from the rotor facing side, according to the tenth embodiment of the present invention.
Figure 17:
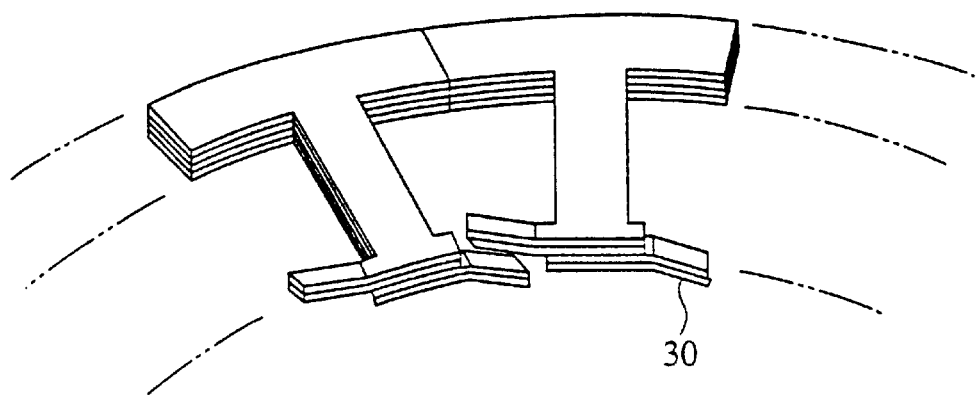
FIG. 17 is a perspective view of the stator core according to the tenth embodiment of the present invention.
Figure 18:
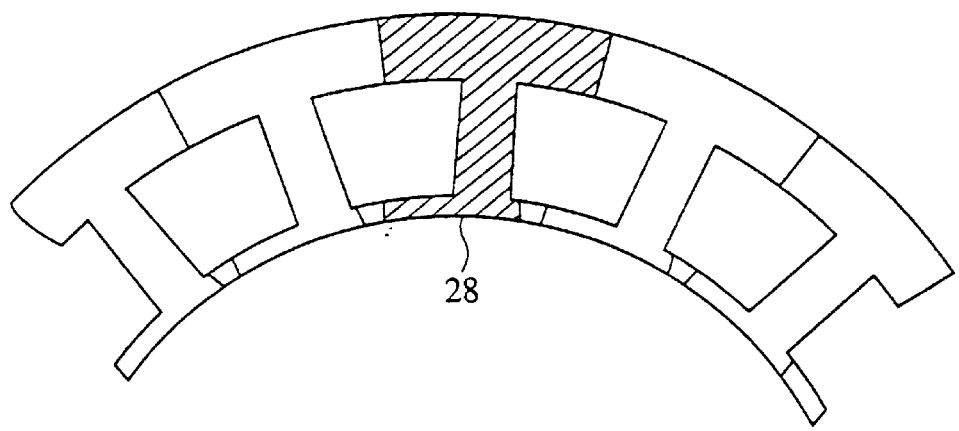
FIG. 18 is a front view of the stator core according to the tenth embodiment of the present invention.
Figure 19:
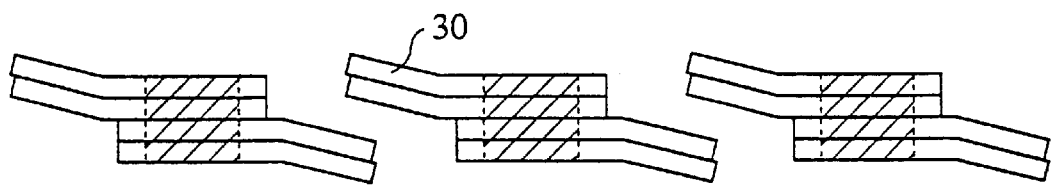
FIG. 19 is a partial sectional view of the stator core viewed from the rotor facing side, according to the tenth embodiment of the present invention.

Then, the rotary motor according to the tenth embodiment of the present invention will be described with reference to FIGS. 14–19. FIG. 14 shows an example in which the rotor facing surface 28 is formed so as to have a plurality of steps along the length of the shaft of the rotary motor. This composition can be achieved by using a plurality of cores having different shapes. FIGS. 15, 16 show an example in which the magnetic pole teeth are formed so as to have two steps. FIGS. 17, 18, 19 show a construction in which the rotor facing surface 28 of the magnetic pole teeth is partially bent to provide slanted portions 30.

It is possible to reduce the unevenness of the rotation resulting from cogging torque easily by changing the shape of the core material of the stator. As a method for reducing the cogging torque of the rotary motor, it is possible to produce magnetic formation on the rotor magnet in the form of a spiral. However, a special apparatus is required to realize the method and further the accuracy of magnetic formation was low.

Embodiment 11

Figure 20:
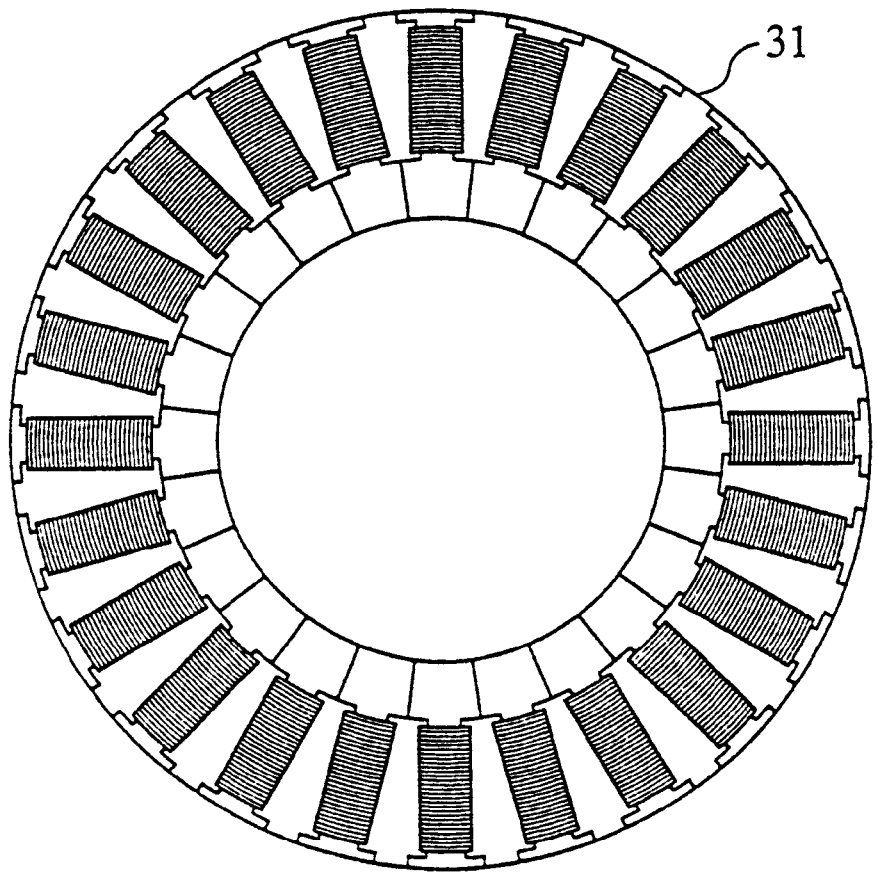
FIG. 20 is a front view of the stator according to the eleventh embodiment of the present invention.

It is permissible to construct the stator as shown in FIG. 20 to reduce the unevenness of rotation. That is, magnetic material wire 31 is wound around or in the vicinity of the rotor facing surface of the stator according to the eighth embodiment by several turns.

Consequently, part of magnetic flux which effectively acts on the rotor magnet from the magnetic pole teeth leaks to the magnetic pole teeth nearby, so that cogging torque occurs inactively thereby reducing the unevenness of rotation.

Embodiment 12

Figure 26:
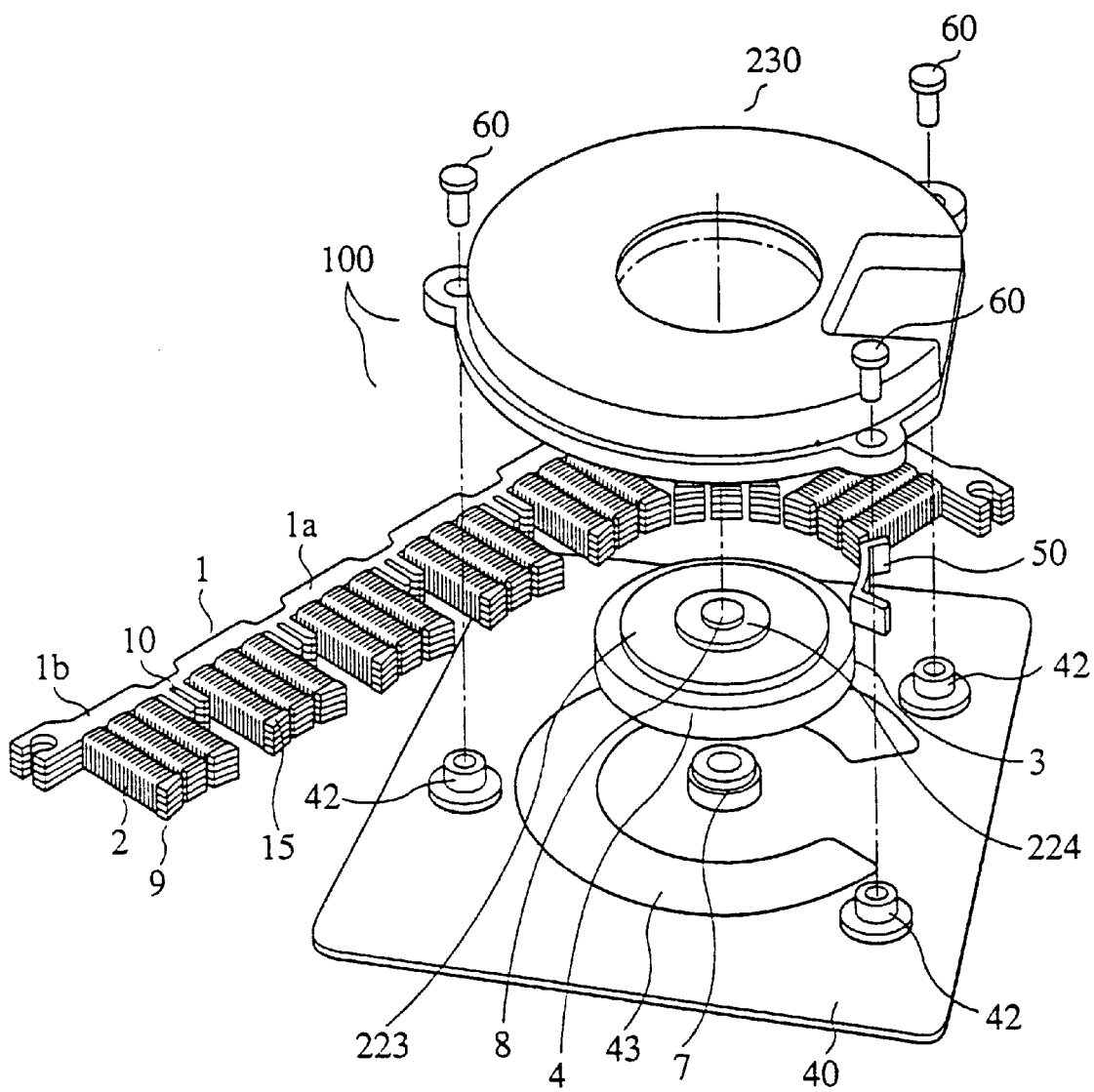
FIG. 26 is a disassembly perspective view of the rotary motor according to the twelfth embodiment of the present invention.

The rotary motor according to the twelfth embodiment will be described with reference to FIGS. 26–31. FIG. 26 is a disassembly perspective view of the rotary motor. The rotary motor of the present embodiment is a thin inner rotor type brushless motor which is used for a flexible disk drive, a hard disk drive or the like. Reference numeral 1 designates the stator, numeral 3 designates the rotor, numeral 230 designates a cover holder which acts as the protective member for the rotary motor, numeral 40 designates the base and numeral 50 designates a magnetic balancer. The stator 1 is formed and then fixed to the cover holder 230.

Figure 27:
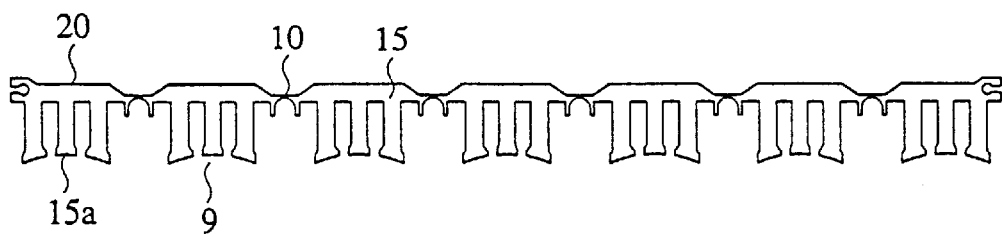
FIG. 27 is a plan view of the stator core according to the twelfth embodiment of the present invention.
Figure 28:
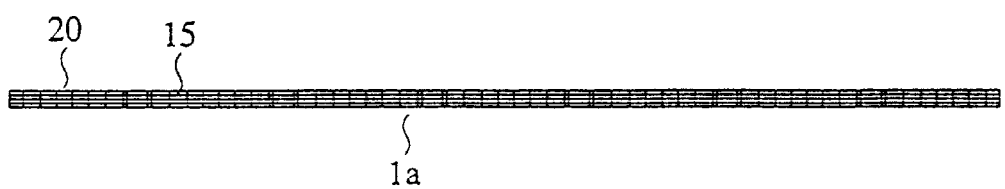
FIG. 28 is a sectional view of the stator core shown in FIG. 27.
Figure 29:
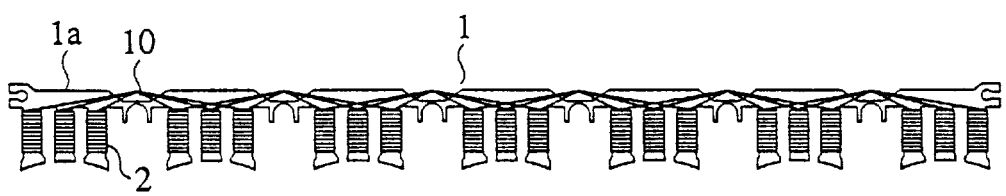
FIG. 29 is a plan view of the stator core wound with wire, according to the twelfth embodiment of the present invention.
Figure 30:
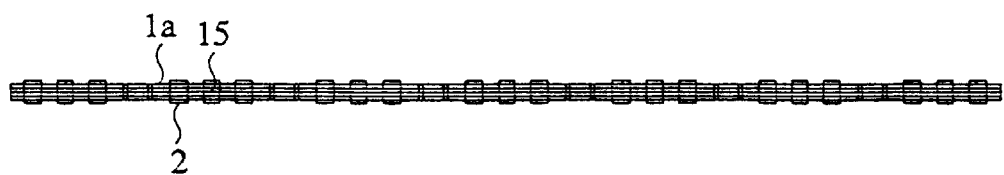
FIG. 30 is a sectional view of the stator core shown in FIG. 29.

The stator 1 comprises the stacked stator core 1a in which the stator cores 20 produced by punching magnetic material by means of press as shown in FIGS. 27, 28 are stacked, and the coils 2 which are wound around the stacked stator core 1a as shown in FIGS. 29, 30. As shown in FIG. 27, the stator core 20 is formed so that a plurality of the blocks 9 are connected to each other by means of the thin portions 10. Each block 9 is composed of the same number of the magnetic pole teeth 15 as the number of the phases of the rotary motor. Winding of wire for the coil 2 is performed in the state in which the stacked stator core 1a is placed straightly as shown in FIG. 27. Generally, the coil 2 is formed around the stacked stator core 1a after the stator core 1a is subjected to insulation treatment such coating.

In the rotor 3 shown in FIG. 26, a spindle shaft 8 is held in the center thereof and comprises a circular rotor holder 223 which acts as the back yoke of the rotor magnet 4, connecting the spindle shaft 8 to the rotor magnet 4, and a hub 224 mounted on the rotor holder 223. The base 41 has the bearing 7. The rotor 3 is mounted so that the bearing 7 engages with the spindle shaft 8.

The stator 1 is formed by deforming the thin portion 10 from linear shape to circular shape. After this, the stator 1 is mounted on the cover holder 230. The stator portion 100 comprising the stator 1 and the cover holder 230 as shown in FIG. 26 is fastened to the base 40 through screw portions 42 provided on the base 40 and screws 60 so that the rotor magnet 4 faces the tips 15a of the magnetic pole teeth 15 with a predetermined gap therebetween. Reference numeral 43 designates an insulating sheet which insulates the coil 2 from the base 40.

As described above, the shape of the stator 1 is determined by the cover holder 230 to hold the stator 1. Additionally, the cover holder 230 protects the stator 1 and the rotor 3.

According to the present embodiment, the stator 1 which comprises a plurality of the blocks 9 is incorporated in the cover holder 230 which acts as the protective member of the rotary motor thereby increasing the accuracy of the location of the stator cores 20. Further, the stator portion 100 including the cover holder 230 can be handled more easily, thereby facilitating the assembly of the rotary motor. Still further, because the stator portion 100 can be handled separately, it is possible to incorporate the rotary motor on a complicated structure base.

Embodiment 13

Figure 32:
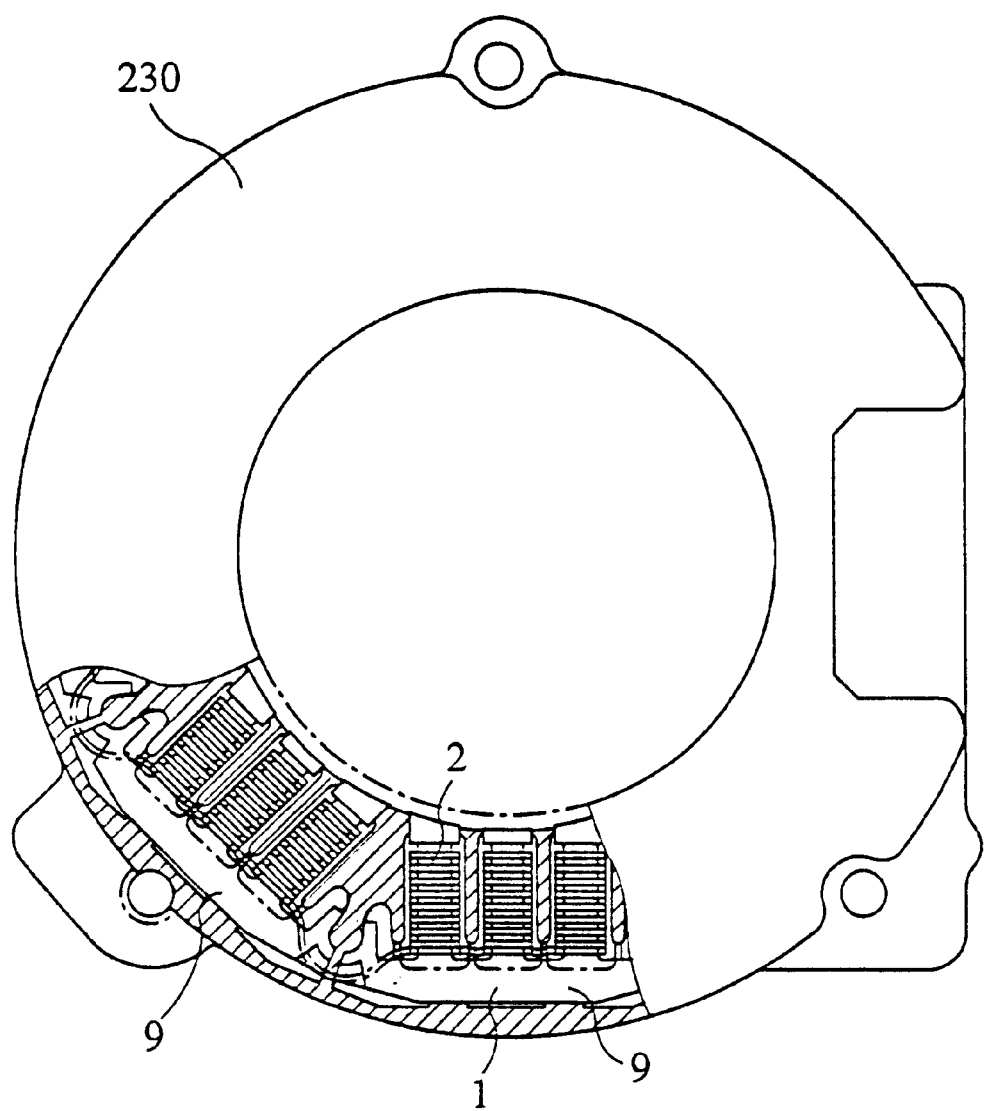
FIG. 32 is a plan view of the rotary motor according to the thirteenth embodiment of the present invention, in which the cover holder is partially cut away.

The twelfth embodiment shows the stator core 20 in which the blocks 9 are connected to each other by means of the thin portions 10. As shown in a plan view of FIG. 32 in which part of the cover holder 230 is cut away, it is permissible to construct the stator 1 in which the thin portions 10 are broken and the blocks 9 are incorporated within the cover holder 230 such that the blocks 9 are connected to each other. In this case also, the same effect can be achieved.

Embodiment 14

Figure 33:
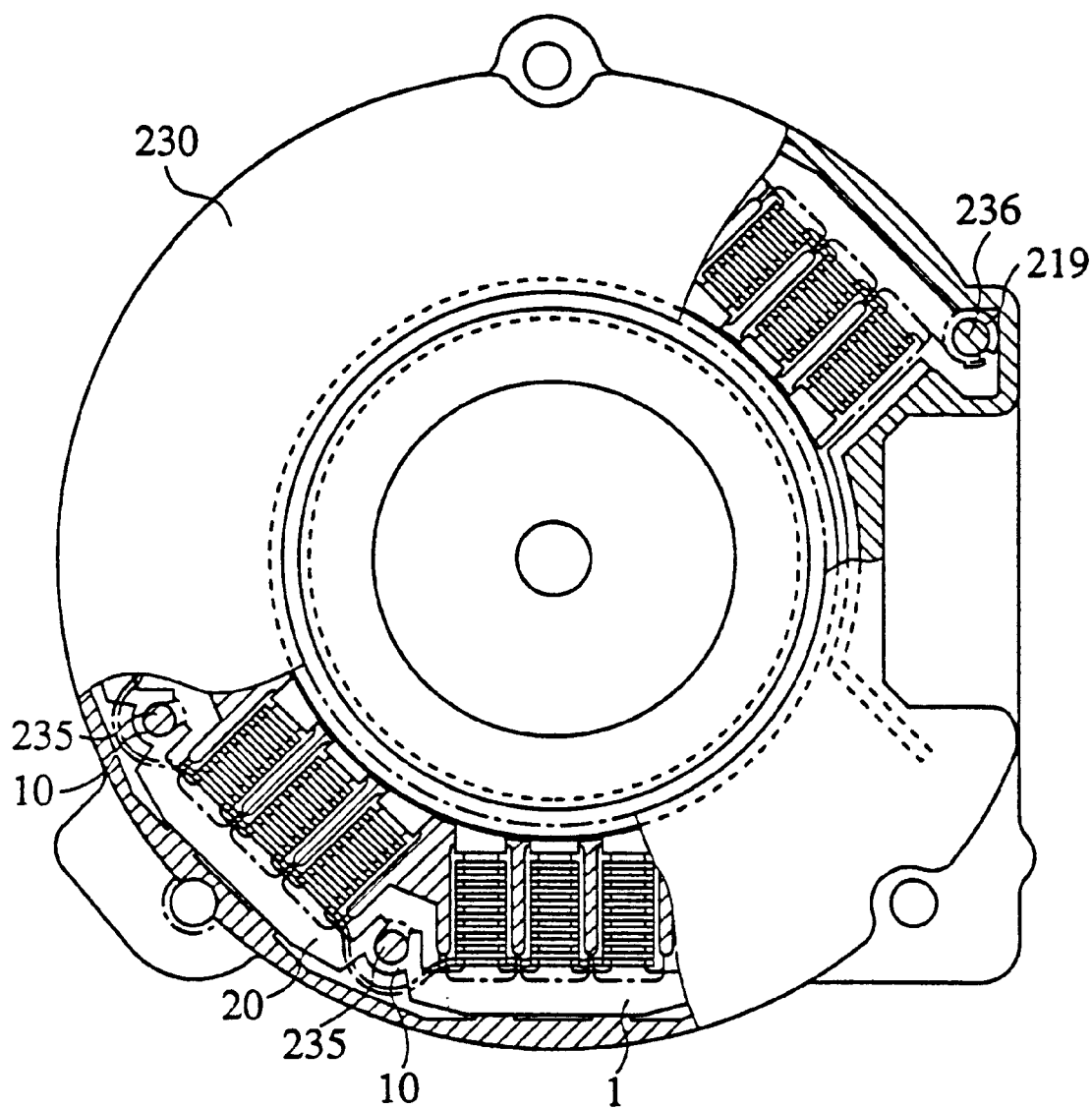
FIG. 33 is a plan view of the rotary motor according to the fourteenth embodiment of the present invention, in which the cover holder is partially cut away.
Figure 34:
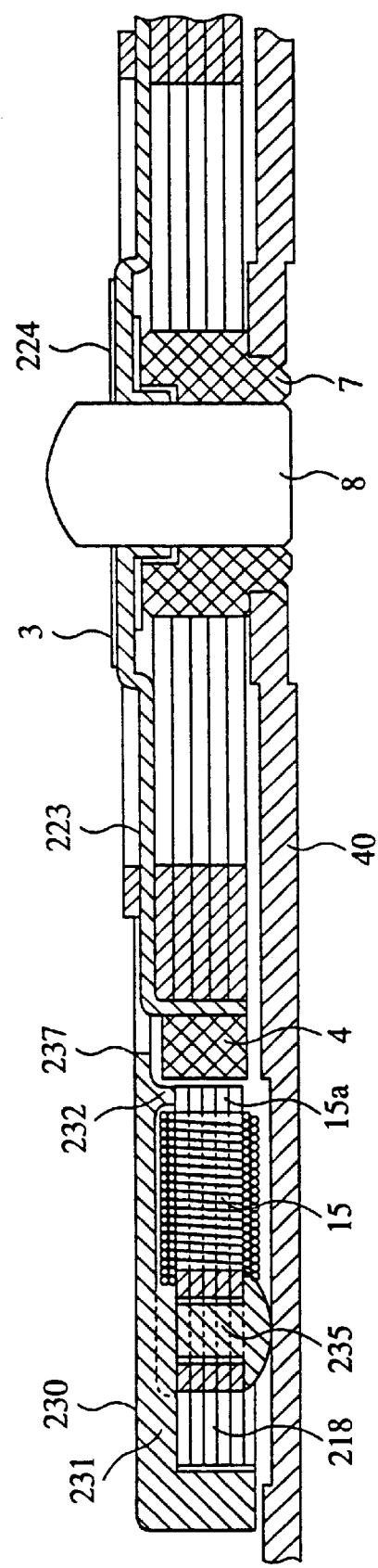
FIG. 34 is a partial sectional view of the rotary motor shown in FIG. 33.
Figure 35:
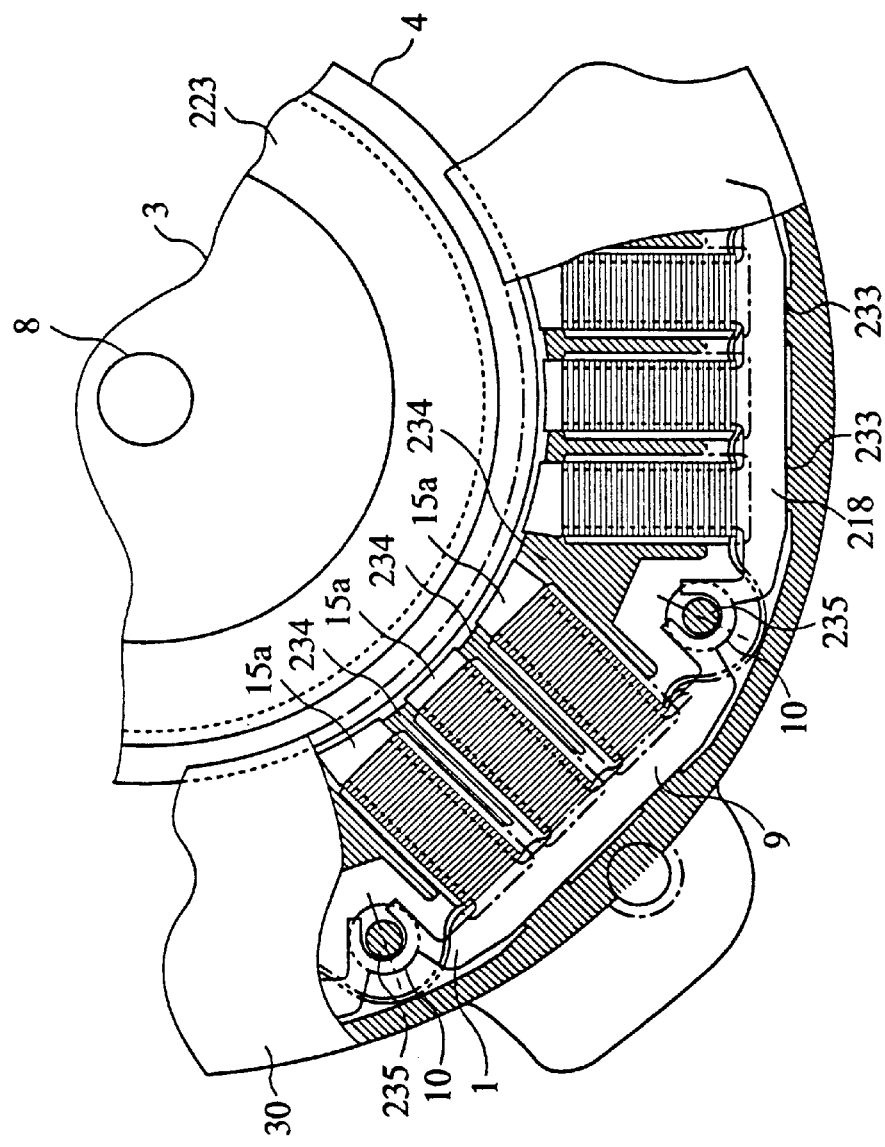
FIG. 35 is a partially enlarged view of the rotary motor shown in FIG. 33.

The rotary motor according to the fourteenth embodiment of the present invention will be described with reference to FIGS. 33–35. FIG. 33 is a plan view of the rotary motor in which the cover holder 230 is partially cut away. FIG. 34 is partial sectional view of the rotary motor shown in FIG. 33 and FIG. 35 is a partially enlarged view of the rotary motor shown in FIG. 33. As shown in FIG. 33, the stator 1 is embedded in the cover holder 230 which is resin molded to a predetermined shape. The position of the stator core along the height thereof is determined by making the top face of the back yoke portion 21B in the rear of the block 9 in contact with the abutment surface 231 provided on the cover holder 230 and further the top of the tip 15a of the magnetic pole teeth 15 in contact with the abutment surface 232.

Further, the position of the stator core along the radius thereof is determined by making the rear side of the back yoke 218 in contact with the abutment surface 233 as shown in FIG. 35. The position of the stator core along the circumference thereof is determined by making both sides of the tip 15a of the magnetic pole teeth 15 in contact with the partition portions 234 which act as the rib of the cover holder 230. As shown in FIGS. 33, 35, the cover holder 230 has holding pins 235 at such positions in which the thin portions 10 of the stator core 20 are inserted. Further, supporting pins 236 are provided so as to engage with the fixing portions 219 provided on both ends of the stator core. Then, the stator 1 is fixed to the cover holder 230 by caulking the tips of the supporting pins 235, 236 by means of thermal means such as a heater chip, as sown in FIG. 34.

The supporting pins 235 have a function for pressing the stator 1 against the abutment surface 233 of the cover holder 230 by its elasticity. Further, as shown in FIG. 34, the cover holder 230 is provided with a loosening stopper portion 237 for the rotor 3 such that the cover holder 230 does not overlap the rotor magnet 4 interfering therewith in terms of the height. By producing the cover holder 230 by molding resin, it is possible to provide the cover holder with a positioning means and a fixing means easily. By using these means, it is possible to position and fix the stator 1 to the cover holder 230 easily.

According to the present embodiment, the cover holder 230 is produced by molding resin so as to serve as a protective cover for the rotary motor also and includes a positioning portion for positioning the stator 1 on the cover holder 230, a fixing portion for fixing the stator 1 and the loosening stopper portion 237 for the rotor 3. Thus, it is possible to incorporate the stator 1 at high precision and fix it easily. Additionally, the cover holder 230 prevents the rotor 3 from loosening.

Embodiment 15

Figure 36:
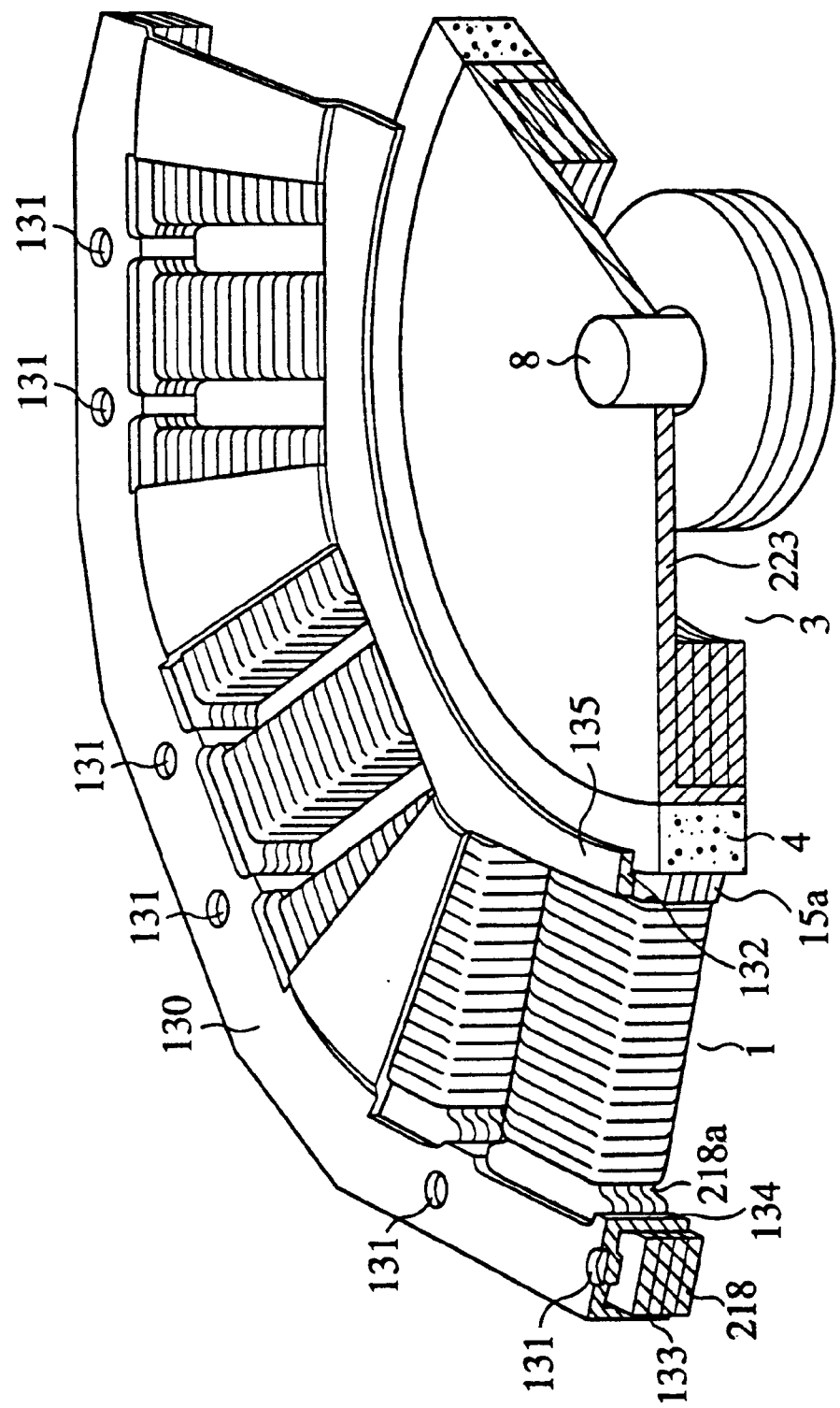
FIG. 36 is a perspective view of the major parts of the rotary motor according to the fifteenth embodiment of the present invention.
Figure 37:
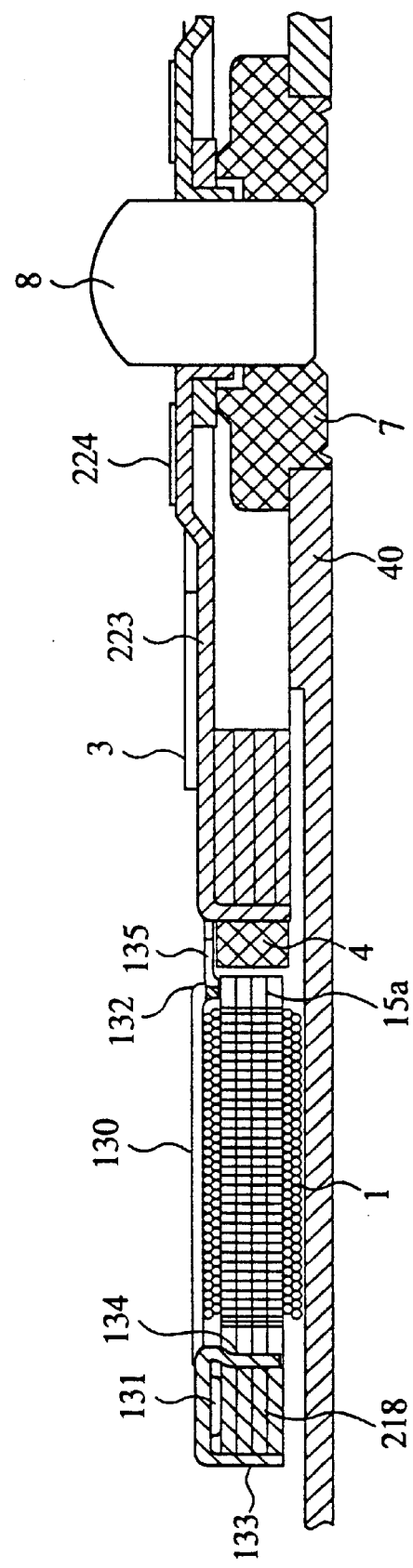
FIG. 37 is a sectional view of the rotary motor shown in FIG. 36.

Then, the rotary motor according to the fifth embodiment will be described with reference to FIGS. 36, 37. FIG. 36 is a perspective view of the major parts of the rotary motor and FIG. 37 is a sectional view of the rotary motor shown in FIG. 36. Reference numeral 130 designates a cover holder formed of non- magnetic material by means of press. As shown in FIG. 36, the stator formed in a predetermined shape is mounted on this cover holder 130. The position of the stator 1 along the height thereof is determined by making the top surface of the back yoke portion 218 in contact with a half pierce 131 which is provided on the top surface of the cover holder 130 by punching or the like and further the tip 15a in contact with the abutment surface 132 of the cover holder 130. Further, the position of the stator 1 along the radius thereof is determined by making the rear side of the back yoke portion 218 in contact with the abutment surface 133 which is the outer circumference of the cover holder 130. Still further, the position of the stator 1 along the circumference thereof is determined by nipping the back yoke portion 218 with the abutment surface 133 of the cover holder 130 and the holding portion 134 and then the stator 1 is fixed to the cover holder 130. The reason is that the back yoke portions 218 are provided with dent portions 218a and the side face of the holding portion 134 abuts the inner wall thereof, so that the stator 1 is fixed and positioned to the cover holder 130. The holding portion 134 possesses also the function for pressing the stator 1 against the abutment surface 133 by means of elasticity.

Further, as shown in FIG. 37, the cover holder 130 is provided with the loosening stopper portion 135 for the rotor 3 so that the cover holder 130 does not overlap the rotor magnet 4 interfering therewith in terms of the height. By producing the cover holder 130 by forming non-magnetic material by means of press, it is possible to provide the cover holder 130 with a positioning means and a fixing means for the stator 1 easily. By these means, it is possible to position and fix the stator 1 to the cover holder 130 easily.

According to the present embodiment, the cover holder 130 is produced by forming of non-magnetic material by means of press, the cover holder also acting as the protective cover of the rotary motor and includes the positioning portion for positioning the stator 1 in the cover holder 130, the stator holding portion 134 for nipping the back yoke portion 218 connecting magnetically respective magnetic pole teeth and the rotor loosening stopper portion 135. Thus, it is possible to incorporate the stator 1 in the cover holder 130 at high precision and fix the stator 1 thereto easily. Additionally, it is possible to prevent the rotor 3 from being loosed by means of the cover holder 130.

Embodiment 16

Figure 38:
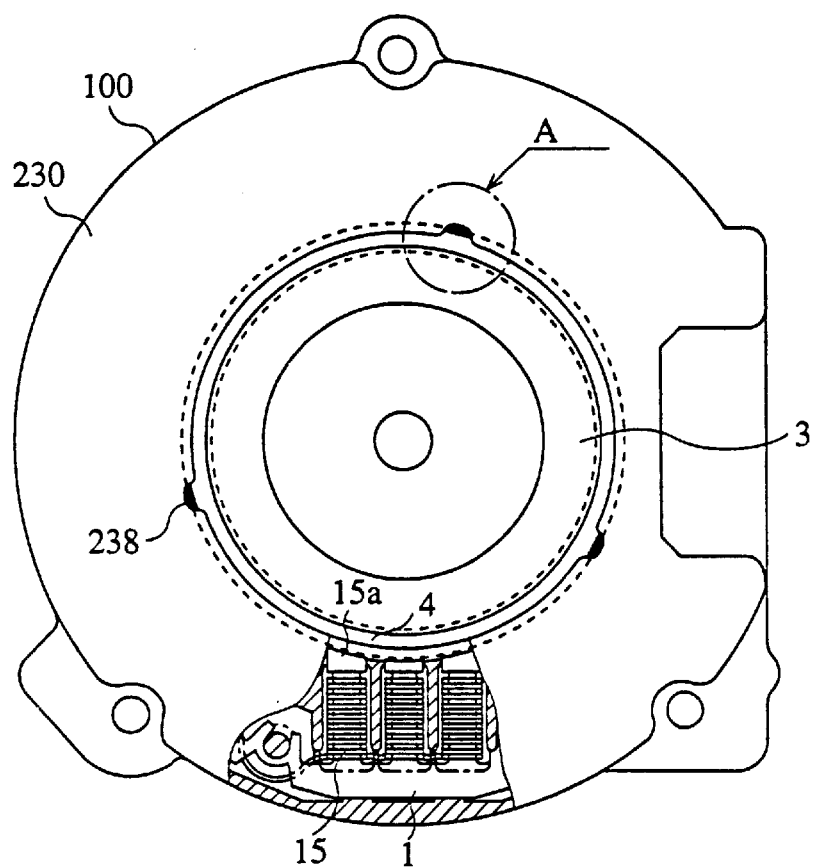
FIG. 38 is a plan view of the rotary motor according to the sixteenth embodiment of the present invention, in which the cover holder is partially cut away.
Figure 39:
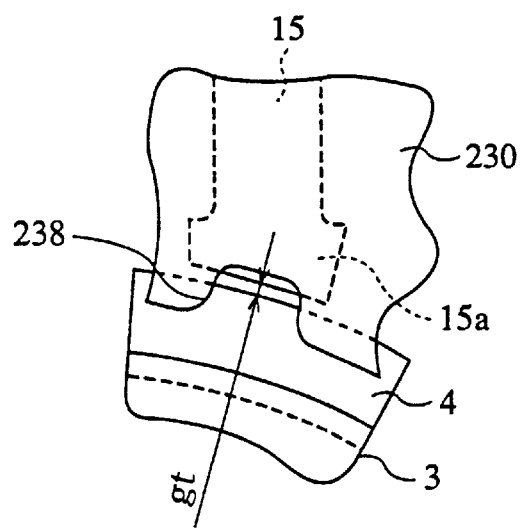
FIG. 39 is an enlarged view of the section A shown in FIG. 38.

Then, the rotary motor according to the sixteenth embodiment will be described with reference to FIGS. 38, 39. FIG. 38 is a plan view of the rotary motor in which part of the cover holder 230 is cut away. FIG. 39 is an enlarged view of the section A of the rotary motor shown in FIG. 38. In the rotary motor, the cover holder 230 in which the stator 1 is fixed has several windows which allow to see the tips 15a of the magnetic pole teeth 15 and the rotor magnet 4 from above. Thus, it is possible to observe the gap gt between the tip 15a and the rotor magnet 4 by means of a video camera or the like. As a result, by developing images of the output of the video camera or the like and observing the result of the developed images, an operator can adjust the stator portion 100 through the respective windows 238 so as to equalize the gap gt. Thus, it is possible to dispose the stator portion 100 at high precision with respect to the rotor 3.

Embodiment 17

Figure 40:
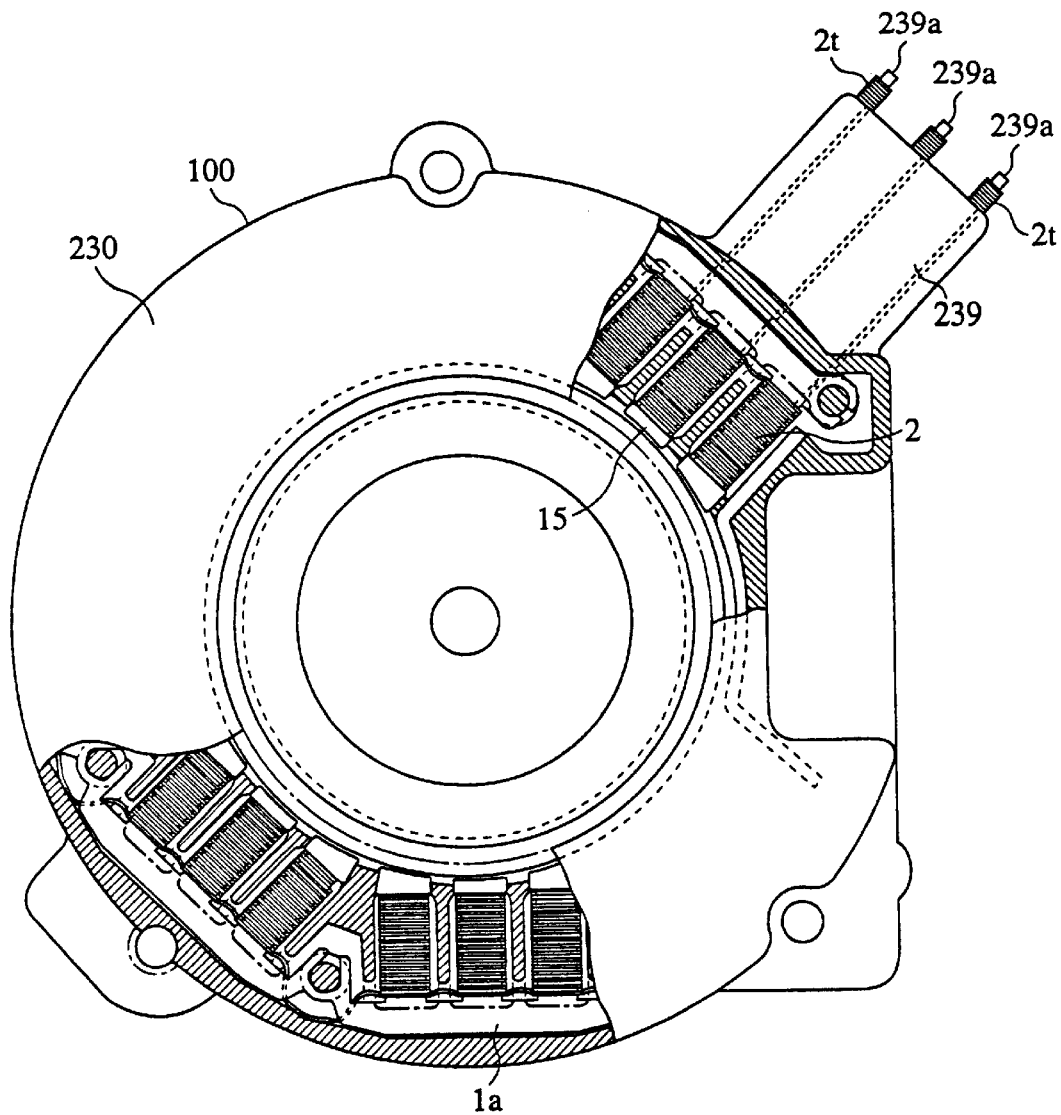
FIG. 40 is a plan view of the rotary motor according to the seventeenth embodiment of the present invention, in which the cover holder is partially cut away.
Figure 41:
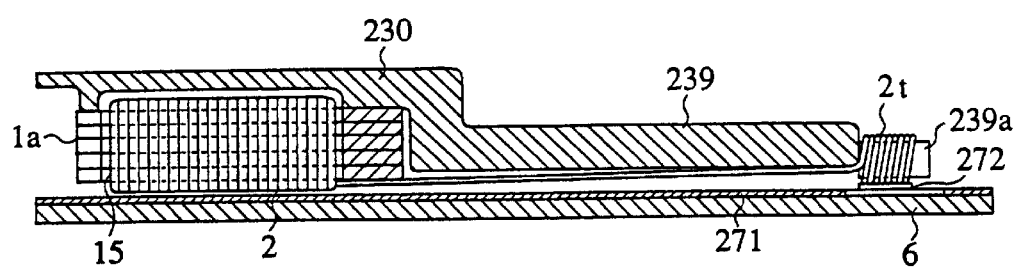
FIG. 41 is a sectional view of the major parts of the rotary motor shown in FIG. 40.

The rotary motor according to the seventeenth embodiment of the present invention will be described with reference to FIGS. 40, 41. FIG. 40 is a plan view of the rotary motor in which part of the cover holder 230 is cut away. FIG. 41 is a sectional view of the major parts of the rotary motor shown in FIG. 40. Reference numeral 239 designates a coil terminating portion provided on the cover holder 230 and tying portions 239a corresponding to the number of phases of the rotary motor are provided at the tips of the coil terminating portions. The terminal 2t of the coil 2 is tied up to the tying portion 239a. In this manner, the terminal 2t of the coil 2 is not an obstacle when the stator portion 100 is handled. Additionally, by arranging the tying portions 239a in parallel to each other with the same pitch as that of the magnetic pole teeth 15, it is possible to wind the tying portion 239a with the terminal 2t of the coil 2 using the same winding machine as the winding machine for winding the stacked stator core 1a. Further, by providing the coil terminating portion 239 on the same level as the substrate 6 as shown in FIG. 41, soldering of the terminal 2t of the coil 2 wound on the tying portion 239a to the substrate 6 is facilitated thereby making it easy to automate the soldering process. In the same Figure, numeral 271 designates an insulating layer for insulating the substrate 6 from the coil 2 and numeral 272 designates solder.

As described above, because the cover holder 230 is provided with the terminating portion 239 of the coil 2, the coil terminal 2t is not an obstacle when the stator portion including the cover holder 230 is handled. Additionally, soldering work of the coil terminal 2t is simplified.

Embodiment 18

Figure 42:
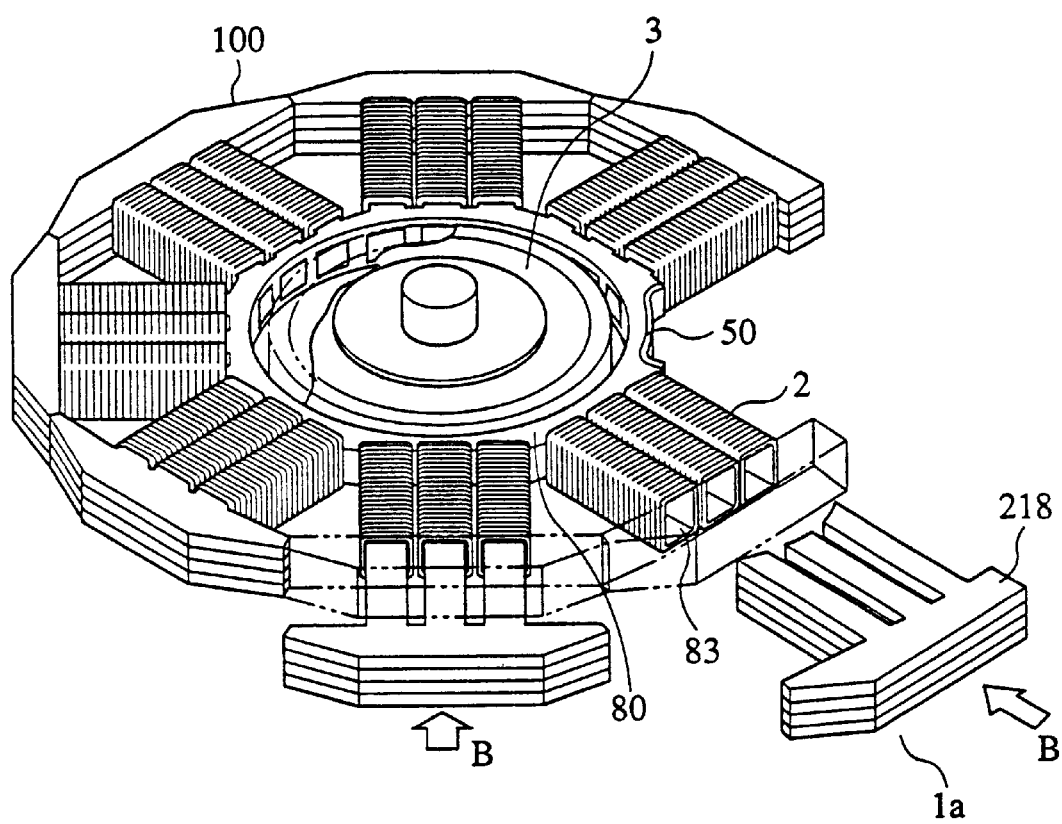
FIG. 42 is a perspective view of the major parts of the rotary motor according to the eighteenth embodiment of the present invention.
Figure 43:
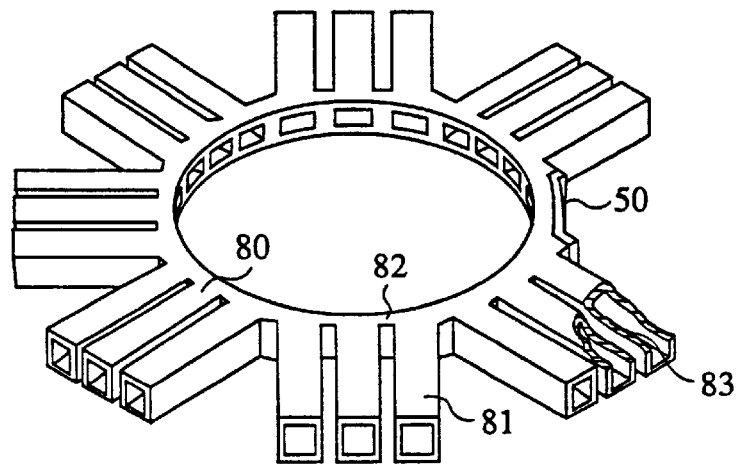
FIG. 43 is a perspective view of the stator holder according to the eighteenth embodiment of the present invention.

The rotary motor according to the eighteenth embodiment of the present invention will be described with reference to FIGS. 42, 43. FIG. 42 is a disassembly perspective view of the major parts of the rotary motor. FIG. 43 is a perspective view of the stator holder 80. As shown in FIG. 43, the stator holder 80 comprises coil winding portions 81 provided substantially radially, holding ring portion 82 which connects the coil winding portions 81 along the inner circumference thereof, and stator insertion portions 83 which are through holes provided substantially radially from the coil winding portion 81 to the holding ring portion 82. The coil winding portion 81 is wound with the coil 2 from the outer edge. As shown in FIG. 42, the stacked stator cores 1a are inserted into the stator insertion portions 83 of the stator holder 80 in the direction indicated by the arrow B from the outer circumference and then the stacked stator cores 1a are positioned by making the back yoke portion 218 in contact with the coil winding portion 81. Winding of the coil 2 is performed in the direction indicated by the arrow B. The stator portion 100 is composed of the stator holder 80, the coil 2 and the stacked stator cores 1a and the rotary motor is constituted by disposing the rotor 3 along the inner circumference thereof. This construction makes it possible to wind the coil 2 from the outer circumference in the inner rotor type rotary motor as well as in the outer rotor type rotary motor.

According to the present embodiment, the blocked stator cores 1a are inserted into the stator holder 80 having the coil winding portions 81 substantially radially provided, around which the coil 2 is wound from the outer circumference. Thus, the magnetic pole teeth tips (stator core protrusion) 15a which act as an obstacle when the coil 2 is wound are not provided, thereby facilitating winding process.

Embodiment 19

Figure 44:
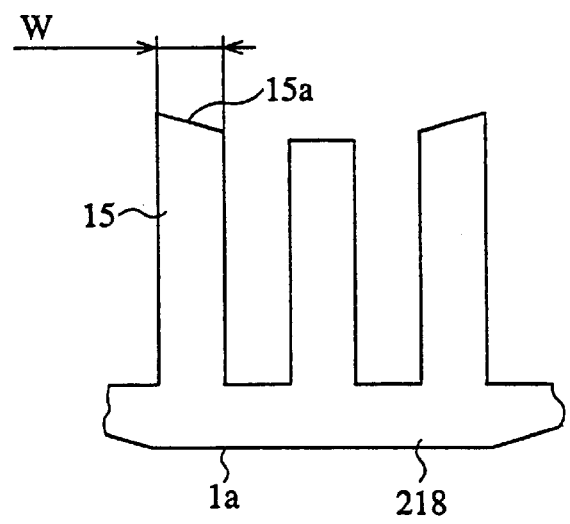
FIG. 44 is an enlarged view of the stator core according to the nineteenth embodiment of the present invention.

The rotary motor according to the nineteenth embodiment of the present invention will be described with reference to FIGS. 43, 44. FIG. 44 is a plan view of the stacked stator core 1a. As shown in FIG. 44, the width W of the magnetic pole tooth 15 of the stacked stator core 1a is equal from the tip 15a to the root of the back yoke portion 218. Consequently, insertion of the stacked stator cores 1a into the stator holder 80 is facilitated and further the rotary motor can be assembled more easily.

Embodiment 20

Figure 45:
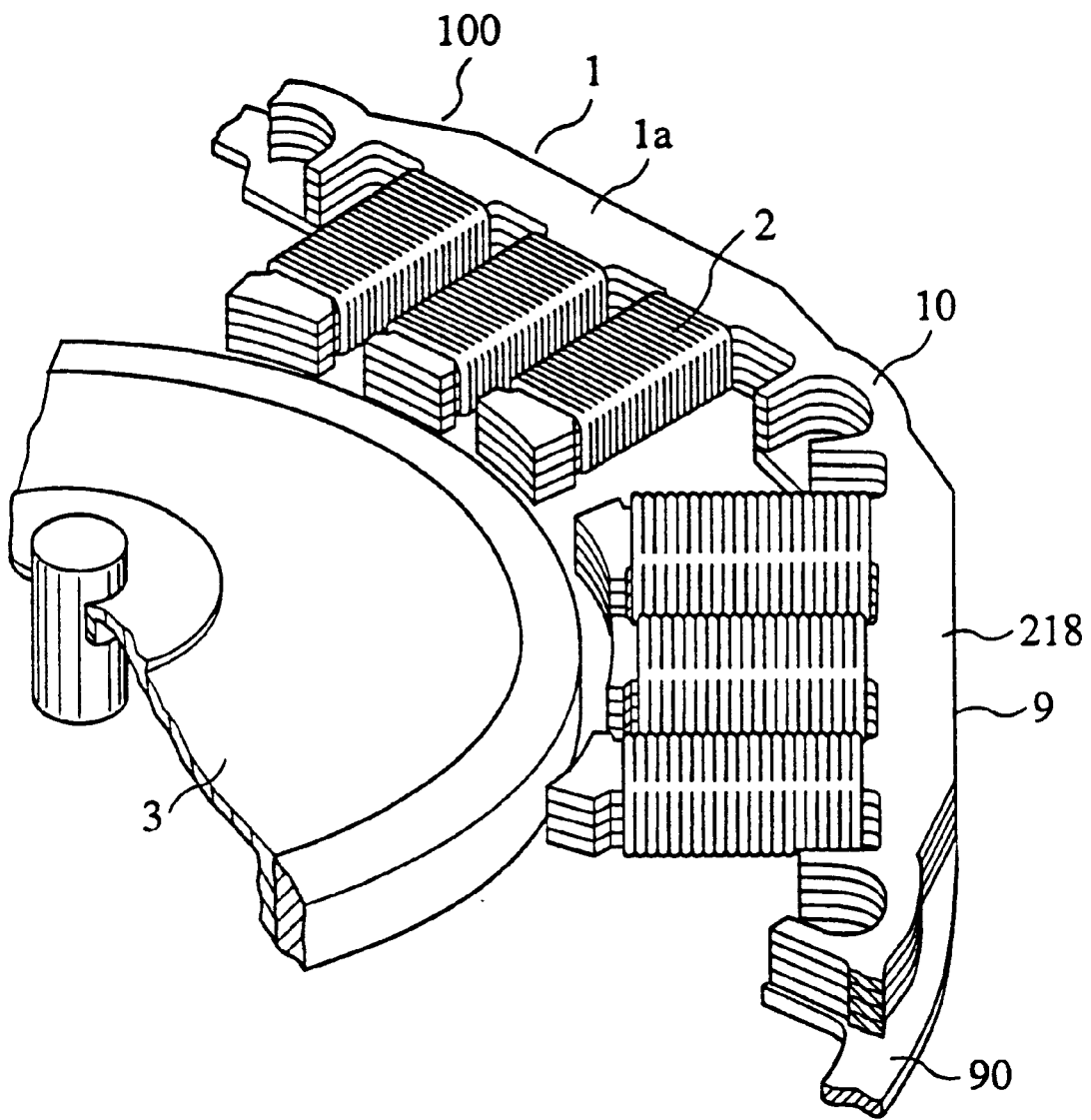
FIG. 45 is a perspective view of the major parts of the rotary motor according to the twentieth embodiment of the present invention.
Figure 46:
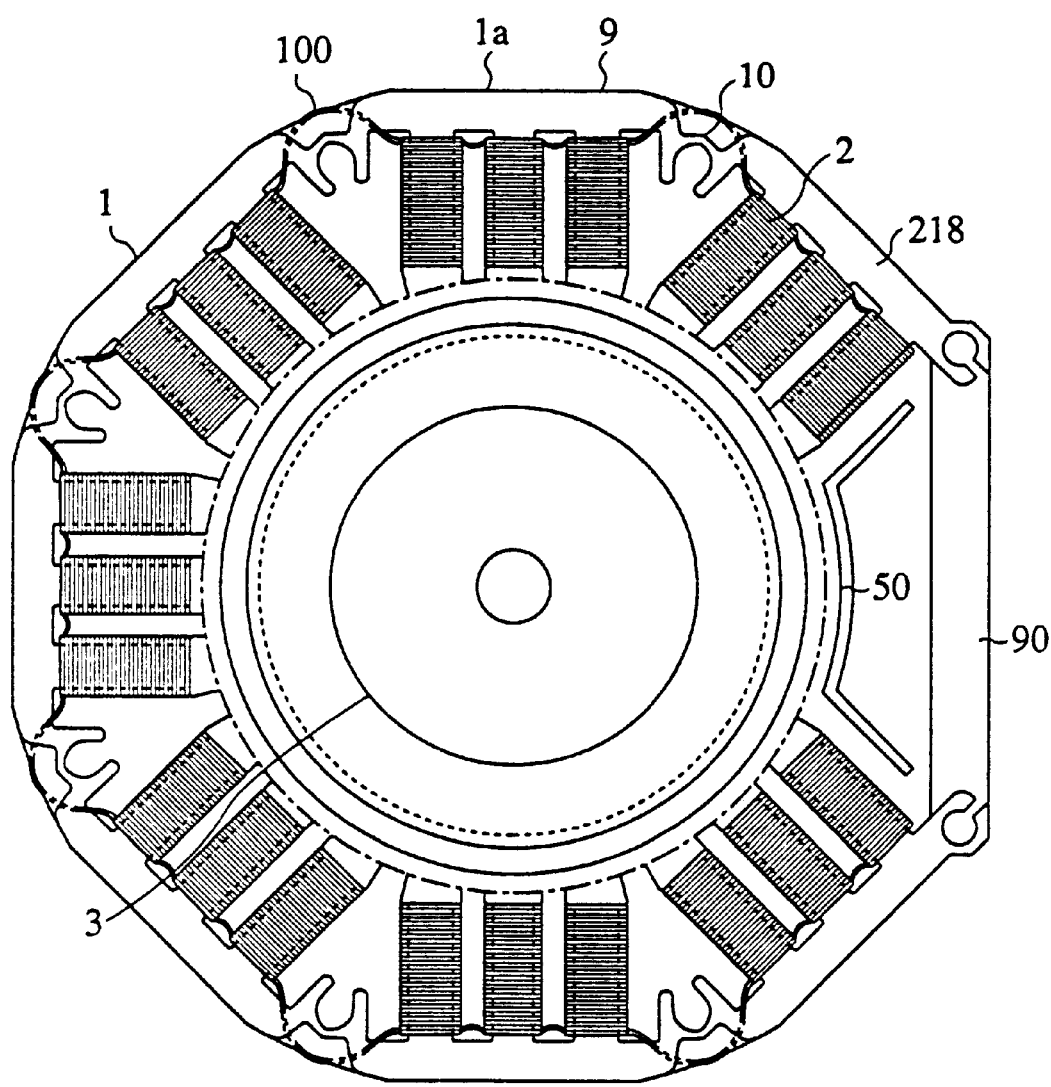
FIG. 46 is a plan view of the rotary motor according to the twentieth embodiment of the present invention.

Next, the rotary motor according to the twentieth embodiment of the present invention will be described with reference to FIGS. 45, 46. FIG. 45 is a perspective view of the major parts of the rotary motor and FIG. 46 is a plan view of the major parts of the rotary motor. The stator 1 in which the coils 2 are formed on the stacked stator core 1a is bent at the thin portions 10 to be formed to a predetermined shape. After this, the stator 1 is fixed onto the holding ring 90 which is of substantially ring shape and which is provided so as to overlap the back yoke portion 218. The stator 1 and the holding ring 90 constitute the stator portion 100 and the rotor 3 is disposed on the inner circumference of the stator portion 100. As a result, the stator 1 in which the blocks 9 are connected to each other by means of the thin portions 10 can be supported stably at high precision by means of the holding ring 90.

Because the blocked stator core 1a is fixed to the holding ring 90 according to the present invention, it is possible to hold the stator core 1a accurately, thereby facilitating the handling of the stator portion 100 including the holding ring 90.

Embodiment 21

Figure 47:
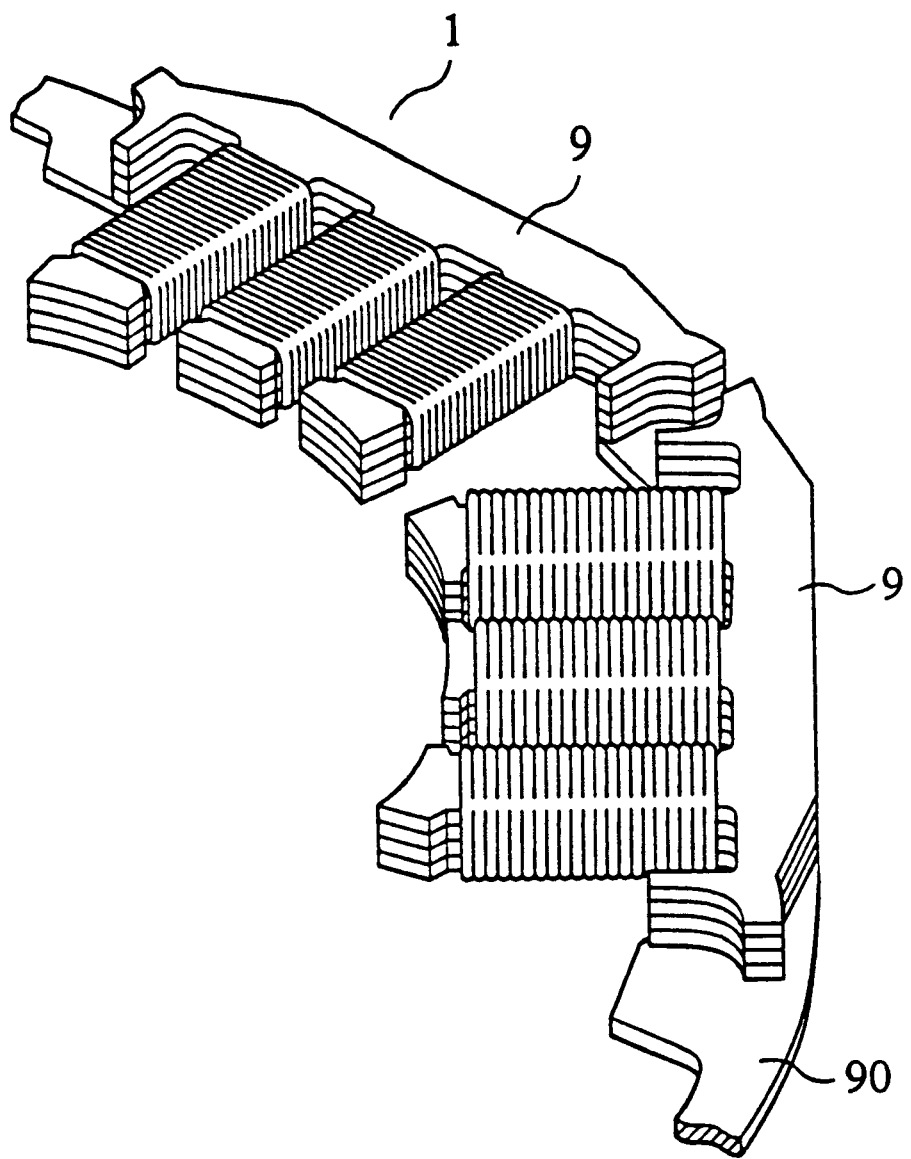
FIG. 47 is a partial perspective view of the stator according to the twenty first embodiment of the present invention.

Although the aforementioned embodiment presents such an example in which the stator 1 is composed of respective blocks which are connected to each other by means of the thin portions 10, it is permissible to have such a construction in which respective divided blocks 9 are mounted on the holding ring 90 shown in FIG. 47, thereby achieving the same effect as in the aforementioned embodiment.

Embodiment 22

Figure 48:
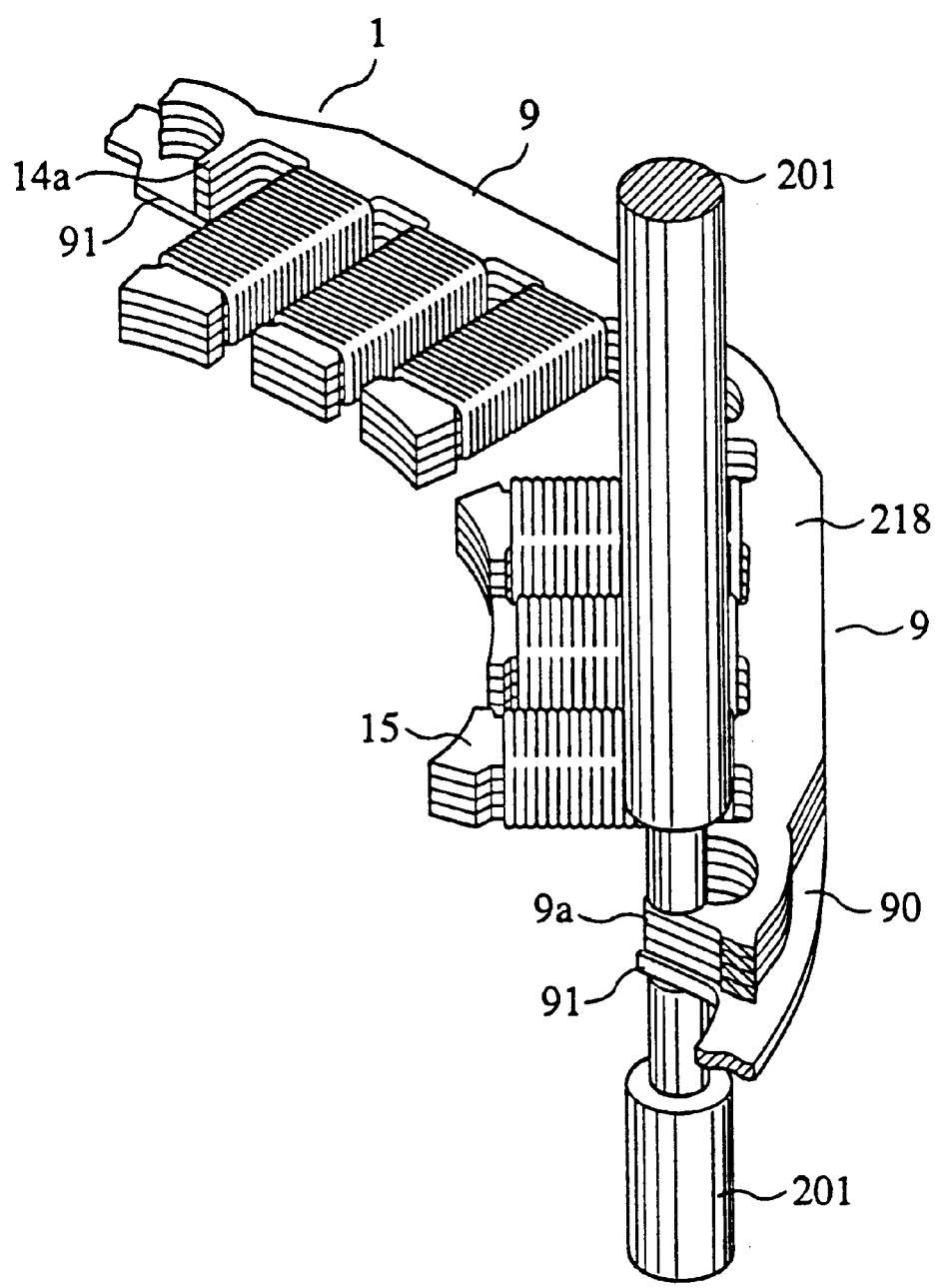
FIG. 48 is a perspective view showing the stator according to the twenty second embodiment of the present invention and the fixing means for the holding ring.

Next, the rotary motor according to the twenty second embodiment will be described with reference to FIGS. 46, 48. FIG. 48 is a partial perspective view of the rotary motor shown in FIG. 46 for explaining the stator 1 and the holding ring 90 which is a fixing means. Reference numeral 201 designates an electrode of a spot welding machine. The spot welding machine 201 holds welding portions 9a provided on both ends of the block 9 and welding portion 91 of the holding ring 90 between the two members of the spot welding machine 201, and welds the welding portion 9a to the welding portion 91 in order to fix the stator 1 to the holding ring 90. The reason why the welding portion 9a is provided not in the center of the block 9 but on the ends of the block 9 is to prevent the magnetic characteristic of the center portion of the block 9 which is composed of the magnetic pole teeth 15 and the back yoke portion 218, the block forming a magnetic path, from being deteriorated by welding heat. Consequently, it is possible to fix the stator 1 to the holding ring 90 by spot welding the stator 1 to the holding ring 90.

Embodiment 23

Figure 49:
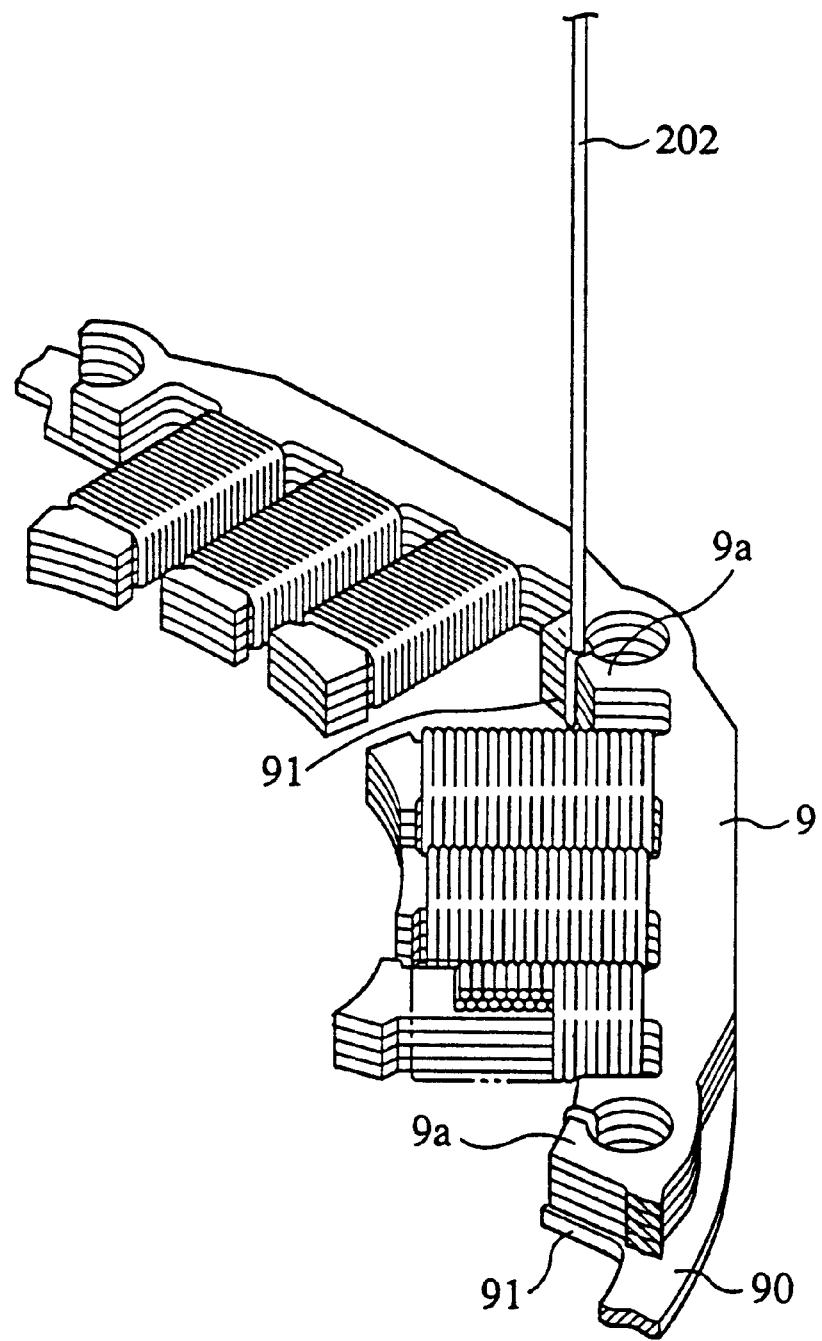
FIG. 49 is a perspective view of the stator according to the twenty third embodiment of the present invention and the fixing means for the holding ring.

Although the spot welding machine is used as a means for fixing the stator 1 to the holding ring 90 in the aforementioned embodiment, it is possible to weld the welding portions 9a provided on both ends of the block 9 of the stator 1 to the welding portion 91 of the holding ring 90 by means of YAG laser 202 as shown in FIG. 49. YAG laser is capable of welding more accurately than the spot welding because the stator 1 is not pressed by the electrode 201. Additionally, because YAG laser is capable of narrowing the range which is heated by welding although the range differs slightly depending on welding condition, magnetic deterioration of the block 9 is lower than when in spot welding.

According to the twenty-second and the twenty-third embodiments, the holding ring 90 is magnetic material and the stator core 1a is welded to the holding ring 90 by spot welding or laser beam. Thus, it is possible to fix the stator core 1a to the holding ring 90.

Embodiment 24

Figure 50:
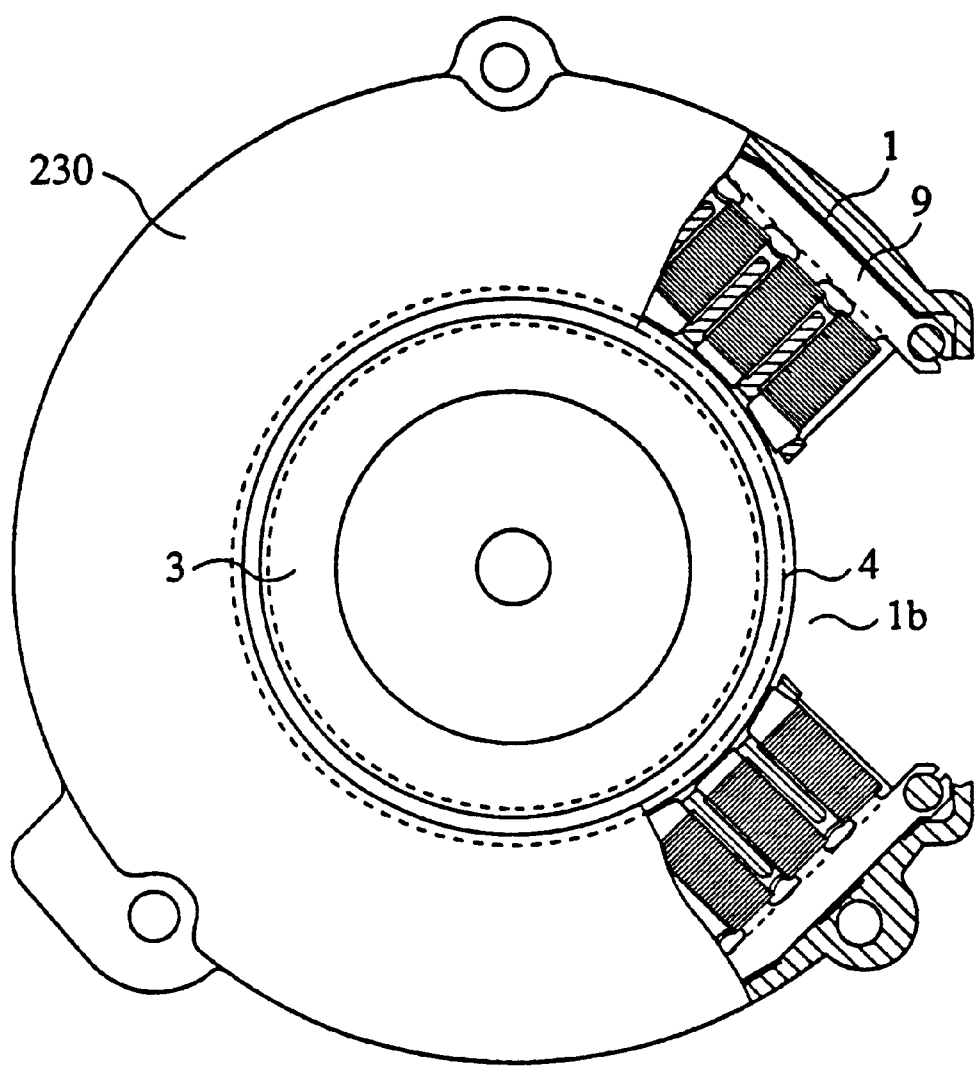
FIG. 50 is a partially cutaway plan view of the rotary motor for explaining the deflection of the rotation in the twenty fourth embodiment of the present invention.
Figure 51:
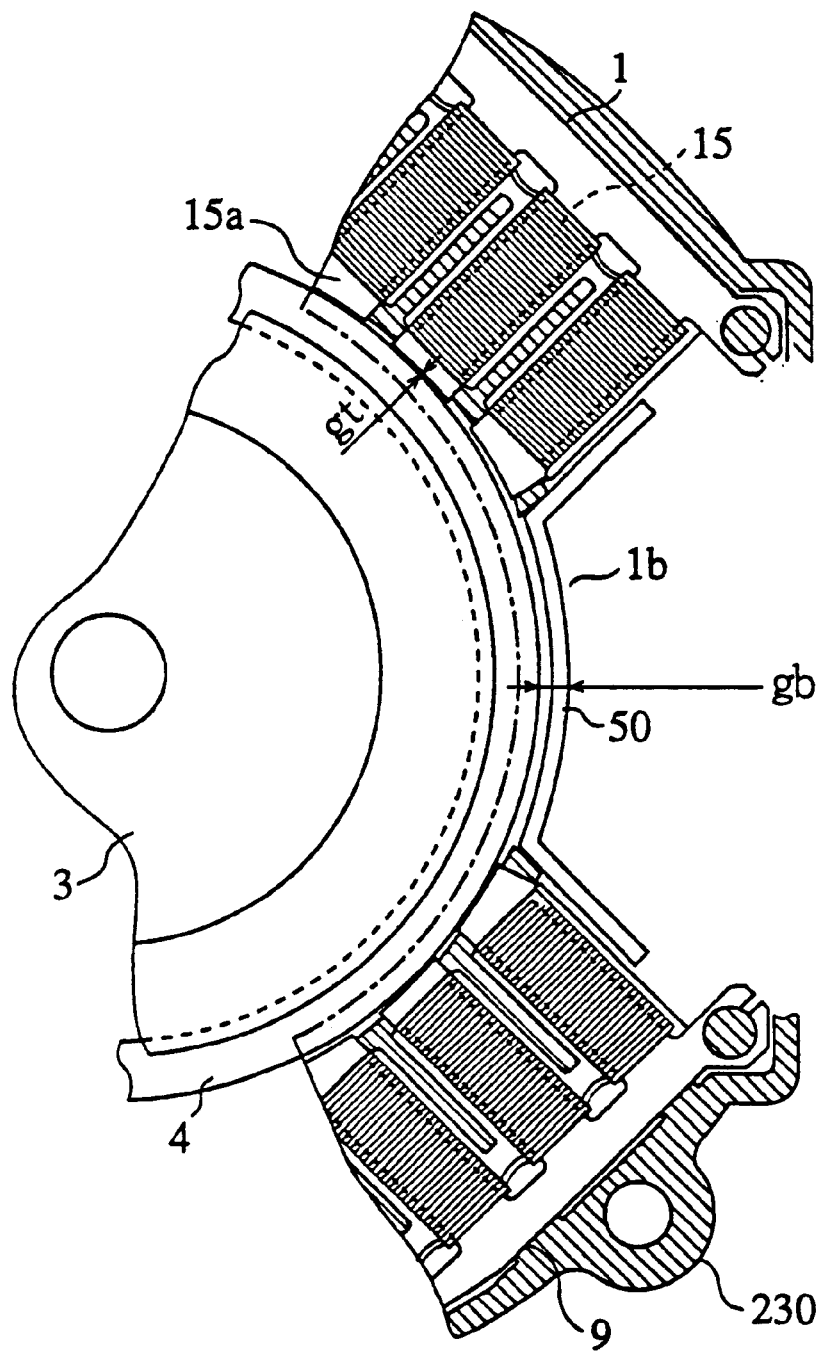
FIG. 51 is a partially cutaway plan view of the rotary motor according to the twenty fourth embodiment of the present invention.

The rotary motor according to the twenty fourth embodiment will be described with reference to FIGS. 26, 42, 46, 50, 51 and 52. The magnetic balancer 50 shown in FIGS. 26, 42, 46 is disposed in the portion in which no block 9 of the stator 1 is provided. The magnetic balance 50 is a magnetic field stabilizing member presenting a substantially arc shape concentric with the rotor 3. The portion in which no block 9 is provided is disposed as a space in which the head of a recording/reproducing apparatus moves. The operation of the magnetic balancer 50 will be explained according to FIGS. 50, 51. If the stator 1 has the portion 1b in which no block 9 is provided as shown in FIG. 50, magnetic field formed by the rotor magnet 4 of the rotor 3 and the stator 1 is uncontinuous at the portion 1b, so that ripples occur in the rotation of the rotor 3. Thus, the magnetic balancer 50 of substantially arc shape is disposed in the portion 1b as shown in FIG. 51 to make magnetic field continuous, thereby reducing the ripples.

Figure 52:
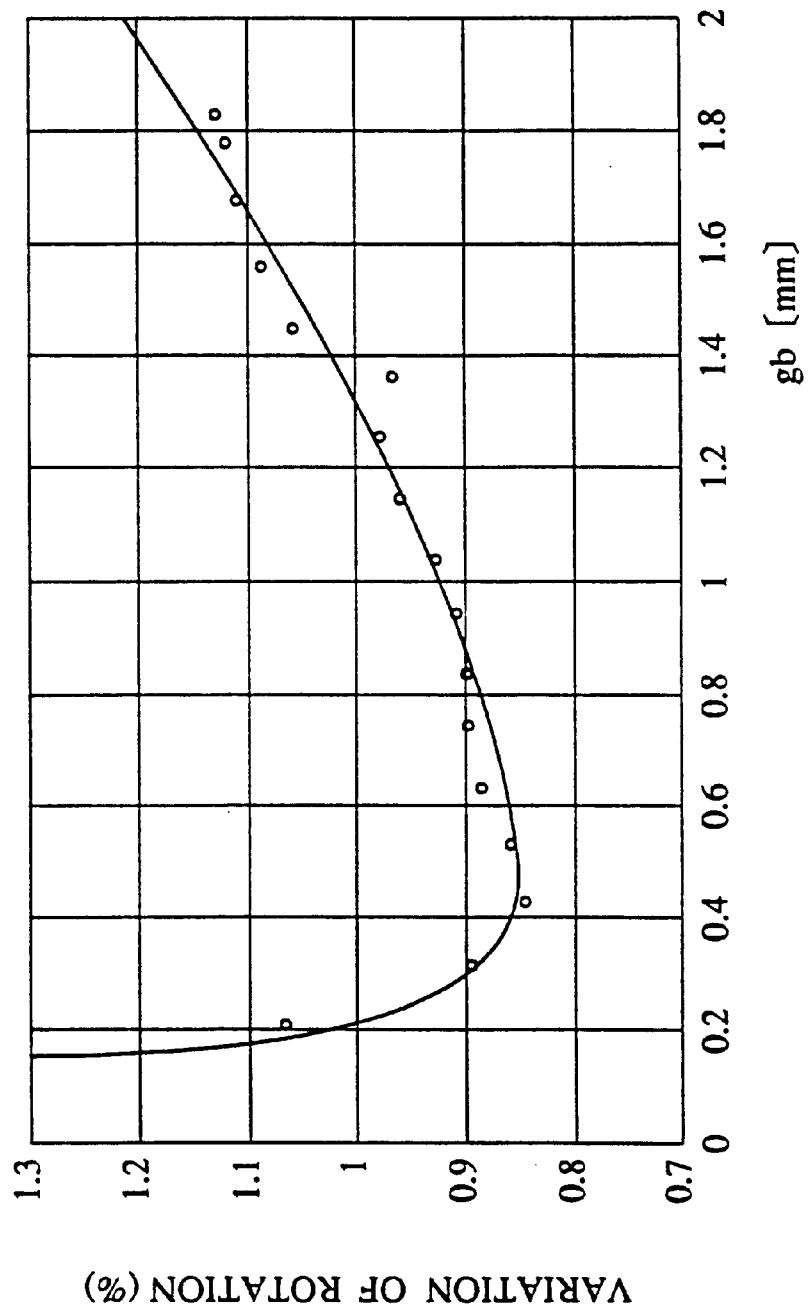
FIG. 52 is an explanatory diagram for showing the relationship between the gap gb between the magnetic balancer and the rotor magnet in the twenty fourth embodiment, and the deflection of the rotation.

FIG. 52 shows the measurement result of the effect of the magnetic balancer 50. For this measurement, the rotor 3 having the outer diameter D of about 35 mm is used and the gap gt between the tip 15a of the magnetic pole teeth 15 of the stator 1 and the rotor magnet 4 of the rotor 3 is 0.25 mm. FIG. 52 shows the measurement result of the deflection of the rotation when the gap gb between the magnetic balancer 50 and the rotor magnet 4 is changed. Meanwhile, the deflection of the rotation when no magnetic balancer 50 is provided is about 1.3%. It is when gb is 0.55 mm which is about twice gt that the deflection of the rotation is minimized when the magnetic balancer 50 of substantially arc shape is used. The deflection of rotation increases if gb becomes smaller than gt. Thus, it is preferable to keep the relationship of gb≧gt. If there is no problem concerned with the space, it is preferable to keep the relationship of gb ≧2×gt. As described above, it is possible to minimize the deflection of the rotation by disposing the magnetic balancer 50 in the portion 1b.

According to the present embodiment, the portion 1b in which no block is disposed is provided in part of the stator core, and the magnetic balancer 50 made of substantially arc shaped magnetic material is provided so as to be almost concentric with the rotor 3, in the portion 1b. The relationship between the gap gb between the magnetic balancer 50 and the rotor 3 and the gt between the tip 15a of the electrode teeth and the rotor 3 is set to be gb≧gt, thereby reducing the deflection of the rotation due to the influence of the portion 1b.

Embodiment 25

Figure 53:
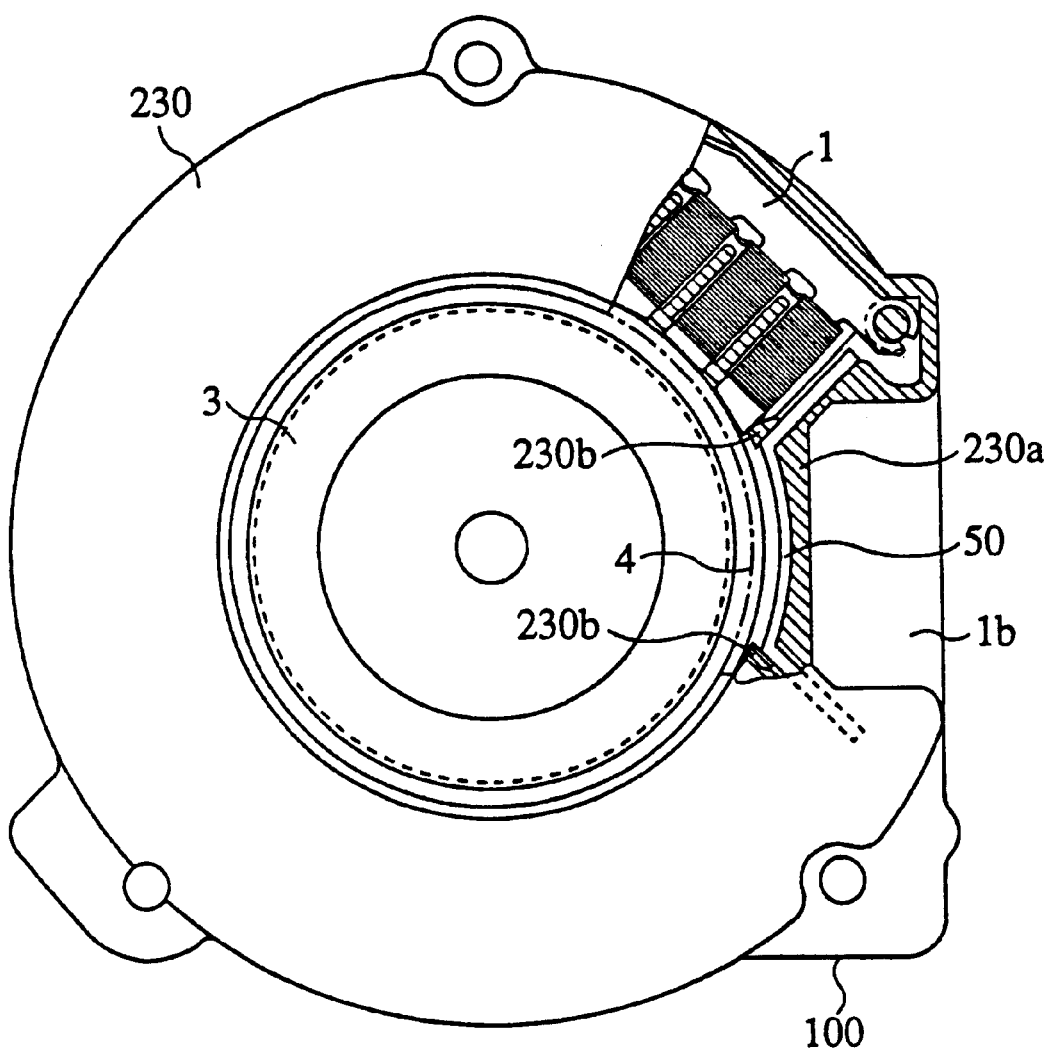
FIG. 53 is a partially cutaway plan view of the rotary motor according to the twenty fifth embodiment.

Then, the rotary motor according to the twenty fifth embodiment will be described with reference to FIG. 53. FIG. 53 is a plan view of the rotary motor in which part of the cover holder 230 is cut away. The magnetic balancer 50 disposed in the portion 1b of the stator 1 is fixed by adhesive to the balancer mounting portion 230a of the cover holder 230 so that the magnetic balancer 50 faces the rotor magnet 4 provided on the rotor 3. The cover holder 230 is provided with a balancer pressing portion 230b in order to prevent the magnetic balancer 50 from contacting the rotor magnet 4 even if the magnetic balancer 50 is peeled. This balancer pressing portion 230b is also a guide member for mounting the magnetic balancer 50 to the cover holder 230. The magnetic balancer 50 is mounted from downward of the cover holder 230, and the position thereof is determined by the balancer mounting portion 230a, the balancer pressing portion 230b and the top face of the cover holder. By providing the cover holder 230 with a mounting portion, it is possible to mount the magnetic balancer 50 easily. Further, by providing the cover holder 230 with the magnetic balancer 50, the magnetic balancer can be handled as part of the stator portion 100. Thus, the necessity of handling miscellaneous parts upon assembly of the rotary motor is eliminated thereby improving productivity and facilitating automation of the production.

Because the magnetic balancer 50 is fixed to the cover holder 230 according to the present embodiment, it is possible to handle the magnetic balancer 50 as part of the stator so that the other parts can be fixed and handled more easily. By providing the cover holder 230 with a magnetic balancer mounting portion, it is possible to fix the magnetic balancer to the stator portion easily.

Embodiment 26

Figure 54:
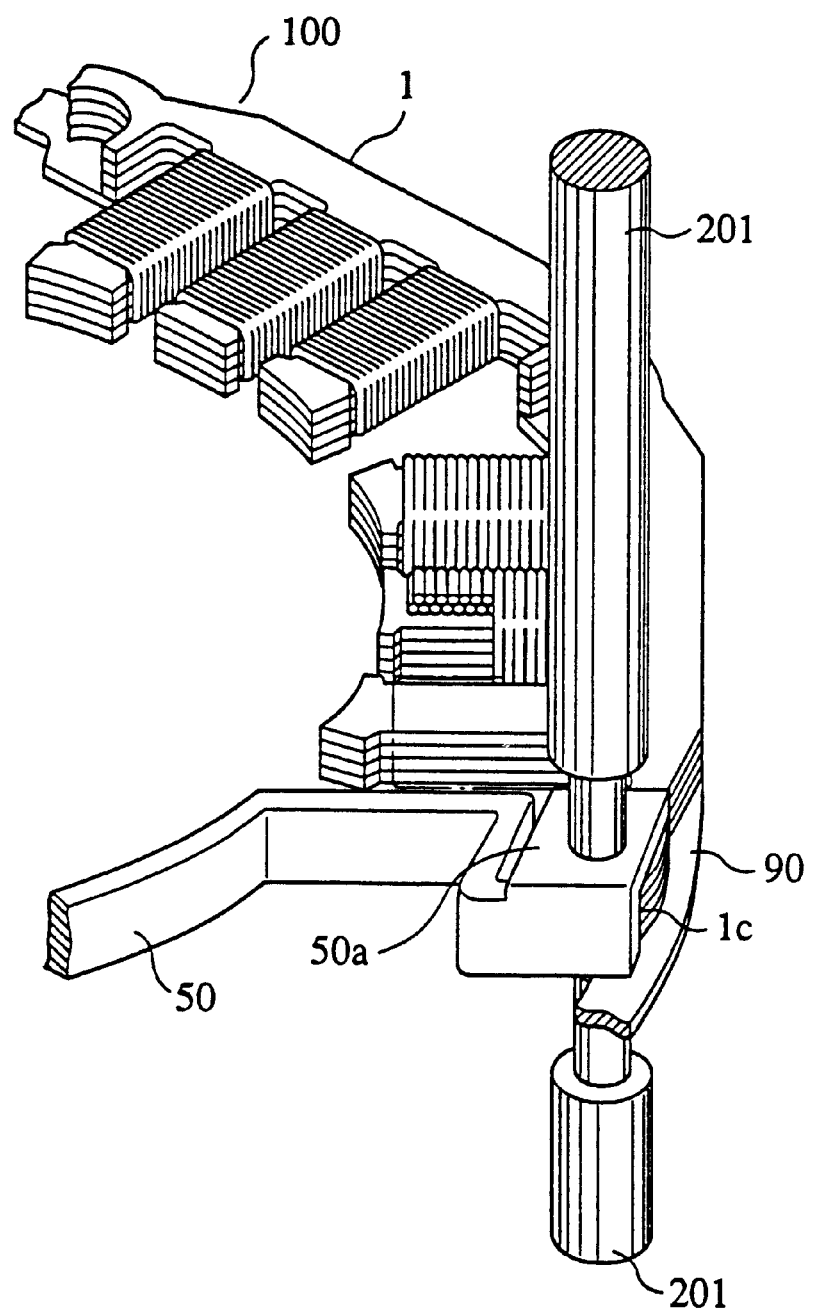
FIG. 54 is a perspective view showing the fixing means for the magnetic balancer and the stator according to the twenty sixth embodiment of the present invention.

The rotary motor according to the twenty sixth embodiment will be described with reference to FIG. 54. FIG. 54 is a partial perspective view of the mounting portion of the magnetic balancer 50. As shown in the same Figure, the balancer holding portions 1c are provided on both ends of the stator 1 fixed to the holding ring 90. By spot welding the welding portion 50a of the magnetic balancer 50 to the balancer holding portion 1c, it is possible to fix the magnetic balancer 50 to the stator 1 easily. Reference numeral 201 designates the electrode of the spot welding machine. Meanwhile, it is possible to spot weld the stator 1, the holding ring 90 and the magnetic balancer 50 simultaneously.

Embodiment 27

Figure 55:
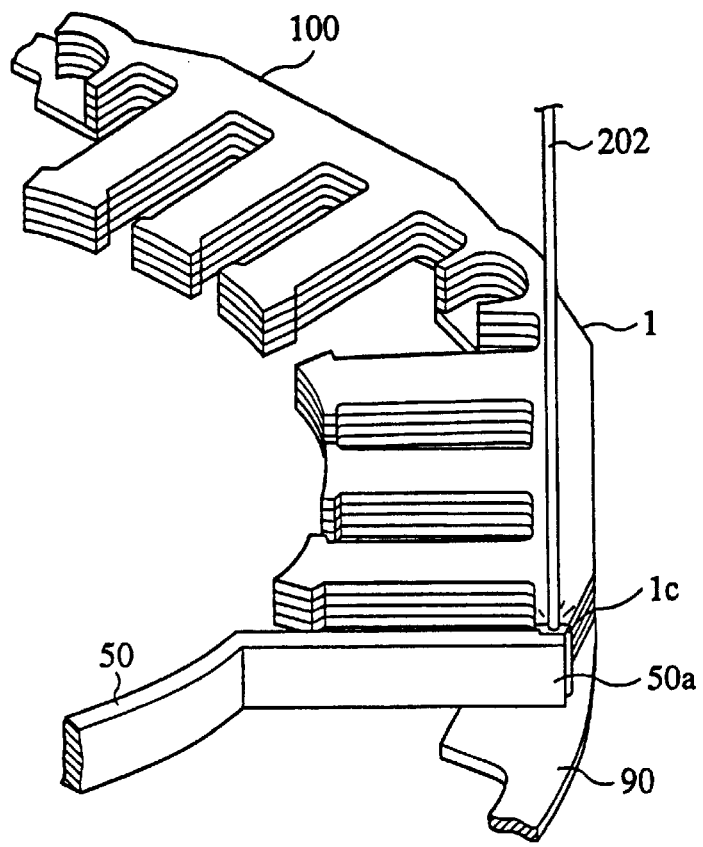
FIG. 55 is a perspective view showing the magnetic balancer and the stator according to the twenty seventh embodiment of the present invention.

Although spot welding is used as a means for fixing the magnetic balancer 50 to the stator 1 in the aforementioned embodiment, it is possible to weld the welding portion 50*a* of the magnetic balancer 50 to the balancer holding portion 1*c* by means of YAG laser 202 shown in FIG. 55.

According to the twenty-sixth and the twenty-seventh embodiments, the magnetic balancer 50 is welded to the stator core by spot welding or laser beam. Thus, it is possible to fix the magnetic balancer 50 to the stator portion easily.

Embodiment 28

Figure 56:
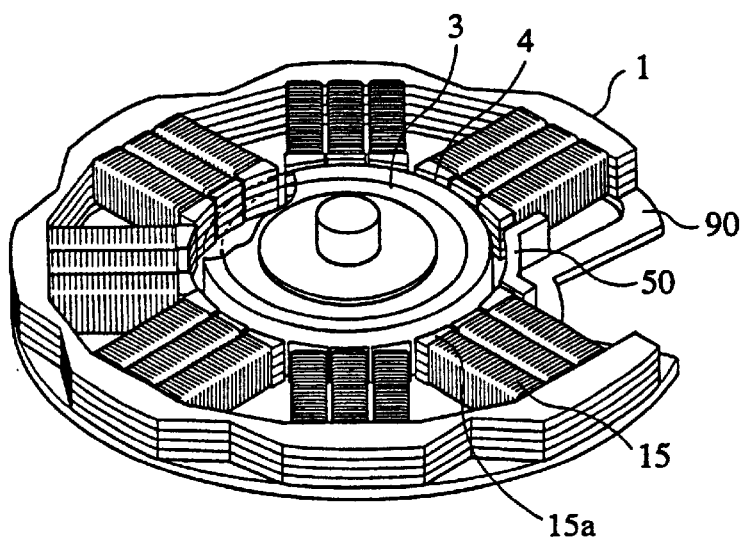
FIG. 56 is a perspective view of the major parts of the rotary motor according to the twenty eighth embodiment of the present invention.

The rotary motor according to the twenty eighth embodiment will be described with reference to FIG. 56. FIG. 56 is a perspective view of the major parts of the rotary motor. In this motor, the magnetic balancer 50 is integratedly mounted on the holding ring 90 for holding the stator 1. As a result, it is possible to provide the magnetic balancer 50 without increasing the number of parts. In the present embodiment also, it is preferable that the relationship between the gap gt between the rotor magnet 4 and the tip 15*a* of the magnetic pole teeth 15 and the gap gb between the rotor magnet 4 and the magnetic balancer 50 is gb≧gt as in the twenty fourth embodiment.

According to the present embodiment, when the portion 1*b* in which no block is provided is disposed in part of the stator core, the magnetic balancer 50 made of magnetic material having a substantially fan shape concentric with the rotor 3 is provided in the portion 1*b* integratedly with the holding ring 90. Then, by maintaining the relationship between the gap gb between the magnetic balancer 50 and the rotor portion and the gap gt between the tip 15*a* of the magnetic pole teeth and the rotor portion 3 so as to be gb≧gt, it is possible to suppress the deflection of the rotation due to the influence of the portion 1*b*. Additionally, it is possible to provide the magnetic balancer easily without increasing the number of parts.

Embodiment 29

Figure 57:
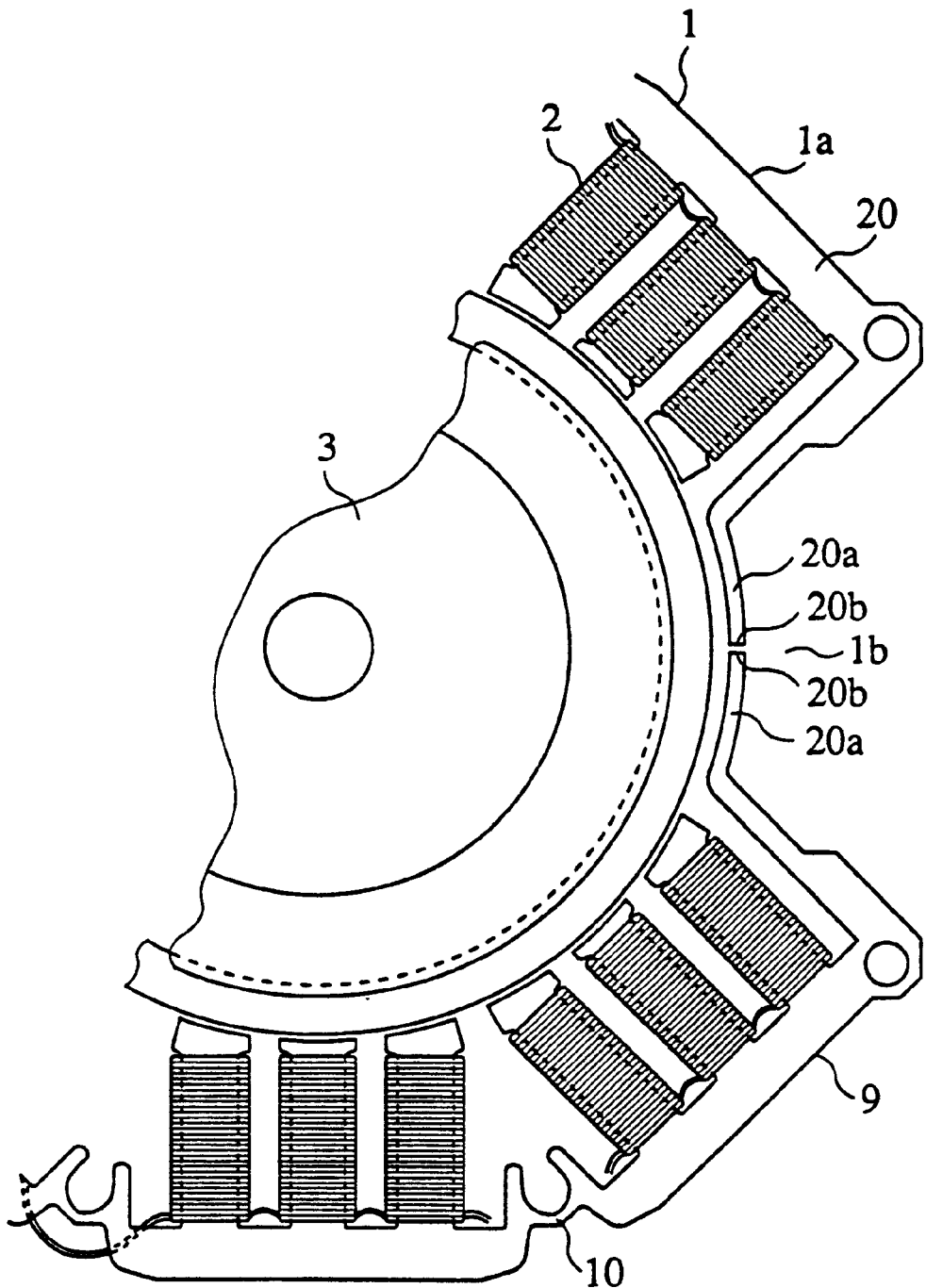
FIG. 57 is a plan view of the major parts of the rotary motor according to the twenty ninth embodiment of the present invention.

Next, the rotary motor according to the twenty ninth embodiment will be described with reference to FIG. 57. Reference numeral 20*a* designates a magnetic balancer portion concentric with the rotor 3, the magnetic balancer portion extending from both ends of the stator core 20 provided on the portion 1*b* of the stator 1. The magnetic balancer portions 20*a* are constructed so that they abut each other at the abutment portion 20*b* in the center thereof as shown in FIG. 57. As described in the sixteenth embodiment, for example, the stator cores 20 are obtained by punching magnetic material linearly by means of press and stacked. After the coils 2 are formed on the laminated stator core 1*a*, the thin portions 10 of each block 9 are bent to obtain the configuration shown in FIG. 57. As described above, according to the present embodiment, it is possible to provide the stator core with the magnetic balancer portion 20*a* as part of the stator core, while maintaining ease of winding when the coil 2 is formed.

According to the present embodiment, when the portion 1*b* in which no block is provided is disposed in part of the stator core, as the magnetic balancer 50 extending from both ends of the portion 1*b* of the stator core 20 is provided, minimizing deflection of the rotation due to the influence of the portion 1*b* in which no block is achieved.

Figure 58:
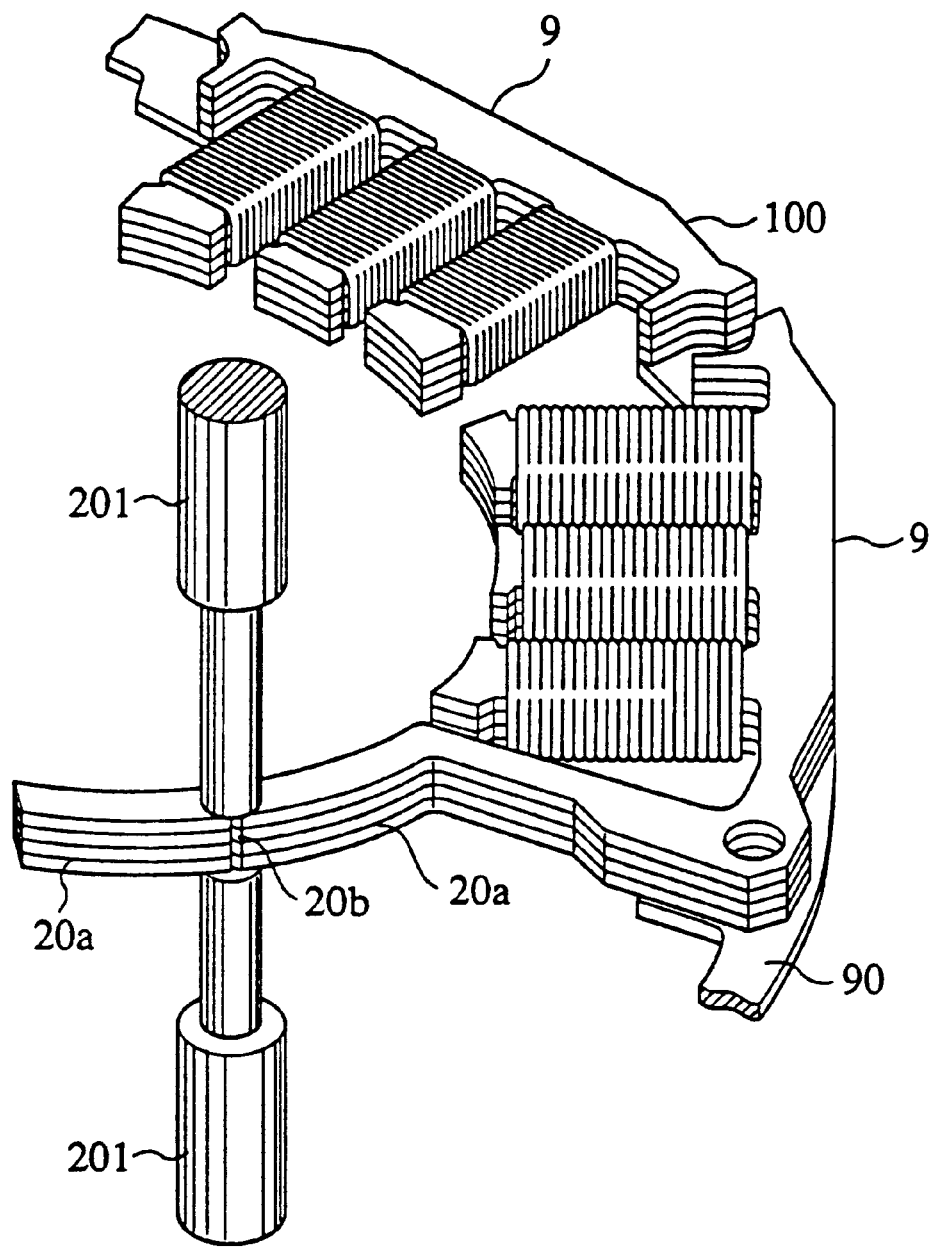
FIG. 58 is a perspective view showing the jointing means for the magnetic balancer according to the twenty ninth embodiment of the present invention.

Then, jointing of the magnetic balancer portions 20*a* will be described with reference to FIG. 58. Although, in the same Figure, respective blocks 9 are not connected by means of the thin portions 10 but fixed to the holding ring 90, the method for jointing the magnetic balancer portions 20*a* is the same as in the case in which the respective blocks 9 are connected by means of the thin portions 10. When the magnetic balancer portions 20*a* are jointed with each other, first, the magnetic balancer portions 20*a* are brought into contact with each other and then, the abutment portion 20*b* is held between the electrodes 201 of the spot welding machine and welded together. Consequently, according to the present embodiment, it is possible to weld the magnetic balancer portions 20*a* easily and further improve the strength of the stator portion 100 by welding.

Embodiment 30

Figure 59:
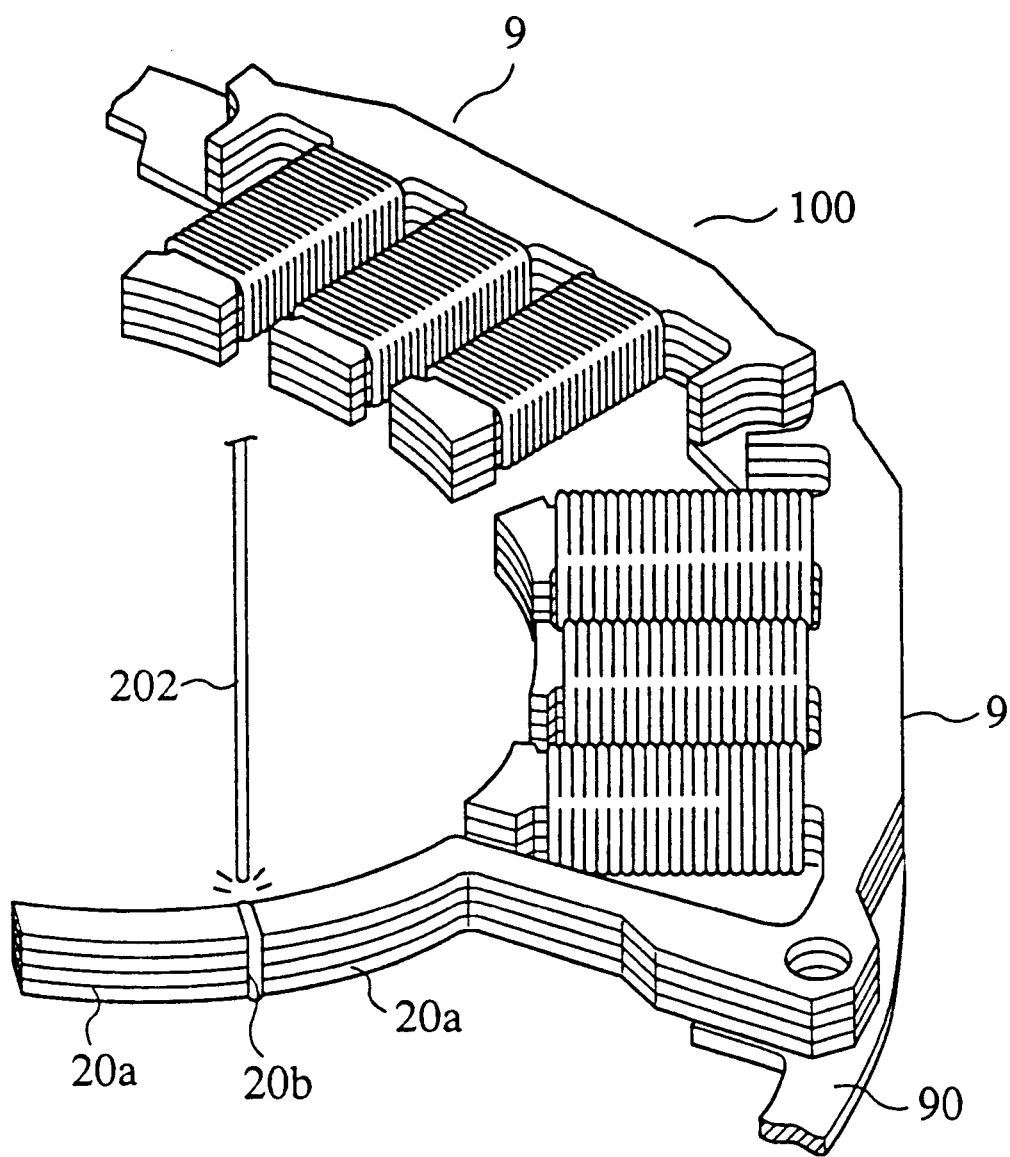
FIG. 59 is a perspective view showing the jointing means for the magnetic balancer according to the thirtieth embodiment of the present invention.

Although the aforementioned embodiment indicates the case in which spot welding is used for jointing together the magnetic balancer portions 20*a*, it is possible to weld the abutment portion 20*b* of the magnetic balancer portion 20*a* by means of YAG laser 202 as shown in FIG. 59.

Embodiment 31

Figure 60:
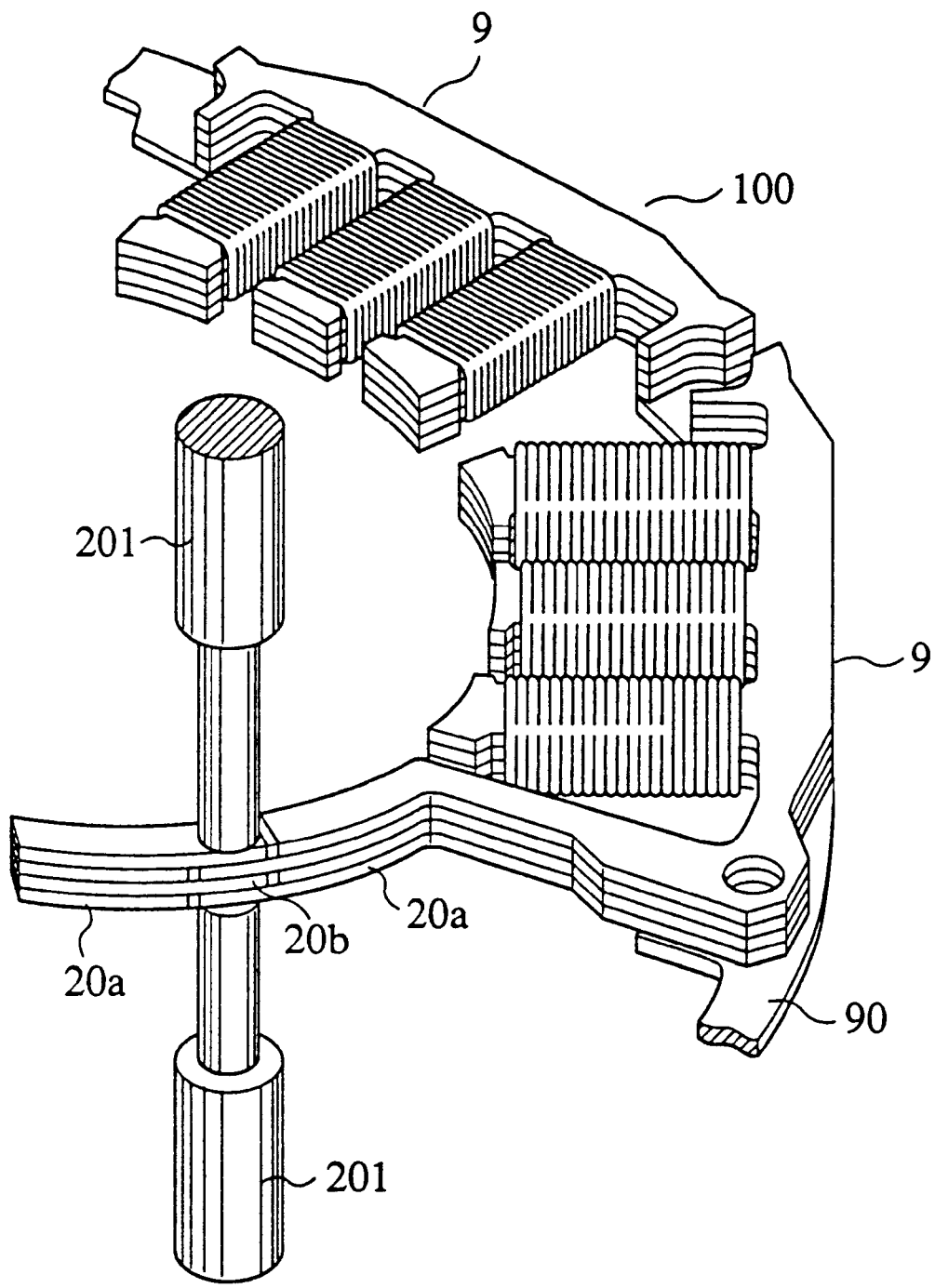
FIG. 60 is a perspective view showing the configuration of and the jointing means for the magnetic balancer according to the thirty first embodiment of the present invention.

Although the abutment portions 20*b* of the magnetic balancer 20*a* having flat end faces are shown in the twenty ninth and thirtieth embodiments, it is possible to increase the strength of jointing by overlapping the respective abutment portions alternately as shown in FIG. 60.

Embodiment 32

Figure 61:
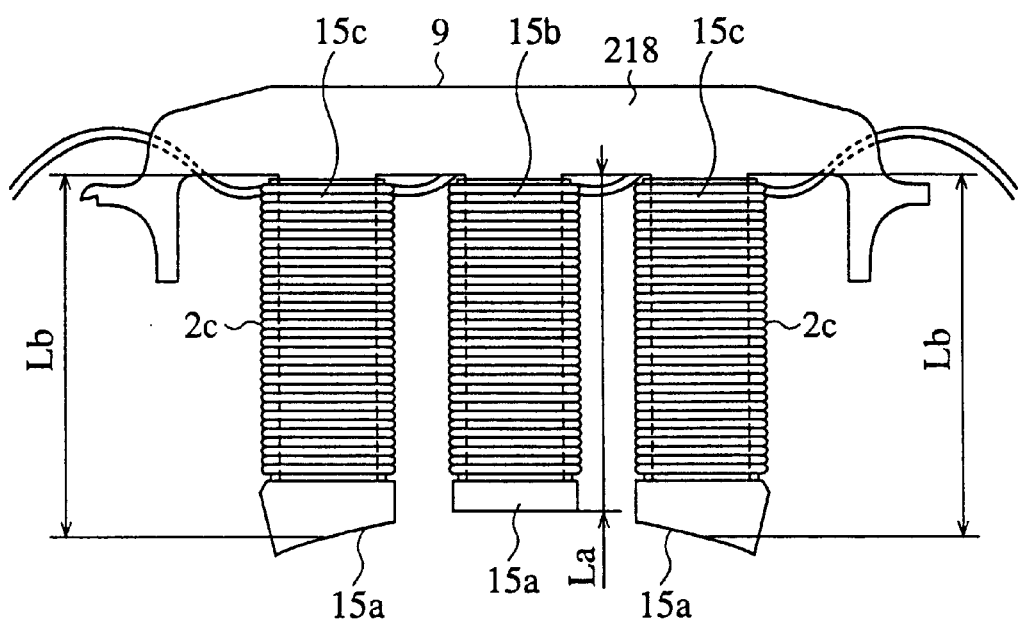
FIG. 61 is an enlarged view of the stator for explaining magnetic resistance or the like in the thirty second embodiment of the present invention.
Figure 62:
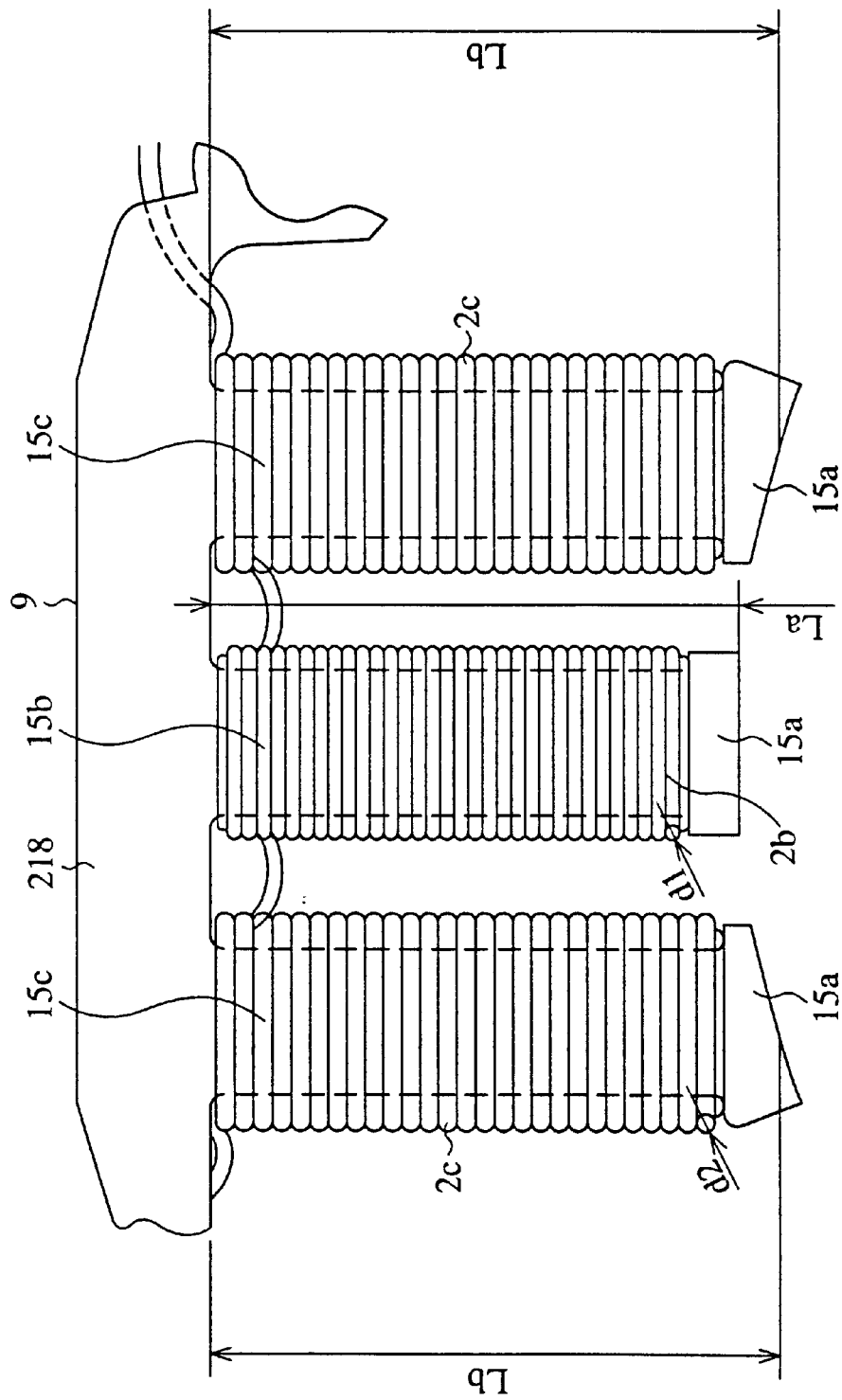
FIG. 62 is an enlarged view of the block of the stator according to the thirty second embodiment of the present invention.

Next, the rotary motor according to the thirty second embodiment will be described with reference to FIGS. 61 and 62. FIG. 61 is an enlarged view of the block 9 of the stator 1 used in the rotary motor according to the twelfth embodiment. When respective teeth 15*b*, 15*c* are provided so that they are substantially parallel to each other as shown in FIG. 61, the lengths Lb, La of the magnetic pole teeth 15*b*, 15*c* from the tip 15*a* to the back yoke portion 218 has the relationship of Lb>La. Thus, the magnetic resistances of the magnetic paths formed in the magnetic pole teeth 15*b*, 15*c* are different from each other.

To verify this phenomenon, the rotor 3 is rotated by external force and voltages induced in respective coils 2*b*, 2*c* were measured. Assuming that the induced voltages of the coil 2*b*, 2*c* are Vb, Vc, respectively, the relationship of Vb>Vc is obtained. As a result of measurement under the same condition as in the twenty fourth embodiment, Vc/Vb became about 0.98. It is well known that the induced voltage is proportional to driving force (accurately speaking, torque constant). Thus, torques generated in the respective magnetic pole teeth 15*b*, 15*c* differ from each other. The difference of torque results in torque ripples.

Then, the relationship between the winding number Nc of the coil 2*c* and the winding number Nb of the coil 2*b* is set so as to be Nc>Nb and d2>d1 is determined so that the resistances of respective coils 2*b*, 2*c* are not different, where the diameter of the coil 2*b* is d1 and the diameter of the coil 2*c* is d2. As a result, it is possible to equalize the torques generated in the respective magnetic pole teeth 15*b*, 15*c*, thereby realizing a rotary motor having small torque ripple.

According to the present embodiment, in respective block 9 of the blocked stator core, the number of winding of the coil 2 and the diameter of the coil are increased a the length of the magnetic pole teeth 15 in the longitudinal direction thereof (magnetic path direction) is increased. Consequently, it is possible to reduce the imbalance of magnetic field (rotating magnetic field) among respective magnetic pole teeth 15 of the block 9, thereby minimizing torque ripple.

Embodiment 33

Figure 63:
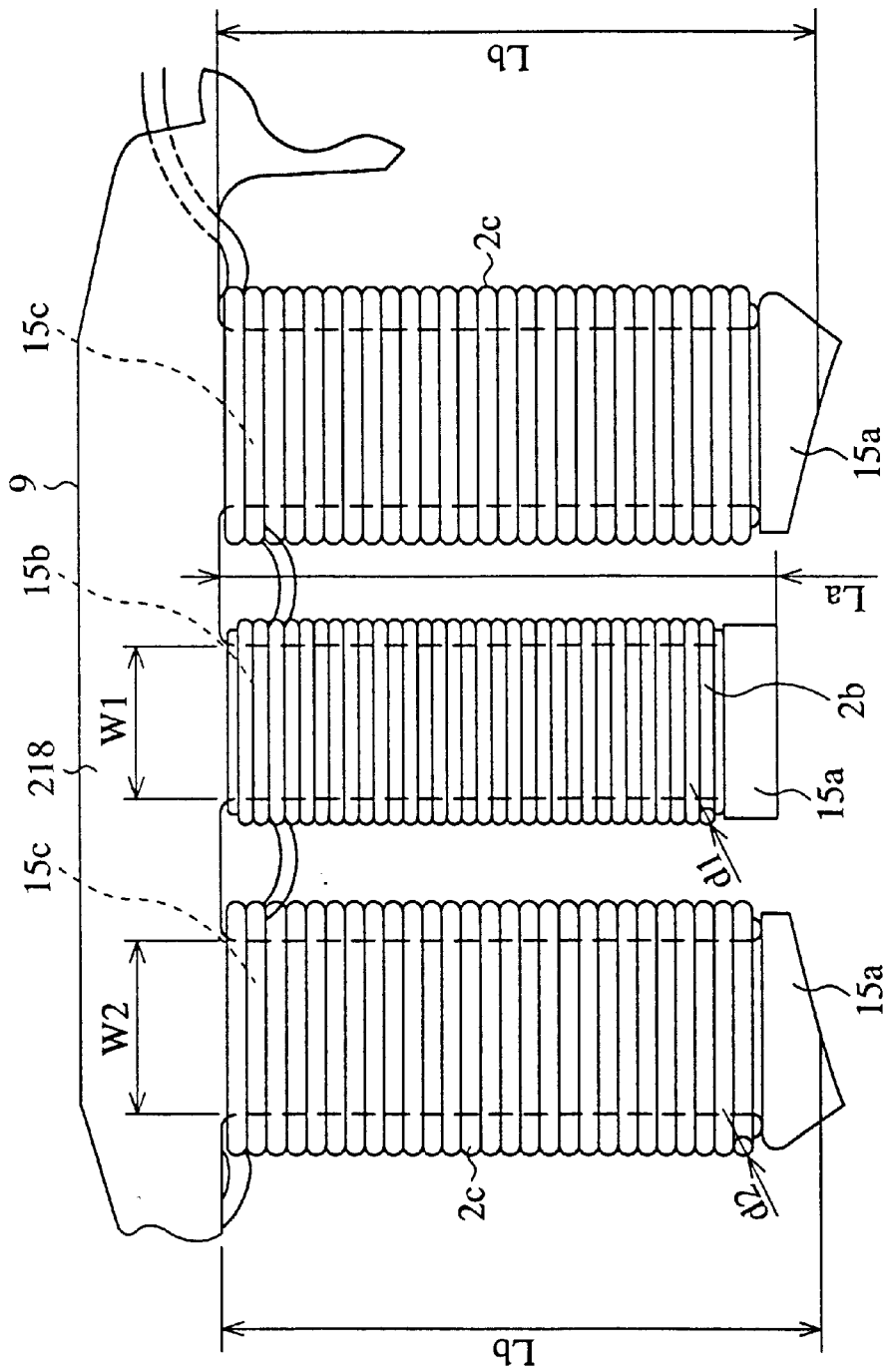
FIG. 63 is an enlarged view of the block of the stator according to the thirty third embodiment of the present invention.

Then, the rotary motor according to the thirty third embodiment will be described with reference to FIGS. 61, 62. In the aforementioned embodiment, the torque ripple caused from the difference between the lengths La, Lb of the magnetic pole teeth 15b, 15c was improved by providing the coils with different numbers of winding. In the present embodiment, if the width of the magnetic pole teeth 15b is w1 and the width of the magnetic pole teeth 15c is w2 as shown in FIG. 63, the relationship of w2>w1 is maintained and further d2>d1 is maintained not to make the resistances of the coils 15b, 15c different from each other, where the diameter of the coil 2b is d1 and the diameter of the coil 2c is d2. As a result, as in the aforementioned embodiment, it is possible to equalize the torque generated in the respective magnetic pole teeth 15b, 15c, thereby realizing a rotary motor having small torque ripple.

According to the present embodiment, in respective block 9 of a blocked stator core, the width of the magnetic pole teeth 15 and the diameter of the coil are increased as the length of the magnetic pole teeth 15 in the longitudinal direction (magnetic path direction) is increased. As a result, it is possible to reduce the imbalance of magnetic field (rotating magnetic field) generated among respective magnetic pole teeth 15, thereby minimizing torque ripple.

Embodiment 34

Figure 64:
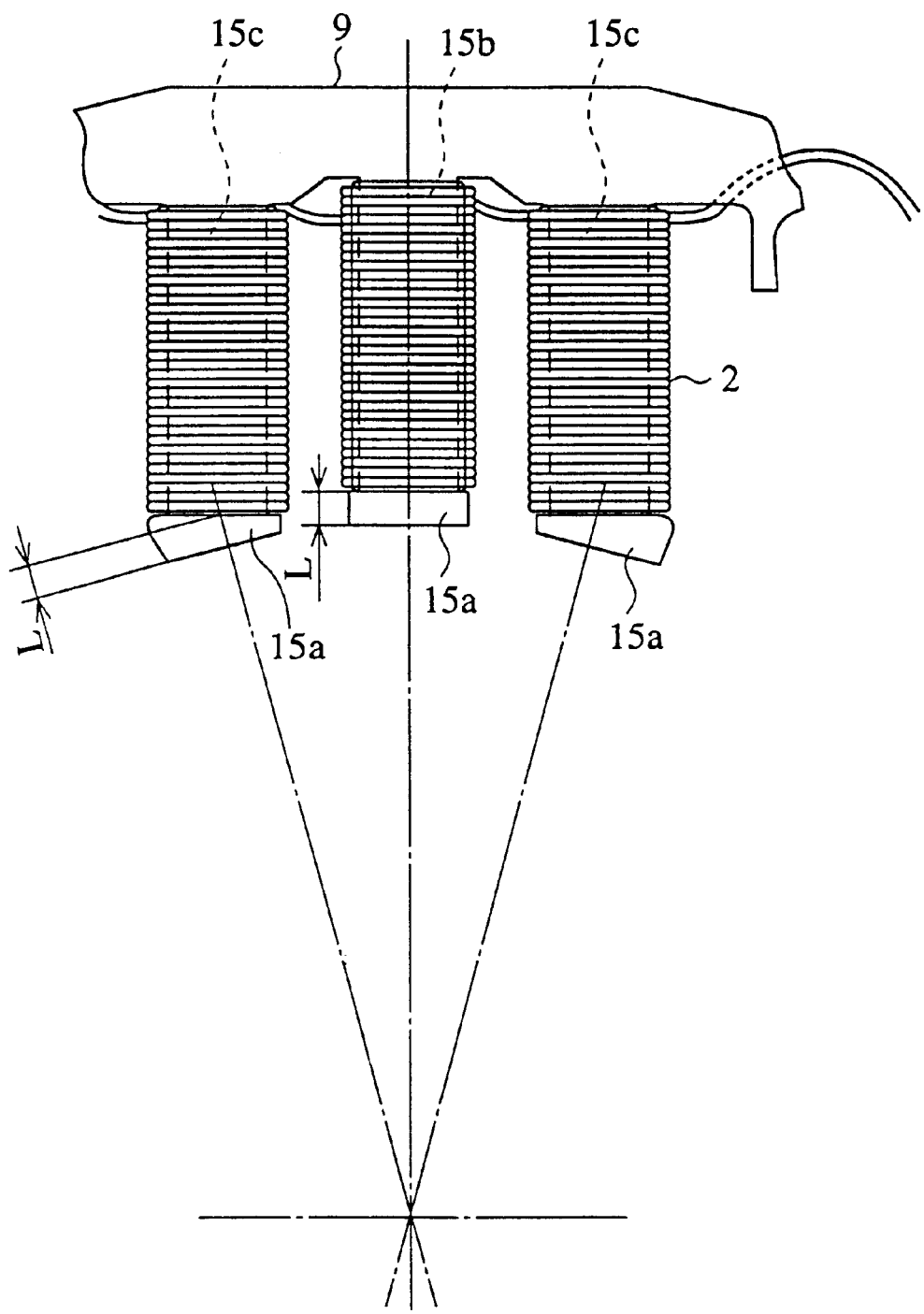
FIG. 64 is an enlarged view of the block of the stator according to the thirty fourth embodiment of the present invention.

The rotary motor according to the thirty fourth embodiment will be described with reference to FIG. 64. Although the specification of wire winding of the coil 2 has been modified to reduce torque ripple according to the thirty second embodiment and the thirty third embodiment, if the specification of the coil 2 differs between the magnetic pole teeth 15b and 15c, the efficiency of wire winding work drops.

However, it is possible to cope with torque ripple by setting the wire winding position on the respective coil 2, at a predetermined position (distance L from the tip 15a) from the tip 15a of the magnetic pole teeth 15b, 15c. In this case, the number of windings of respective coil 2 is the same and the diameter of the coil 2 is the same. According to the present embodiment, torque ripple can be reduced without making the specification of wire winding of the coil 2 different between the respective magnetic pole teeth 15b and 15c. Thus, the efficiency of wire winding work does not drop.

According to the present embodiment, the wire winding positions at the coils 2 are made different depending on the length of the magnetic pole teeth 15 (magnetic path direction) in the respective block 9 of the blocked stator core. As a result, it is possible to reduce the imbalance of magnetic field (rotating magnetic field) generated in the magnetic pole teeth 15 of the block 9, thereby reducers torque ripple.

Embodiment 35

Figure 31:
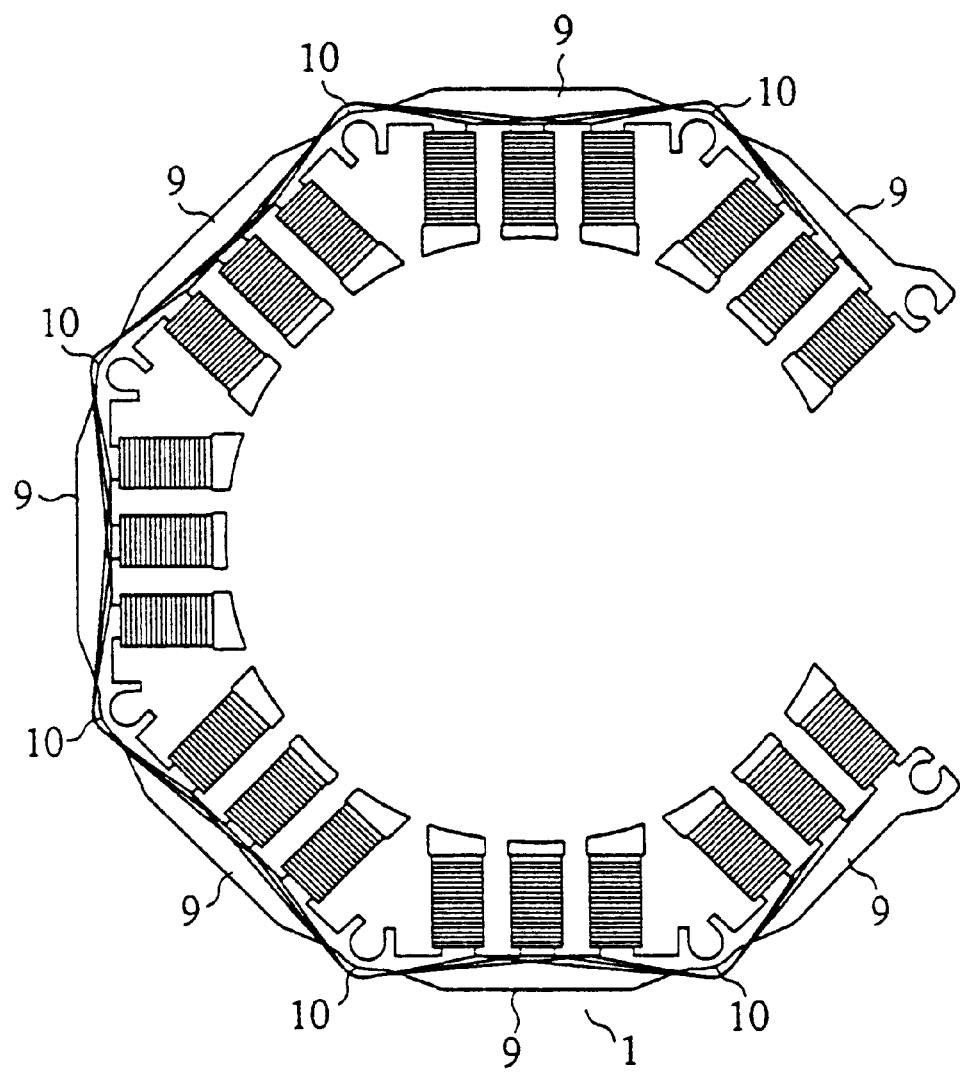
FIG. 31 is a plan view of the stator according to the twelfth embodiment of the present invention.
Figure 65:
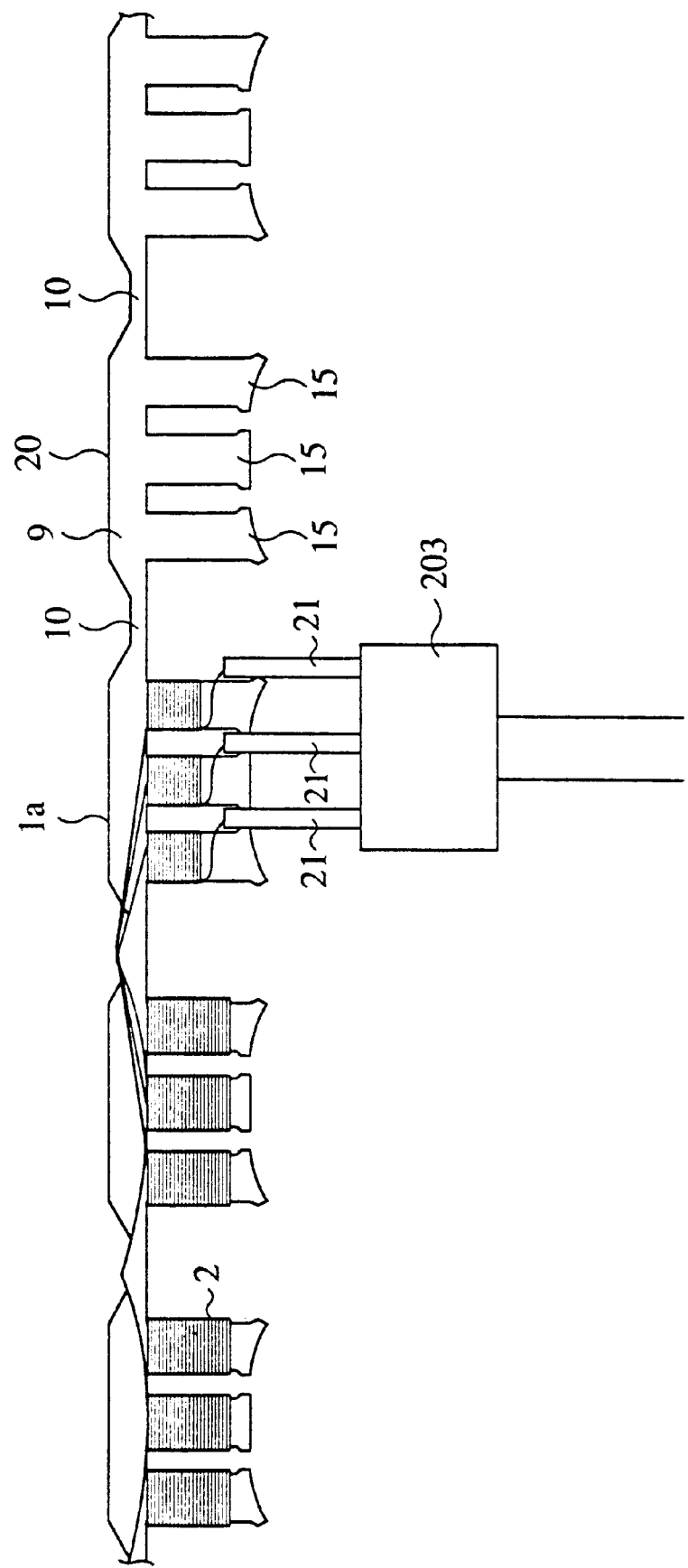
FIG. 65 is a plan view of the state in which the stator core according to the thirty fifth embodiment of the present invention is being coiled.

The rotary motor according to the thirty fifth embodiment will be described with reference to FIG. 65. FIG. 65 is a plan view showing the state in which the coil 2 is being formed on the laminated stator core 1a used in the twelfth, fourteenth, eighteenth, thirty second, thirty third and thirty fourth embodiments. By positioning the respective magnetic pole teeth 15 of the block 9 substantially parallel to each other as shown in FIG. 65, the nozzle 21 of the wire winding machine 203 is parallel to the magnetic pole teeth 15. Thus, it is possible to form the coil 2 on a plurality of the magnetic pole teeth 15 of the same block thereby improving the efficiency of wire winding. Meanwhile, by bending the thin portions 10 after the coils 2 are formed, as described in the twelfth embodiment, the laminated stator core 1a is formed as shown in FIG. 31.

According to the present embodiment, because the respective magnetic pole teeth 15 of the block 9 are substantially parallel to each other, the nozzles 21 of the wire winding machine are placed parallel to all the magnetic pole teeth 15 when the coils 2 are formed on the magnetic pole teeth 15. Thus, it is possible to simplify the construction of the wire winding machine. Additionally, by placing the same number of the nozzles of the wire winding machine as the number of the magnetic pole teeth of a single block 9 along the magnetic pole teeth, it is possible to form a plurality of the coils at the same time. Further, because the motion of the nozzles 21 when wire is being wound can be simplified, it is possible to improve the speed of wire winding and reduce the possibility of fault occurrence. Accordingly, these effects make it possible to improve the productivity of wire winding on the stator.

Embodiment 36

Figure 66:
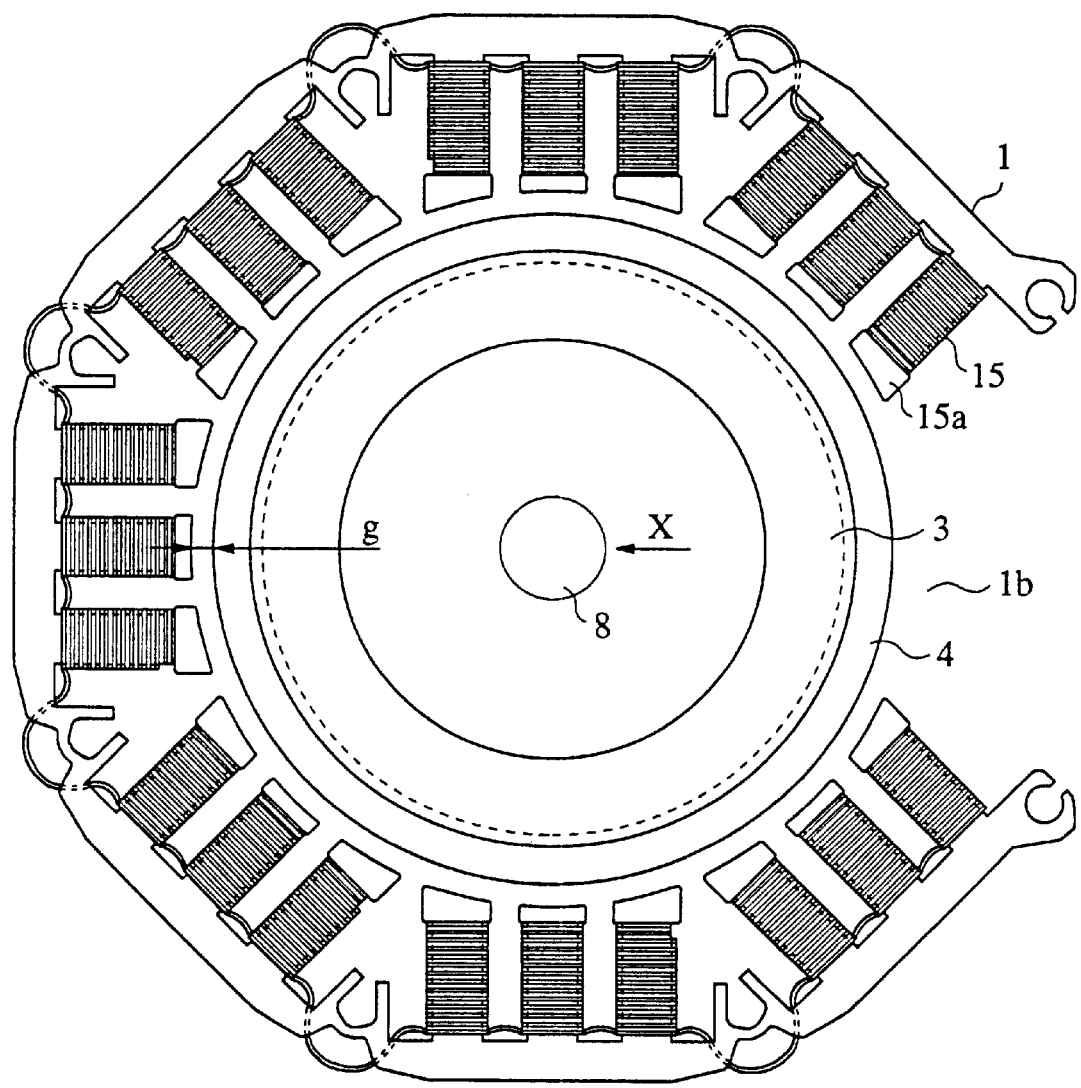
FIG. 66 is a plan view for explaining the unbalanced magnetic attraction in the thirty sixth embodiment of the present invention.
Figure 67:
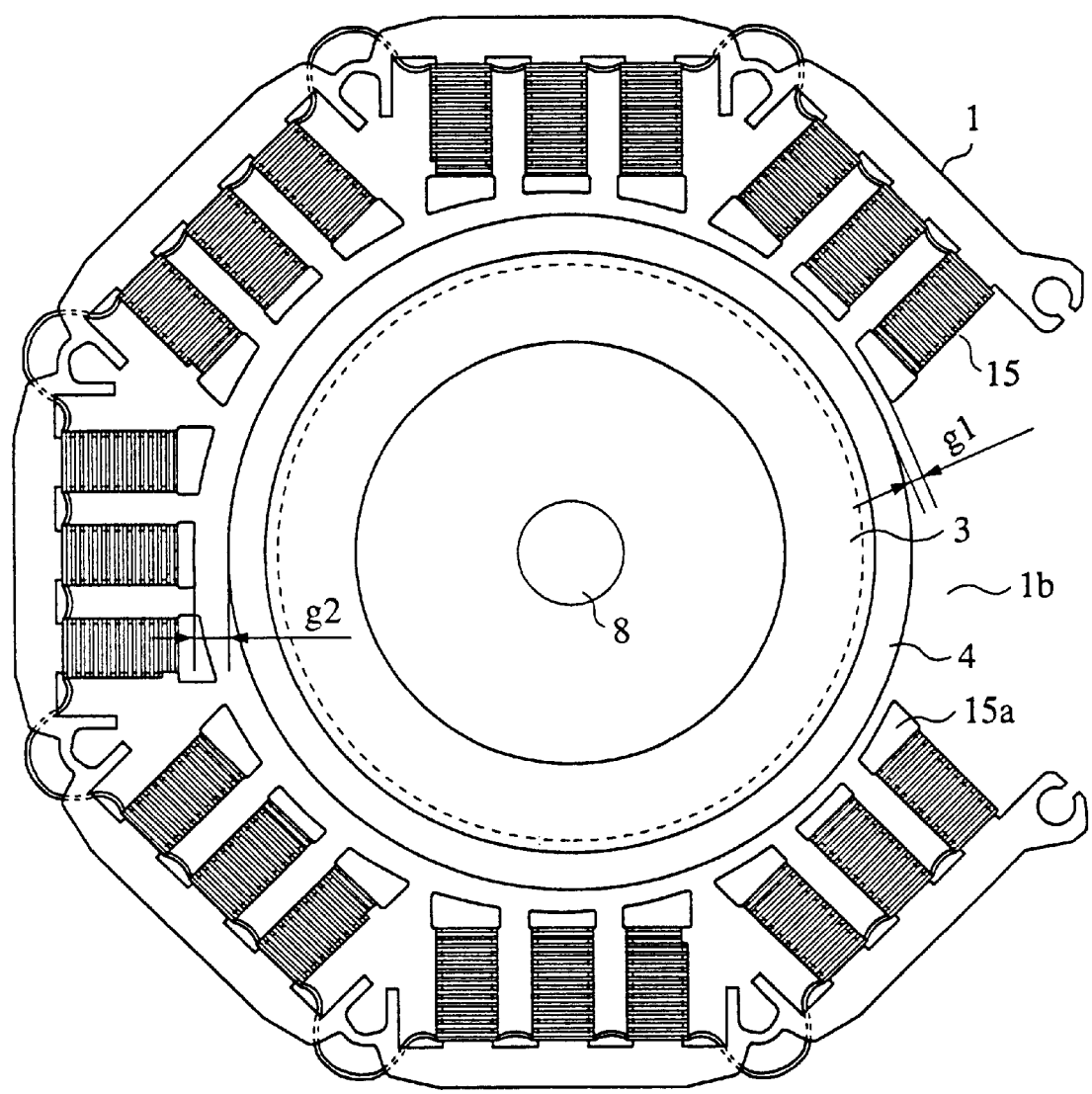
FIG. 67 is a plan view of the major parts of the rotary motor according to the thirty sixth embodiment of the present invention.

The rotary motor according to the thirty sixth embodiment will be described with reference to FIGS. 66, 67. FIGS. 66, 67 are plan views of the motor. Assuming the condition in which the portion 1b in which no block is provided is disposed in the stator 1 as shown in FIG. 66 and the gap g between the tip 15a of the magnetic pole teeth 15 and the rotor magnet 4 is constant, unbalanced magnetic attraction acts against the rotor 3 from the portion 1b in the direction toward the spindle shaft 8 (direction X indicated by the arrow). As a result, friction on the bearing including the spindle shaft 8 supporting the rotor 3 increases. Consequently, the torque loss of the rotary motor increases thereby reducing the motor efficiency.

Then, as shown in FIG. 67, the rotor 3 is mounted eccentrically so that the relationship between the gap g1 provided near the portion 1b in which no block is provided and the gap g2 provided on the opposite side thereof is g2>g1. As a result, the magnetic flux Bg1 on the side of the portion 1b can be equivalently the same as the magnetic flux Bg2 generated on the opposite side. Thus, the unbalanced magnetic attraction is reduced thereby decreasing torque loss. This reason is that unbalanced magnetic attraction is generated due to the imbalance of magnetic flux in the gap and proportional to the square of the magnetic flux Bg in the gap.

According to the present embodiment, the portion 1b in which no block is provided is disposed in part of the stator core and then the rotor 3 is placed eccentrically toward the portion 1b. As a result, the unbalanced magnetic attraction is reduced so that the load applied to the bearing can be reduced thereby suppressing the increase of shaft loss.

Embodiment 37

Figure 68:
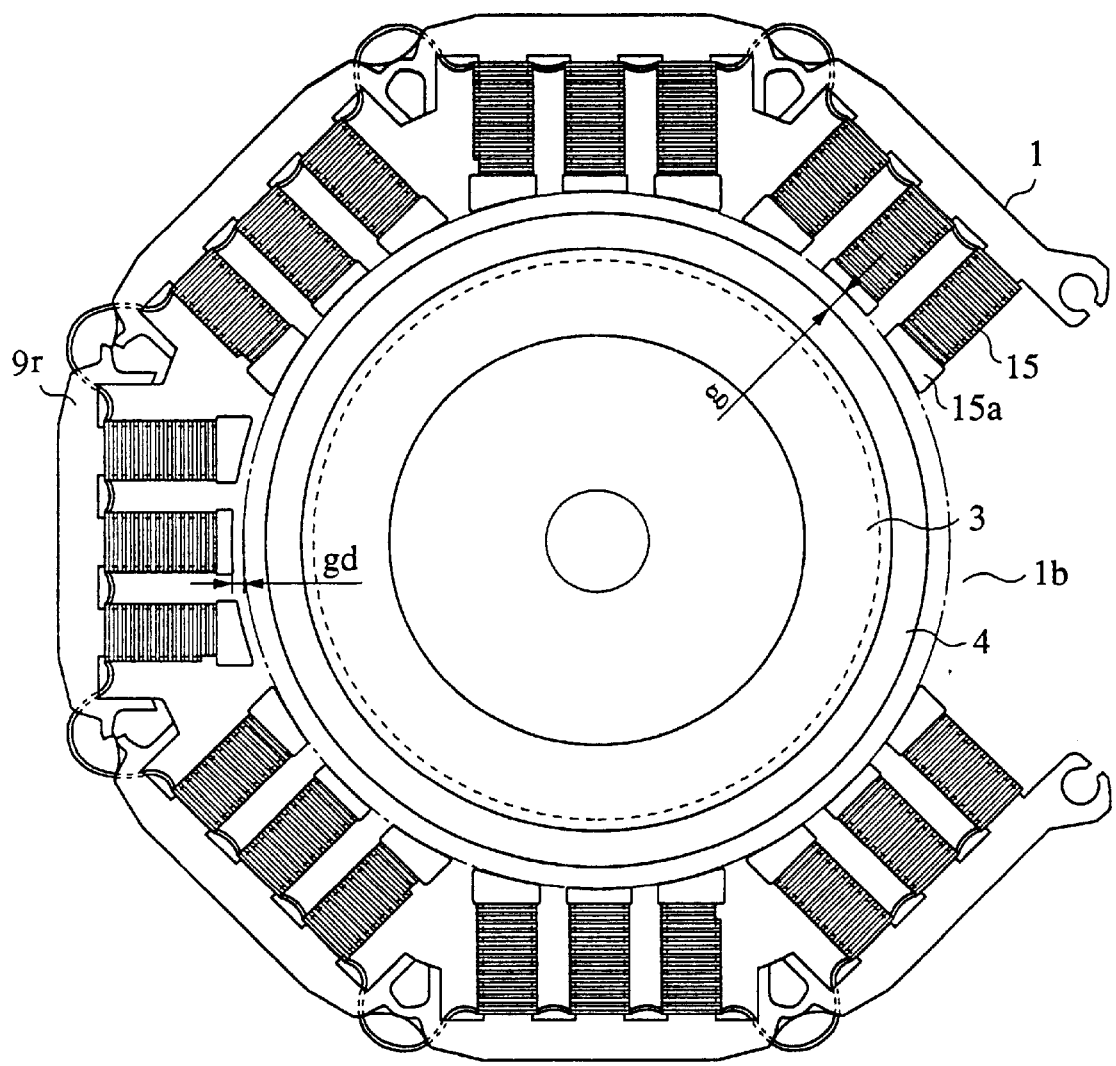
FIG. 68 is a plan view of the major parts of the rotary motor according to the thirty seventh embodiment of the present invention.

The rotary motor according to the thirty seventh embodiment will be described with reference to FIG. 68. In the aforementioned embodiment, the rotor 3 is mounted eccentrically toward the side of the portion 1b in order to reduce the unbalanced magnetic attraction. However, by enlarging the gap gd of the block 9r provided on the opposite side of the portion 1b by gd relative to the other gaps g, the same effect can be achieved.

According to the present embodiment, when the portion 1b in which no block is provided is disposed in part of the stator core, the gap of the block on the opposite side of the portion 1b is enlarged as compared with the gaps of the other blocks. As a result, the unbalanced magnetic attraction is reduced so that the load applied to the bearing can be reduced, thereby suppressing the increase of shaft loss.

Embodiment 38

Figure 69:
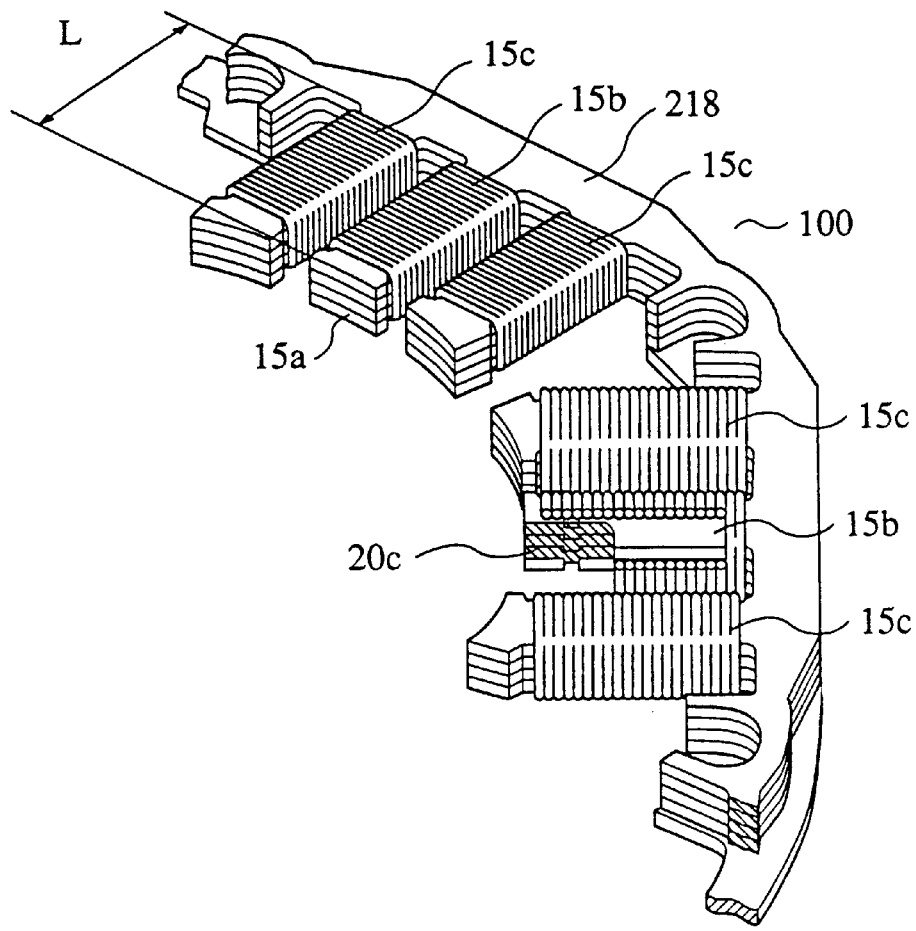
FIG. 69 is a perspective view of the major parts of the rotary motor according to the thirty eighth embodiment of the present invention.
Figure 70:
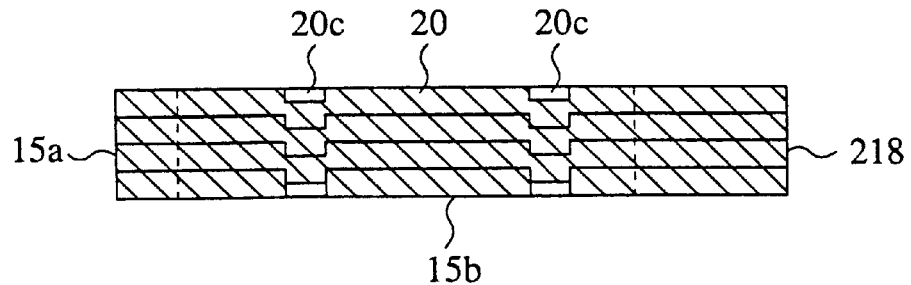
FIG. 70 is a sectional view of the magnetic pole teeth of the rotary motor shown in FIG. 69.

The rotary motor according to the thirty eighth embodiment will be described with reference to FIGS. 69, 70. FIG. 69 is a partial perspective view of the stator portion 100 and FIG. 70 is a sectional view of the magnetic pole tooth 15b in the center, in which the length L from the tip 15a to the root of the back yoke portion 218 is the shortest of the magnetic pole teeth 15b, 15c. As explained in the thirty second embodiment, if the magnetic pole teeth 15b, 15c are provided substantially parallel to each other, the magnetic resistance of the magnetic path formed in the magnetic pole teeth 15b, 15c differs, so that the magnetic resistance of the magnetic path passing the magnetic pole tooth having a shorter L is reduced.

In this case, the magnetic pole teeth 15b are provided with trimmed caulking portions 20c for stacking the stator cores 20 to fix the stator cores 20. As a result, it is possible to equalize magnetic resistance of the magnetic path passing the respective teeth 15b, 15c by laminating the stator core by means of the trimmed caulking portions in the magnetic pole teeth 15b. The trimmed caulking portions 20c apply stress to the magnetic pole teeth 15b thereby deteriorating the magnetic characteristic of the magnetic pole teeth 15b. By providing shorter magnetic pole teeth with trimmed caulking portions, it is possible to equalize magnetic resistance thereby reducing torque ripple.

According to the present embodiment, the magnetic pole teeth 15b having the shortest length in the longitudinal direction (magnetic path direction) of the magnetic pole teeth 15 in the respective blocks 9 of the blocked stator core, with the trimmed caulking portions 20c for laminating and fixing the stator core, the difference of magnetic resistance among the respective magnetic pole teeth decreases, so that the imbalance of magnetic field generated among the magnetic pole teeth 15 is reduced thereby minimizing torque ripple.

Embodiment 39

Figure 71:
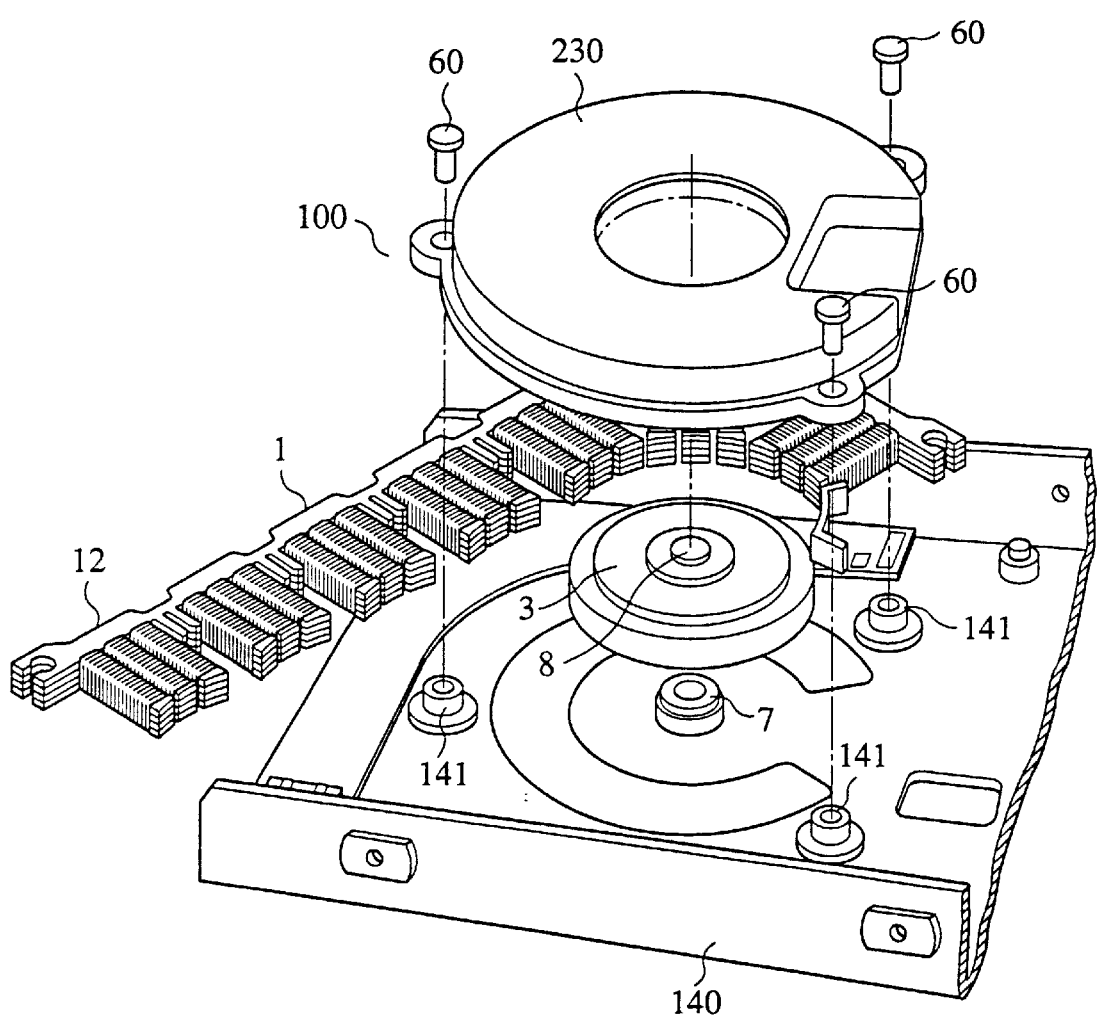
FIG. 71 is a disassembly perspective view showing the state in which the rotary motor according to the thirty ninth embodiment of the present invention is mounted on an apparatus.

In the twelfth embodiment, the stator portion 100 and the rotor 3 are attached to the base 40. However, the following construction is also available; that is, as shown in FIG. 71, the bearing 7 is provided on the frame 140 of a flexible disk drive unit, the spindle shaft 8 of the rotor 3 is engaged with the bearing 7, and then the stator portion 100 incorporating the stator 1 in the cover holder 230 in a desired configuration is fixed to the frame 140 through the screw 60 and the screw portion 141. According to this construction, the bottom face of the cover holder 230 is in contact with the surface of the screw portion 141 in order to determine the positions of the rotor 3 and the stator 1 along the height thereof. However, it is preferable to set the bottom face of the laminated stator core 1a so as to be in contact with the mounting face of the frame 140 in order to enhance the accuracy of positioning. As described above, the stator 1 is contained in the cover holder 230 so that the stator 1 can be handled as a unit of the stator portion 100. As a result, it is possible to mount the stator 1 on a frame having complicated configuration with side wall or the like, so that the process for building in the rotary motor is facilitated.

Embodiment 40

Figure 72:
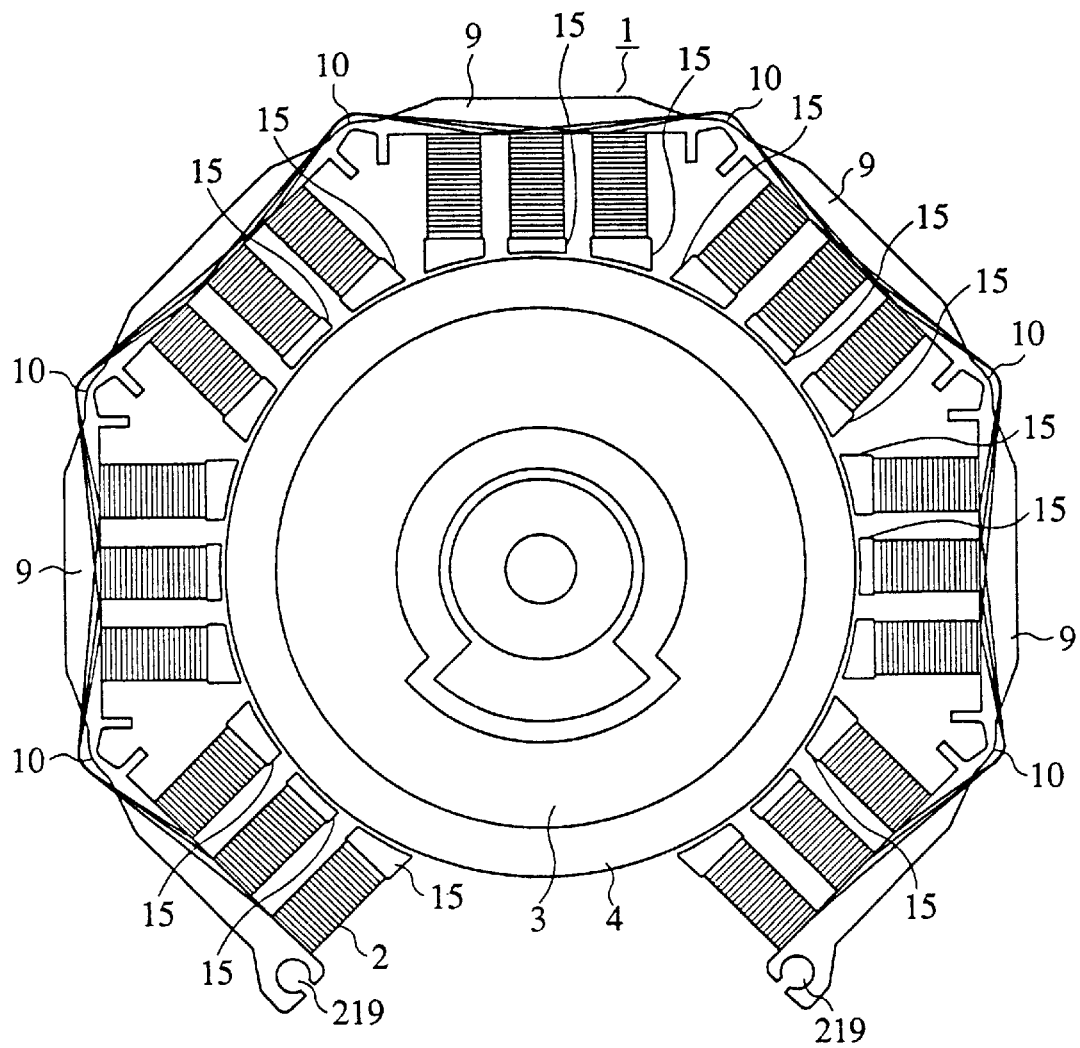
FIG. 72 is a front view showing the rotary motor according to the fortieth embodiment of the present invention.

The rotary motor according to the fortieth embodiment will be described with reference to the Figure. FIG. 72 is a front view of the rotary motor. This motor is a brushless motor having thin structure, which is used in floppy disk drive units, hard disk drive units or the like. Reference numeral 1 designates a stator, numeral 2 designates coils wound around the magnetic pole teeth 15 of the stator 1, numeral 3 designates a rotor, and numeral 4 designates a rotor magnet. The stator 1 is constructed so that a plurality of stator components (block) 9 are connected by means of the thin portions 10. Each respective stator component 9 comprises; a plurality of magnetic pole teeth 15.

Figure 73:
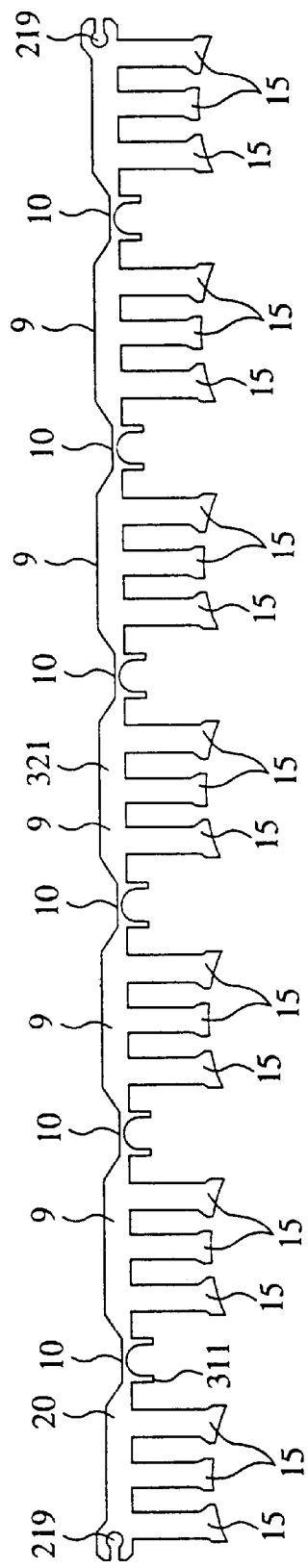
FIG. 73 is a front view of the laminated core of the rotary motor shown in FIG. 72.
Figure 74:
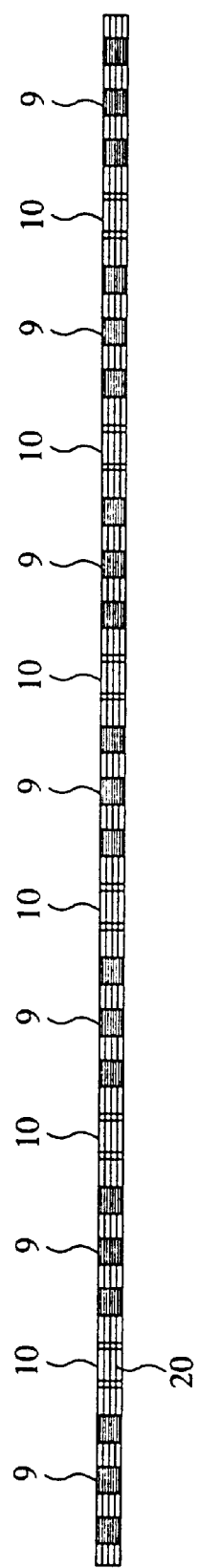
FIG. 74 is a side view of the laminated core shown in FIG. 73.

FIG. 73 is a front view of the laminated core (laminated connecting stator cores) constituting the stator 1 shown in FIG. 72. FIG. 74 is a side view thereof. As shown in Figures, the shape of the magnetic material 321 obtained by punching by means of press, that is, the shape of the stator core, is changed to a shape different from the stator 1 shown in FIG. 72 with respect to a plurality of the stator components 9 and the thin portions 10 which connect the stator components. Reference numeral 20 designates the laminated core if required.

Thin magnetic material 321 obtained by punching by means of press extends straight, and on the other hand, the shape of the stator 1 is circular. A plurality of the magnetic materials 321 or the connecting stator cores are stacked to form the laminated core 20. Reference numeral 311 designates a pair of protrusions extending on both sides of the thin portion 10.

Figure 75:
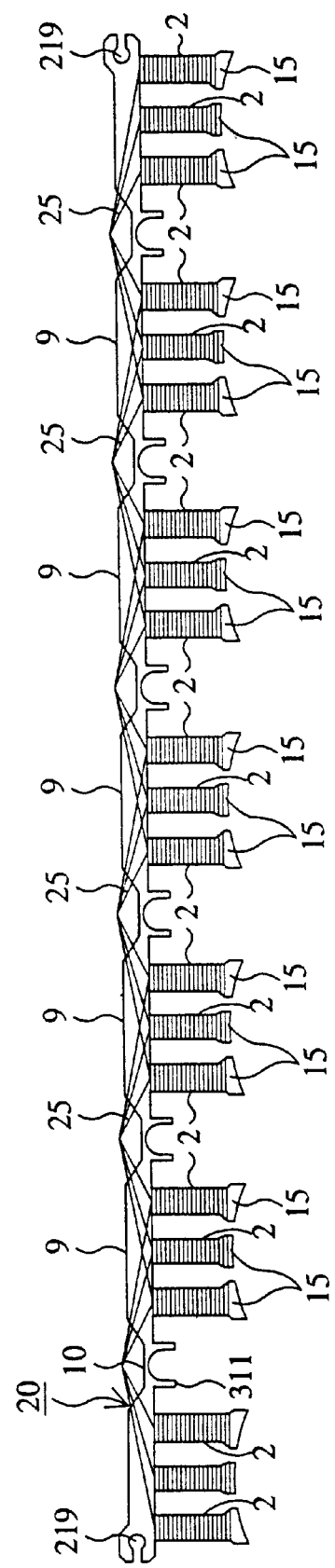
FIG. 75 is a front view showing the laminated core according to the fortieth embodiment of the present invention, in which the coils are formed.
Figure 76:
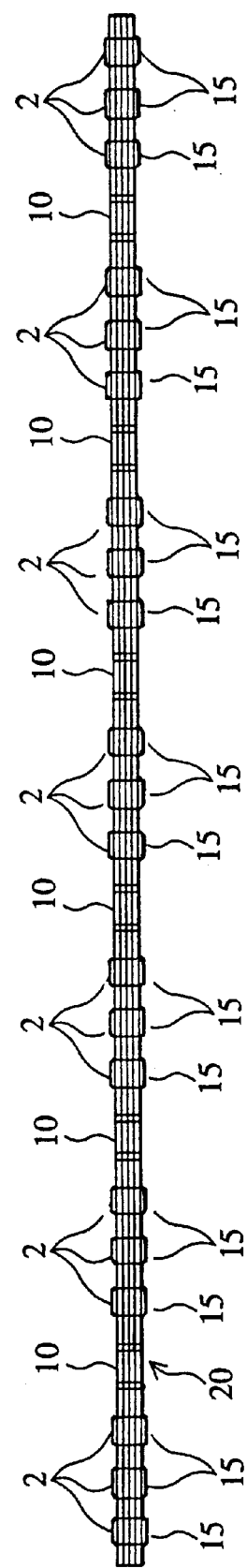
FIG. 76 is a side view of the laminated core shown in FIG. 75.
Figure 83:
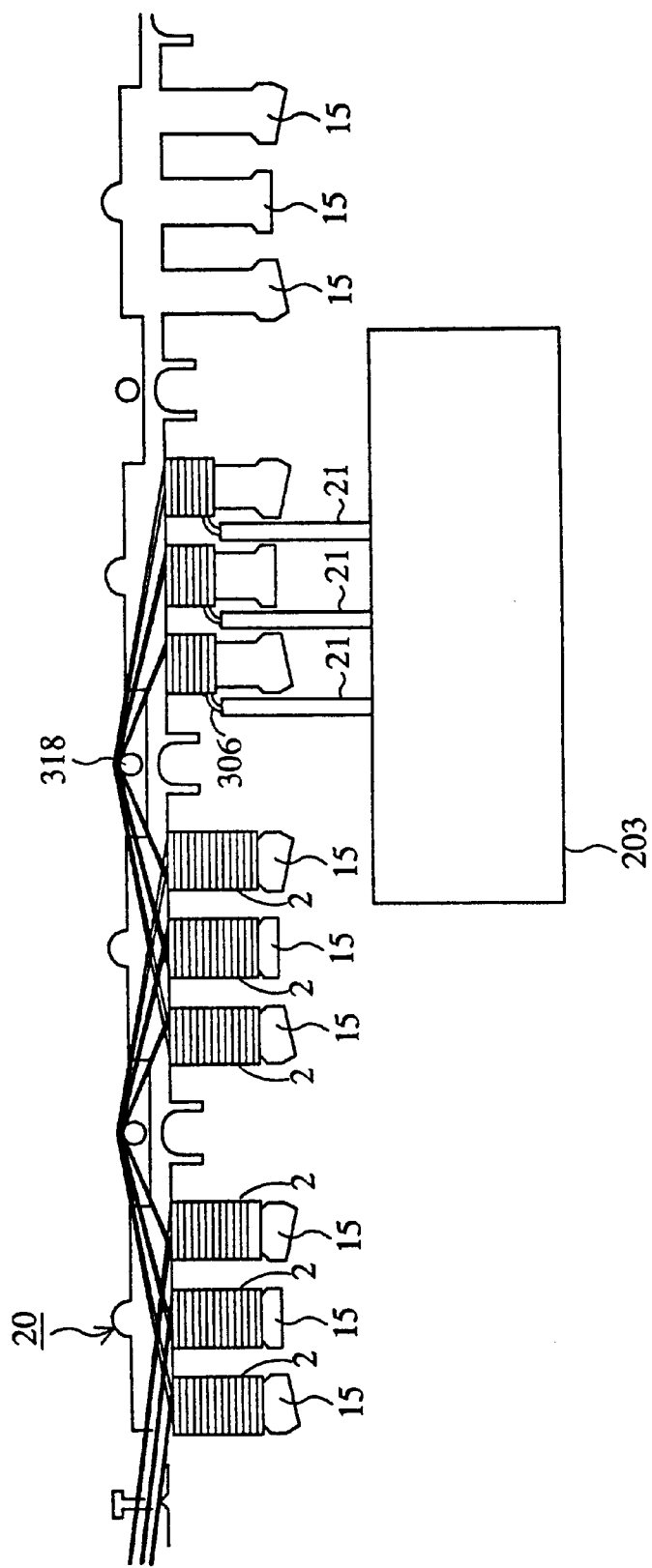
FIG. 83 is an explanatory view showing the state in which the coils are formed on the laminated core according to the fortieth embodiment of the present invention.

FIG. 75 is a front view showing the state in which the coils 2 are formed around the magnetic pole teeth 15 of the laminated core 20. FIG. 76 is a side view thereof. When the coils 2 are formed, as shown in FIG. 83, for example, the wire winding machine 203 is located at a position facing the laminated core 20 formed straight. Then, a wire or wires are introduced from a wire winding nozzle or a plurality of wire winding nozzles respectively, and a wire or wires are wound around the magnetic pole tooth or teeth 15.

In this condition, the wire winding machine 203 can be located without being restricted by the shape of the laminated core 20, and therefore the coils 2 can be formed easily, so that it is possible to wind wires neatly, quickly and at high density. Additionally, when the coils 2 are formed on a plurality of the stator components 9, it is possible to wind wires continuously without cutting the wires between the stator components 9 to secure the crossover wire 25 at the thin portion 10, when the coils 2 are formed on a plurality of the stator components 9, thereby simplifying the procedure for connecting wire between the coils 2.

Figure 77:
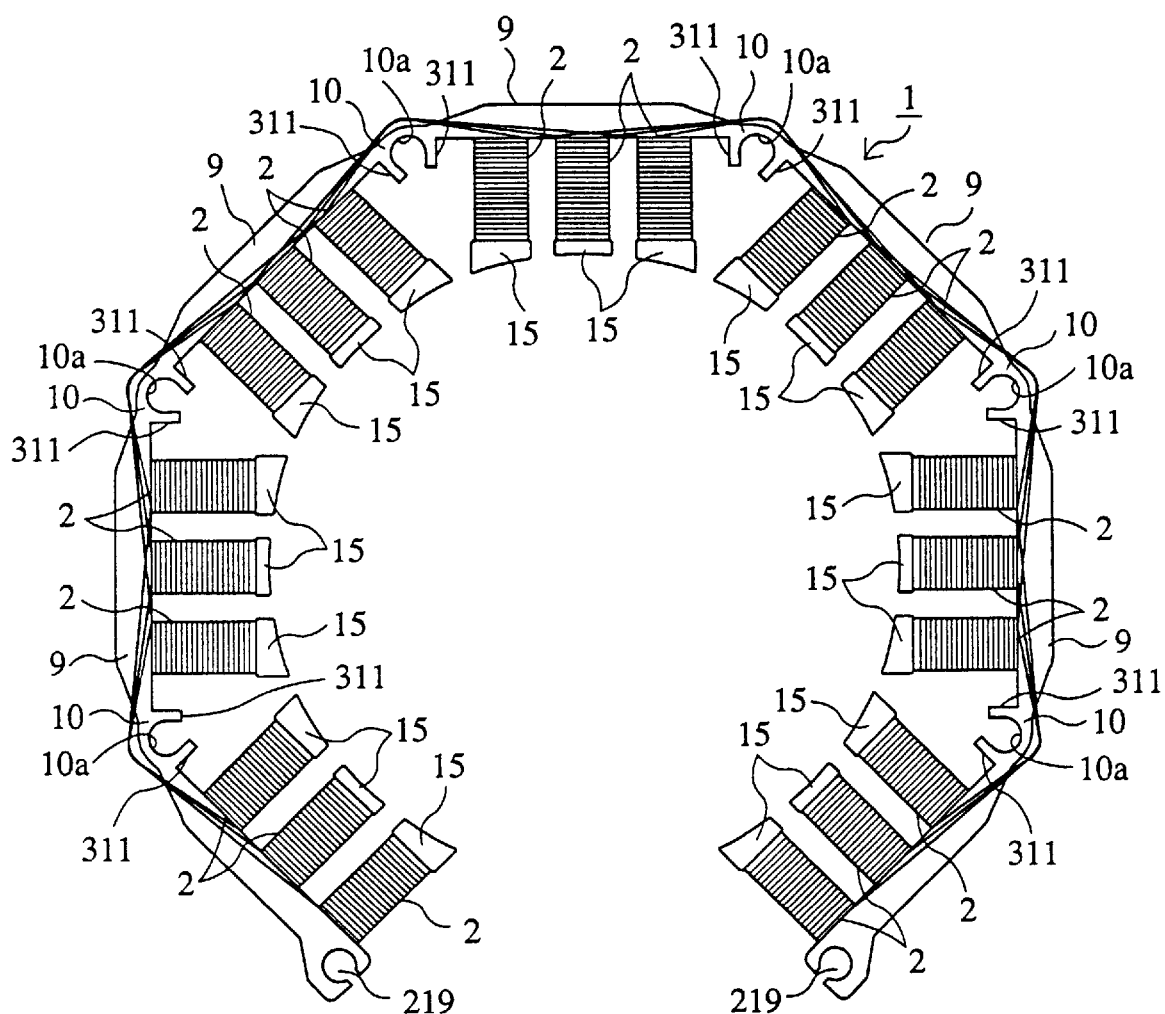
FIG. 77 is a front view showing the stator according to the fortieth embodiment of the present invention, in which the thin portion of the laminated core is deformed.
Figure 84:
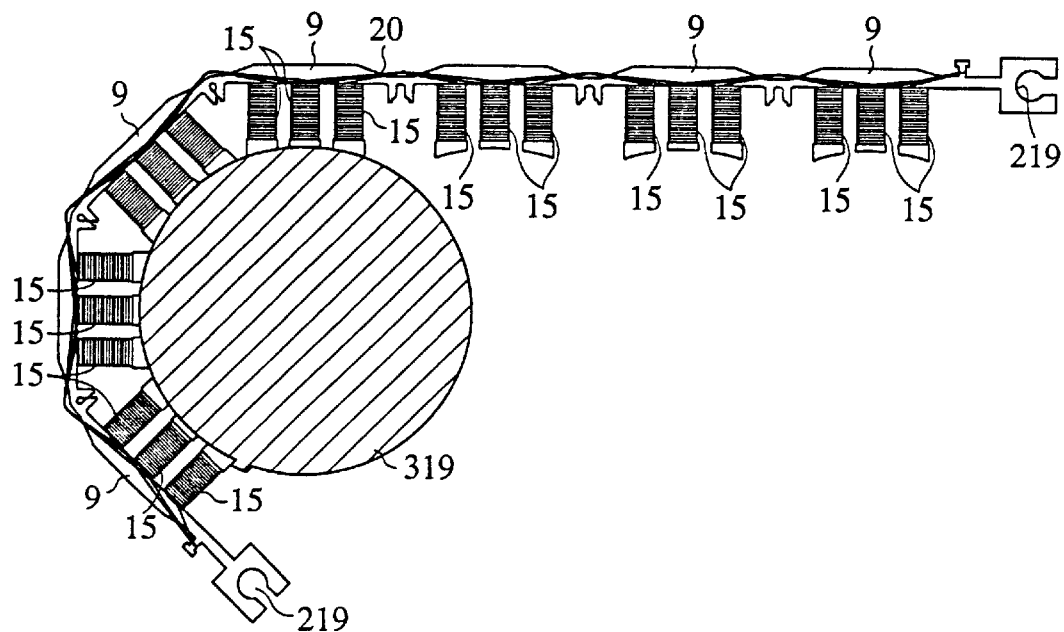
FIG. 84 is a plan view showing the state in which the laminated core in which the coils are formed according to the fortieth embodiment of the present invention is being bent.

FIG. 77 is a front view showing the stator 1 which is deformed to a circular shape by bending the thin portions 10 after the coils 2 are formed on the laminated core 20. FIG. 84 shows a process in which the thin portions 10 are being deformed with the stator 1 being pressed on the bending jig 319.

Figure 85:
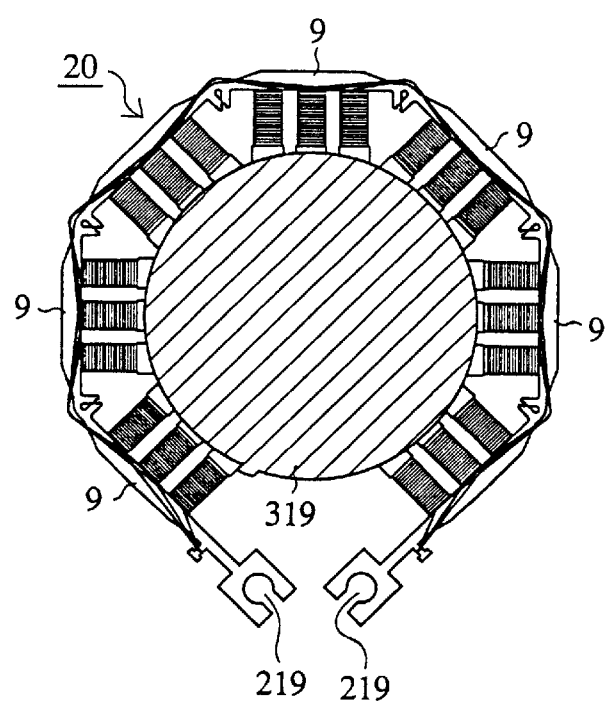
FIG. 85 is a plan view showing the state in which bending of the laminated core shown in FIG. 84 is finished.

FIG. 85 shows the state in which the stator 1 having an appropriate shape has been obtained by bending the thin portions 10. As compared with the stator in which the laminated cores 20 are independent, this construction does not increase the number of the parts of the laminated core 20 and eliminates the necessity of handling small parts.

Figure 78:
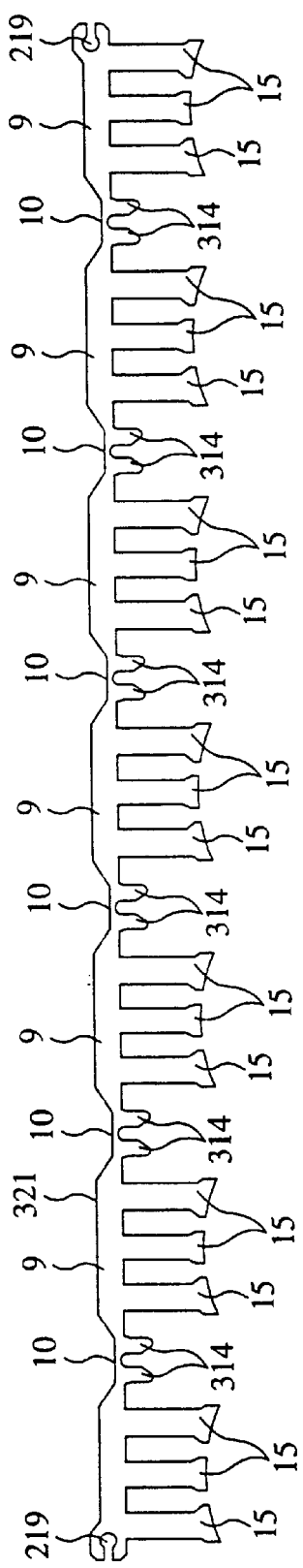
FIG. 78 is a front view showing other laminated core according to the fortieth embodiment of the present invention.
Figure 79:
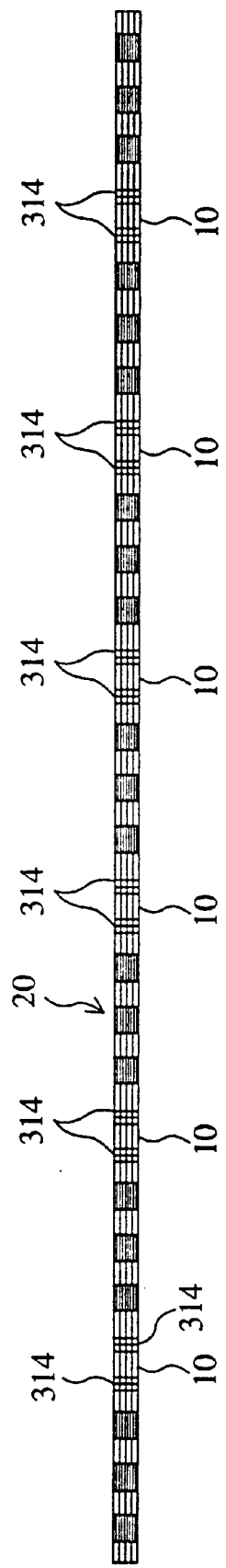
FIG. 79 is a side view of the laminated core shown in FIG. 78.
Figure 80:
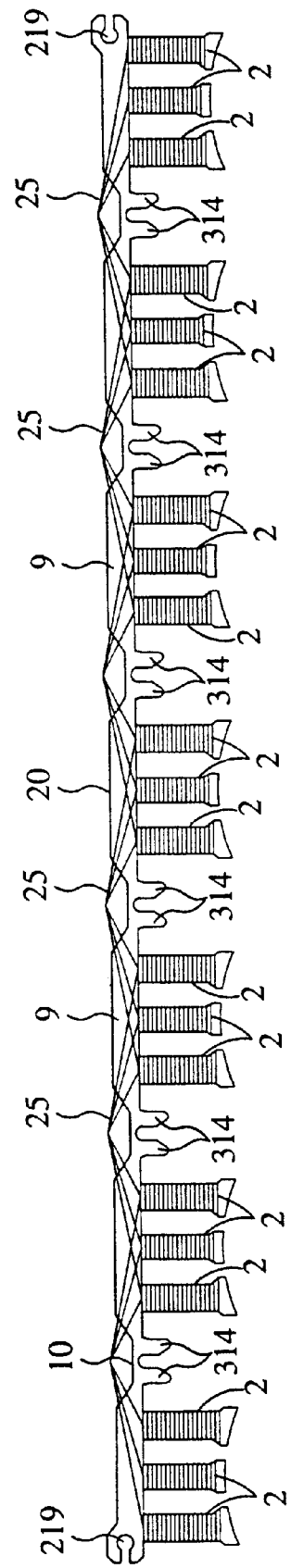
FIG. 80 is a front view showing the laminated core according to the fortieth embodiment of the present invention, in which other coils are formed.
Figure 81:
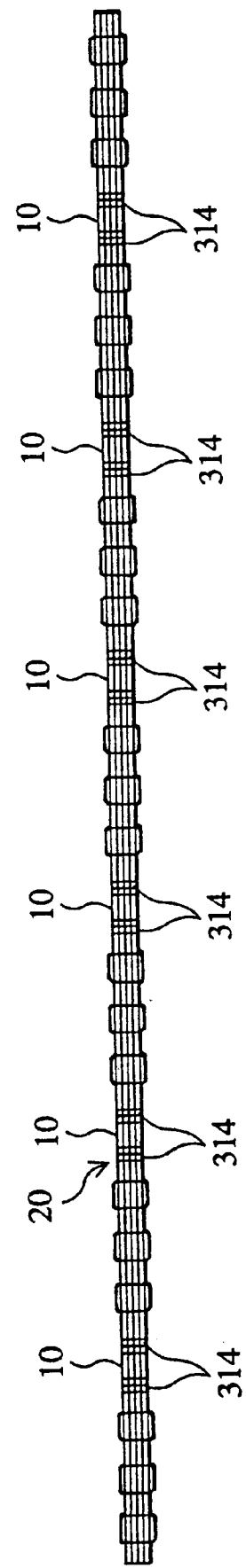
FIG. 81 is a side view of the laminated core shown in FIG. 80.
Figure 82:
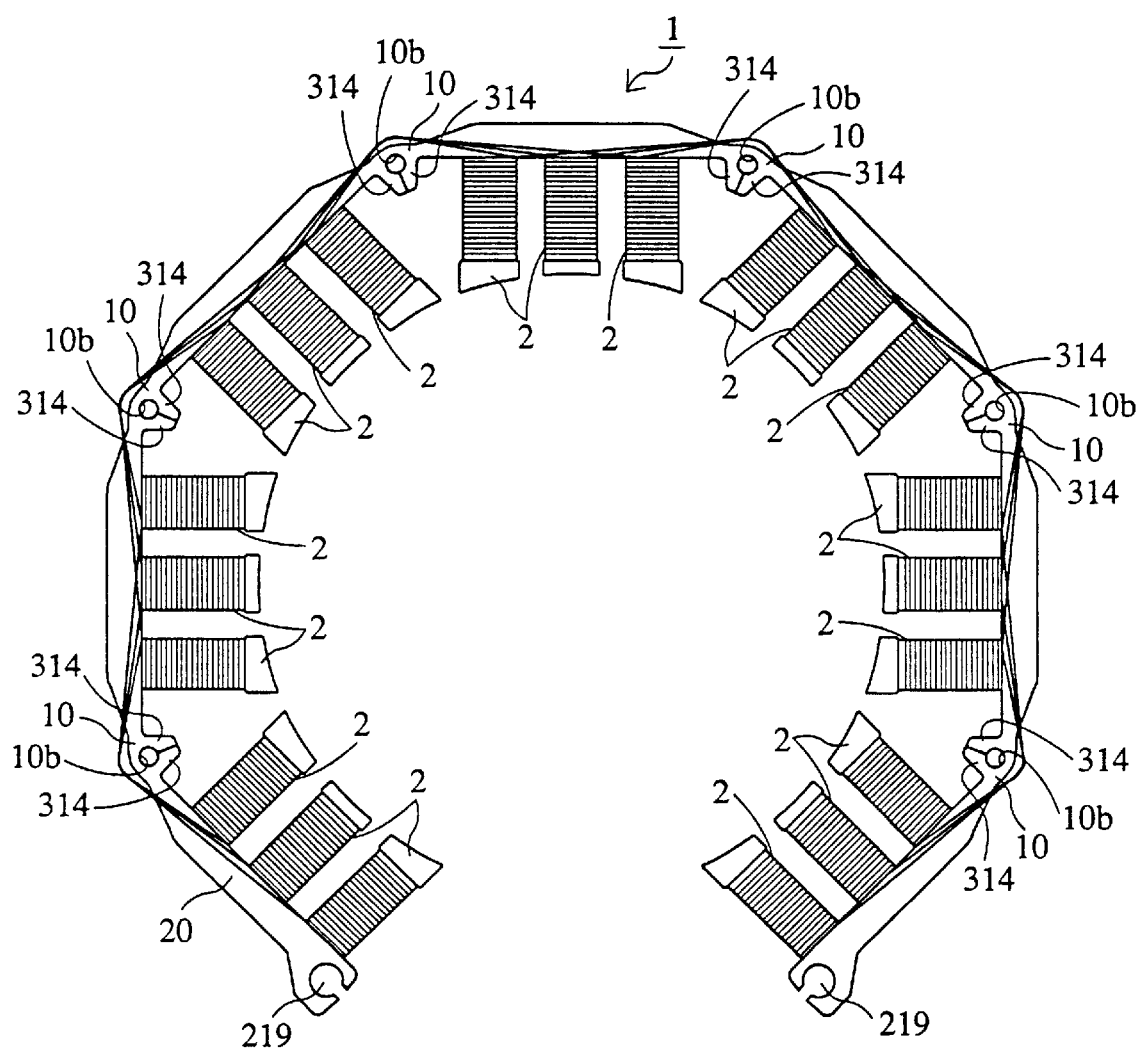
FIG. 82 is a front view showing the stator in which the thin portions of other laminated core are deformed, according to the fortieth embodiment of the present invention.

FIG. 78 is a front view showing the laminated core 20 of the other shape. FIG. 79 is a side view of the laminated core 20 shown in FIG. 78. Different from the laminated core shown in FIG. 73, the laminated core 20 of the present embodiment is provided with respective protrusions which act as a magnetic path forming portion 314 which is formed on both sides of the thin portion 10. FIG. 80 shows the state in which the coils 2 are formed on the laminated core 20 shown in FIG. 78. FIG. 81 is a side view of the laminated core shown in FIG. 78. FIG. 82 shows the stator 1 which is deformed to a circular shape by bending the thin portion 10 as in FIG. 77.

When the circular shaped stator 1 is formed, a magnetic path is formed by the respective pairs of the magnetic path forming portions 314 located on both sides of the thin portions 10 as shown in FIG. 82. By the respective pairs of protrusions 311 located on both sides of the thin portion 10 as shown in FIG. 77 and the magnetic path forming portion 314 located on both sides of the thin portions 10 as shown in FIG. 82, fastening member insertion portions such as C-shaped cut-out portions 10a and circular holes 10b into which resin pins, screws or the like are to be inserted or screwed to fasten the stator 1 onto the substrate or the like are formed. The fastening member insertion portions are capable of fixing a plurality of the stator components 9 of the laminated core 20 tightly on both sides thereof.

Figure 86:
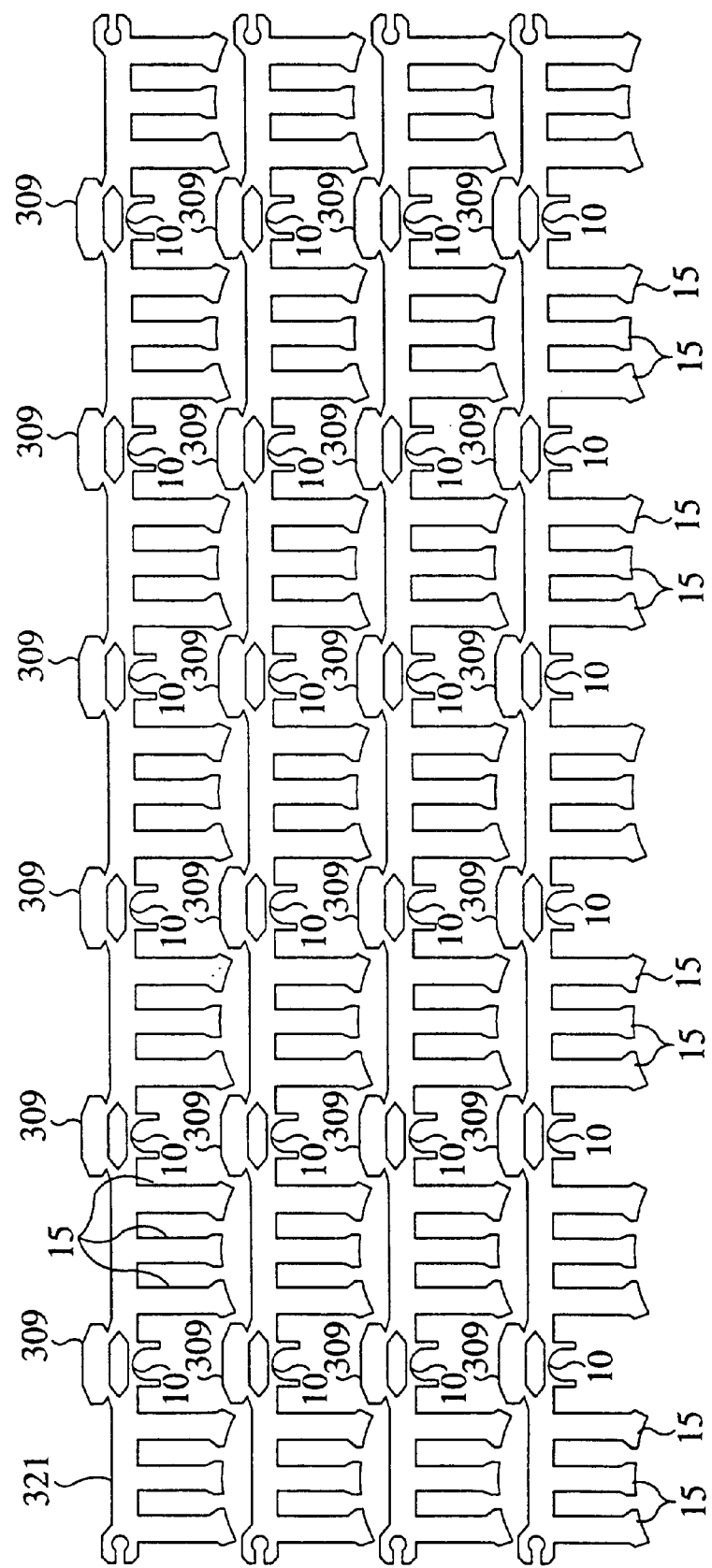
FIG. 86 is a front view showing the state in which materials of the laminated core according to the fortieth embodiment of the present invention are obtained by punching by means of press.
Figure 87:
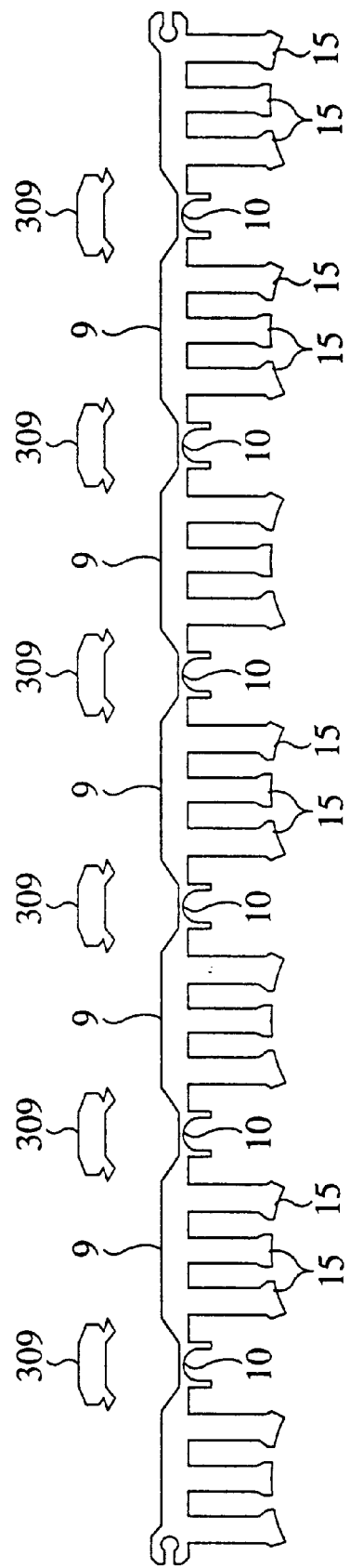
FIG. 87 is an explanatory view showing the state in which the reinforcing members of the laminated core shown in FIG. 86 are removed.

FIG. 86 shows magnetic material 321 of the other shape, obtained by punching by mean of press. The magnetic material 321 has bridge-like reinforcing portions 309 in the vicinity of the thin portions 10. FIG. 87 shows the state in which the reinforcing portions 209 for reinforcing the thin portions 10 are removed after the coils 2 (not shown) are formed.

This procedure makes it possible to prevent the thin portions 10 of the laminated core 20 from being deformed or damaged in annealing the laminated core 20 or treatment for coiling. By placing the magnetic material 321 to be punched by means of press as shown in FIG. 86 in the present punching process, the sheets of the magnetic material can be used more effectively than in the case of the integrated type core, thereby reducing the amount of the material to be thrown away by punching.

Figure 88:
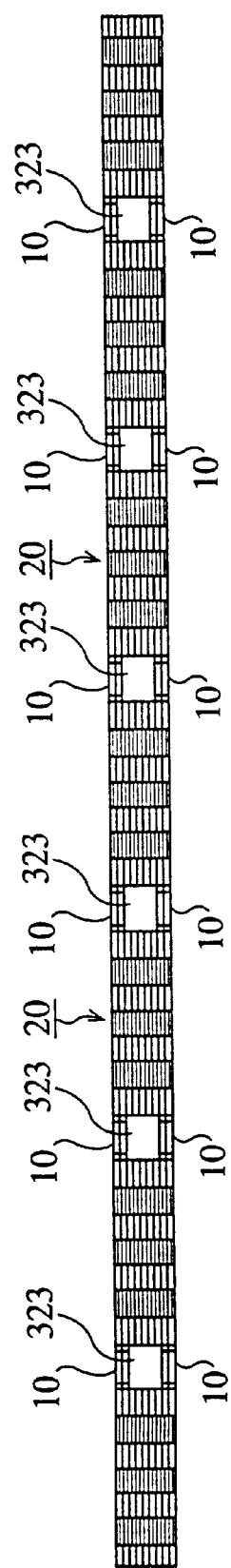
FIG. 88 is a front view showing further other laminated core according to the fortieth embodiment of the present invention.
Figure 89:
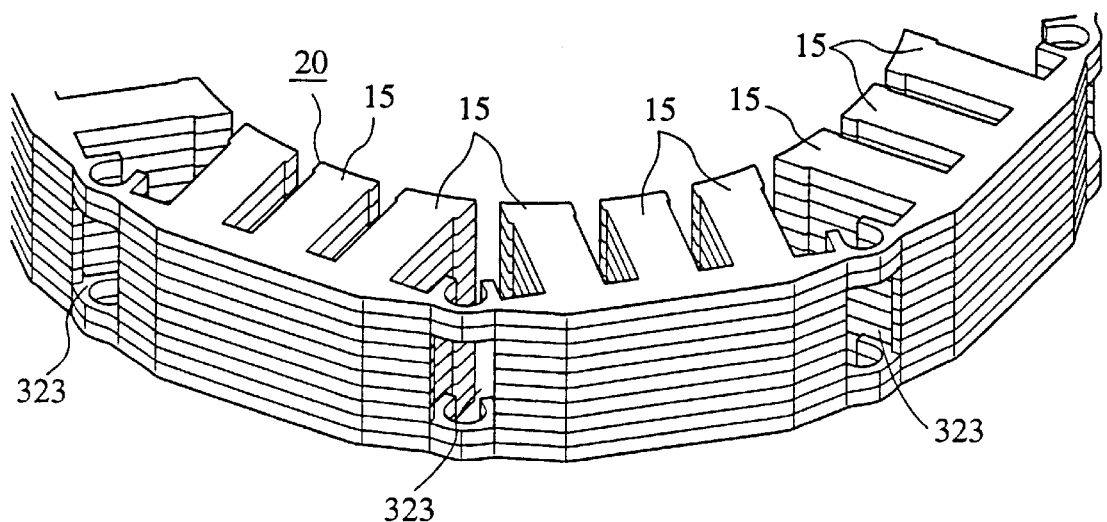
FIG. 89 is a partial perspective view of the laminated core shown in FIG. 88.

FIG. 88 is a side view of the laminated core 20 in which the connecting stator cores punched by means of press so as to form the thin portion 10 as shown in FIG. 73 are combined with the magnetic material in which no thin portion is formed. FIG. 89 is a partial perspective view of the laminated stator core 20 which is deformed to the shape of the stator 1. Here, thin portion missing portion 329 is formed. This construction makes it possible to bend the thin portion 10 easily even if a number of the magnetic materials are stacked in the laminated core 20.

The connecting stator core shown in FIG. 73 has fixing portions 219 on both sides thereof. The fixing portion 219 may be a positioning portion made of a hole, circular shaped or C- shaped cut-out portion or protruded portion. This construction facilitates the handling of the laminated core 20. Additionally, the fixing portion 219 is capable of improving the accuracy of positioning when the laminated core composed of a plurality of connecting stator cores is wound with wire.

Figure 90:
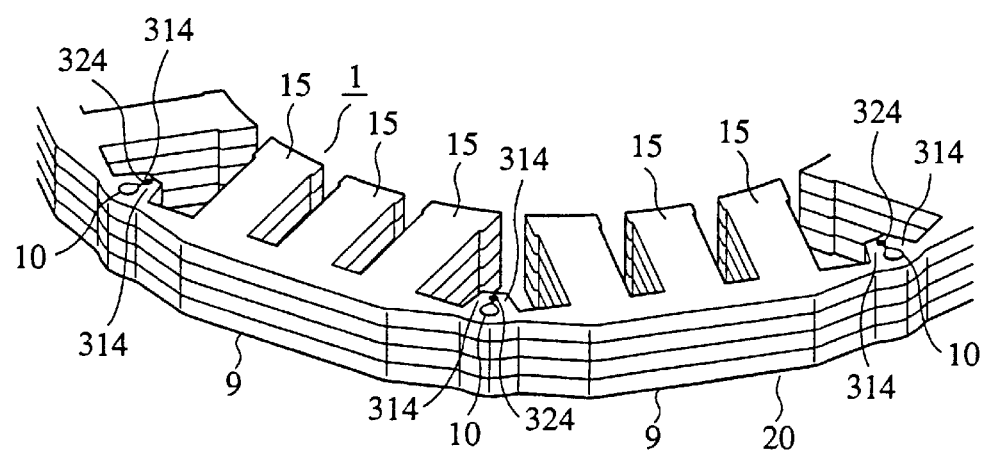
FIG. 90 is a partial perspective view showing the state in which the protrusions of the laminated core according to the fortieth embodiment of the present invention are fused together.
Figure 91:
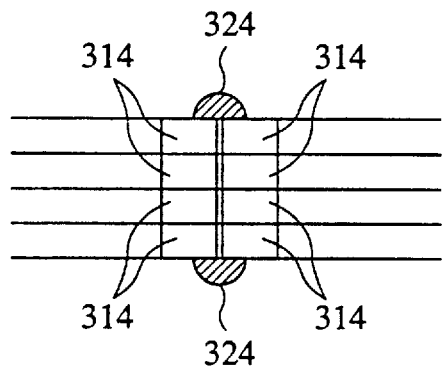
FIG. 91 is a partial side view of the fused portion shown in FIG. 90.

FIG. 90 shows the stator 1 in which the laminated core 20 is bent at the thin portions 10 after the coils are formed (the representation of the coils 2 is omitted here). In the stator 1, the protrusions facing each other which acts as the magnetic path forming portion 314 of the neighboring stator components 9 of the laminated core 20 are fit to each other or placed near each other and then the corresponding magnetic path forming portions are fused and fixed through both end faces or a single end face along the direction of the layers by means of YAG laser or the like. In the same Figure, reference numeral 324 designates the welded portion. FIG. 91 is a partial sectional view showing the detail of the welded portion 324. By fusing and fixing the magnetic path forming portions 314 in this manner, the stator components 9 of the laminated core 20 can be fixed more firmly. That is, the integrated structure of the laminated core 20 is stabilized, so that mounting of the laminated core 20 onto the substrate through mainly the magnetic path forming portions 314 can be made firm and secure.

Figure 92:
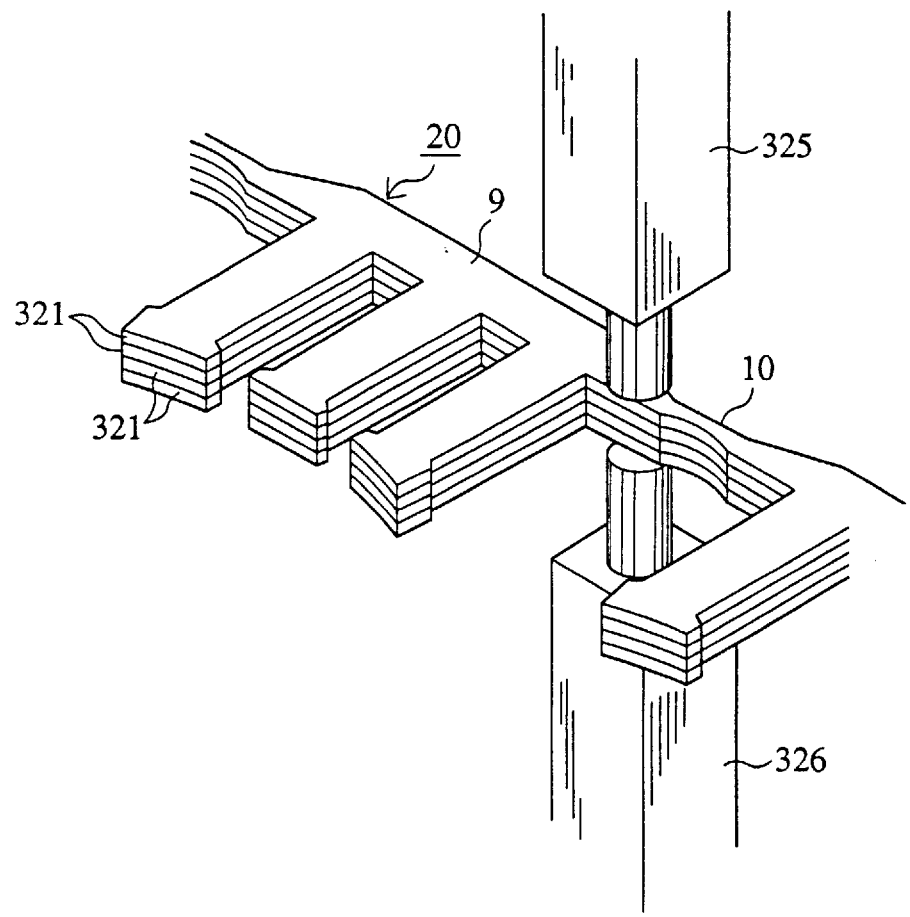
FIG. 92 is an explanatory view showing the state in which the laminated core according to the fortieth embodiment of the present invention is integratedly fused.

FIG. 92 shows the state in which a plurality of stacked magnetic materials 321 are welded by spot welding a single position or a plurality of positions. That is, the magnetic materials 321 are nipped by the upper electrode 325 and the lower electrode 326 of the spot welding machine along the thickness of the magnetic materials, pressure is applied to a plurality of stacked magnetic materials 321, and a large current is supplied thereto in order to fix a plurality of the stacked magnetic materials 321 by fusing the current passing portion by self generated heat. As a result, a plurality of the stacked magnetic materials 321 are fixed integratedly. In this case, the strength of spot welding is larger than in the case of caulking or adhesion and further, it is possible to select the position to be spot-welded freely.

Figure 93:
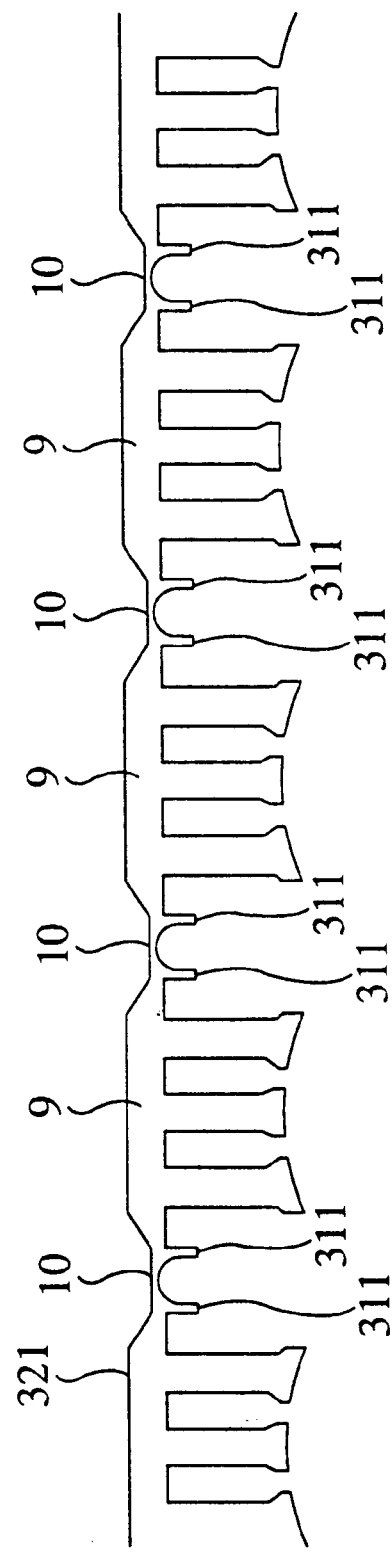
FIG. 93 is a partial front view showing the protrusions for electrically fusing the laminated core according to the fortieth embodiment of the present invention integratedly.
Figure 94:
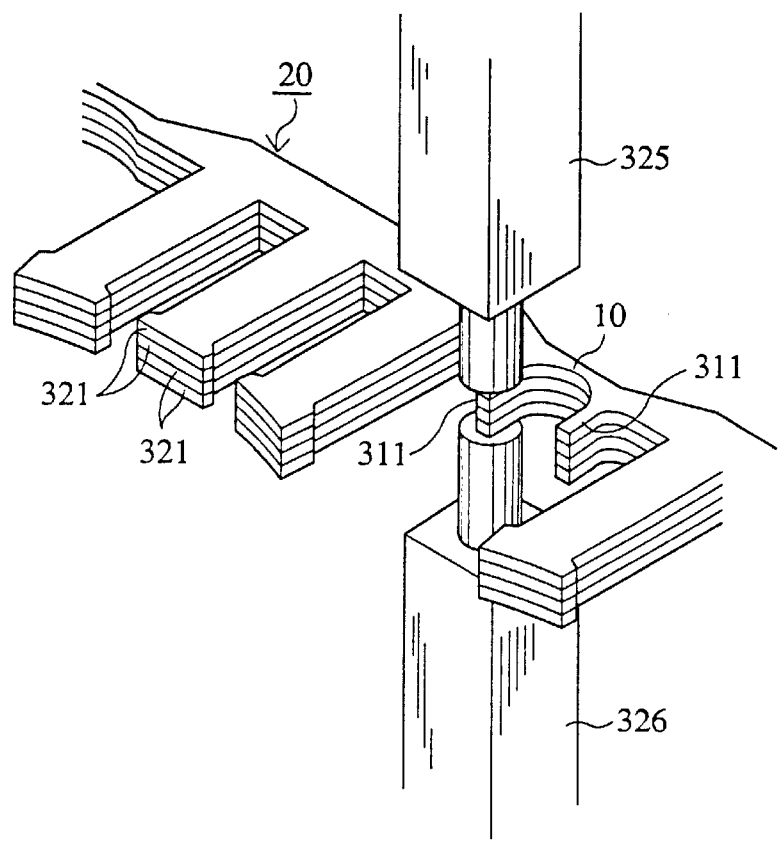
FIG. 94 is an explanatory view for explaining the state in which the protrusions of the laminated core according to the fortieth embodiment of the present invention are electrically fused.
Figure 95:
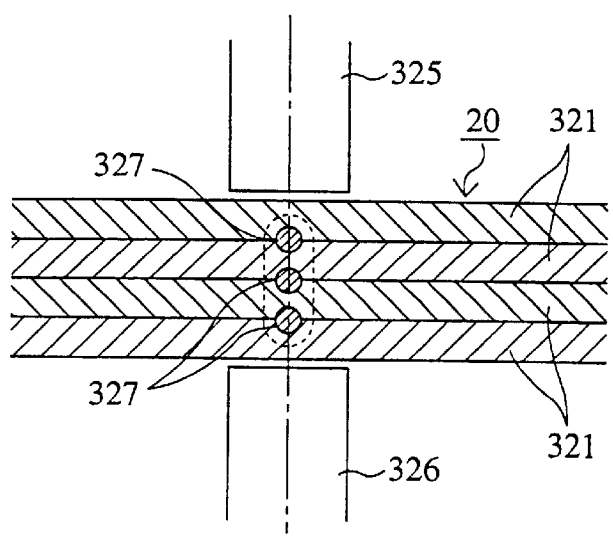
FIG. 95 is a partial sectional view of the laminated core which is electrically fused, shown in FIGS. 92, 94.

FIGS. 93, 94 show another method for fixing the magnetic materials. As shown in FIG. 93, the protrusions 311 at a single position or a plurality of positions of the stacked magnetic materials 321 punched by means of press are nipped between the upper electrode 325 and the lower electrode 326 along the thickness thereof as shown in FIG. 94, pressure is applied to the stacked magnetic materials 321 and a large current is supplied to the stacked magnetic materials 321 in order to fuse the current passing portion thereof. Consequently, a plurality of the stacked magnetic materials 321 are fixed integratedly. FIG. 95 is a schematic view of the fused portion 327 of the laminated core 20 according to this method.

Figure 96:
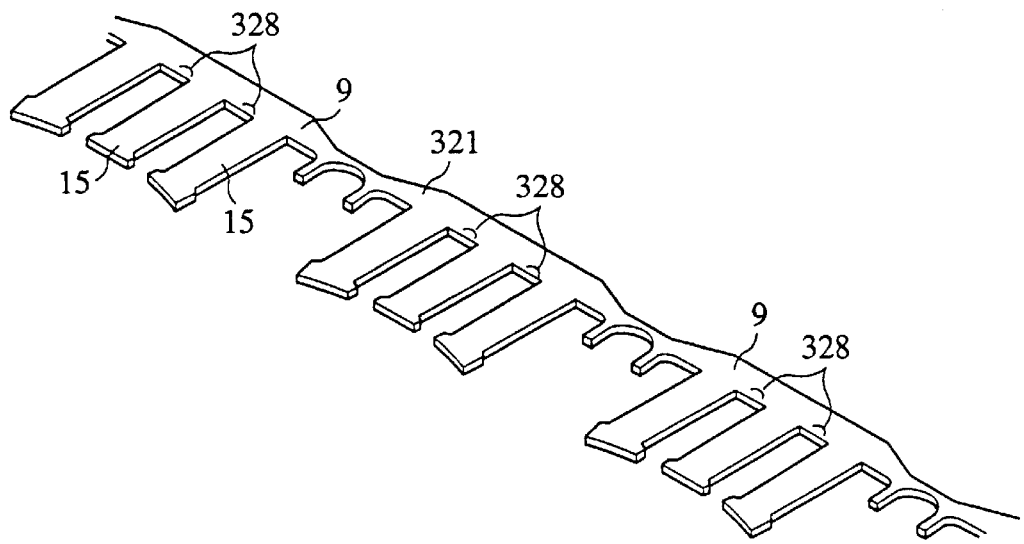
FIG. 96 is a partial sectional view showing the magnetic material of other laminated core according to the fortieth embodiment of the present invention.
Figure 97:
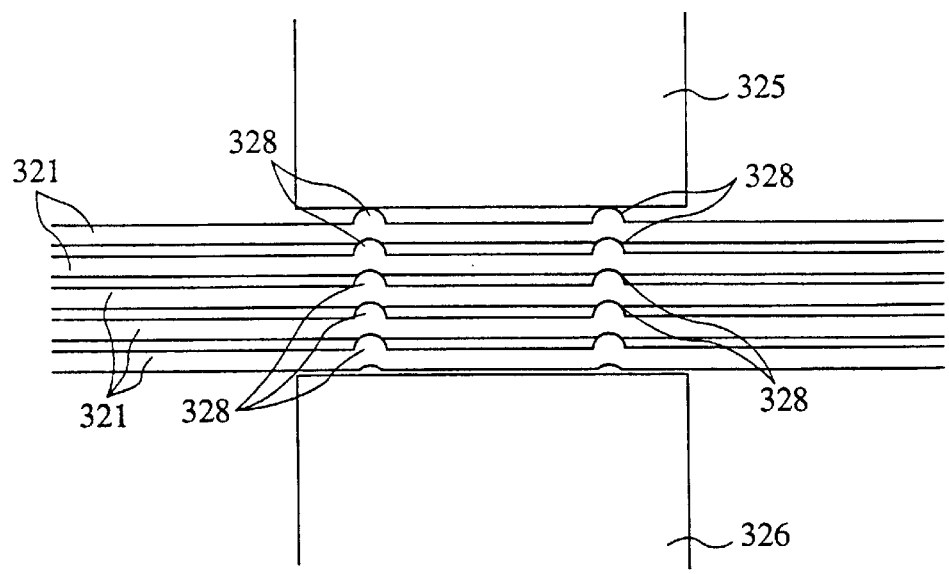
FIG. 97 is an explanatory view showing the state in which the laminated core shown in FIG. 96 is electrically fused.
Figure 98:
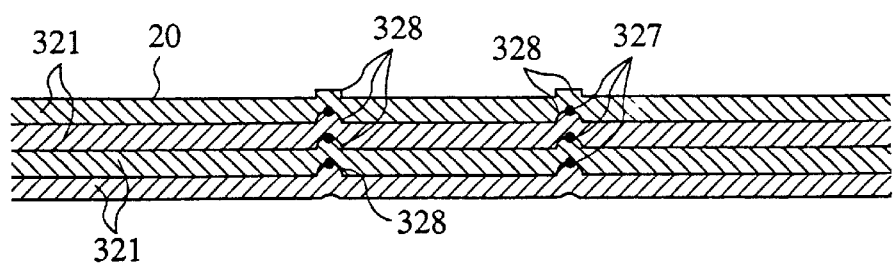
FIG. 98 is a partial sectional view of the laminated core which is electrically fused, shown in FIG. 96.

FIGS. 96, 97, 98 show still another method for fixing the magnetic materials 321. As shown in FIG. 96, slight dent/protruding portions 328 are provided at a position or a plurality of positions on the surface of the magnetic material 321. This dent/protruding portion 328 can be formed easily by pressing. Then, as shown in FIG. 97, a plurality of the magnetic materials 321 obtained by punching by press, the magnetic materials having the dent/protruding portions 328, are stacked. Then, the locations corresponding to the dent/protruding portions 328 are nipped across the laminated core 20 by means of the upper electrode 325 and the lower electrode 326 along the thickness of the laminated core 20, pressure is applied to the laminated core and a large current is supplied thereto.

As a result, the dent/protruding portions 328 are locally heated by the large current passing therethrough and the dent/protruding portions 328 are fused to each other at the fusing portions 327 as shown in FIG. 98, so that a plurality of the stacked magnetic materials 321 are integratedly fixed.

Figure 99:
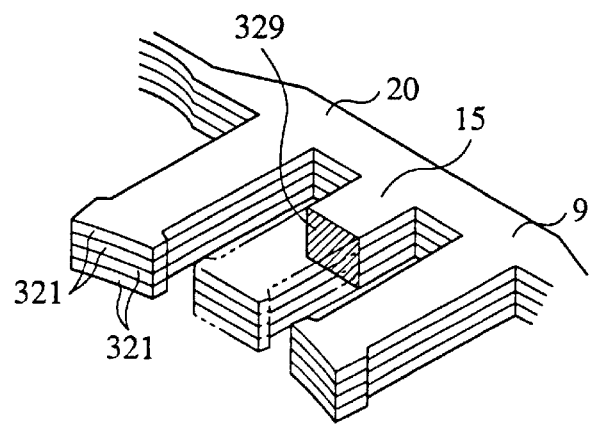
FIG. 99 is a partial perspective view showing another laminated core according to the fortieth embodiment of the present invention.
Figure 100:
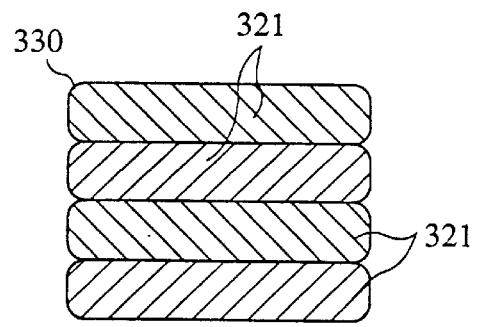
FIG. 100 is a partial sectional view showing still another laminated core according to the fortieth embodiment of the present invention.

FIG. 99 is a view showing the details of the coil forming portions of the magnetic pole teeth 15 in the laminated core 20. In this Figure, reference numeral 329 designates the cross section of the coil forming portion indicating the cut section. For example, as shown in FIG. 100, part or all of the corners in the cross section of the magnetic materials 321 punched by means of press are formed so as to be of smoothly round shape 330. A plurality of such magnetic materials are stacked.

Then, it is possible to wind directly the laminated core 20 with wire or the laminated core 20 covered with thin coating film with wire. That is, it is not necessary to perform insulation treatments on the laminated core 20, such as integrated molding of resin, formation of resin bobbin or fusing of insulating sheet.

Figure 101:
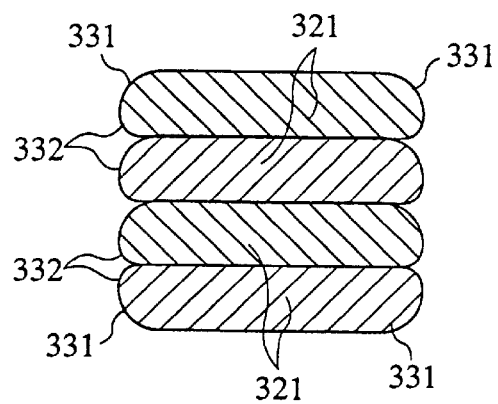
FIG. 101 is a partial sectional view showing further laminated core according to the fortieth embodiment of the present invention.
Figure 102:
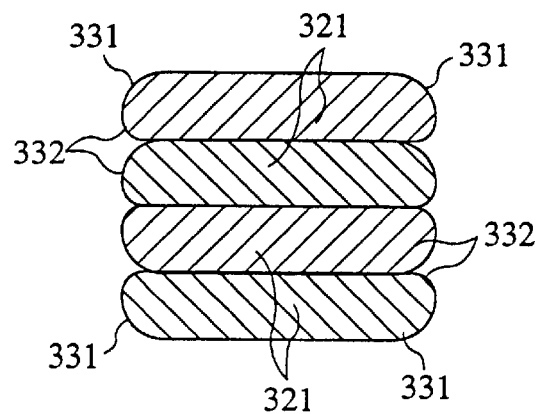
FIG. 102 is a partial sectional view showing still further laminated core according to the fortieth embodiment.

FIGS. 101, 102 show the coil forming portion cross section 329 of other configuration. The magnetic materials 321 punched by means of press have such cross section in which part or all of the corners are formed with large-radius round shape 331 and small-radius round shape 332. Large-radius round shapes 331 are formed on the outside edges of two outermost pieces of stacked magnetic materials 321.

As a result, it is possible to wind directly the laminated core 20 with wire or the laminated core covered with thin coating film with wire. Additionally, this construction is capable of preventing wire from being damaged by the corners of the magnetic materials, located on both sides of the laminated core For example, if a round shape larger than half of the sheet thickness of the magnetic material is formed on the outer edges of the outermost two pieces, this construction can be also applied to thin magnetic materials.

Figure 103:
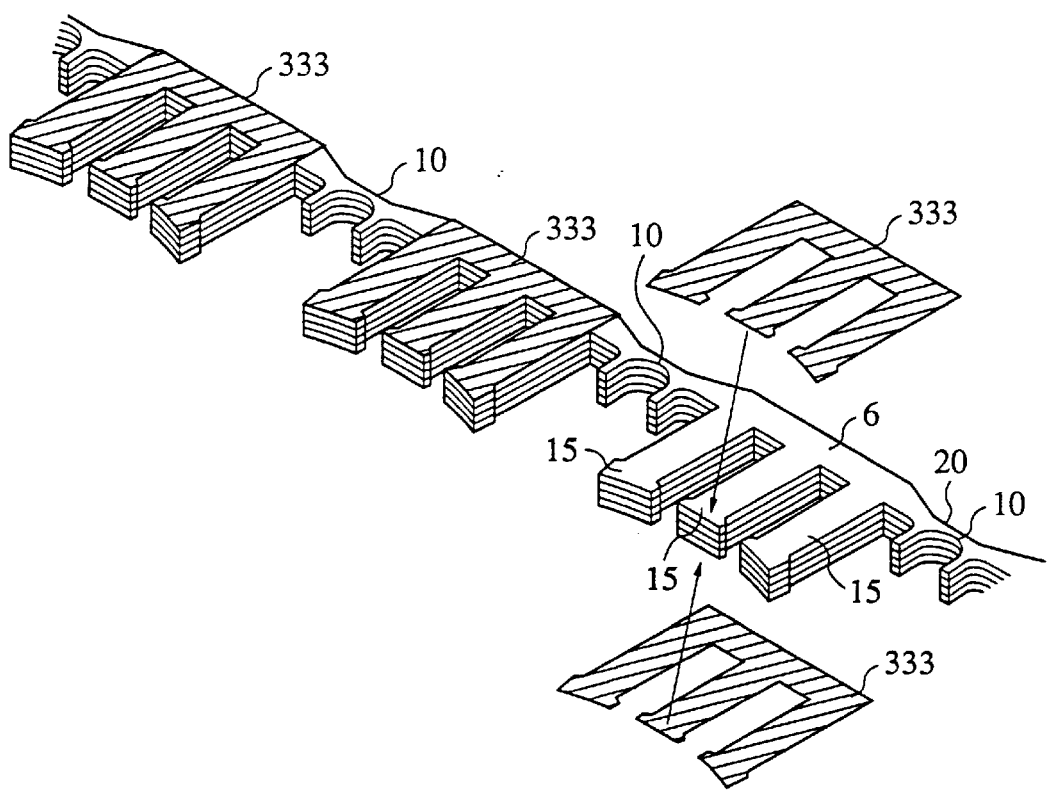
FIG. 103 is a partial perspective view showing a yet still further laminated core according to the fortieth embodiment of the present invention.
Figure 104:
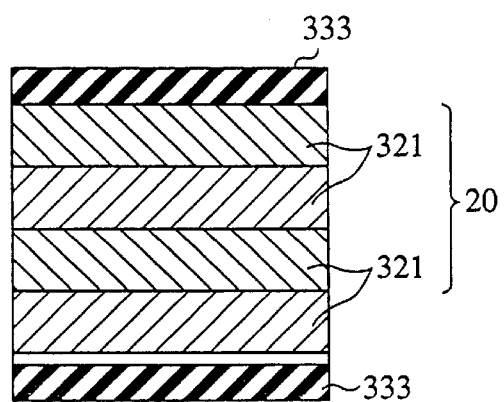
FIG. 104 is a partial sectional view of the laminated core shown in FIG. 103.

FIGS. 103, 104 are a partial perspective view and a partial sectional view, respectively, showing the laminated core 20 of another configuration. FIG. 103 shows the state in which insulating thin plates 333 are bonded to the upper and lower surfaces of the laminated core 20 corresponding to the stator component 9. FIG. 104 shows the state of the coil forming portion cross section 329, in which the insulating thin plates 333 are bonded to the upper and lower surfaces of the laminated core 20.

Consequently, this construction makes it possible to wind the laminated core 20 with wire without performing insulation treatment on the laminated core 20, such integrated molding of resin, formation of resin bobbin and fusing of insulating sheet.

Figure 105:
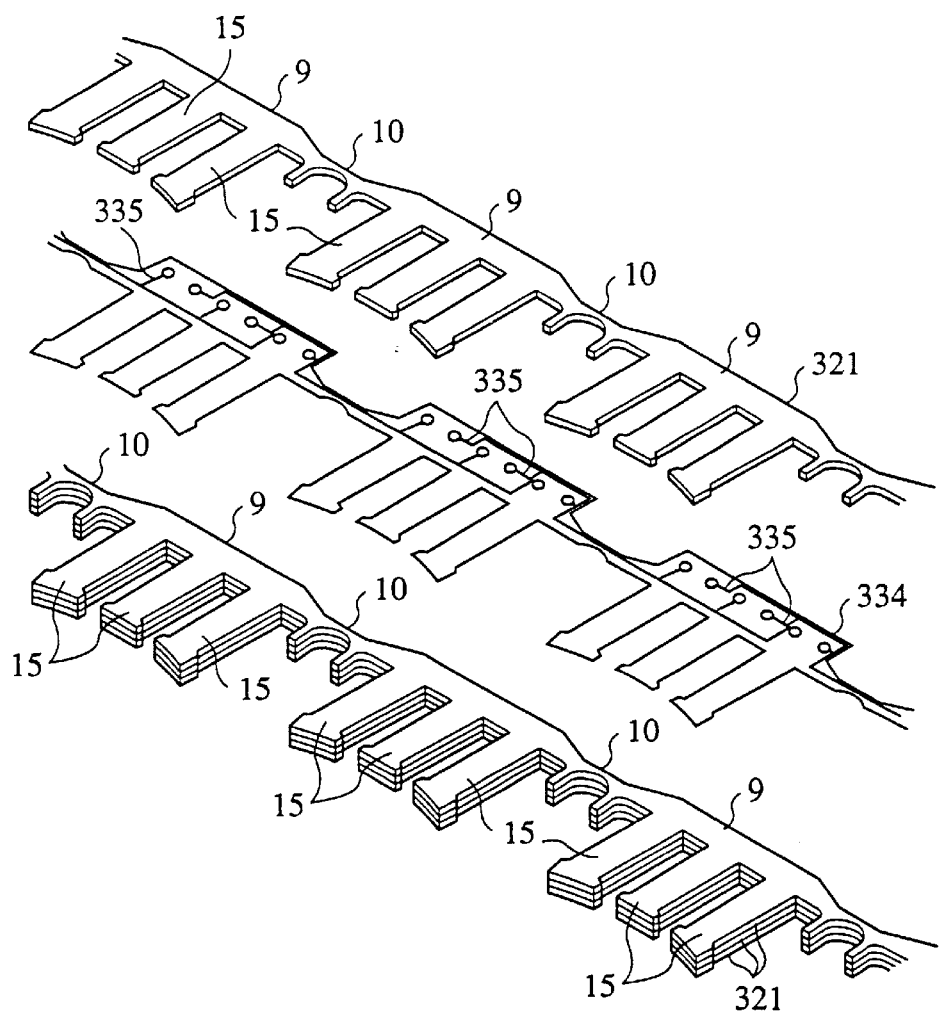
FIG. 105 is a disassembly perspective view showing an enlargement of a yet still further laminated core according to the fortieth embodiment of the present invention.
Figure 106:
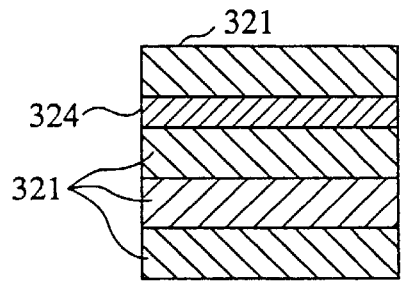
FIG. 106 is a partial sectional view of the laminated core shown in FIG. 105.

FIG. 105 is a partial perspective view of still another laminated core 20 and FIG. 106 is a partial sectional view thereof. As shown in FIG. 105, the laminated core contains film like wiring sheet 334 which is sandwiched between arbitrary pieces of a plurality of the magnetic materials 321 punched by means of press. The wiring sheet 334 has wiring pattern 335 which is arranged in the insulating sheet. FIG. 106 shows the coil forming cross section 329 which contains the wiring sheet 334.

By forming the laminated core 20 in this manner, it is possible to connect the terminal wire of the coil 2 to the wiring pattern 335 of the wiring sheet 334.

Figure 107:
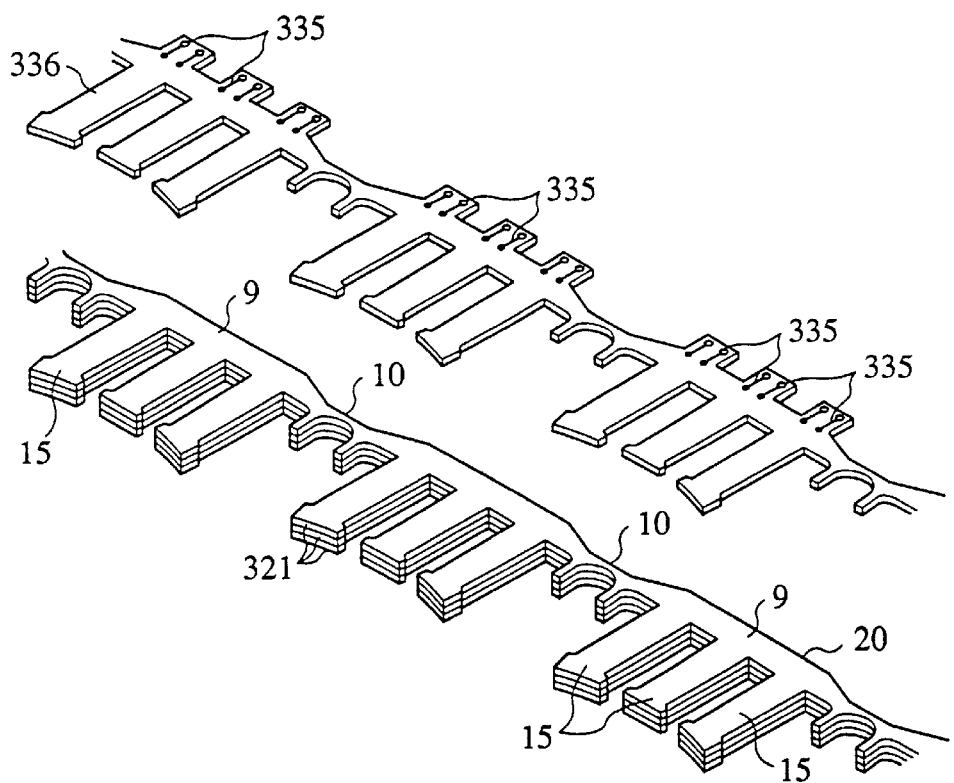
FIG. 107 is a disassembly perspective view of a yet still further laminated core according to the fortieth embodiment of the present invention.
Figure 108:
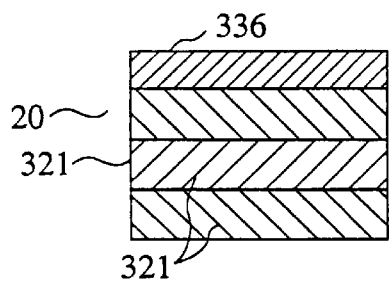
FIG. 108 is a partial sectional view of the laminated core shown in FIG. 107.

FIG. 107 is a partial perspective view of a further laminated core 20 and FIG. 108 is a partial sectional view thereof. As shown in FIG. 107, the magnetic material substrate 336 is attached to one side of the laminated core 20. The magnetic material substrate 336 is of the same shape as the magnetic material 321, and insulating thin film and conductive thin film made of copper or the like are formed on the surface thereof. The wiring pattern 335 is formed by etching the conductive thin film. FIG. 108 shows the coil forming cross section in which the magnetic material substrate 336 is formed on the top surface of the laminated core 20.

By forming the laminated core 20 in the aforementioned manner, it is possible to connect directly the terminal wire of the coil 2 to the magnetic material substrate 336, thereby achieving thin structure laminated core 20.

Embodiment 41

Figure 109:
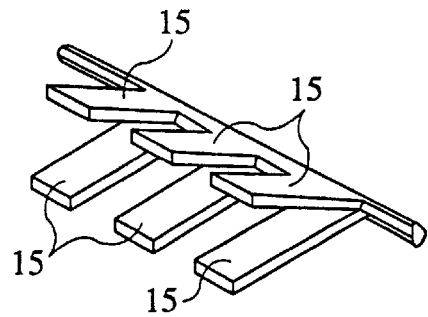
FIG. 109 is an explanatory view showing the state in which the magnetic materials are bent according to the forty first embodiment of the present invention.
Figure 110:
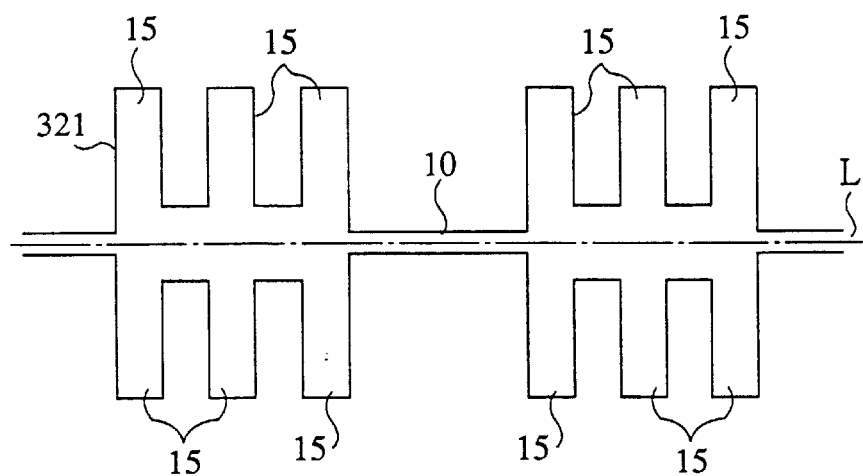
FIG. 110 is an explanatory view showing the shape before the magnetic material shown in FIG. 109 is bent.
Figure 111:
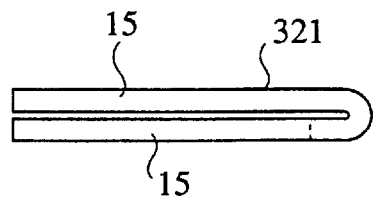
FIG. 111 is an explanatory view showing the shape after the magnetic material shown in FIG. 109 is bent.
Figure 112:
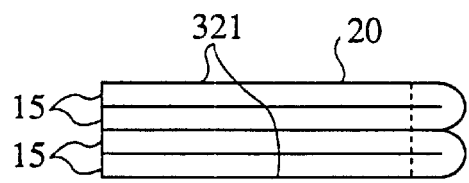
FIG. 112 is an explanatory view showing the state in which the bent magnetic materials shown in FIG. 111 are stacked.
Figure 113:
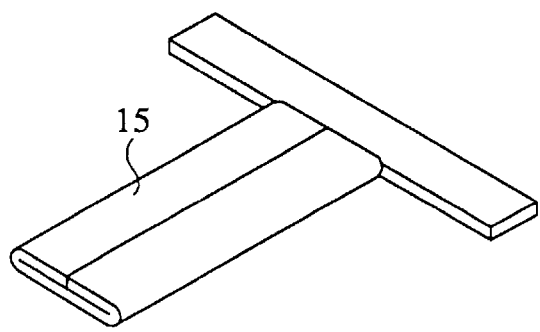
FIG. 113 is an explanatory view showing the state in which the magnetic pole tooth of the magnetic material is bent according to the forty first embodiment of the present invention.

FIGS. 109–114 are explanatory views showing other method for forming the laminated core 20. As shown in FIG. 110, the sheet-like magnetic material 321 having the teeth 15 arranged symmetrically with respect to the axis line L is formed by punching by means of press. Then, as shown in FIG. 109, the magnetic material 321 is bent at a position (or a plurality of positions) in order to form the connecting stator core as shown in FIG. 111. This method makes it possible to position the burr portion on the edge of the magnetic material 321 formed due to punching, on the overlapping side and then position the drooping side on the outside. That is, it is possible to provide the corner of the coil forming portion with roundness, thereby reducing damage of the coil. Further, a plurality of the magnetic materials 321 or the connecting stator cores are stacked as shown in FIG. 112 to form the laminated core 20. Meanwhile, it is permissible to form the core 20 with only a single magnetic material 321.

Figure 114:
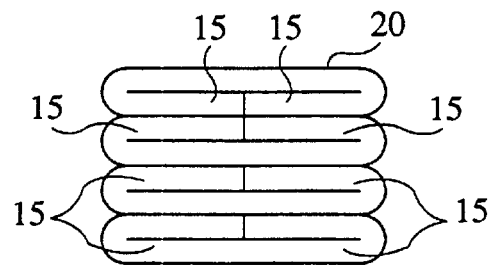
FIG. 114 is an explanatory view showing the state in which the magnetic pole teeth shown in FIG. 113 are stacked.

Further, it is permissible to bend both sides of the magnetic pole teeth 15 of the magnetic material 321 punched by means of press so that the edges of the bent portions contact each other in order to provide both side ends with roundness and stack such magnetic pole teeth 15 to form the laminated core 20 as shown in FIG. 114. In this manner, it is possible to provide the corners of the cross section of the coil forming portion of the laminated core 20 with roundness, so that the burr formed by punching by press is not located on the corner of the cross section of the coil forming portion. As a result, it is possible to form the coil 2 directly on the surface of the laminated core 20 or the laminated core coated with thin film.

Embodiment 42

Figure 115:
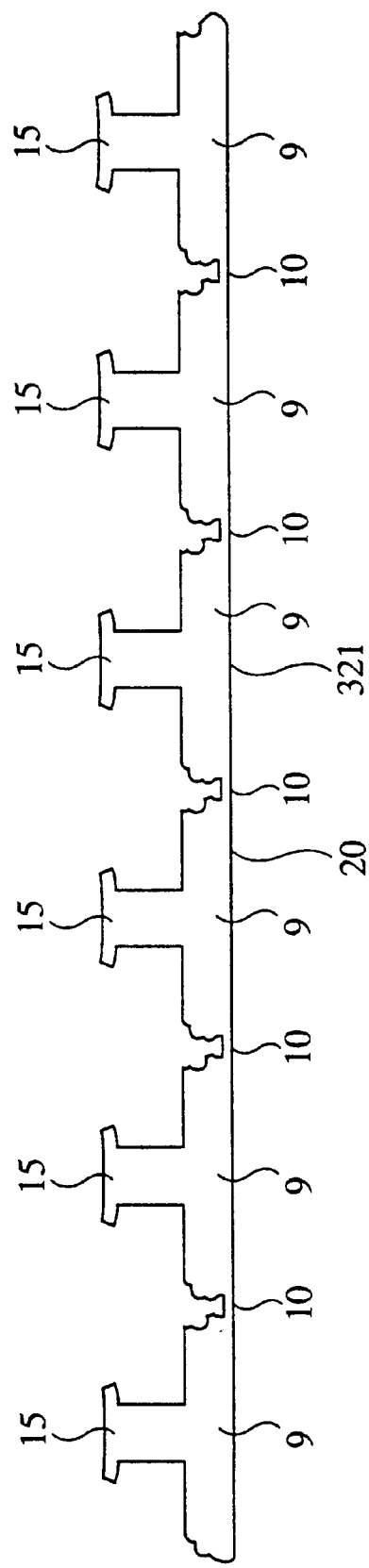
FIG. 115 is a front view showing the laminated core according to the forty second embodiment of the present invention.
Figure 125:
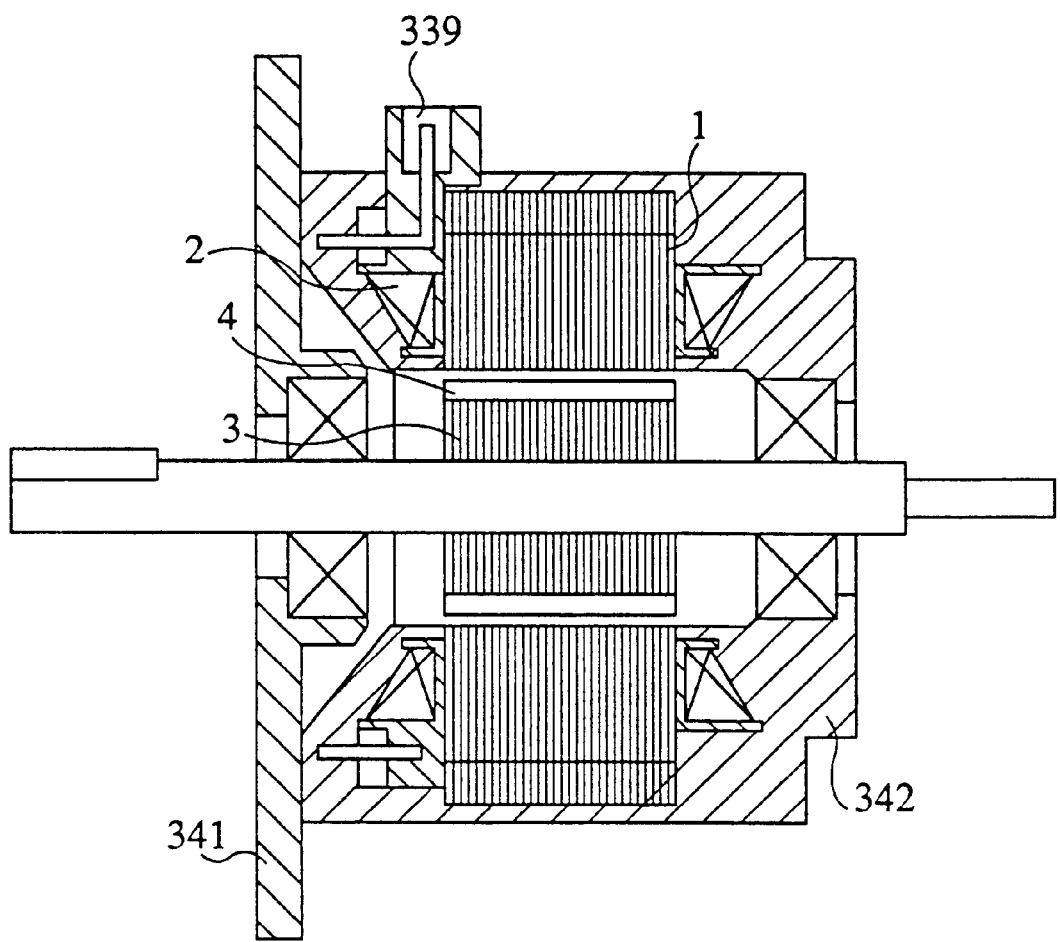

FIG. 115 is a plan view of the laminated core 20 for AC servo motor according to the forty seventh embodiment of the present invention. This AC servo motor is a small sized, high power brushless motor used for automation equipment, industrial robot or the like. FIG. 125 shows a sectional view of the AC servo motor. In FIG. 125, reference numeral 1 designates a stator, numeral 2 designates a coil, numeral 3 designates a rotor and numeral 4 designates a rotor magnet.

Figure 116:
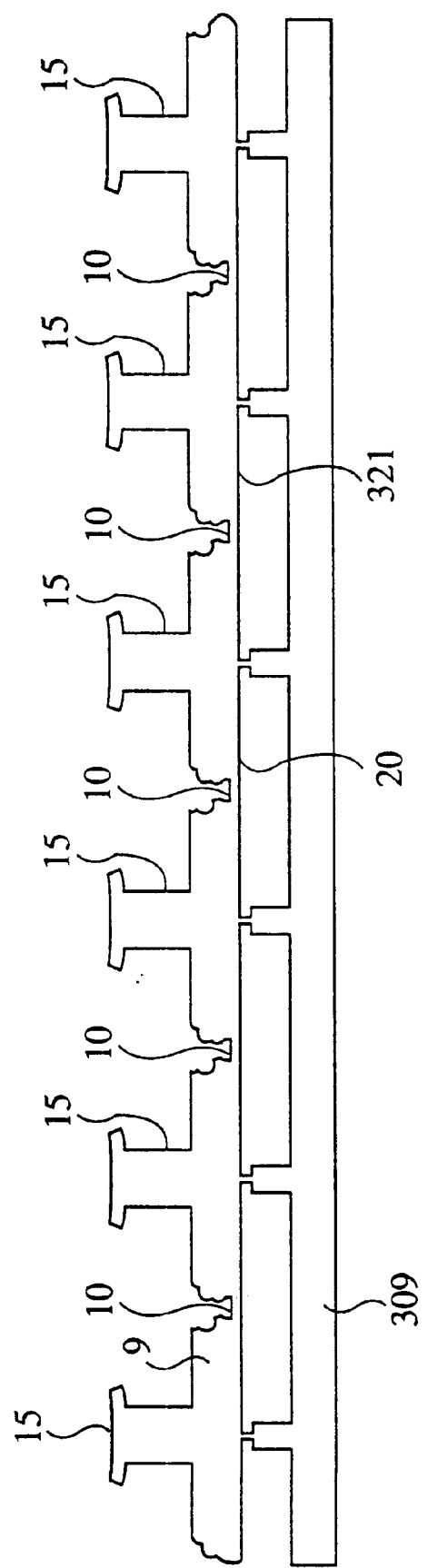
FIG. 116 is a front view of another laminated core according to the forty second embodiment of the present invention.

In the present embodiment, the magnetic material punched by means of press is formed so that a plurality of the stator components 9 are connected linearly by the thin portions 10, as shown in FIG. 115. For example, it is permissible to arrange a series of reinforcing material 309 so that they bridge the thin portions 10 as shown in FIG. 116, the reinforcing material being separable from the stator components 9.

Figure 117:
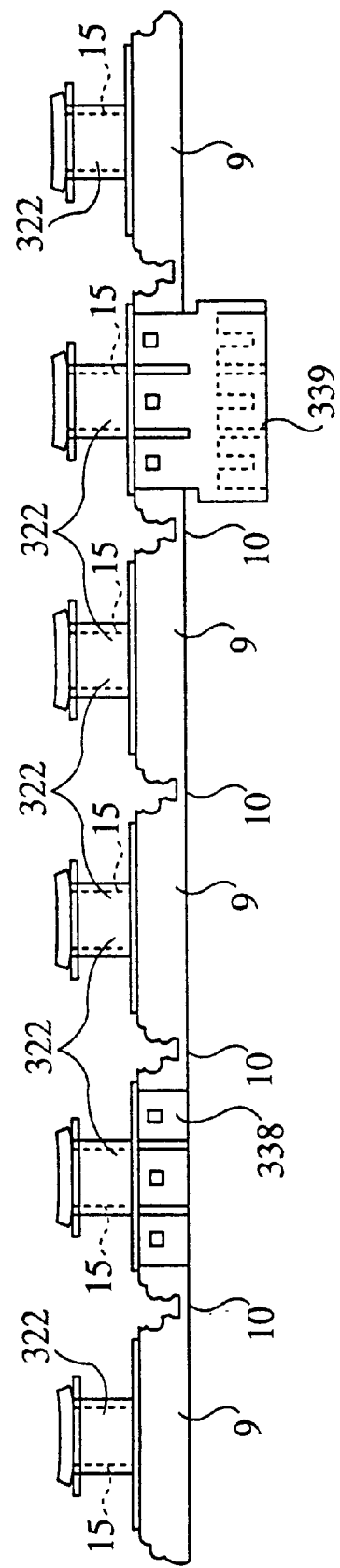
FIG. 117 is an explanatory view showing the state in which the neutral point treatment portion and the connector portion are integratedly molded in the laminated core according to the forty second embodiment of the present invention.

FIG. 117 shows an example in which resin is integratedly molded so as to form the coil forming portion 322 of the stator component 9, the neutral point treatment portion 338 and the connector portion 339 at predetermines positions of the laminated core 20. Meanwhile, it is permissible to construct the laminated core 20 so that the magnetic materials 321 in which the thin portion 10 is formed are stacked with the magnetic materials 321 in which the thin portion 10 is not formed.

As the method for fixing the laminated core 20, as shown in FIG. 92, it is possible to use such a method in which a large current is supplied to a position or a plurality of positions of the stacked magnetic materials 321 with pressure applied to the stacked magnetic materials 321 in order to fuse the current passing portions of the magnetic materials 321 by self generated heat. Or as shown in FIGS. 96–98, it is also possible to use such a method in which slight dent/protruding portions 328 are formed at a position or a plurality of positions on the surface of the magnetic material 321 punched by means of press, a plurality of the punched magnetic materials 321 are stacked, the dent/protruding portions 328 are nipped between the upper electrode 325 and the lower electrode 326 along the thickness thereof and a large current is supplied with pressure applied to the stacked magnetic materials.

Figure 118:
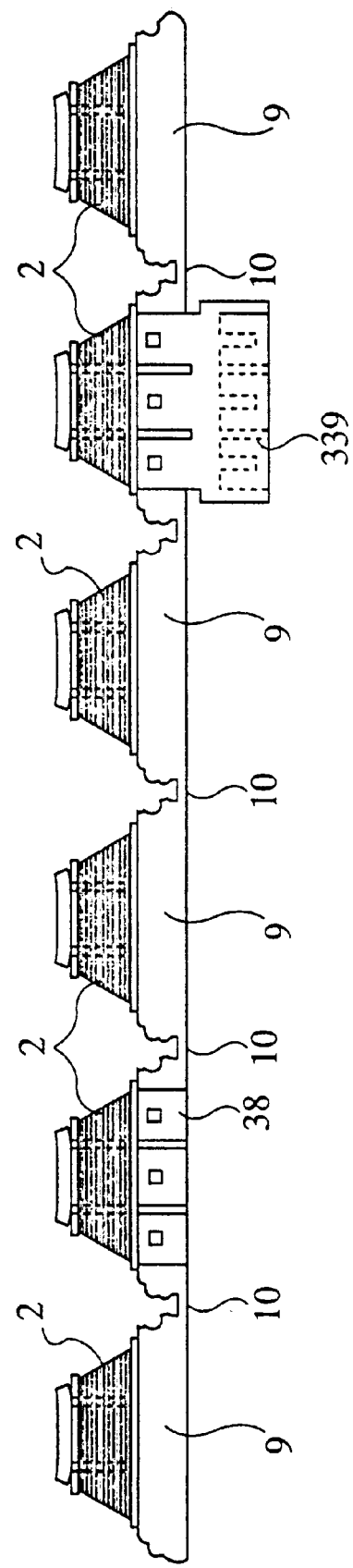
FIG. 118 is a front view showing the state in which the coils are formed on the laminated core shown in FIG. 117.
Figure 119:
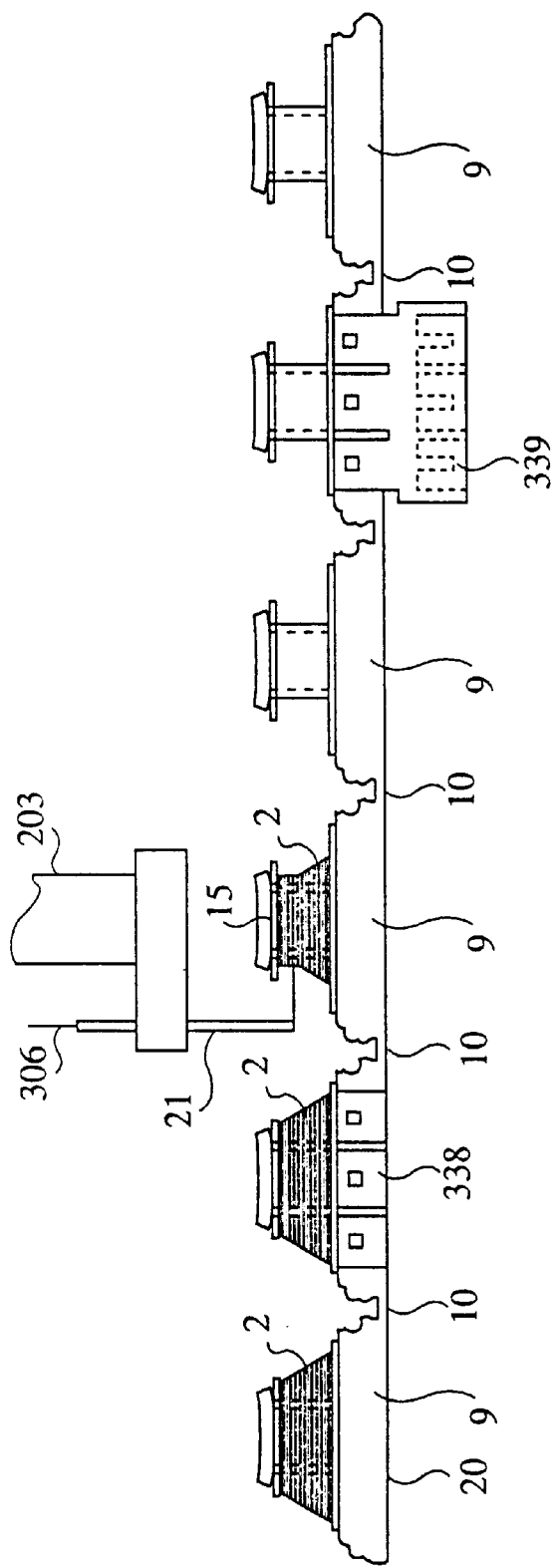
FIG. 119 is a front view showing the process in which the laminated core according to the forty second embodiment of the present invention is being wound with wire.
Figure 124:
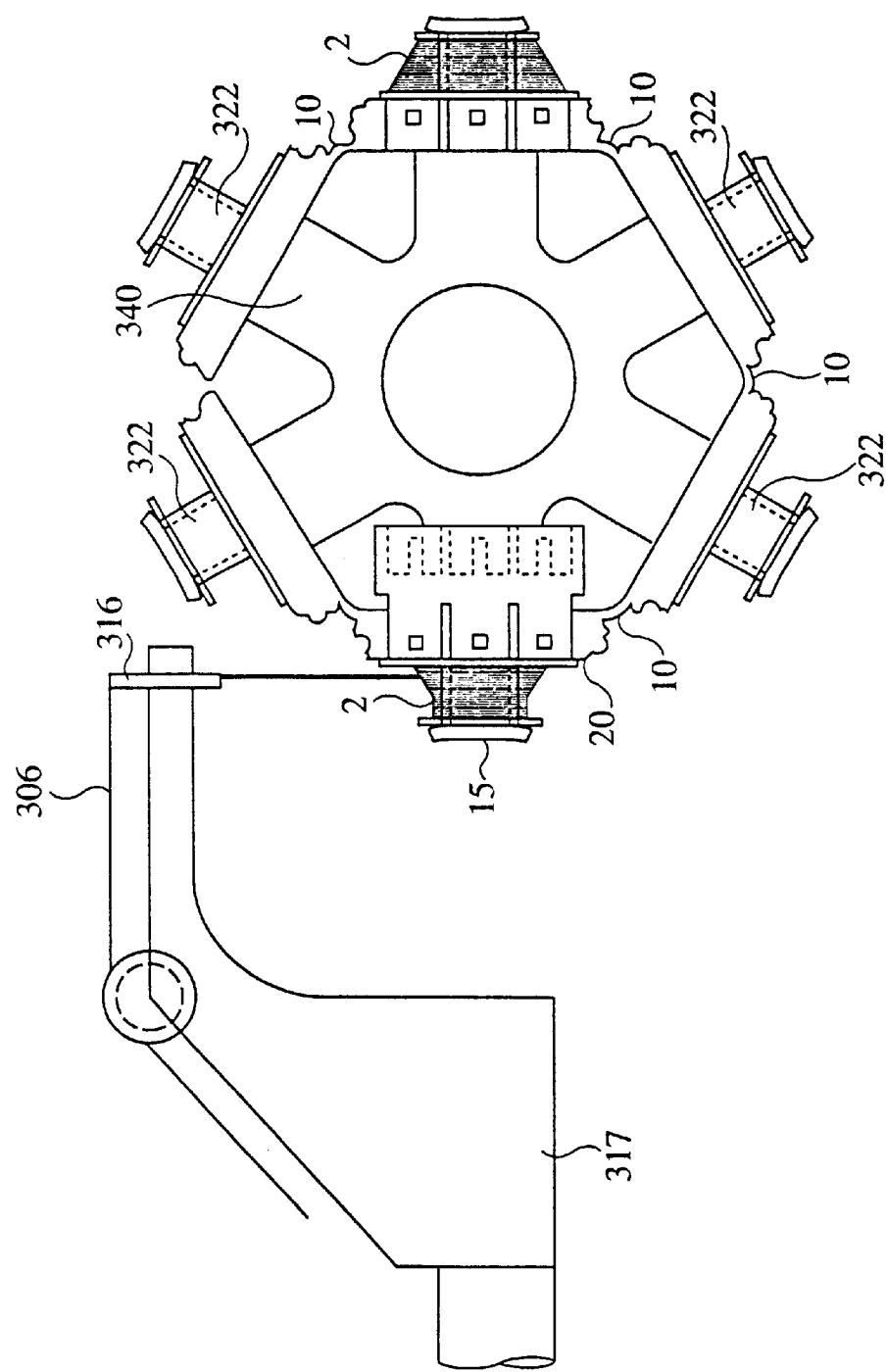

FIG. 118 shows the state in which the coils 2 are formed by winding wire introduced from the wire nozzle 316 of the wire winding machine 317 as shown in FIGS. 119 and 124. In this wire winding process, the wire nozzle 316 is rotated around the magnetic pole tooth 15 and then the position of the wire nozzle 316 is changed with respect to the laminated core 20, thereby facilitating to obtain the shape of coil in which wires are neatly arranged. FIG. 124 shows the laminated core 20 is attached to the index jig 340 during winding.

Figure 120:
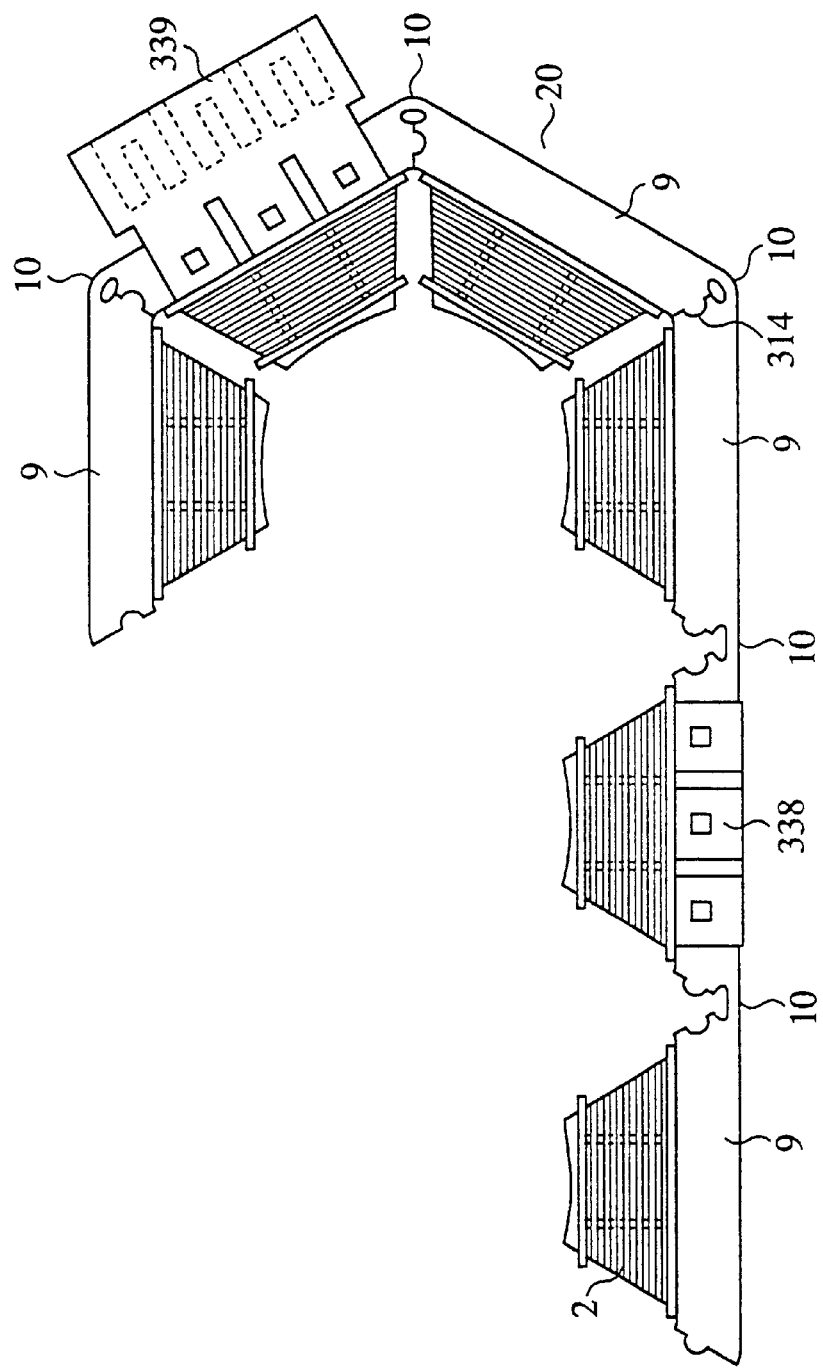
Figure 121:
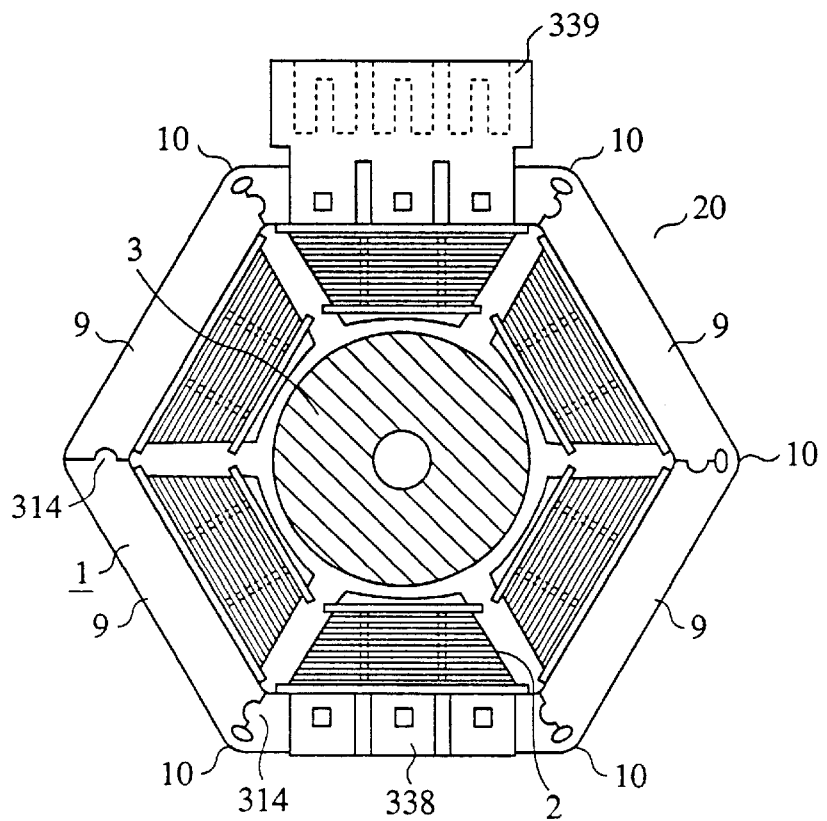

FIG. 120 shows the state in which the stator 1 is being formed by bending the laminated core 20 as shown in FIG. 118 through the thin portion 10. FIG. 121 shows the state in which the stator 1 has been formed by bending all the thin portions 10 completely. In this Figure, reference numeral 3 designates a rotor. When the laminated core 20 has been bent completely, as shown in FIG. 90, the neighboring magnetic path forming portions 314 of the core portion 9 of the laminated core 20 are fit to each other or brought near each other, both ends or a single end thereof along the thickness of the laminated core 20 is fused and fixed by means of YAG laser or the like, thereby fixing together the core portions 9 of the laminated core 2 firmly.

Figure 122:
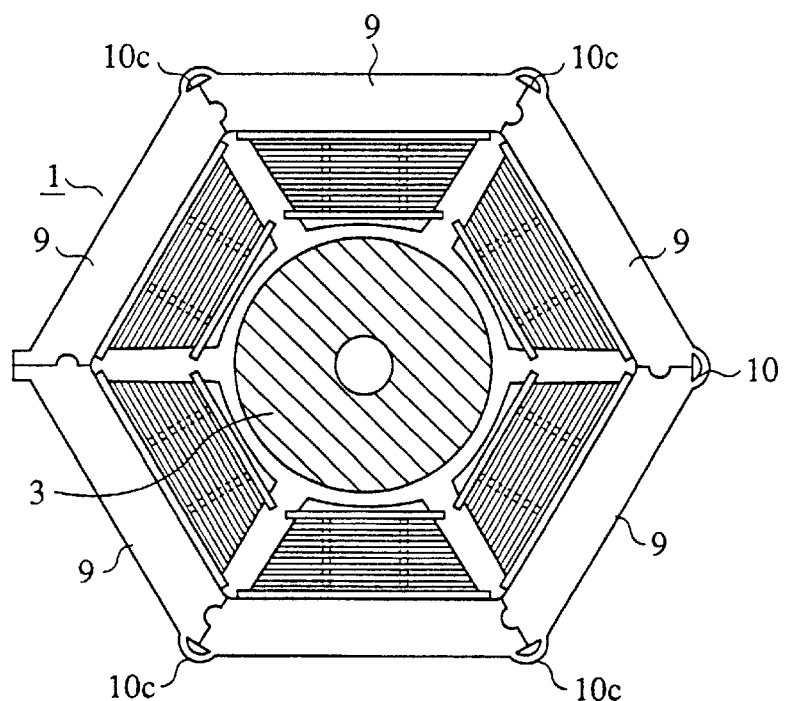
Figure 123:
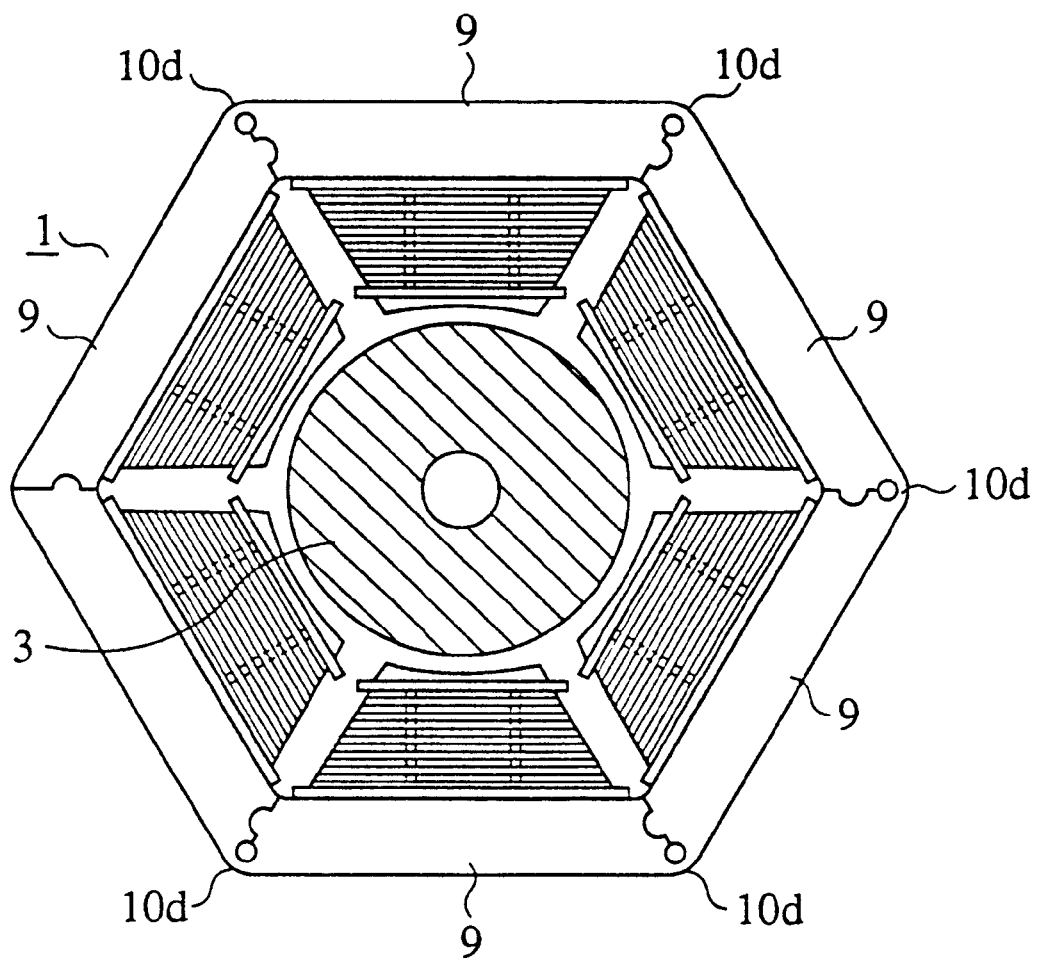

FIG. 122 shows the state in which the thin portions 10 protrude in the shape of arc as the thin pieces 10c. FIG. 123 shows the state in which the respective thin portions 10 are thin arc pieces 10d having no edge.

Embodiment 43

Figure 126:
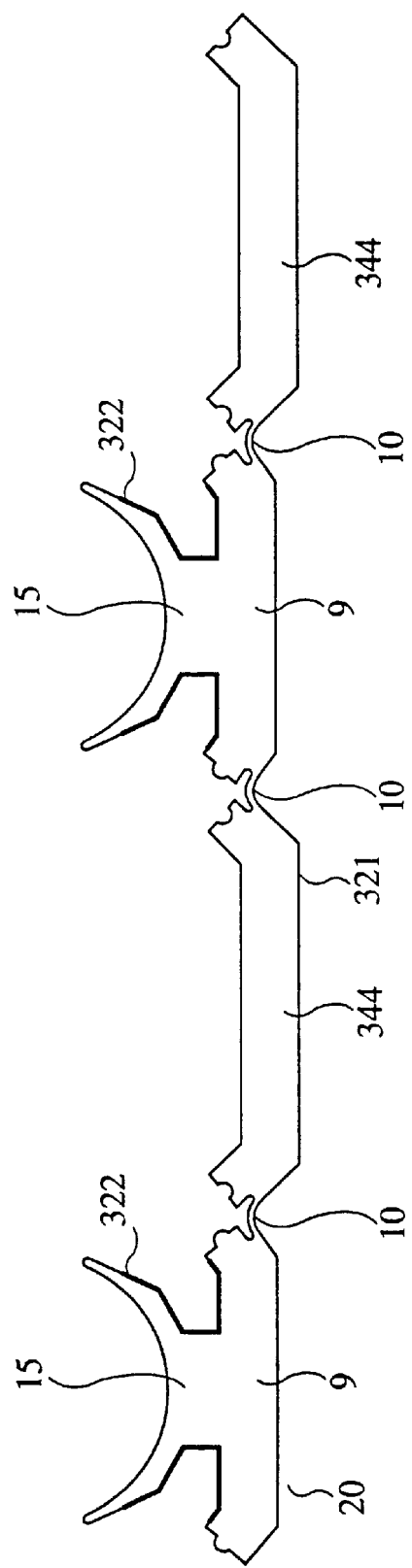

FIG. 126 is a plan view showing the laminated core 20 of an armature motor according to the forty third embodiment of the present invention. This armature motor is a small sized, high speed rotation, brush provided motor used in electric fans of cleaners, electric drill and the like. FIG. 134 shows a side view of an electric fan among those. In this Figure, reference numeral designates a stator, numeral 2 designates a coil, numeral 3 designates a rotor and numeral 343 designates a bracket.

As shown in FIG. 126, the magnetic material 321 punched by means of press includes two stator components 9, two yoke portions 344 and the thin portions 10 which combine the stator components with the yoke portions, the respective members being connected to each other in series. The laminated core 20 composed of the magnetic materials 321 may be constructed so that the magnetic materials having the thin portion 10 are stacked with the magnetic materials having no thin portion as shown in FIG. 88.

As the method for fixing the laminated core 20, it is possible to use such a method in which, as shown in FIG. 92, a large current is supplied to a position or a plurality of positions of the stacked magnetic materials 321 with pressure applied thereto and the current passing portions of the stacked magnetic materials 321 are fused by self generated heat. Or it is also possible to use such a method in which, as shown in FIGS. 96–98, slight dent/protruding portions 328 are provided on a position or a plurality of positions on the surface of the magnetic materials 321 punched by means of press, a plurality of the magnetic materials 321 punched by press are stacked and the dent/protruding portions 328 are nipped between the upper electrode 325 and the lower electrode 326 along the thickness of the stacked magnetic materials to supply a large current thereto.

Figure 127:
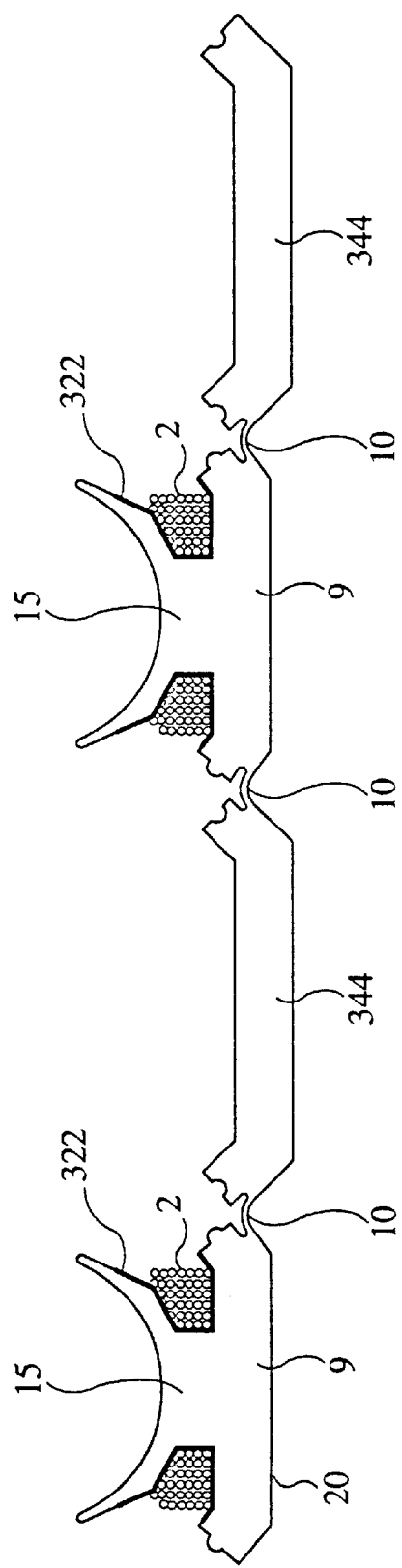
Figure 128:
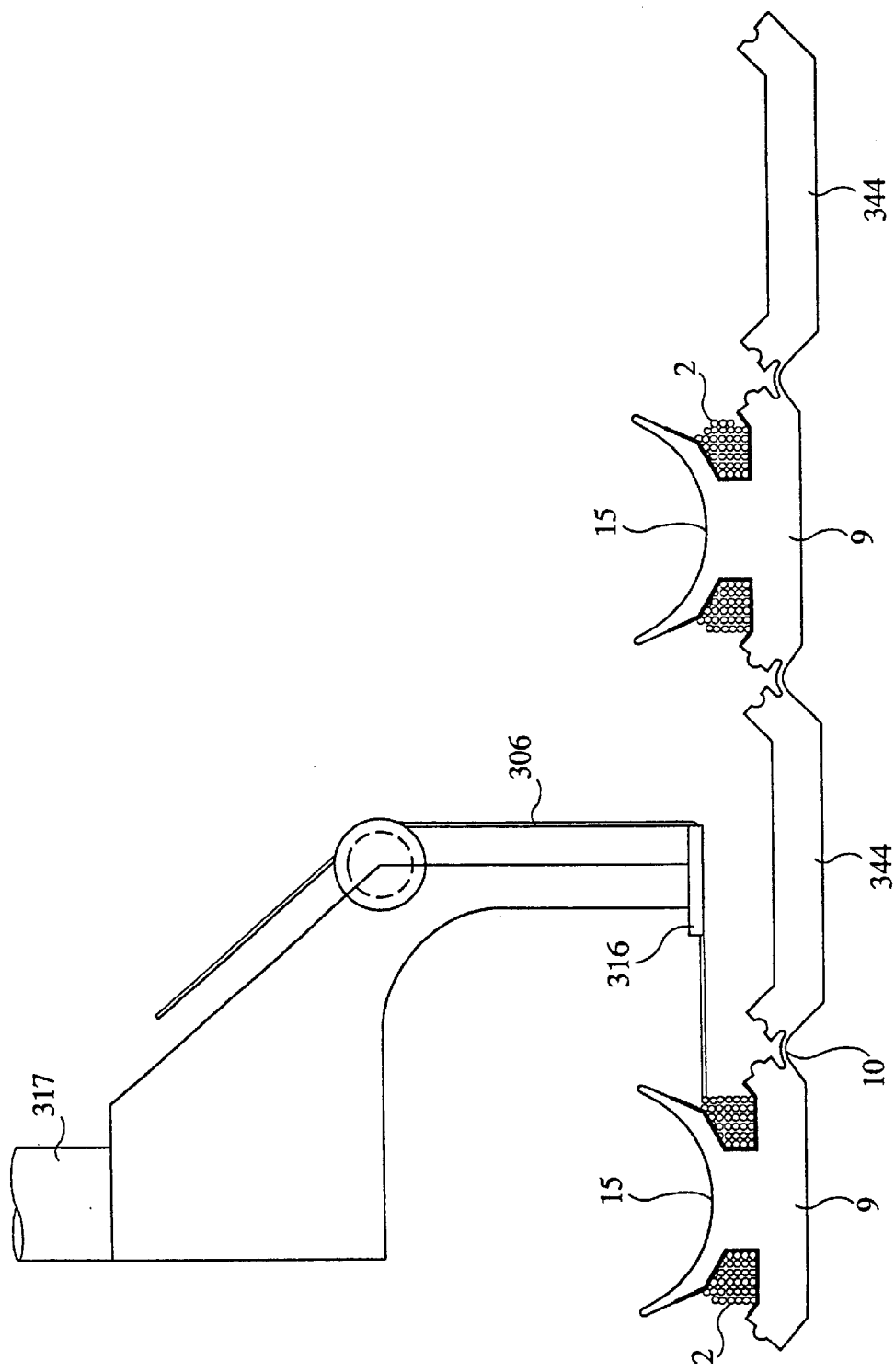

FIG. 127 shows the state in which the coils 2 are formed around the magnetic pole teeth 15 of the laminated core 20 and FIG. 128 shows the process in which the coils 2 are being formed. According to the method shown in FIG. 128, the wire nozzle 316 for feeding wire are rotated around the magnetic pole teeth 15 and the position of the wire nozzle 316 is changed with respect to the position of the laminated core 20. Consequently, it is possible to obtain the coils 2 arranged neatly.

Figure 130:
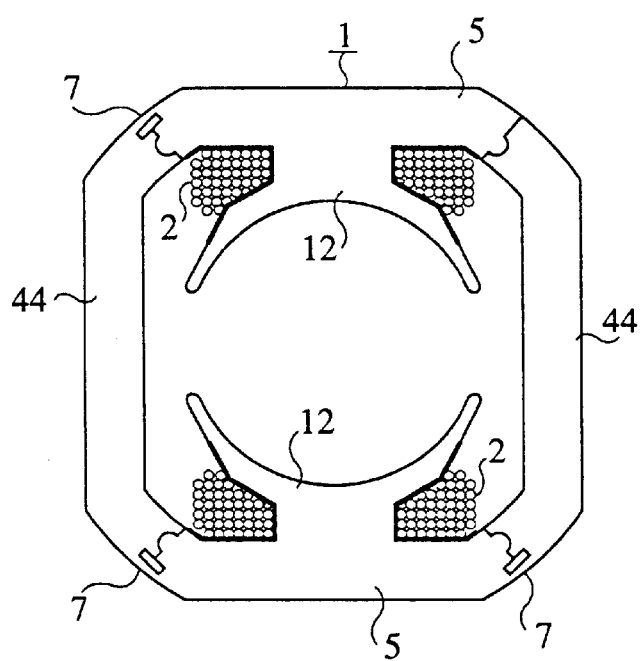

FIG. 129 shows the process in which the stator 1 is being formed by bending the thin portions 10 of the laminated core 20 in which the coils 2 are formed on the magnetic pole teeth 15. FIG. 130 shows the state in which all the thin portions 10 have been bent to form the stator 1. When all the thin portions 10 are bent completely, the magnetic path forming portions 314 of the neighboring core portion 9 of the laminated core 20 are fit to each other or placed near each other as shown in FIG. 90 and both end faces or a single end face of the laminated core 20 is fused together by means of YAG laser or the like. As a result, the core portions 9 of the laminated core 20 are fixed together firmly.

Figure 131:
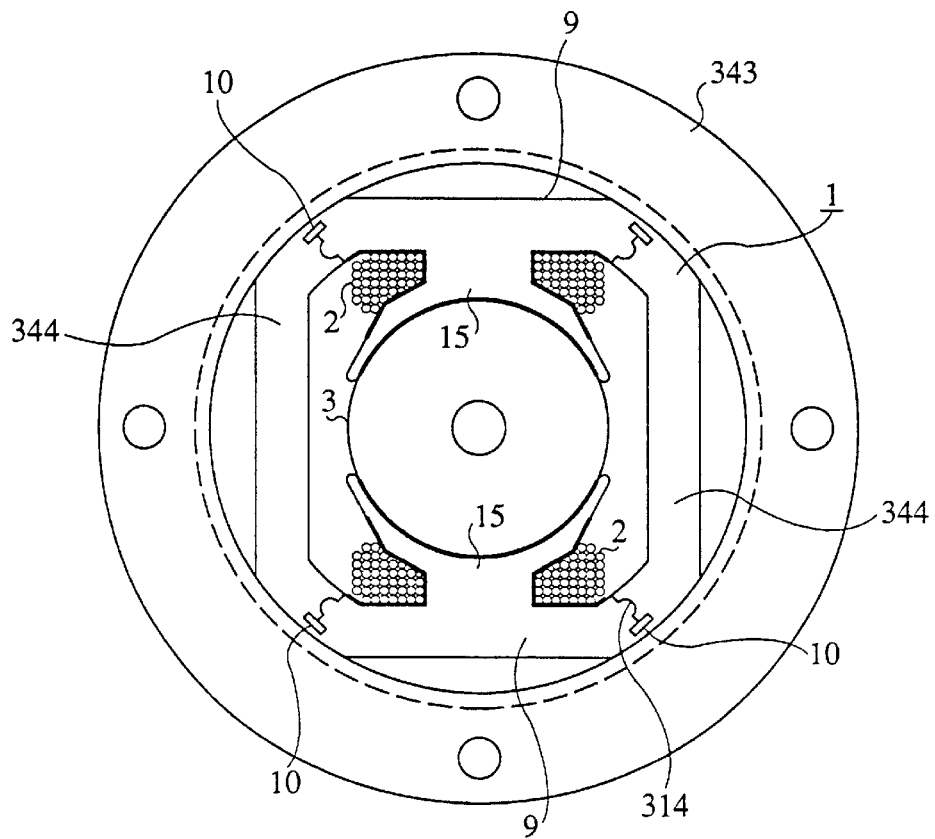

By pressing the stator 1 into the ring like bracket 343 after all the thin portions 10 are bent completely as shown in FIG. 131, it is possible to fix the laminated core firmly.

In this case, in the process in which the thin portions are bent as shown in FIG. 132, the rotor 3 is disposed. Then, as shown in FIG. 133, all the thin portions 10 are bent to form the stator. After all the thin portions 10 are bent completely, the stator 1 is pressed into the bracket 343. According to this method, it is easy to wind wire so that the coils 2 are formed so as to surround the rotor 3.

Embodiment 44

FIG. 135 is a front view of the laminated core 20 for small size transformers. As shown in the Figure, the yoke portion 344 which is part of the magnetic path of the laminated core 20 is connected to a substantially U-shaped core 9 through the thin portion 10. After a coil is mounted, the yoke portion 344 can be bent so as to close the U-shaped opening. As a method for fixing the laminated core, it is possible to use a conventional trimmed caulking portion. Further, it is possible to use such a method in which, as shown in FIG. 92, pressure is applied to a position or a plurality of positions of the stacked magnetic materials by means of the upper electrode 325 and the lower electrode 326 and then a large current is supplied to fuse the current passing portion of the stacked magnetic materials 321 by self generated heat. Still further, it is possible to use such a method in which, as shown in FIGS. 96–98, slight dent/protruding portions 328 are provided at a position or a plurality of positions on the surface of the magnetic material 321 punched by press, a plurality of the punched magnetic materials 321 are stacked, the dent/protruding portions 328 are nipped by the upper electrode 325 and the lower electrode 326 along the thickness of the stacked magnetic materials to apply pressure and then a large current is supplied thereto.

As shown in FIGS. 136, 137, the coil 2 is formed on the bobbin 345 made of insulating material, the bobbin is mounted around the leg of the laminated core 20, and the yoke portion 344 is closed by bending the thin portion 10. As a result, as shown in FIG. 138, a magnetic path of the laminated core 20 is formed. With this condition, as shown in FIG. 90, the neighboring magnetic path forming portions 314 of the laminated core 20 are fit to each other and then both end faces or a single end face along the stacked layers is fused in order to fix the cores 9 of the laminated core 20 firmly.

What is claimed is:

1. A method of producing a rotary motor, the method comprising steps of:

forming a plurality of sheets of magnetic material, each sheet including a plurality of blocks and a plurality of bendable coupling portions, each block having a plurality of magnetic pole teeth and being free of the bendable coupling portions between the magnetic pole teeth, the plurality of blocks being connected with the plurality of bendable coupling portions in series in a direction perpendicular to the direction of magnetic flux flow of the magnetic pole teeth of each block;

laminating the plurality of sheets of magnetic material;

winding the magnetic pole teeth of the laminated sheets with a continuous length of wire to form coils thereon, respectively, at least one coil on a block being connected to at least one coil on an adjacent block with a crossover wire that is a portion of the continuous length of wire; and bending the laminated sheets at the bendable coupling portions to arrange the blocks in a circular configuration after the winding step.

2. The method according to claim 1, wherein the rotary motor has n phases, the number of magnetic pole teeth of each block being n and one of the n magnetic pole teeth corresponding to each of the n phases.

3. The method according to claim 1, wherein the step of winding the magnetic pole teeth includes simultaneously winding wire on each of the magnetic pole teeth of one of the blocks.

4. The method according to claim 1, wherein the step of forming the plurality of sheets includes forming the plurality of coupling portions as thin portions.

5. The method according to claim 4, further comprising a step of:

mounting the bent sheets on a molded resin product or a substrate.

6. The method according to claim 5, wherein the step of mounting the bent sheets includes removing the coupling portions from the bent sheets.

7. A method of producing a rotary motor, the method comprising steps of:

forming a plurality of sheets of magnetic material, each sheet including a plurality of blocks and a plurality of thin portions, each block having at least one magnetic pole tooth and at least one hole, the plurality of blocks being connected with the plurality of thin portions in series in a direction perpendicular to the direction of magnetic flux flow of the magnetic pole tooth of each block;

laminating the plurality of sheets of magnetic material;

forming an integrated resin molded member having a plurality of pins fixed to the blocks of the laminated sheets, the pins of the integrated resin molded member being fitted into the holes of the blocks;

winding the plurality of the magnetic pole teeth of the blocks with wire to form coils thereon;

cutting the plurality of thin portions of the laminated sheets; and bending the laminated sheets at the pins of the integrated molded member after the winding and cutting steps.

8. A method of producing a rotary motor, the method comprising steps of:

producing a linear core that includes a plurality of block portions and a plurality of bendable coupling portions, the plurality of block portions being connected with the plurality of bendable coupling portions in series, each block portion including a plurality of magnetic pole teeth and being free of the bendable coupling portions between the magnetic pole teeth;

winding the magnetic pole teeth with a continuous length of wire to form coils thereon, respectively; and bending the core at the bendable coupling portions to arrange the block portions in a nonlinear configuration after the winding step.

9. The method according to claim 8, wherein the rotary motor has n phases, the number of magnetic pole teeth of each block being n and one of the n magnetic pole teeth corresponding to each of the n phases.

10. The method according to claim 9, wherein the n magnetic pole teeth of each block portion are parallel to each other.

11. The method according to claim 10, wherein the step of winding includes simultaneously winding each of the n magnetic pole teeth of one of the block portions.

12. The method according to claim 8, wherein the step of winding includes connecting at least one coil on a block to at least one coil on an adjacent block with a crossover wire that is a portion of the continuous length of wire and positioning at least one portion of the crossover wire on a side of the core opposite the magnetic pole teeth.

\* \* \* \* \*